US008419544B2

(12) United States Patent
McNutt et al.

(10) Patent No.: US 8,419,544 B2
(45) Date of Patent: Apr. 16, 2013

(54) SYSTEMS AND METHODS FOR INTERACTIVE WAGERING USING MULTIPLE TYPES OF USER INTERFACES

(75) Inventors: Richard Earl McNutt, Lafayette, CO (US); Thomas Lazzlo Aronson, Boulder, CO (US); Masood Garahi, Superior, CO (US); Alice June Courtney, Boulder, CO (US); Ben Springborn, Lakewood, CO (US); Douglas Vaughn Ramsey, Lafayette, CO (US); Eric Frank Stimmel, Louisville, CO (US); Erik Thomas Russell Olsen, Westminster, CO (US); James Howard Darr, Arvada, CO (US); Rodney John Gaidies, Golden, CO (US); Connie T. Marshall, Muskogee, OK (US); Jon Charles Zaring, Glenpool, OK (US); Kevin Dwight Satterfield, Tulsa, OK (US)

(73) Assignee: ODS Properties, Inc., Los Angeles, CA (US)

( * ) Notice: Subject to any disclaimer, the term of this patent is extended or adjusted under 35 U.S.C. 154(b) by 538 days.

(21) Appl. No.: 12/077,305

(22) Filed: Mar. 17, 2008

(65) Prior Publication Data

US 2008/0234051 A1 Sep. 25, 2008

Related U.S. Application Data

(63) Continuation of application No. 09/330,963, filed on Jun. 11, 1999, now abandoned.

(51) Int. Cl.
*A63F 13/00* (2006.01)

(52) U.S. Cl.
USPC .................................. 463/42; 463/17; 463/25

(58) Field of Classification Search ................ 463/6, 17, 463/25, 41, 42
See application file for complete search history.

(56) References Cited

U.S. PATENT DOCUMENTS

| | | | |
|---|---|---|---|
| 3,697,698 | A | 10/1972 | Oswald |
| 3,909,002 | A | 9/1975 | Levy |

(Continued)

FOREIGN PATENT DOCUMENTS

| | | |
|---|---|---|
| DE | 19502613 | 8/1996 |
| EP | 0387046 A2 | 9/1990 |

(Continued)

OTHER PUBLICATIONS

Arlen, "Telegambling is Odds on Bet to Make an Impact", Multichannel News, Broadbrand Week; Nov. 7, 1994 (1 page).

(Continued)

*Primary Examiner* — James S McClellan
(74) *Attorney, Agent, or Firm* — Ropes & Gray LLP

(57) ABSTRACT

The present invention is systems and methods for interactive wagering using multiple types of user interfaces. Preferred embodiments of these systems and methods incorporate a wagering data hub which controls the flow of data relating to wagers, wagering events, and wagering account and facilitates the use of a variety of user interfaces such as graphical user interfaces and interactive voice response interfaces. For example, a user of the present invention may use a television set-top box, a computer, a telephone, and/or any other suitable device. To communicate with the wagering data hub, television set-top boxes preferably use a two-way cable system, computers preferably use a computer network, and telephones preferably use a telephone network, although each may use any suitable mechanism or combination of mechanisms to communicate with wagering data hub.

21 Claims, 154 Drawing Sheets

U.S. PATENT DOCUMENTS

| | | | | | |
|---|---|---|---|---|---|
| 4,033,588 | A | | 7/1977 | Watts | |
| 4,108,361 | A | | 8/1978 | Krause | |
| 4,322,612 | A | | 3/1982 | Lange | |
| 4,323,242 | A | | 4/1982 | Rosenfeld | |
| 4,339,798 | A | | 7/1982 | Hedges | |
| 4,372,558 | A | | 2/1983 | Shimamoto | |
| 4,467,424 | A | | 8/1984 | Hedges | |
| 4,494,197 | A | | 1/1985 | Troy | |
| 4,592,546 | A | | 6/1986 | Fascenda | |
| 4,593,904 | A | | 6/1986 | Graves | |
| 4,636,951 | A | | 1/1987 | Harlick | |
| 4,652,998 | A | | 3/1987 | Koza | |
| 4,669,730 | A | | 6/1987 | Small | |
| 4,689,742 | A | | 8/1987 | Troy | |
| 4,694,490 | A | | 9/1987 | Harvey | |
| 4,745,468 | A | | 5/1988 | Von Kohorn | |
| 4,747,600 | A | | 5/1988 | Richardson | |
| 4,760,527 | A | | 7/1988 | Sidley | |
| 4,764,666 | A | | 8/1988 | Bergeron | |
| 4,799,683 | A | | 1/1989 | Bruner | |
| 4,815,741 | A | | 3/1989 | Small | |
| 4,882,473 | A | | 11/1989 | Bergeron | |
| 4,922,522 | A | | 5/1990 | Scanlon | |
| 4,926,255 | A | | 5/1990 | Von Kohorn | |
| 4,926,327 | A | | 5/1990 | Sidley | |
| 4,965,825 | A | | 10/1990 | Harvey | |
| 4,969,183 | A | | 11/1990 | Reese | |
| 4,996,705 | A | | 2/1991 | Entenmann | |
| 5,007,649 | A | | 4/1991 | Richardson | |
| 5,034,807 | A | | 7/1991 | Von Kohorn | |
| 5,042,063 | A | | 8/1991 | Sakanishi | |
| 5,054,787 | A | | 10/1991 | Richardson | |
| 5,057,915 | A | | 10/1991 | Von Kohorn | |
| 5,073,931 | A | | 12/1991 | Audebert | |
| 5,083,271 | A | | 1/1992 | Thacher | |
| 5,083,272 | A | | 1/1992 | Walker | |
| 5,083,800 | A | | 1/1992 | Lockton | |
| 5,096,195 | A | | 3/1992 | Gimmon | |
| 5,096,202 | A | | 3/1992 | Hesland | |
| 5,112,050 | A | | 5/1992 | Koza | |
| 5,119,295 | A | | 6/1992 | Kapur | |
| 5,178,389 | A | | 1/1993 | Bentley | |
| 5,186,471 | A | | 2/1993 | Vancraeynest | |
| 5,218,631 | A | | 6/1993 | Katz | |
| 5,276,312 | A | | 1/1994 | McCarthy | |
| 5,280,426 | A | | 1/1994 | Edmonds | |
| 5,282,620 | A | | 2/1994 | Keesee | |
| 5,283,734 | A | * | 2/1994 | Von Kohorn | 463/17 |
| 5,286,023 | A | | 2/1994 | Wood | |
| 5,295,242 | A | | 3/1994 | Mashruwala | |
| 5,297,802 | A | | 3/1994 | Pocock et al. | |
| 5,326,104 | A | | 7/1994 | Pease | |
| 5,327,485 | A | | 7/1994 | Leaden | |
| 5,333,868 | A | | 8/1994 | Goldfarb | |
| 5,340,119 | A | | 8/1994 | Goldfarb | |
| 5,351,970 | A | | 10/1994 | Fioretti | |
| 5,354,069 | A | | 10/1994 | Guttman | |
| 5,365,575 | A | | 11/1994 | Katz | |
| 5,398,932 | A | | 3/1995 | Eberhardt | |
| 5,403,999 | A | | 4/1995 | Entenmann | |
| 5,408,417 | A | | 4/1995 | Wilder | |
| 5,411,258 | A | * | 5/1995 | Wilson et al. | 463/6 |
| 5,415,416 | A | | 5/1995 | Scagnelli | |
| 5,417,424 | A | | 5/1995 | Snowden | |
| 5,462,275 | A | | 10/1995 | Lowe | |
| 5,505,449 | A | | 4/1996 | Eberhardt | |
| 5,507,489 | A | | 4/1996 | Reibel | |
| 5,518,253 | A | | 5/1996 | Pocock | |
| 5,535,321 | A | | 7/1996 | Massaro | |
| 5,539,450 | A | | 7/1996 | Handelman | |
| 5,539,822 | A | | 7/1996 | Lett | |
| 5,545,088 | A | | 8/1996 | Kravitz | |
| 5,559,945 | A | | 9/1996 | Beaudet | |
| 5,564,977 | A | * | 10/1996 | Algie | 463/25 |
| 5,569,083 | A | | 10/1996 | Fioretti | |
| 5,573,244 | A | | 11/1996 | Mindes | |
| 5,575,474 | A | | 11/1996 | Rossides | |
| 5,577,727 | A | | 11/1996 | Brame | |
| 5,586,937 | A | | 12/1996 | Menashe | |
| 5,608,785 | A | | 3/1997 | Kasday | |
| 5,643,088 | A | | 7/1997 | Vaughn | |
| 5,647,795 | A | | 7/1997 | Stanton | |
| 5,652,998 | A | | 8/1997 | McKenzi | |
| 5,674,128 | A | | 10/1997 | Holch | |
| 5,679,077 | A | | 10/1997 | Pocock | |
| 5,683,090 | A | | 11/1997 | Zeile | |
| 5,688,174 | A | | 11/1997 | Kennedy | |
| 5,713,795 | A | | 2/1998 | Von Kohorn | |
| 5,722,890 | A | | 3/1998 | Libby | |
| 5,729,212 | A | | 3/1998 | Martin | |
| 5,746,657 | A | * | 5/1998 | Ueno | 463/41 |
| 5,749,785 | A | | 5/1998 | Rossides | |
| 5,755,621 | A | | 5/1998 | Marks | |
| 5,759,101 | A | | 6/1998 | Von Kohorn | |
| 5,762,552 | A | | 6/1998 | Vuong | |
| 5,772,511 | A | | 6/1998 | Smeltzer | |
| 5,787,156 | A | | 7/1998 | Katz | |
| 5,800,268 | A | | 9/1998 | Molnick | |
| 5,816,917 | A | | 10/1998 | Kelmer | |
| 5,816,919 | A | | 10/1998 | Scagnelli | |
| 5,823,872 | A | | 10/1998 | Prather | |
| 5,823,879 | A | | 10/1998 | Goldberg | |
| 5,830,067 | A | | 11/1998 | Graves | |
| 5,830,068 | A | * | 11/1998 | Brenner et al. | 463/42 |
| 5,830,069 | A | | 11/1998 | Soltesz | |
| 5,851,149 | A | | 12/1998 | Xidos | |
| 5,871,398 | A | | 2/1999 | Schneier | |
| 5,904,619 | A | | 5/1999 | Scagnelli et al. | |
| 5,910,047 | A | | 6/1999 | Scagnelli | |
| 5,921,865 | A | | 7/1999 | Scagnelli | |
| 5,954,582 | A | | 9/1999 | Zach | |
| 5,999,808 | A | | 12/1999 | LaDue | |
| 6,001,016 | A | | 12/1999 | Walker | |
| 6,004,211 | A | | 12/1999 | Brenner | |
| 6,007,426 | A | | 12/1999 | Kelly | |
| 6,024,640 | A | | 2/2000 | Walker et al. | |
| 6,024,641 | A | | 2/2000 | Sarno | |
| 6,030,288 | A | | 2/2000 | Davis | |
| 6,068,552 | A | | 5/2000 | Walker | |
| 6,080,062 | A | | 6/2000 | Olson | |
| 6,080,063 | A | | 6/2000 | Khosla | |
| 6,099,408 | A | | 8/2000 | Schneier et al. | |
| 6,102,797 | A | | 8/2000 | Kail | |
| 6,117,011 | A | | 9/2000 | Lvov | |
| 6,117,013 | A | | 9/2000 | Eiba | |
| 6,152,824 | A | | 11/2000 | Rothschild et al. | |
| 6,186,892 | B1 | | 2/2001 | Frank et al. | |
| 6,203,427 | B1 | | 3/2001 | Walker et al. | |
| 6,251,016 | B1 | | 6/2001 | Tsuda | |
| 6,251,017 | B1 | | 6/2001 | Leason | |
| 6,253,062 | B1 | | 6/2001 | Leyendecker | |
| 6,257,982 | B1 | | 7/2001 | Rider | |
| 6,264,560 | B1 | | 7/2001 | Goldberg | |
| 6,272,223 | B1 | | 8/2001 | Carlson | |
| 6,273,820 | B1 | | 8/2001 | Haste, III | |
| 6,278,980 | B1 | | 8/2001 | Wendkos | |
| 6,280,325 | B1 | | 8/2001 | Fisk | |
| 6,302,793 | B1 | * | 10/2001 | Fertitta et al. | 463/25 |
| 6,383,074 | B1 | | 5/2002 | Boggs | |
| 6,450,887 | B1 | | 9/2002 | Mir | |
| 2001/0003099 | A1 | | 6/2001 | Von Kohorn | |
| 2001/0003100 | A1 | | 6/2001 | Yacenda | |

FOREIGN PATENT DOCUMENTS

| | | | |
|---|---|---|---|
| EP | 0583196 | A1 | 2/1994 |
| EP | 0620688 | | 10/1994 |
| EP | 0673004 | A2 | 9/1995 |
| EP | 0873772 | A1 | 10/1998 |
| GB | 2229565 | | 9/1990 |
| JP | 01-269157 | | 10/1989 |
| JP | 02-110660 | | 4/1990 |
| JP | 02-231671 | | 9/1990 |
| JP | 06-325062 | | 11/1994 |
| JP | 01-025659 | | 1/1998 |
| WO | WO-81/01664 | | 6/1981 |
| WO | WO-95/30944 | | 11/1995 |
| WO | WO-96/00950 | | 1/1996 |

| | | |
|---|---|---|
| WO | WO-96/23289 | 8/1996 |
| WO | WO-97/09699 | 3/1997 |
| WO | WO-97/19428 | 5/1997 |
| WO | WO-97/28636 | 8/1997 |
| WO | WO-98/30297 | 7/1998 |

OTHER PUBLICATIONS

Burgess, "And We're Off to the Races!", The Washington Post, pp. 17-18, Jan. 16, 1995 (2 pages).

Chartrand, "Patents: A Florida inventor puts his money on a gambling network for interactive television." New York Times, Feb. 28, 1994 (1 page).

Heistand, "Home Wagering is on the way", USA Today (Sports); Dec. 7, 1994 (1 page).

Mauer, "ODS Bets on Horse Racing, System to Allow Users to Wager on Races Through TV," Tulsa World, Business, Oct. 23, 1994 (12 pages).

Peddicord, "New on TV: You Bet Your Horse", The Sun, Baltimore, MD, 16A, Dec. 15, 1994 (1 page).

Perrone, "The Home Betting Channel, Maryland 1st to Test Interactive TV Wagers", *The Washington Post*, Horse Racing, Dec. 15, 1994 (1 page).

TrackMaster User's Guide Version 2.0.7, AXCIS Pocket Information Network, Inc., Santa Clara, California, Apr. 1994 (132 pages).

Welcome to the You Bet Network, from http://www.youbet.com/demo/login.htm, accessed Jul. 12, 1999 (15 pages).

Wolff, "Interactive Wagering a Good Bet", Daily Racing Form, p. 4, Jan. 29, 1995 (1 page).

Youbet.com: View The Demo. Online horseracing, handicapping, track odds, wagering and live simulcasts, Youbet.com, Inc., Los Angeles, California, <http:--www.youbet.com-demo->, (Jul. 11, 1998) (136 pages).

Bet Mate Brochure, AmTote, Hunt, Valley, Maryland (accessed Nov. 26, 1999) (2 pages).

Probe XL Brochure, AutoTote Systems, Inc., Newark, Delaware (accessed Nov. 26, 1999) (59 pages).

Tiny TIM Brochure, Autotote Systems, Inc., Newark, Delaware (accessed Nov. 26, 1999) (3 pages).

US 5,823,877, 10/1998, Scagnelli (withdrawn)

* cited by examiner

11300

SYSTEMS AND METHODS FOR INTERACTIVE WAGERING USING MULTIPLE TYPES OF USER INTERFACES

CROSS-REFERENCE TO RELATED APPLICATIONS

This application is a continuation of U.S. patent application Ser. No. 09/330,963, filed Jun. 11, 1999, which is hereby incorporated by reference herein in its entirety.

BACKGROUND OF THE INVENTION

This invention relates to interactive wagering systems and methods. More particularly, this invention relates to interactive wagering systems and methods that enable wagers to be placed via a television set-top box, via a computer, and/or via a telephone.

Wagering on sporting events such as horse, dog, and harness racing is a popular leisure activity. However, it is sometimes inconvenient to attend racing events in person. Not all racing fans have sufficient time to visit race tracks as often as they would like and some fans have difficulty in obtaining suitable transportation to the track. Thus, there is a need for wagering services for fans who cannot attend racing events in person.

Off-track betting establishments, which are generally more readily accessible than race tracks, have attempted to fill this need. However, a racing fan who desires to place a wager still faces the prospect of traveling to the off-track betting establishment.

Wagering via telephone is another option. A user of a telephone-based system typically sets up a telephone account against which wagers may be made. In order to place wagers, the user must interact with a computerized telephone ordering system by pressing appropriate buttons on a touch-tone telephone. This type of system is mainly used for placing wagers. Detailed racing information is typically obtained from other sources, such as printed racing programs.

Wagering via a television set-top box is still another option. As described in Brenner et al. U.S. Pat. No. 5,830,068, which is hereby incorporated by reference herein in its entirety, known systems enable a user to receive wagering information and place wagers using a television set-top box in a user's home.

Wagering via computer is yet another option. Using a computer, a user can similarly receive wagering information and place wagers from the user's home.

Although, systems for telephone, set-top box, and computer wagering are known, no known system provides an integrated wagering system that enables a user to receive wagering information and place wagers using more than one of these methods. Moreover, many known systems for telephone, set-top box, and computer wagering are difficult to use and do not provide a user-friendly interface.

It would therefore be desirable to provide systems and methods for interactive wagering that provide an integrated wagering system that can be accessed by telephone, set-top box, and/or computer.

It would also be desirable to provide systems and methods for interactive wagering that provide an easy to use interface that allows the user to quickly navigate through the available options to place a wager.

It would further be desirable to provide systems and methods for interactive wagering that provide a user interface that provides both an expert wagering mode and a novice wagering mode.

SUMMARY OF THE INVENTION

It is therefore an object of this invention to provide systems and methods for interactive wagering that provide an integrated wagering system that can be accessed by telephone, set-top box, and/or computer.

It is also an object of the invention to provide systems and methods for interactive wagering that provide an easy to use interface that allows the user to quickly navigate through the available options to place a wager.

It is further an object of the invention to provide systems and methods for interactive wagering that provide a user interface that provides both an expert wagering mode and a novice wagering mode.

The present invention provides systems and methods for interactive wagering. Preferred embodiments of these systems and methods incorporate a wagering data hub which controls the flow of data relating to wagers, wagering events, and wagering accounts. In order to access this data, a user of the present invention may use a television set-top box, a computer, a telephone, and/or any other suitable device. To communicate with the wagering data hub, television set-top boxes preferably use a two-way cable system or a one-way cable or satellite system with telephone backhaul, computers preferably use a computer network, and telephones preferably use a telephone network, although each may use any suitable mechanism or combination of mechanisms to communicate with the wagering data hub.

Users using television set-top boxes, computers, or any other suitable devices with video and/or audio presentation capabilities may receive wagering event video and/or audio from a video production system coupled to a wagering event. This video and/or audio may be routed to the set-top boxes, computers, or other devices directly through any suitable communication network, such as a cable or satellite system, a telephone network, or a computer network, or indirectly through the wagering data hub. By having wagering event video and/or audio available, a user can watch a wagering event at the same time as when, or in between, placing wagers.

Also connected to the wagering data hub are a subscriber management system, one or more tote companies, one or more racing data providers, and one or more handicapping data providers. The subscriber management system enables an operator of the interactive wagering system to control access by users and setup and maintain player accounts. The subscriber management system also provides player wagering history data to the wagering data hub. The tote companies provide wagering event data to and receive wagers from the wagering data hub. The wagering data hub also receives wagering event data from the racing data providers and handicapping data from the handicapping data providers.

To facilitate interactive wagering, the present invention provides graphical user interfaces and interactive voice response interfaces. The graphical user interfaces are preferably presented on the set-top boxes and on the computers which access the wagering data hub. In preferred embodiments of these user interfaces, a variety of wagering and information dispensing features are provided. For example, these user interfaces provide both expert and novice wagering interfaces that enable experts and novices to place wagers quickly and easily in accordance with their relative levels of experience. In the expert interface, a single page incorporating multiple lines of wagering information is used to construct a wager. The wagering information displayed in the expert interface is abbreviated so as to enable the user to identify the information without being bogged down by unnecessary detail. In the novice interface, multiple pages of wagering information are used to construct a wager. The wagering information displayed in the novice interface is presented in an easy to understand layout so as to simplify the wagering process.

As another example, information dispensing features of the user interface include a variety of handicapping, track, and player information displays. Handicapping information may include odds and payout data, horse, trainer, jockey/driver, and track statistics, expert commentary, and program information. Track information may include schedule, results, news, and weather data for a selected track. Player information may include player news, player betting information, player account balance, and player betting history.

As mentioned above, the preferred embodiments of the present invention also include interactive voice response (IVR) interfaces. These interfaces are preferably presented through telephones which access the wagering data hub. The IVR interfaces enable a user to place wagers, get account balances, get odds, get results, get help, and customize the user interface.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
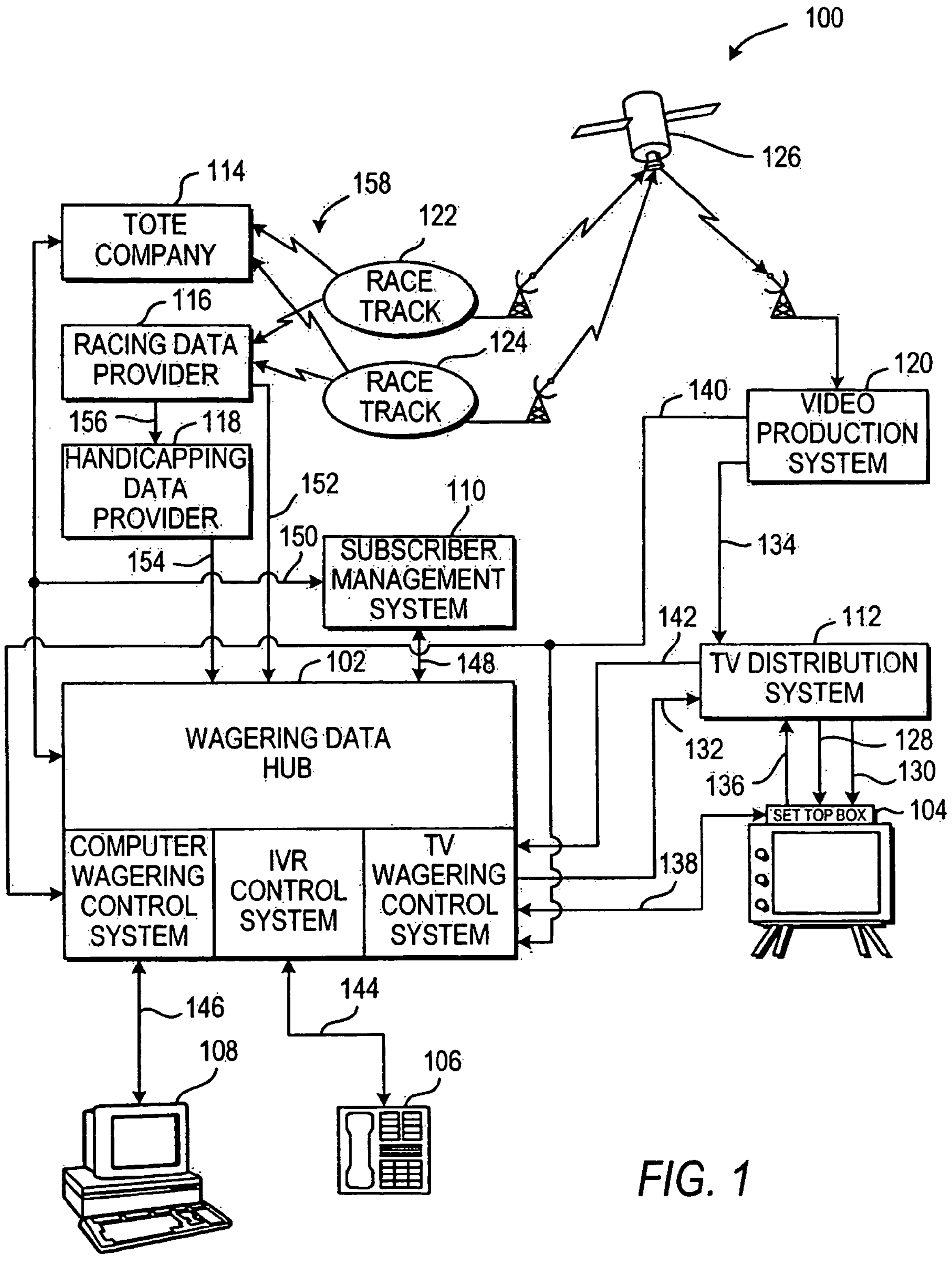
FIG. 1 is a block diagram of a wagering system constructed in accordance with one embodiment of the present invention.

One embodiment of an interactive wagering system 100 in accordance with the present invention is shown in FIG. 1. As illustrated, system 100 includes a wagering data hub 102 that controls wagering in system 100 and that may be coupled to one or more television set-top boxes 104, one or more user telephones 106, and one or more user computers 108. Using any set-top box 104, telephone 106, or computer 108 coupled to hub 102, a user of the present invention can receive information regarding wagering events and wagering accounts, and place wagers related to those wagering events. The wagering data hub 102 may also be connected to a subscriber management system 110, one or more television distribution systems 112, one or more tote companies 114, one or more racing data providers 116, and one or more handicapping data providers 118.

Turning first to set-top boxes 104, in accordance with the present invention, set-top boxes 104 may be any suitable devices for receiving data signals and video signals, processing the data signals, displaying at least a portion of the data signals and the video signals, and receiving user commands that cause data signals to be transmitted to wagering data hub 102. For example, set-top boxes 104 may be conventional set-top boxes, may be circuitry in video cassette recorders, digital video disc players, or televisions, or may be any other suitable devices.

As can be seen from FIG. 1, set-top boxes 104 may receive data signals from hub 102 via communication link 132, television distribution system 112, and communication link 128. These data signals preferably include data relating to wagering events and wagering accounts. Alternatively or additionally to receiving the data signals via link 132, system 112, and link 128, these signals may be received via communication link 138.

Set-top boxes 104 may receive video signals from a video production system 120 via communication link 134, television distribution system 112, and communication link 130. These video signals preferably include video relating to wagering events that originate at race tracks 122 and 124 and are transmitted to video production system 120 via satellite 126. Alternatively or additionally to receiving video signals via link 134, system 112, and link 130, video signals may be received from video production system 120 via communication link 140, hub 102, and link 138. Although links 128 and 130 are illustrated as separate paths for transmitting signals, each link may be part of a single communication mechanism. For example, link 128 may transmit signals in the vertical blanking interval of a video signal carried in link 130.

Set-top boxes 104 may transmit wagering data signals to wagering data hub 102 via communication link 136, television distribution system 112, and communication link 142 and/or via communication link 138. Communication link 138 is preferably a telephone connection, although any suitable connection (such as an Internet connection, etc.) could also be used.

The signals received and transmitted by set-top box 104 may be any suitable type of analog and/or digital signals that are transmitted using any suitable method.

Television distribution system 112 and communication links 128, 130, 132, 134, 136, and 142 are preferably all part of a cable television system, although each may be part of any suitable communication system or combination of communication systems, such as satellite television systems, over-the-air television systems (including RF, microwave, etc.), and computer networks (e.g., the Internet). Similarly to links 128 and 130, link 136 may be incorporated with either or both of links 128 and 130 as part of a single communication mechanism if desired, and links 132 and 142 may be incorporated together as part of a single communication mechanism if desired.

User telephones 106 preferably connect to hub 102 via telephone line 144, although any suitable mechanism for connecting user telephones 106 to hub 102 may also be used. Although user telephones 106 are illustrated as standard telephones, any type of device for receiving audio prompts that may be heard by a user and for responding to those prompts (either by spoken word or key depression) may also be used.

User computers 108 preferably connect to hub 102 via computer network 146. Computer network 146 may be any suitable mechanism for connecting a computer to hub 102, such as a direct telephone connection, one or more telephone connections and a data network connection (such as an Internet connection or a connection provided by computer network provider), or a direct data network connection.

Subscriber management system 110 enables the operator of the present invention to control access by users to the services provided by hub 102. In addition to being connected to hub 102 by communication link 148, subscriber management system is also connected to tote companies 114 via communication link 150. Communication links 148 and 150 may be any suitable mechanism for communicating data and may use any type of data transmission method. The connection to tote companies 114 enables subscriber management system 110 to create and update wagering accounts that are located at tote companies 114. In preferred embodiments of the present invention, when a wager is placed by a user using one of set-top boxes 104, telephones 106, and computers 108, hub 102 accesses subscriber management system 110 to verify that the wager is authorized. One embodiment of a subscriber management system 110 is described further below in connection with FIG. 3.

As stated above, tote companies 114, racing data providers 116, and handicapping data providers 118 may be connected to hub 102 via communication links 150, 152, and 154, respectively. Tote companies 114 preferably provide wagering event data and account information to hub 102, and receive wager information from hub 102. Racing data providers 116 and handicapping data providers 118 preferably provide statistical and handicapping data to hub 102. As shown, tote companies 114 and racing data providers 116 typically receive data from race tracks 122 and 124 via communication links 158, while handicapping data providers typically receive data from one or more of racing data providers 116 via communication link 156. The data received from and transmitted to tote companies 114, racing data providers 116, and handicapping data providers 118 may be transmitted over links 150, 152, and 154 using any suitable method, and these communication links may be any suitable mechanisms for transmitting that data. Similarly, communication links 156 and 158 may be any suitable mechanism for transmitting data that use any suitable method.

Figure 2:
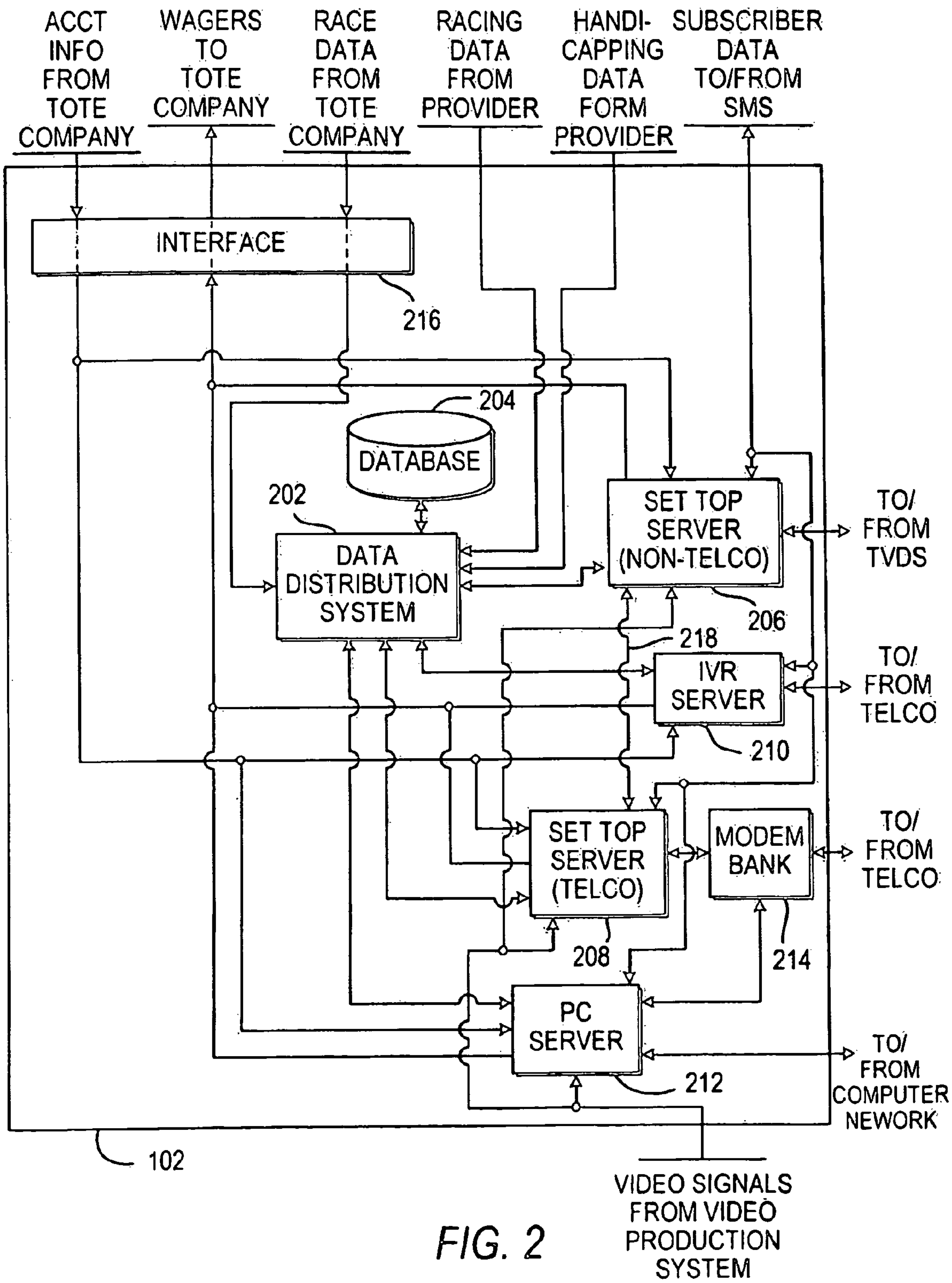
FIG. 2 is a block diagram of a wagering data hub suitable for use with the wagering system of FIG. 1.

Turning additionally to FIG. 2, wagering data hub 102 (FIG. 1) is illustrated in further detail. As shown, hub 102 includes a data distribution system 202, a database 204, a set-top server (non-telco) 206, a set-top server (telco) 208, an interactive voice response (IVR) server 210, a personal computer (PC) server 212, a modem bank 214, and interface circuitry 216. Data distribution system 202 and database 204 work in conjunction with each other to receive, store, and provide racing statistical and handicapping data from and to other components in system 100 of the present invention. As illustrated, racing data may be received from tote companies 114 (via interface circuitry 216) and racing data providers 116, and handicapping data may be received from handicapping data providers 118. This racing and handicapping data may then be provided to set-top servers 206 and 208, IVR server 210, and PC server 212.

Set-top server (non-telco) 206 may provide data and video signals to, and receive data signals from, set-top terminals 104 via television distribution system 112. Set-top server (telco) 208 may provide data and video signals to, and receive data signals from, set-top terminals 104 via modem bank 214 and communication link 138. To coordinate the data sent between servers 206 and 208, hub 102 may incorporate a link 218 between the servers, or the servers may be consolidated into a single mechanism.

Interactive voice response server 210 may provide interactive voice prompts to telephones 106 via link 144. These prompts may be a menu of actual or simulated voice options to which a user can respond by speaking or depressing a button on one of telephones 106. Through these prompts, server 210 may provide account information and racing and handicapping data, including information about various races, horses, jockeys, odds, etc. Through these responses, server 210 may receive wager data.

PC server 212 may provide data and video signals to, and receive data signals from, computers 108 via modem bank 214 and link 146 or through link 146 alone. When computers 108 access server 212 via a telephone line, the computers preferably use bank 214 and link 146. When computers 108 use a computer network connection (such as the Internet) to access server 212, the computers preferably bypass modem bank 214.

In order to authorize and submit wagers, each of servers 206, 208, 210, and 212 preferably provide data to and receive data from tote companies 114 (via interface circuitry 216 and link 150) and subscriber management system 110 (via link 148). For example, when a user requests to place a wager via any of these servers, the corresponding server may send an authorization request to either subscriber management system (SMS) 110 or one of tote companies 114. When the request is sent to a tote company 114, the server may select the desired tote company from among several available tote companies. In response to that request, the SMS 110 or tote 114 may reply with an authorization. The server may then send the wager to the tote company (if not already completed).

Similarly, to notify the users of the status or history of their accounts or to credit those accounts with additional funds or winnings, account information and money transfer information may be transmitted to and received from the tote or SMS. For example, using a user interface from one of a set-top box 104, telephone 106, or computer 108, a user may authorize additional funds to be transferred from the user's bank or credit card account when the available funds in the user's account drop below a desired level.

In some embodiments of the present invention, video signals are provided to set-top boxes 104 by servers 206 and/or 208, and to computers 108 by server 212. These signals are preferably received at the servers from video production system 120 by link 140.

Figure 3:
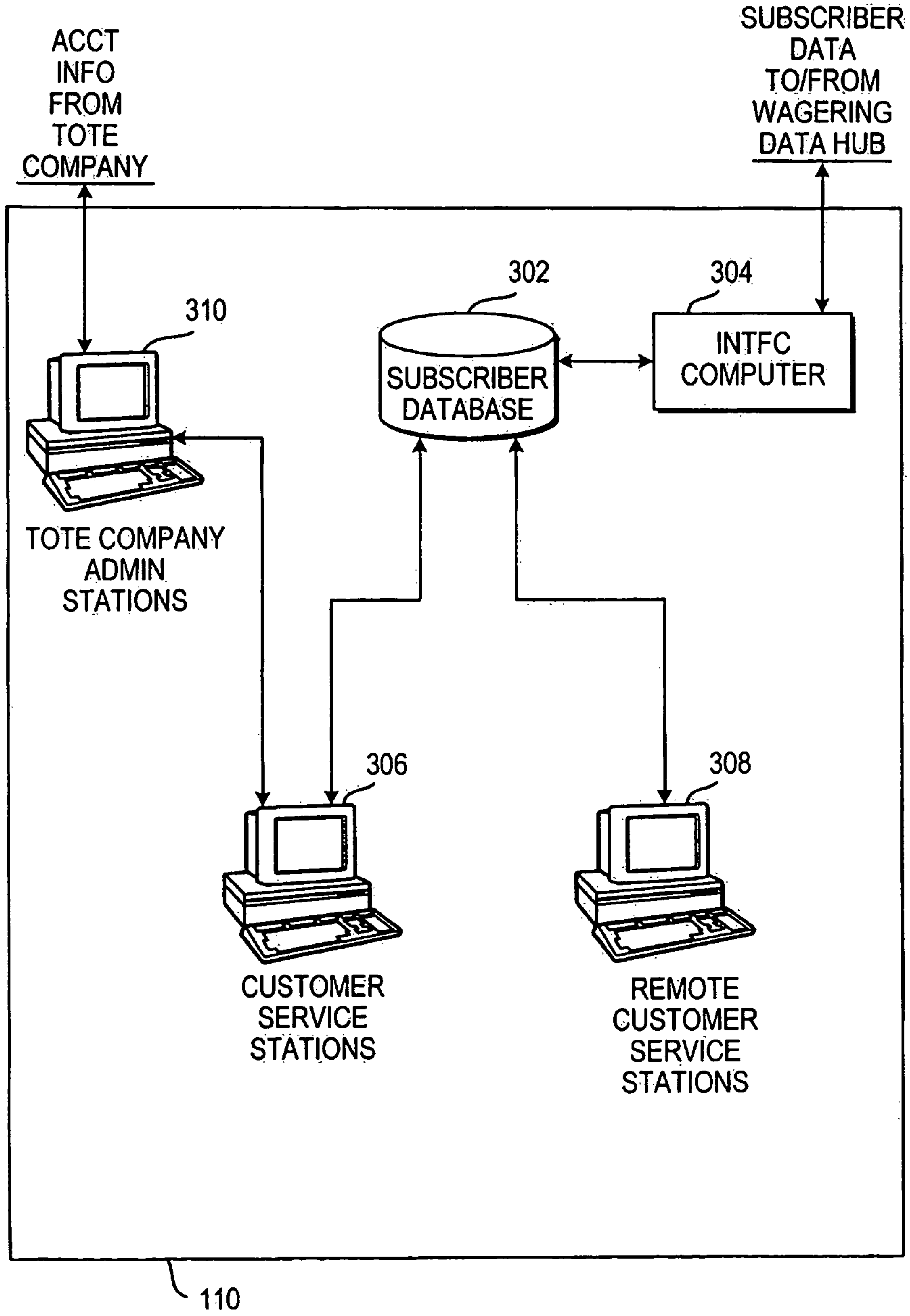
FIG. 3 is a block diagram of a subscriber management system suitable for use with the wagering system of FIG. 1.

One embodiment of a subscriber management system (SMS) 110 in accordance with the present invention is illustrated in FIG. 3. As shown, SMS 110 may include a subscriber database 302, an interface computer 304, one or more customer service stations 306, one or more remote customer service stations 308, and one or more tote company administration stations 310. Subscriber database 302 stores information regarding each user's account. This data may include current balance, past wagering history, individual wagering limits, personal identification numbers, billing addresses, credit card numbers, bank account numbers, social security numbers, etc. The data in database 302 may be accessed by hub 102 (FIG. 1) using interface computer 304. In some embodiments of the present invention, interface computer 304 may be omitted and hub 102 may access database 302 directly.

Stations 306 and 308 preferably enable the operator of system 100 (FIG. 1) to oversee and control the usage of the system by the users. Tote company administration stations 310 enable the operators of system 100 to create and update accounts for users at the tote companies 114 (FIG. 1). Subscriber database 302 and interface computer 304 may be any suitable devices for storing data and accessing the data base, respectively. Each of stations 306, 308, and 310 may be any suitable computers for accessing database 302 and tote companies 114.

Although wagering data hub 102 and subscriber management system 110 are illustrated as separate systems and may be located at separate facilities, it should be noted that hub 102 and system 110 may be combined into a single system at a single location, or may be further split apart into finer sub-units at remotely connected locations.

As shown in FIGS. 1-3, by centralizing the storage of race and handicapping data in database 204 and account information in database 302, the present invention provides a more cost-efficient and centralized interactive wagering system that may be accessed by users using a variety of methods. For example, a user may access race and handicapping data from home using a set-top box 104 in order to consider a wager to be made. Later, that user may place that wager using a cellular telephone while away from his or home. Finally, from the user's office, the user can then use his or her PC to check the status of the wager to determine if the user won. In this way, a user may access any of his or her accounts using any of the interfaces provided in the interactive wagering system. Alternatively, for example, wagering enthusiasts who do not have access to a set-top box 104 or a computer 108 may still receive race, handicapping, and account information and place wagers using the IVR interface accessible using telephones 106.

Figure 3A:
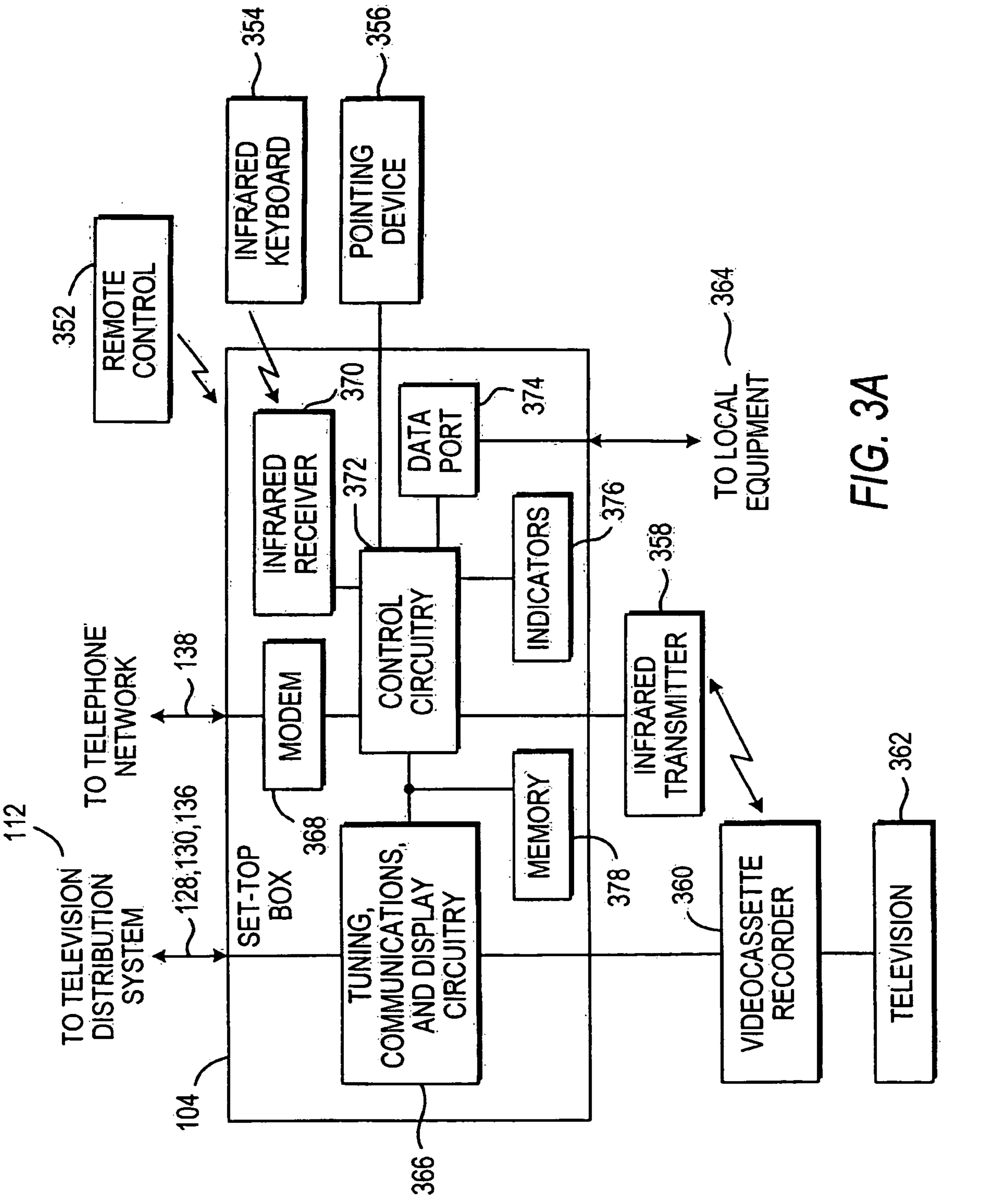
FIG. 3A is a block diagram of a set-top box and related equipment suitable for use with the wagering system of FIG. 1.

An illustration of a set-top box 104 (FIG. 1) and related components is shown in FIG. 3A. As can be seen, set-top box 104 may be connected to television distribution system 112 by links 128, 130, and 136. Set-top box 104 may also be connected to a telephone network by link 138. Through these connections, set-top box 104 is able to communicate with wagering data hub 102 (FIG. 1). In order to control set-top box 104, a remote control 352, a keyboard 354 (e.g., an infrared keyboard), and/or a pointing device 356 may also be provided. Additionally, set-top box 104 may be connected to a videocassette recorder 360 (or any other suitable television appliance) and/or a television 362, and any other local equipment 364 (such as a personal computer that is connected to a cable modem in set-top box 104). In order to control a videocassette recorder 360, in infrared transmitter (or any other suitable control interface, such as an RS-232 interface) may also be provided.

Set-top box 104 may include tuning, communications, and display circuitry 366, a modem 368, a receiver 370, control circuitry 372, a data port 374, indicators 376, and memory 378. Tuning, communications, and display circuitry 366 may be any suitable circuitry for receiving, splitting, combining, and/or distributing video and data signals to and from the television distribution system 112, control circuitry 372, memory 378, videocassette recorder 360, and television 362. Modem 368 may be any suitable device for communicating data with a telephone network. Receiver 370 may be any suitable device for receiving signals from keyboard 354. Control circuitry 372 may be any suitable device, such as a microprocessor, microcontroller, dedicated logic, a computer, etc., for controlling the functionality of set-top box 104. Data port 374 may be any suitable interface for communicating with local equipment 364. Indicators 376 may be any suitable devices for indicating events and statuses to a user, including light-emitting diodes, displays, audio systems, etc. Finally, memory 378 may be any suitable storage device or devices for storing data, including random access memory, flash memory, a disk drive, etc.

During operation, control circuitry 372 will preferably execute instructions stored in memory 378. Through these instructions, the control circuitry will control the flow of video and data through circuitry 366, control the flow of data through modem 368, receiver 370, data port 374, and infrared transmitter 358, and drive indicators 376. More particularly, these instructions may cause a user interface as described below to be implemented on television 362.

Figure 4:
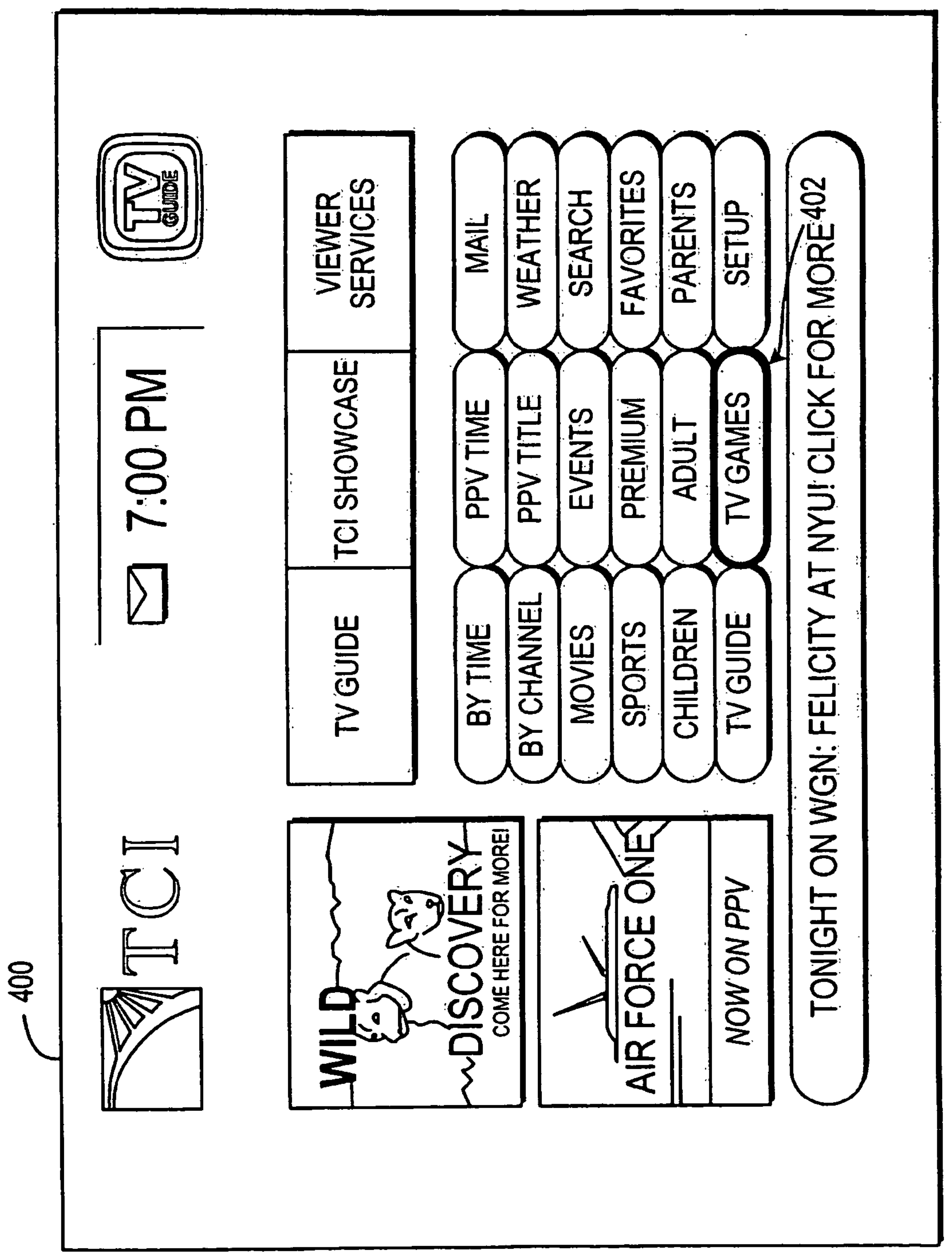
FIGS. 4-5 are illustrations of screen displays through which a user may initiate a set-top box or computer user interface in accordance with one embodiment of the present invention.
Figure 122:
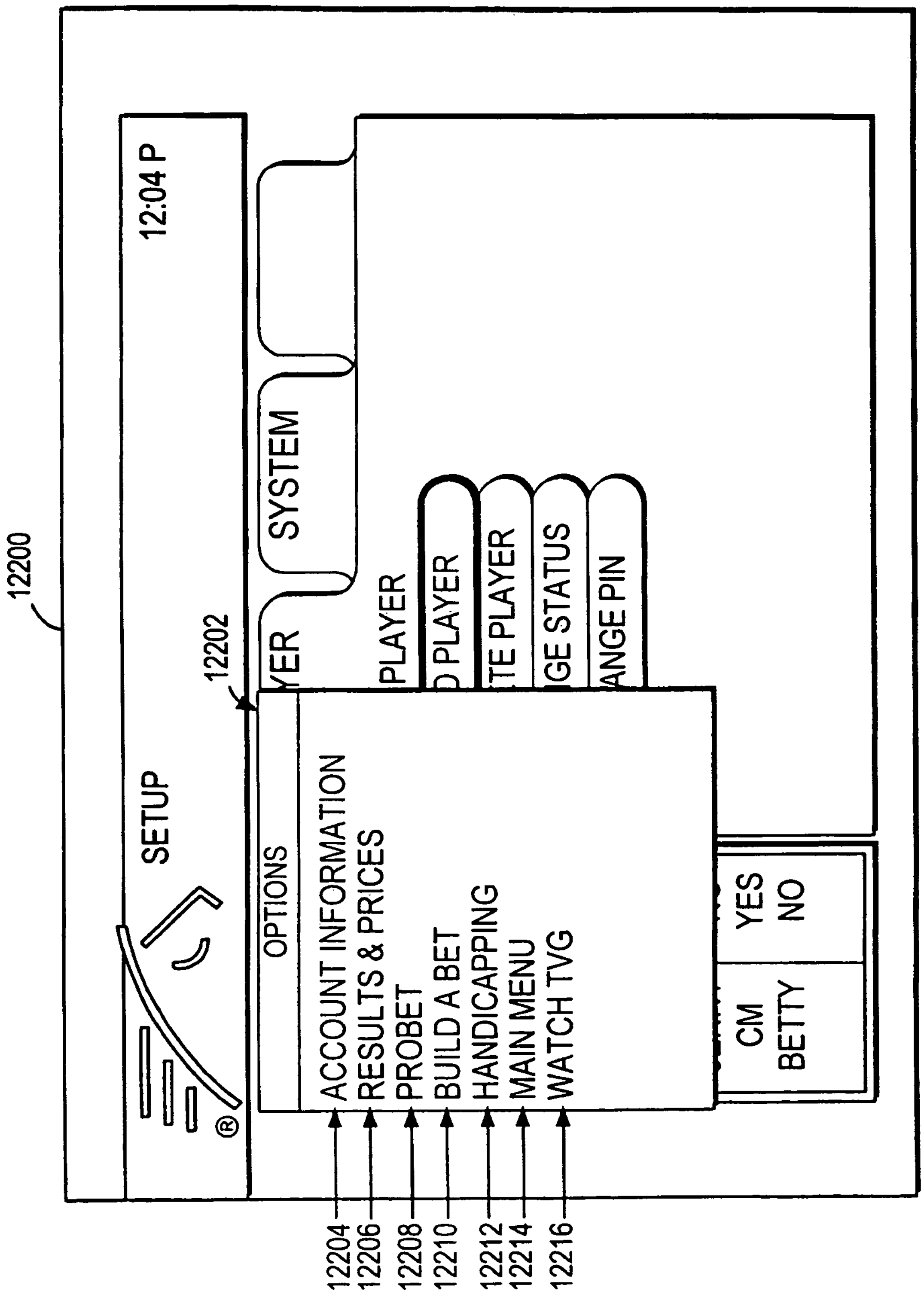

A variety of user interfaces can be provided at set-top boxes 104, telephones 106, and computers 108 (FIG. 1) in accordance with the present invention. One embodiment of a user interface that may be implemented on set-top boxes 104 and computers 108, for example, is illustrated in FIGS. 4-122. Although specific combinations of features are illustrated in these figures, any subset of these features and many additional features could be implemented in accordance with the present invention. Also, although the illustrated embodiment of the user interface is directed to wagering on horse racing, it should be noted that this user interface could be modified for any type of wagering event.

Figure 5:
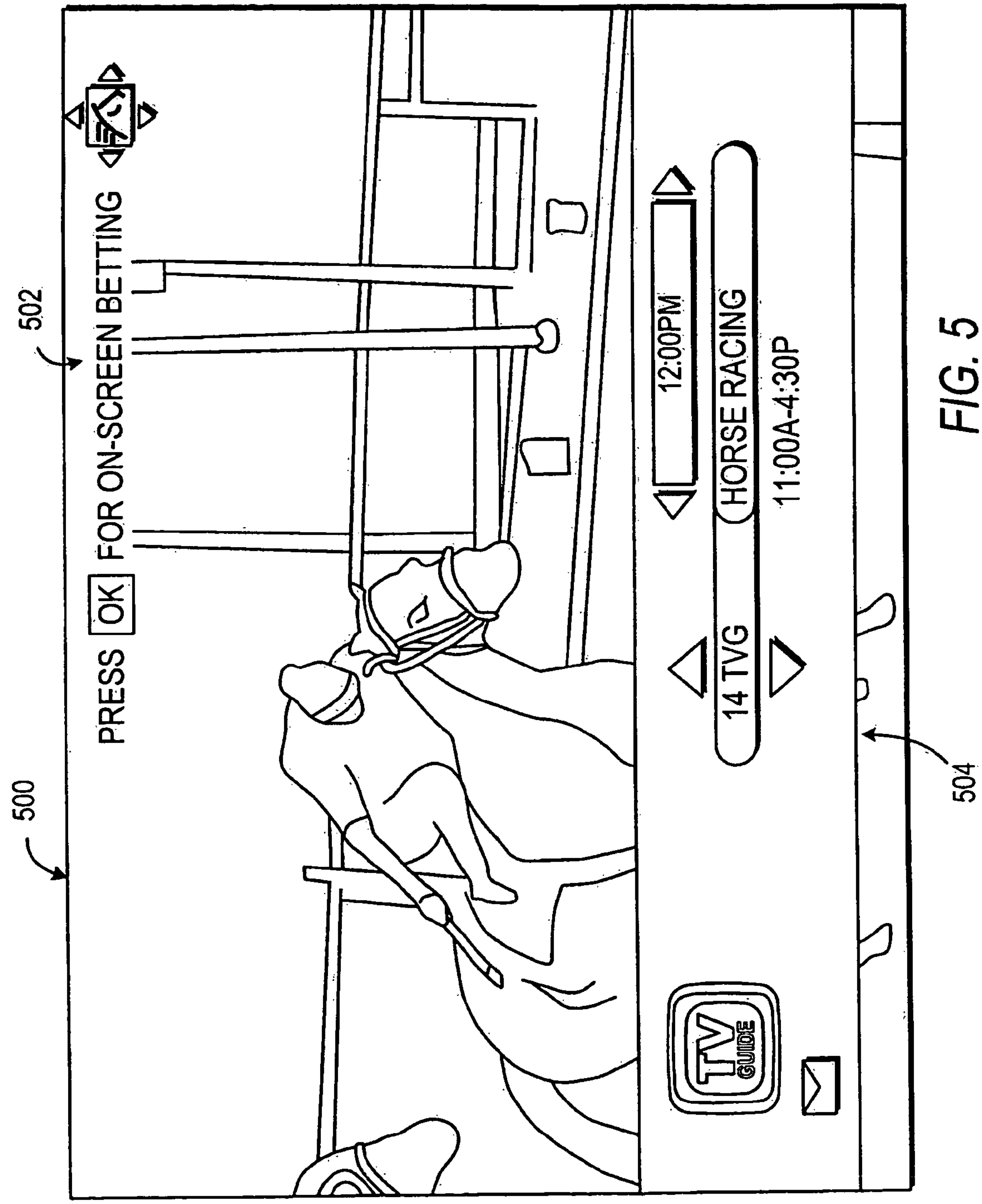

Turning first to FIGS. 4 and 5, two examples of methods for accessing the user interface are shown. As illustrated in FIG. 4, the user interface could be accessible from the main menu 400 of an interactive television program guide. In addition to listing menu options for displaying information about television programs and for performing other functions, such a menu could include a menu option 402 that, when selected, would initiate the user interface. Additionally or alternatively, as illustrated in FIG. 5, the user interface could be initiated using a prompt 502 that appears on top of a user television program 500. This prompt could appear on top of any television program (for example, when triggered by the start of a race for which a wager has been placed (as explained below)) or could appear on top of wagering event programs only when those programs are selected for viewing (for example, when triggered by a signal in the vertical blanking interval of a program or by an attached program guide). Also illustrated in FIG. 5, is a banner 504 that indicates that the user has tuned to the "TVG" channel and that that channel is currently showing horse racing. Although illustrated in FIG. 5, banner 504 is optional.

Figure 6:
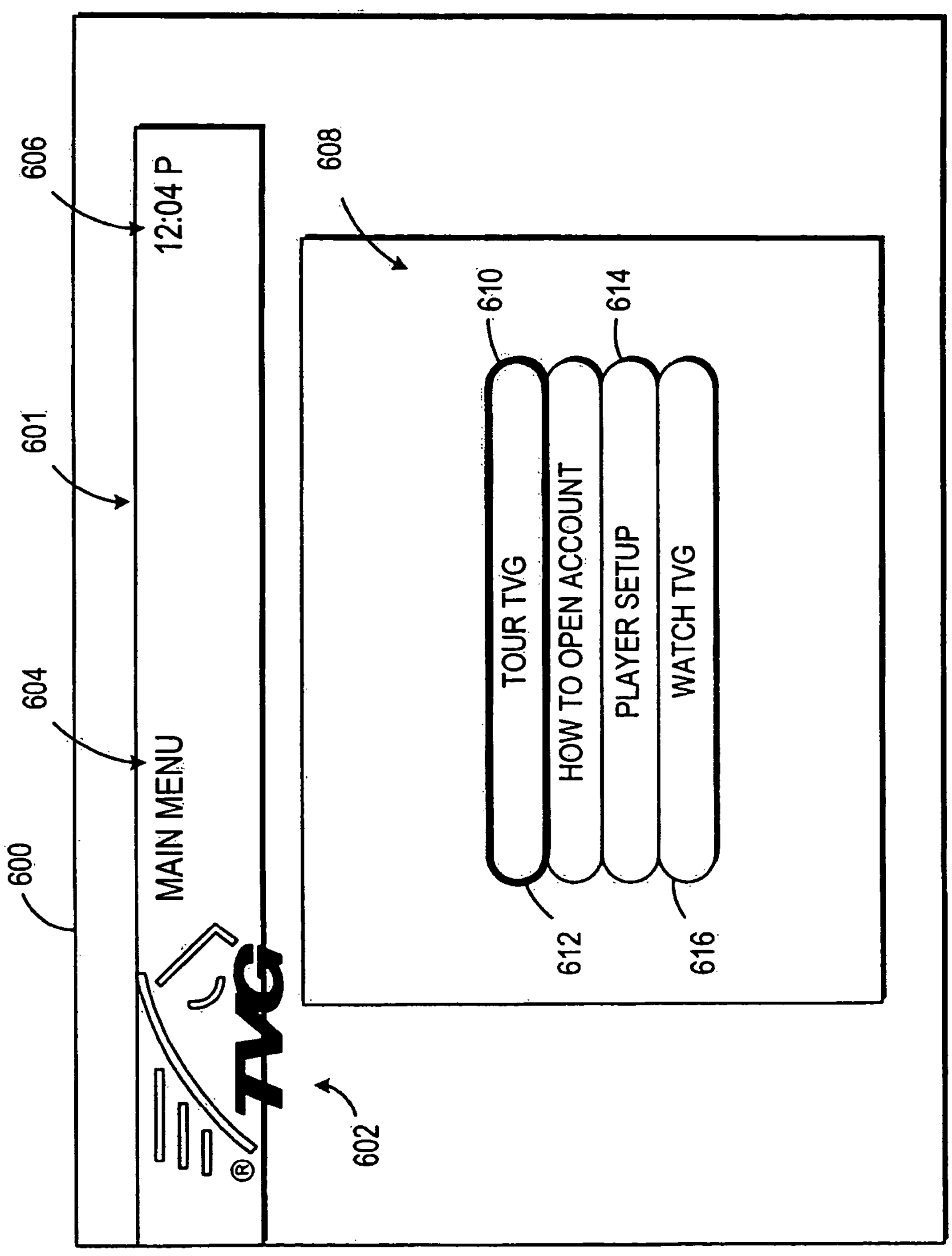
FIGS. 6-7 are illustrations of main menu screen displays that may be presented in a set-top box or computer user interface in accordance with one embodiment of the present invention.
Figure 7:
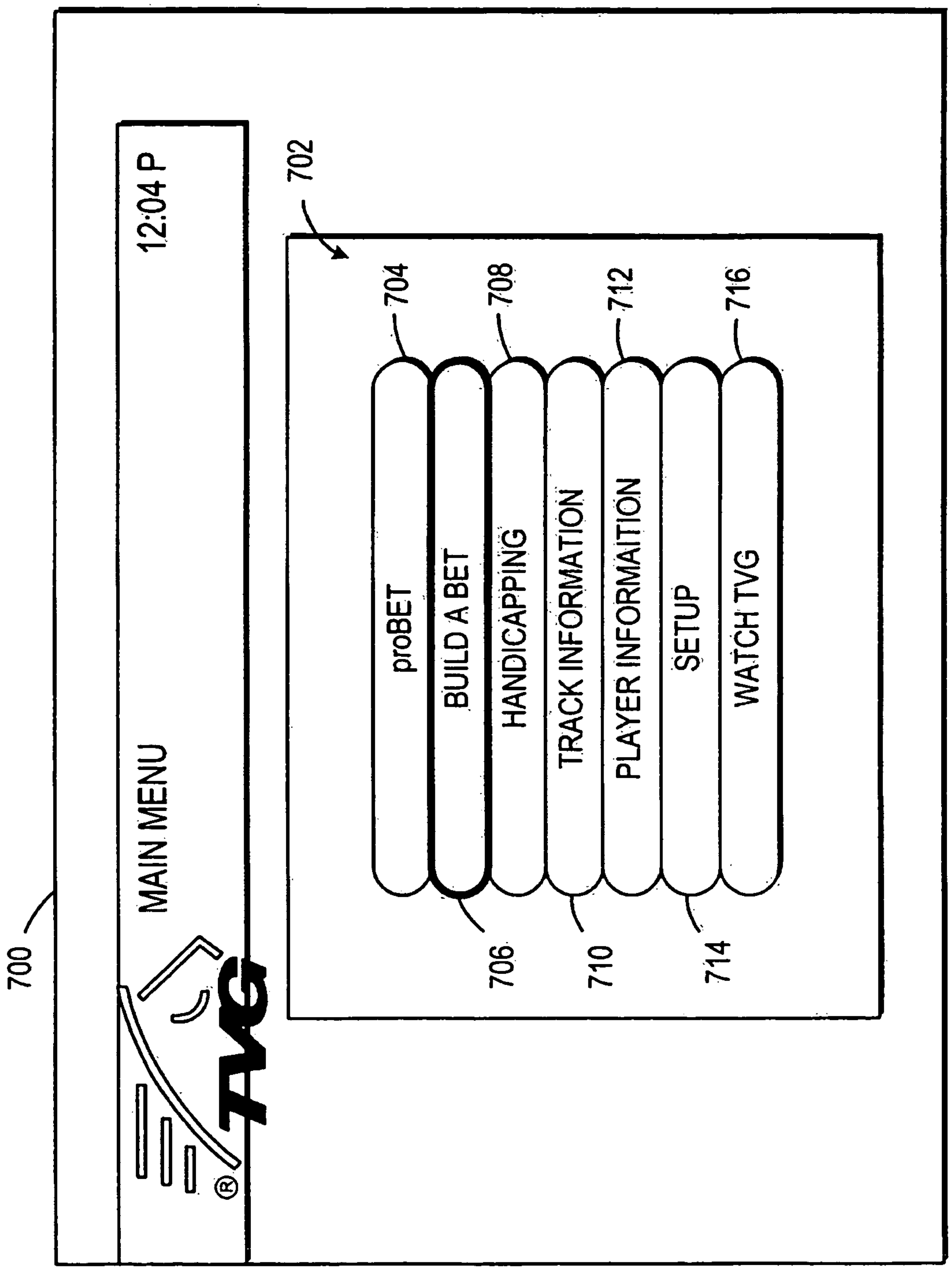

Once the user interface has been initiated, one of the main menus in FIG. 6 or 7 is displayed. As illustrated in FIG. 6, an initial main menu 608 is displayed in screen 600. Initial main menu 608 is preferably only presented when a user uses the user interface for the first time. The initial main menu 608 may also be displayed when the user interface detects that the user is making many mistakes, or at any other suitable time. At all other times, normal main menu 702 shown in FIG. 7 is displayed when the user activates the user interface.

As shown, screen 600 also includes a status bar 601 that includes an operator icon 602, a current function indicator 604, and a clock 606. As will be illustrated in other figures that follow, status bar 601 may include other pieces of information as well. Operator icon 602 indicates to the user that "TVG" is the operator of system 100 (FIG. 1). Function indicator 604 indicates to the user that he or she is currently in the main menu. As the user moves through different menus, function indicator 604 preferably changes to indicate the current function being used.

Initial main menu 608 includes a "Tour TVG" option 610, a "How To Open Account" option 612, a "Player Setup" option 614, and a "Watch TVG" option 616. Any of these options (or any of the options in the subsequent menus) may be selected by using a remote control to reposition the highlight that is illustrated around option 610 to a desired option and to select that option. Alternatively, any other suitable method for selecting the menu options (such as using a computer mouse or keyboard) may be used in accordance with the present invention.

Turning to the options, "Tour TVG" option 610 preferably causes a tutorial of the features and operation of the user interface to be presented to the user. This tutorial could be presented in any method known in the art. Similarly, "How To Open Account" option 612 preferably causes instructions to be presented to the user that instruct him or her how to open an account for wagering. These instructions may additionally enable the user to actually open an account using the user interface or may require the user to contact the operator directly (for example, by calling a "1-800" telephone number). "Player Setup" option 614 enables the user to access the player setup submenu. The player setup submenu is discussed further in connection with FIGS. 109-118 below. Finally, "Watch TVG" option 616 causes the user interface to terminate and a wagering television channel (or any other suitable channel) to be displayed as illustrated in FIG. 5.

FIG. 7 illustrates normal main menu 702 in screen 700. As shown, menu 702 includes a "proBET" option 704, a "Build-A-Bet" option 706, a "Handicapping" option 708, a "Track Information" option 710, a "Player Information" option 712, a "Setup" option 714, and a "Watch TVG" option 716.

Figure 8:
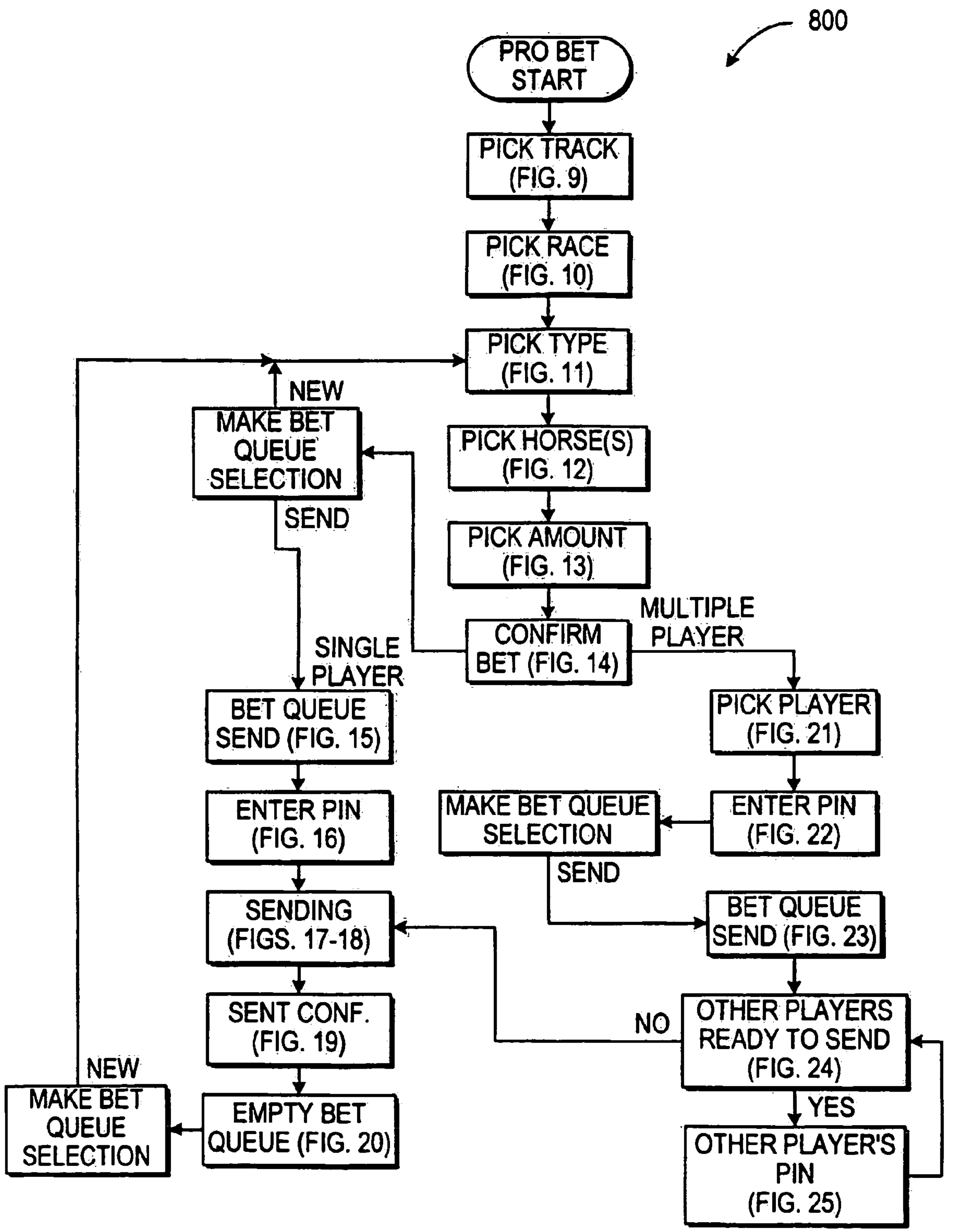
FIG. 8 is a flow diagram illustrating a proBET mode that may be presented in a set-top box or computer user interface in accordance with one embodiment of the present invention.
Figure 9:
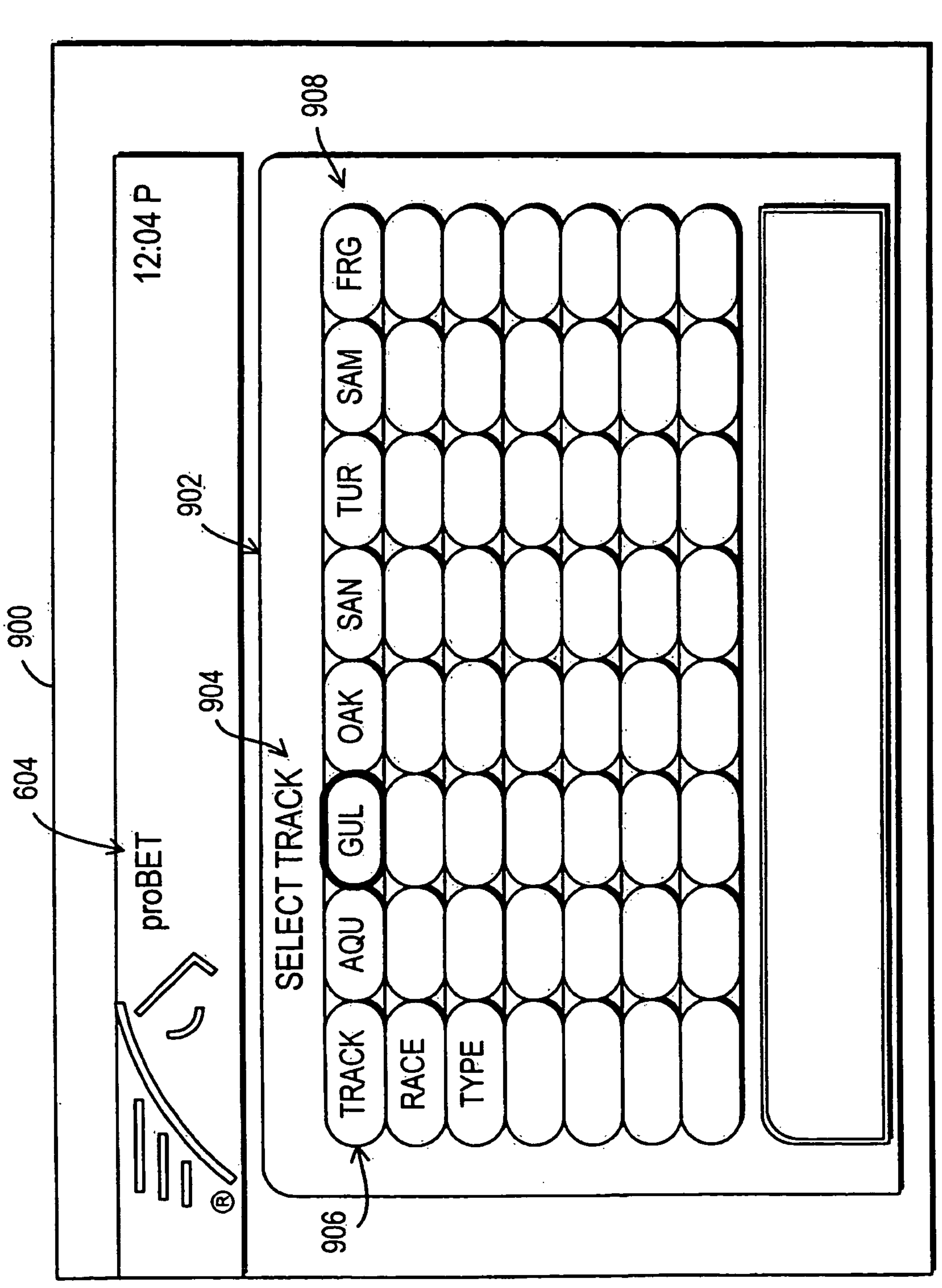
FIGS. 9-25 are illustrations of screen displays that may be presented as part of the proBET mode in a set-top box or computer user interface in accordance with one embodiment of the present invention.

When a user selects "proBET" option 704 from menu 702, series 800 of screen displays 900-2500 (FIGS. 9-25) illustrated in FIG. 8 can be accessed. More particularly, when a user selects option 704, screen 900 is displayed as shown in FIG. 9. As can be seen, in screen 900, current function indicator 604 indicates that the user is currently operating in the "proBET" menu function. In this mode, a selection window 902 is first displayed. Window 902 includes an action indicator 904 that indicates to the user the next action that must be taken. In this case, the user is required to select a track for the bet. To do so, below indicator 904, the user is presented with a track option indicator 906 and a series of track options 908. The user interface then waits for the user to select one of options 908. In FIG. 9, it can be seen that the user has highlighted "GUL" which is an abbreviation for "Gulfstream."

Figure 10:
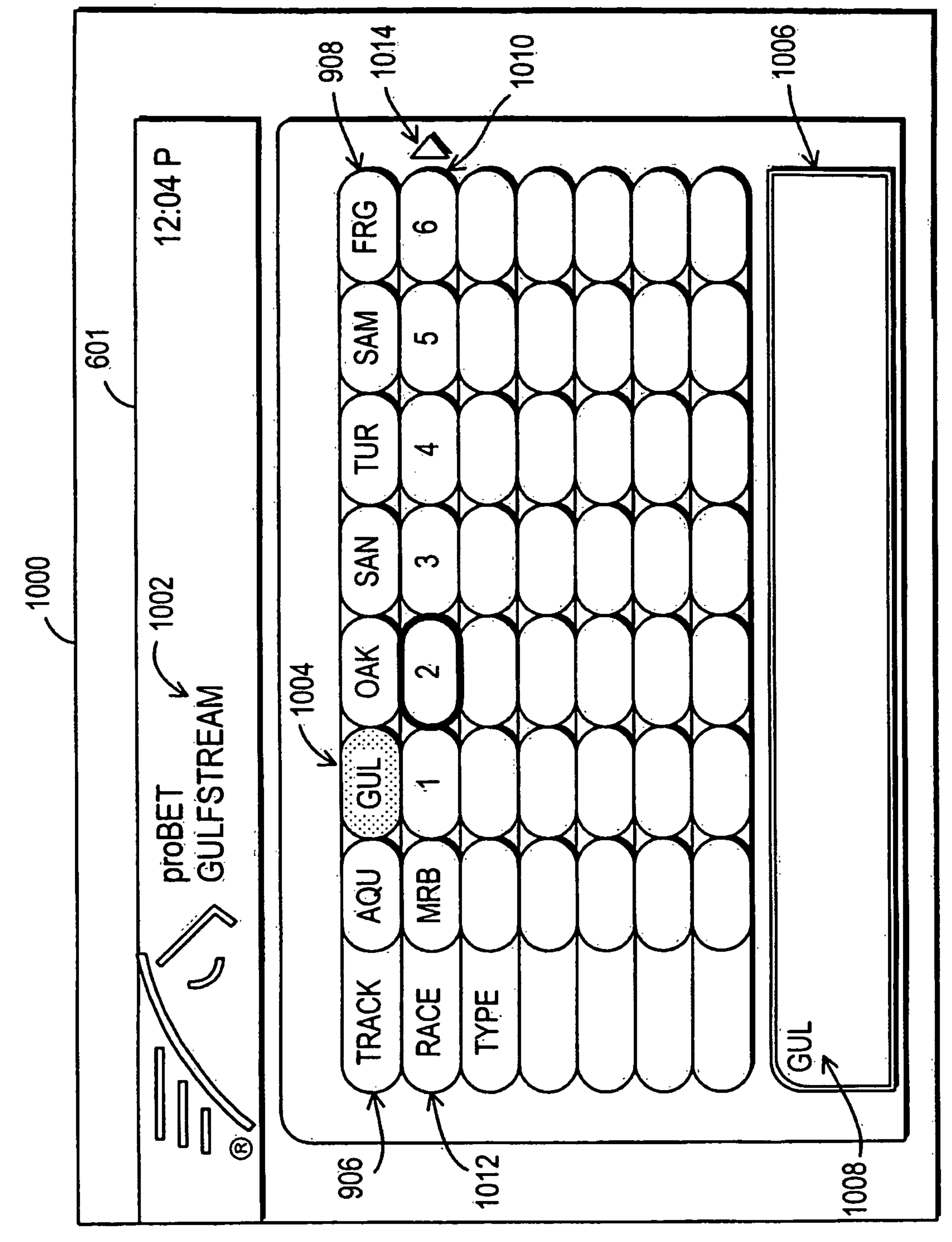

Once the user has selected a track, screen 1000 is displayed as shown in FIG. 10. As illustrated, status bar 601 now includes a track indicator 1002 that indicates that the user has selected "Gulfstream." Similarly, track options 908 next to track option indicator 906 have changed their appearance so that all of options 908 except for track option 1004 (the selected track option) are dark in color and track option 1004 is light in color. Further, to indicate the track selection, a ticket window 1006 in screen 1000 shows a track indication 1008 that preferably uses the same abbreviation as that selection from track options 908.

In screen 1000, the user is required to select one of race choices 1010 as indicated by race choice indicator 1012. As can be seen, the left-most choice 1010 is indicated as "MRB." This is a "multi-race bet" choice that requires selections from multiple races. Next to the right-most choice 1010 is an arrow 1014 that indicates that other race choices 1010 are available by scrolling to the right of the right-most choice.

Figure 11:
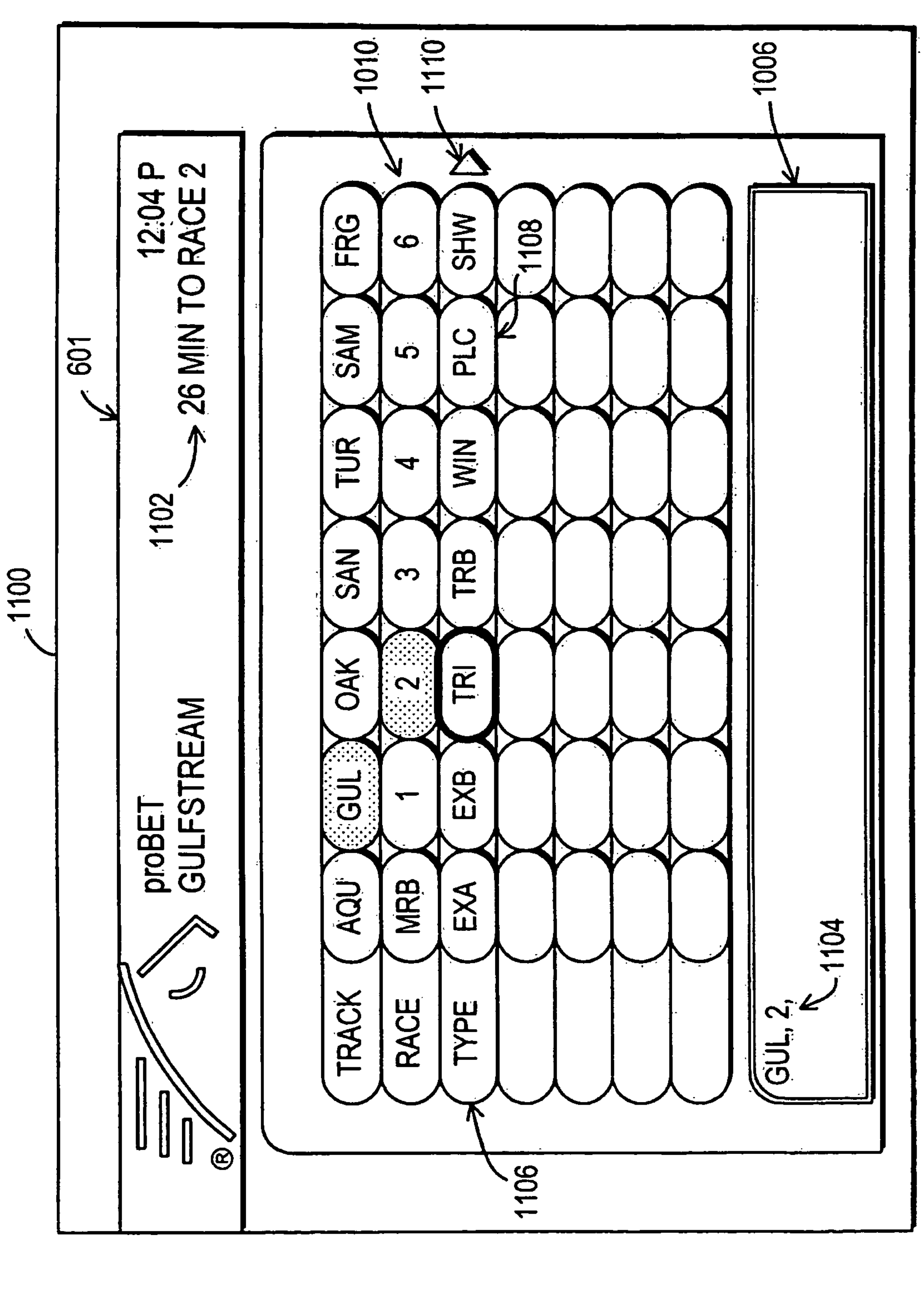

Once the user has selected a race, screen 1100 is displayed as shown in FIG. 11. As can be seen, the user's selection of race 2 in screen 1000 (FIG. 10) is indicated in a race countdown 1102 in status bar 601, in the display colors of race options 1010, and in race indication 1104 of ticket window 1006. Similarly to selecting the race, the user is next required in screen 1100 to select the type of bet (or wager). Next to a type indicator 1106, a series of type options 1108 are displayed. Arrow 1110 indicates that additional options 1108 are available. Choices "EXA," "EXB," "TRI," "TRB," "WIN," "PLC," and "SHW" indicate the common horse racing bet types "exacta," "exacta-box," "trifecta," "trifecta-box," "win," "place," and "show," respectively.

Figure 12:
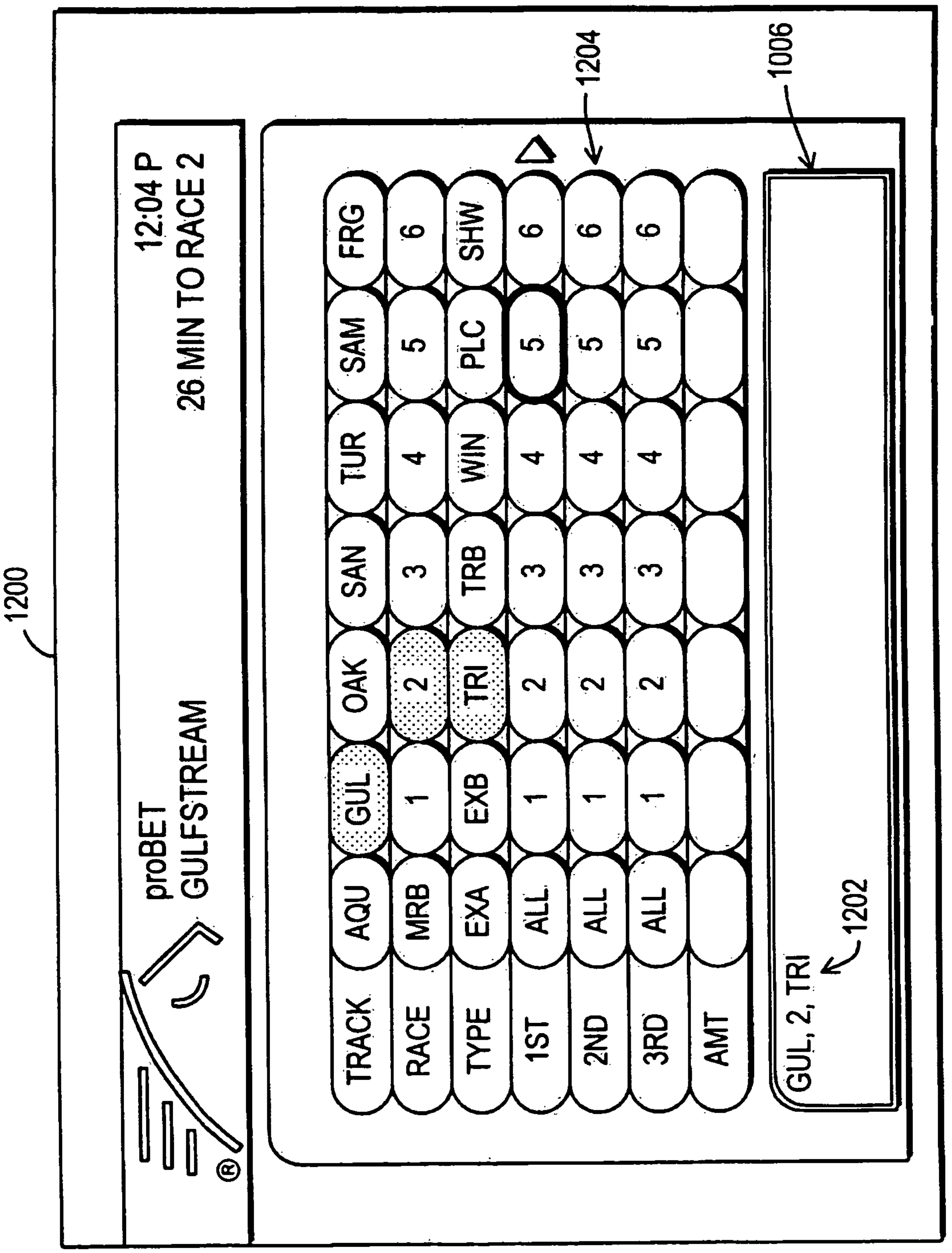

Turning to FIG. 12, it can be seen that the user has selected "trifecta" from type indicator 1202 in ticket window 1006 of screen 1200. Because the user has selected a "trifecta" race type, three place selections (i.e., 1st, 2nd, and 3rd) must be selected by the user. If the user had selected a "win" race type, for example, then only a single place selection would be required. In response to place choices 1204, the user is then required to select at least one first place choice, at least one second place choice, and at least one third place choice, each from the corresponding row of choices 1204.

Figure 13:
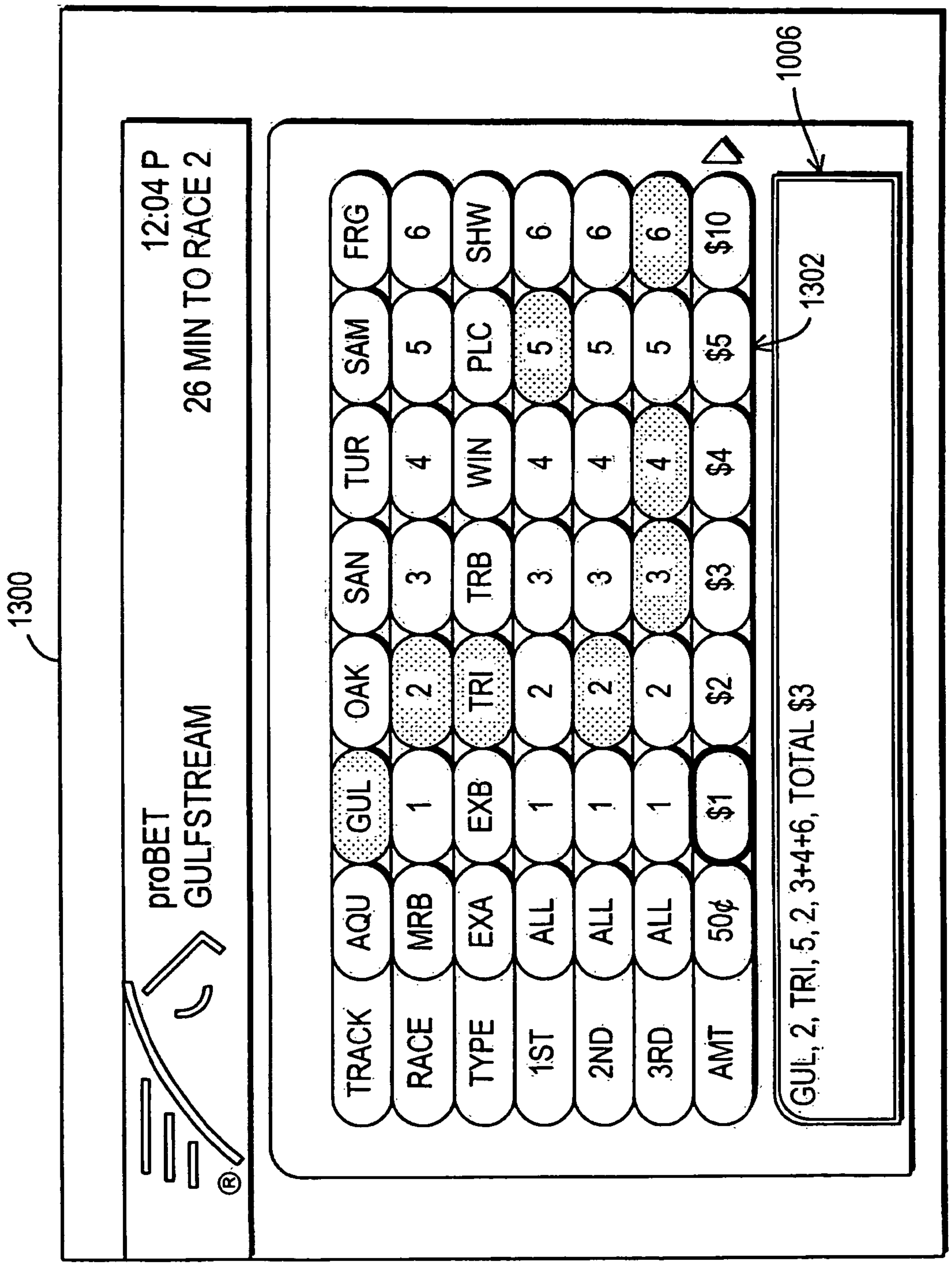

After the user has selected the place choices, screen 1300 is displayed as illustrated in FIG. 13. As shown, the user has selected one first place choice (choice "5"), one second place choice (choice "2"), and three third place choices (choices "3", "4", and "6"). Because of these last three choices, the user is in effect placing three wagers: one for choices "5", "2", and "3"; one for choices "5", "2", and "4"; and one for choices "5", "2", and "6". At this point, the user interface requires the user to select a per bet amount from one of amount choices 1302. As the user moves the highlight to select each one of the choices 1302, the total bet amount indicated in ticket window is preferably updated.

Figure 14:
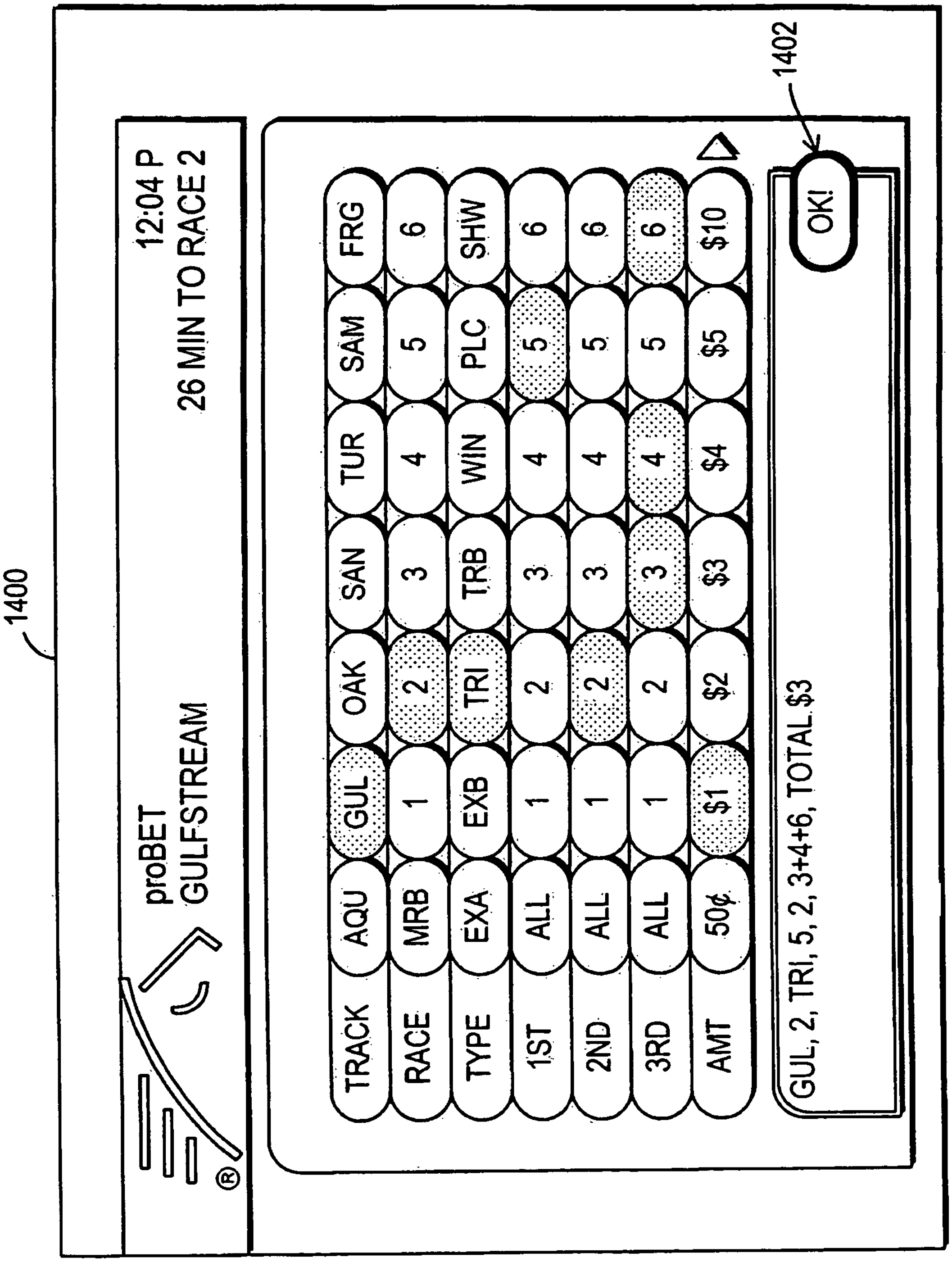

Finally, once the user has selected the bet amount from screen 1300, the user is presented with screen 1400 as shown in FIG. 14 to confirm the bet by selecting "OK" icon 1402 before the bet is placed in a bet queue. As shown in FIG. 8, how the user interface proceeds upon confirming the bet depends on whether only a single player is currently accessing the interface or whether multiple players are accessing the interface. The user interface may determine whether a single player is or multiple players are accessing the interface by referring to the status of the players setup as illustrated in and discussed in connection with FIG. 115. If multiple players are active, the user interface next displays the display shown in FIG. 21 (and described below). Otherwise, the user interface proceeds to screen 1500 shown in FIG. 15.

Figure 15:
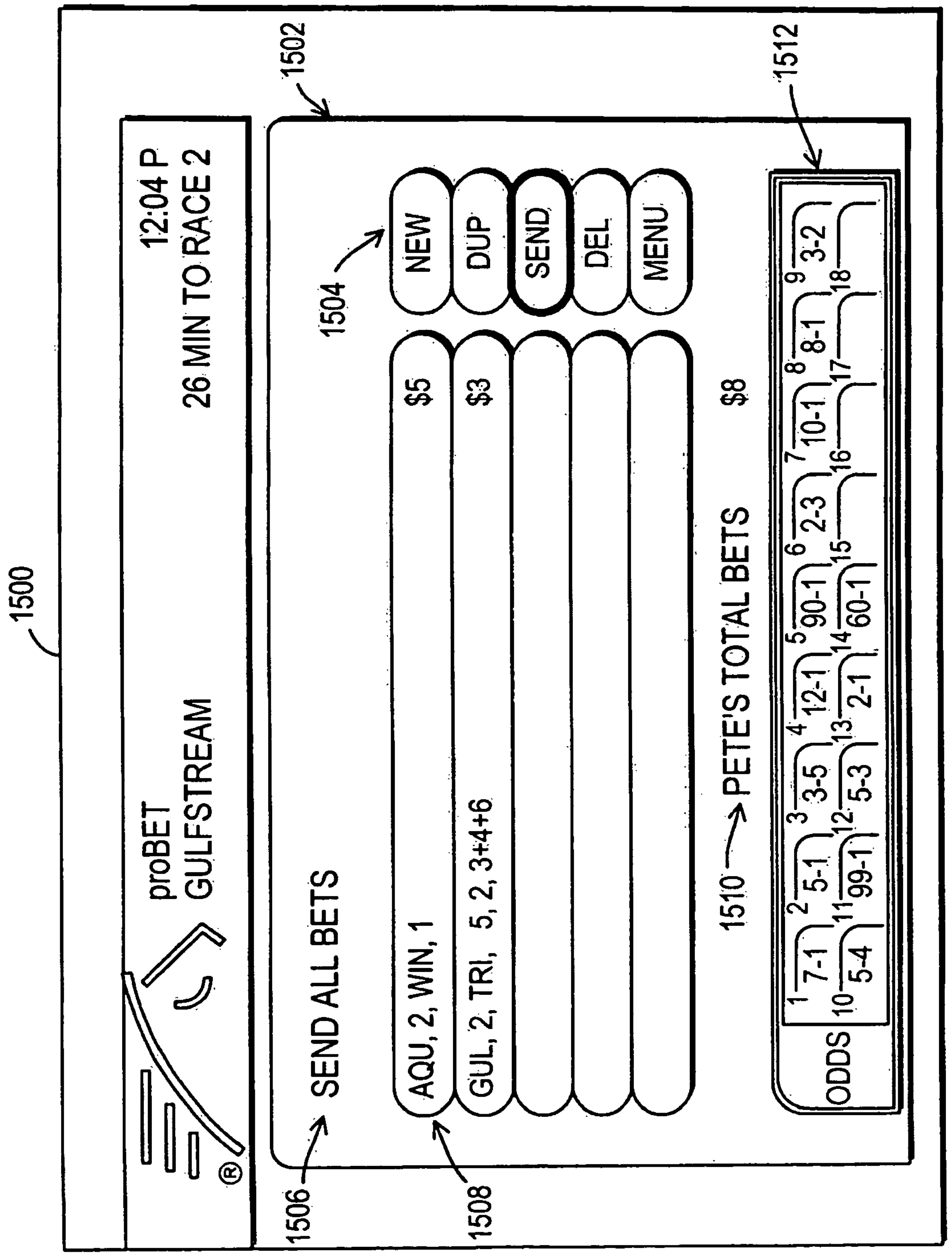

As illustrated in FIG. 15, screen 1500 includes a queue window 1502. Within queue window 1502 are a bet queue 1508, action selections 1504, an action indicator 1506, and a total bet indicator 1510. From bet queue 1508, the user can see all of his or her previously placed, but unsent bets. Total bet indicator 1510 indicates to the user the total amount of the bets waiting to be sent. Also shown in window 1502 is an odds window 1512. Using this odds window, the user can monitor the odds for each horse to win. As can be seen, horse "1" is showing 7-to-1 odds to win. By selecting one of action selections 1504, the user can indicate to the user interface how to proceed with the bets shown in the queue. More particularly: by selecting the "New" selection 1504, the user can add another bet; by selecting the "Dup" selection 1504, the user can duplicate a bet; by selecting the "Send" selection 1504, the user can send the bets; by selecting the "Del" selection 1504, the user can delete a bet; and by selecting the "Menu" selection 1504, the user can access a drop down menu as illustrated in and explained in connection with FIGS. 120-122. As the user scrolls through each of selections 1504, the user interface updates action indicator 1506 to indicate what will happen if the selection is selected.

As can be seen from FIG. 8, if the user selects the "New" option, the user interface will return the user to screen 1100 of FIG. 11. At this point, the user interface will use the track and race selections chosen by the user in making the previous wager. If the user would like to change those selections, however, the user may move the highlight up to choices 1010 (FIG. 10) or options 908 (FIG. 9).

If the user selects the "Dup", "Del", or "Menu" options, the user interface will enable the user to duplicate a bet, delete a bet, or access a drop down menu, respectively, as described below in connection with FIGS. 47-53 and 120-122.

Figure 16:
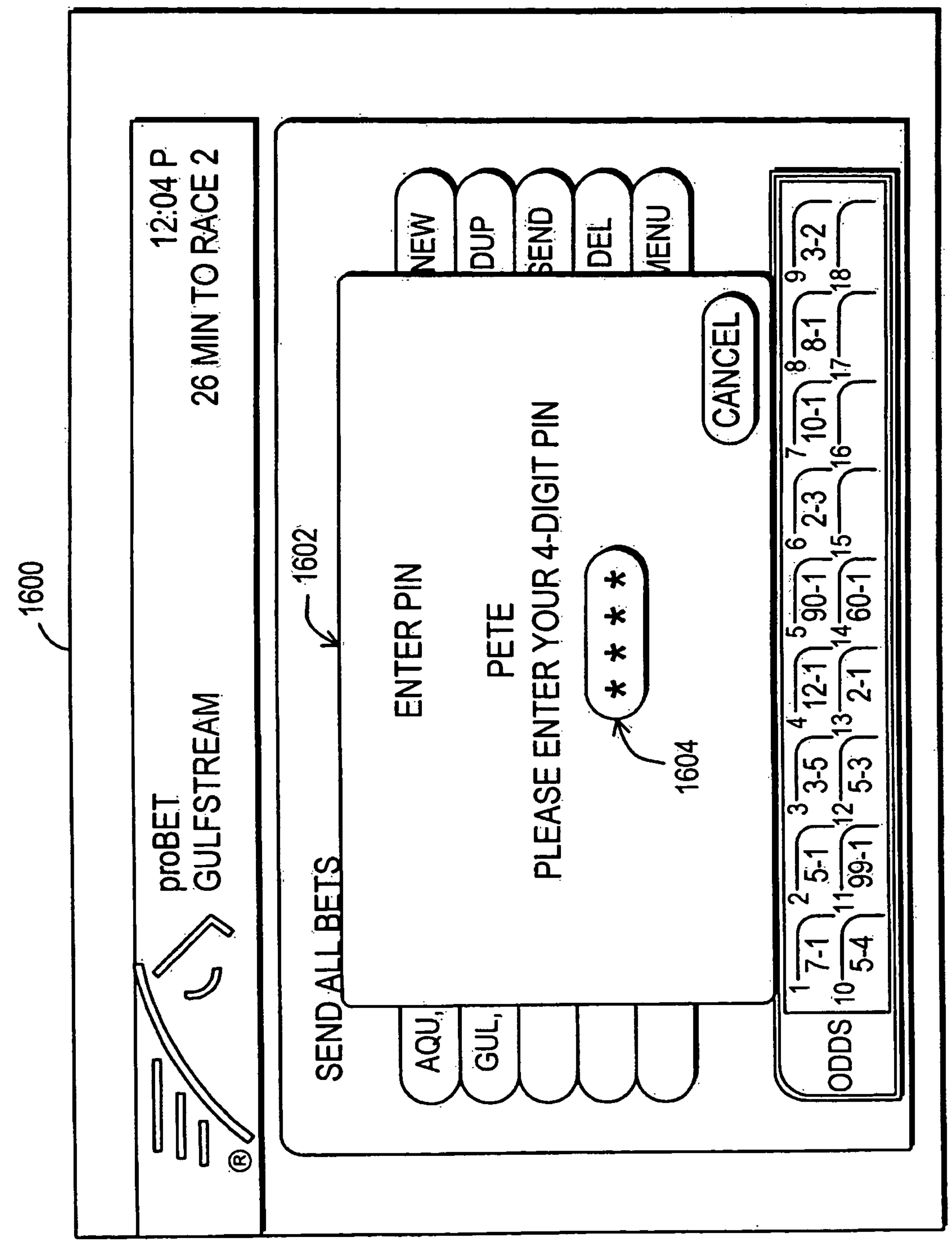

If the user selects the "Send" option, then the user interface displays screen 1600 in FIG. 16. As illustrated, screen 1600 includes a pin-entry window 1602. Using window 1602, the user can then enter a personal identification number (pin) into pin field 1604. By properly entering the account holder's (i.e., Pete's) pin, the user interface knows that the user is in fact the account holder.

Figure 17:
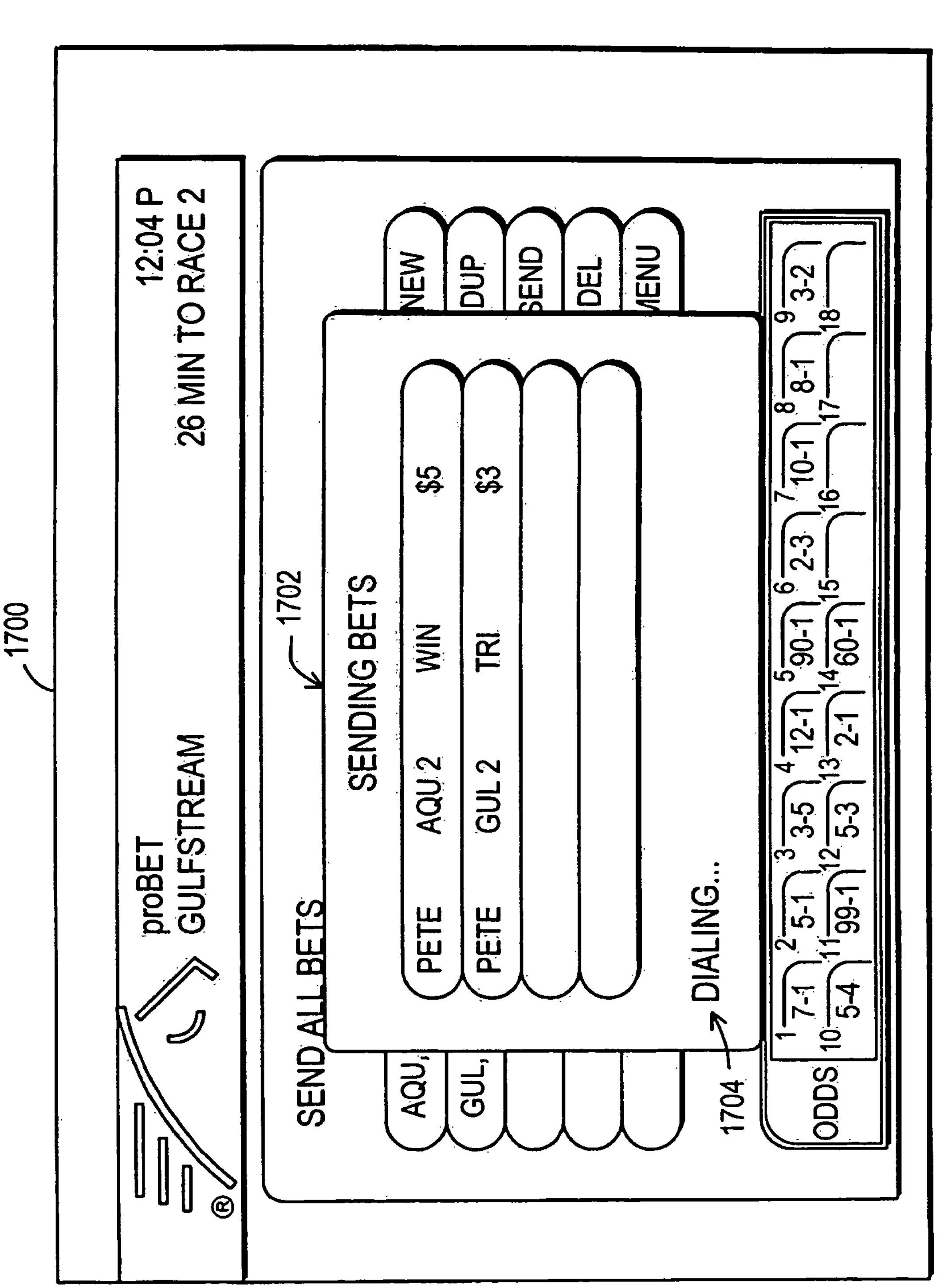

After properly entering his or her pin, the user is then presented with a sending bets window 1702 as shown in screen 1700 of FIG. 17. Window 1702 includes a list of the bets to be sent such that the bets are identified by the player placing the bet, the track and race corresponding to the bet, the type of bet, and the amount of the bet. In a status field 1704 of window 1702, the user is notified of the status of the transmission of the wagers. In the illustration of FIG. 17, field 1704 indicates "dialing." This indication is shown to notify the user that the user interface is currently accessing the telephone. In certain embodiments of the present invention, a "dialing" indication may not be presented when the user interface accesses hub 102 by a mechanism other than a telephone connection and, accordingly, an alternate message may be displayed.

Figure 18:
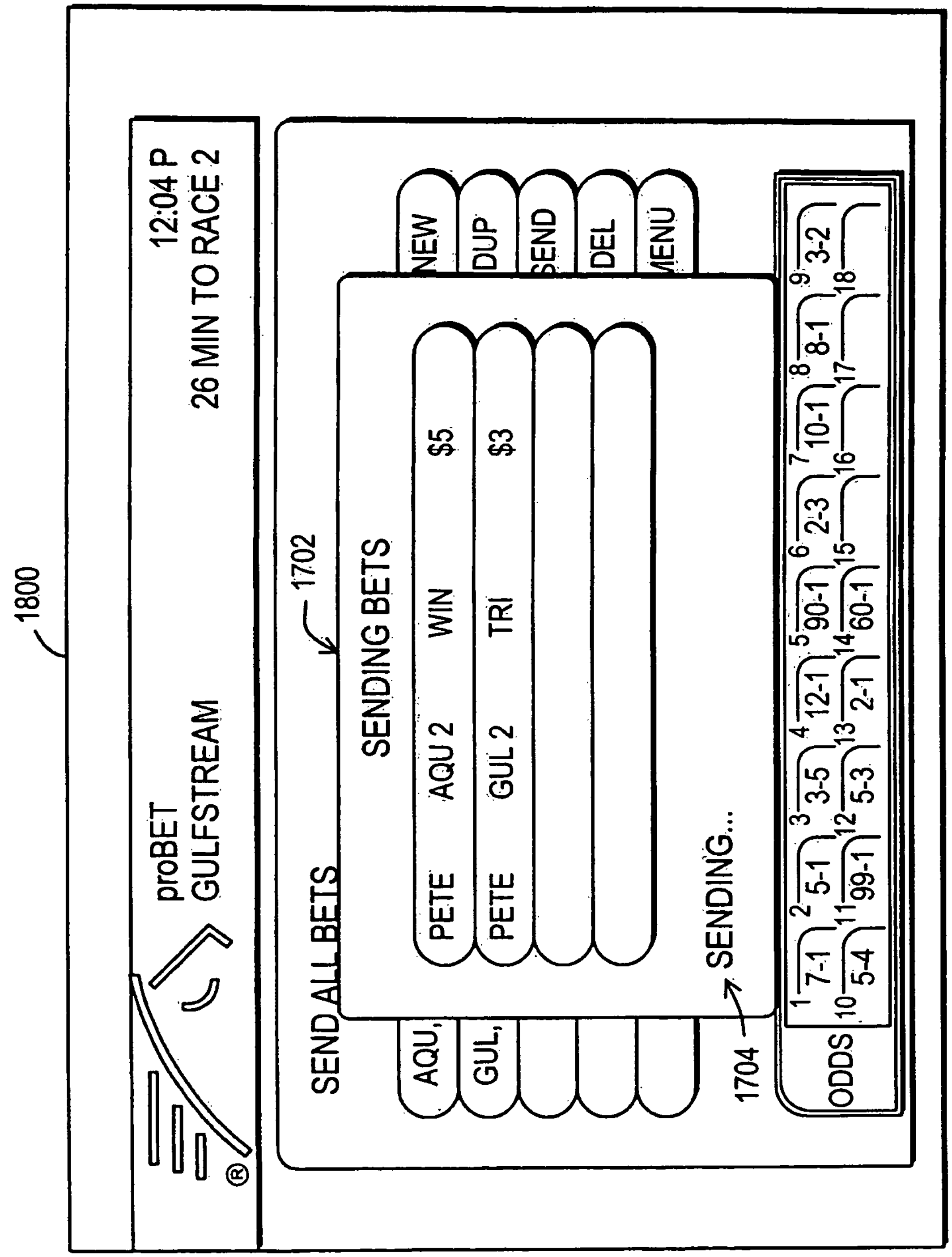

When the wagers are actually being transferred to hub 102 (FIG. 1), status field 1704 indicates that the user interface is "sending" the bets to the hub as shown in screen 1800 of FIG. 18.

Figure 19:
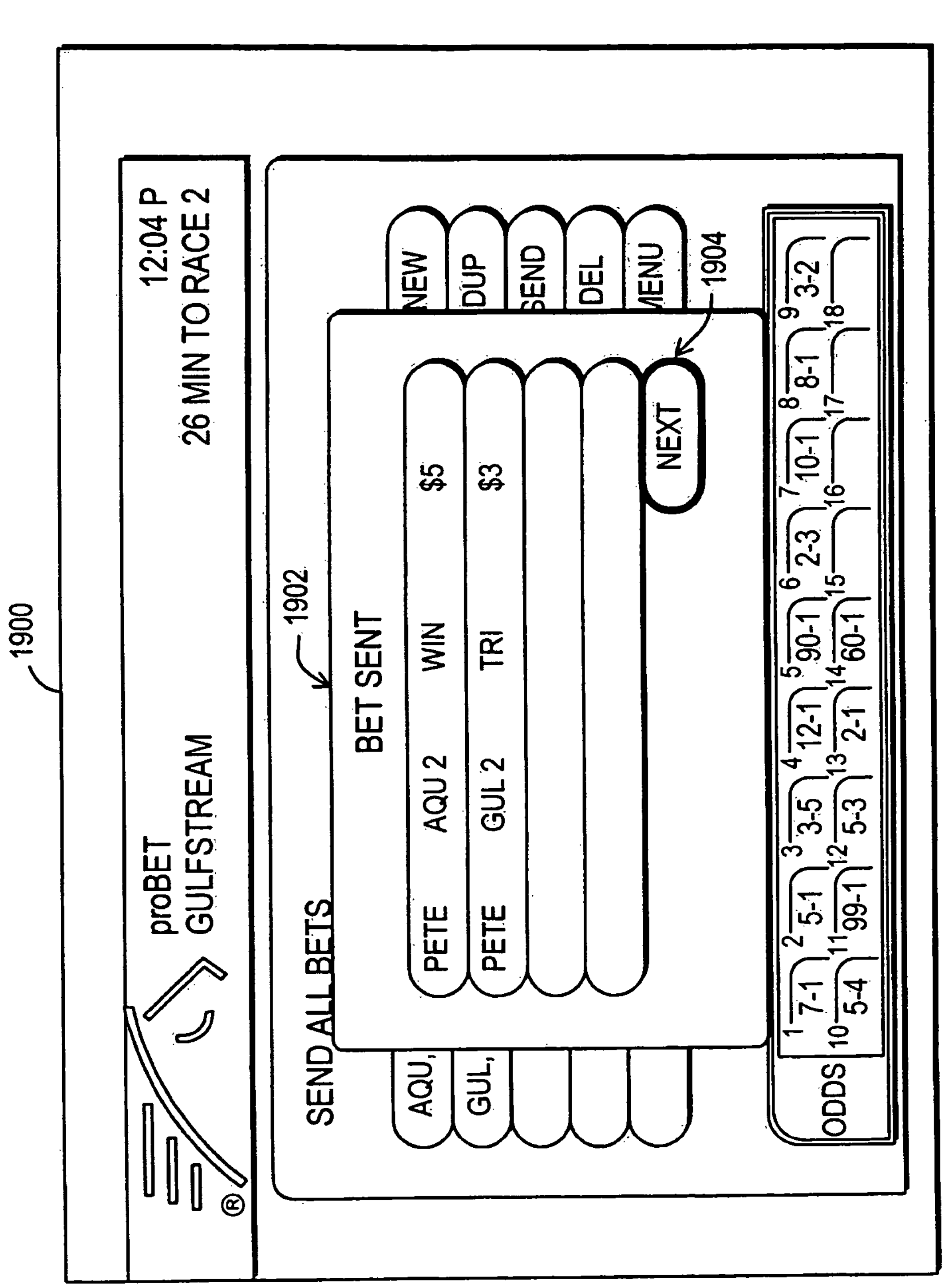
Figure 19A:
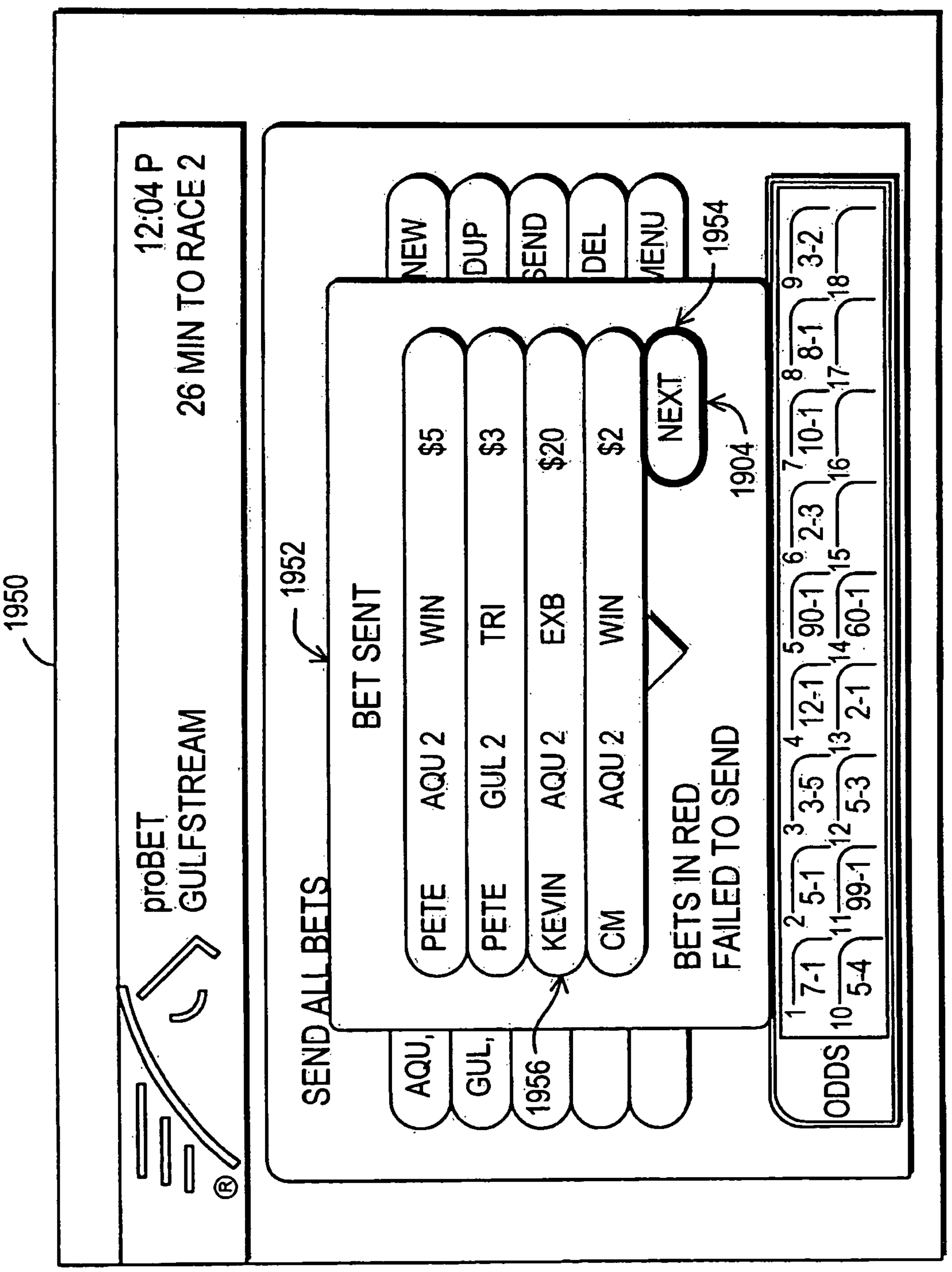

Finally, once the bets have been completely sent, sending bets window 1702 is replaced by a bets sent window 1902 as shown in screen 1900 of FIG. 19. Although not shown in screen 1900, if the sending of any one or more of the bets displayed is unsuccessful (e.g., because of insufficient funds in the wagerer's account or because a selected horse has been scratched), that bet may be indicated as being unsent by not listing the bet in window 1902, by listing the bet in a different color in window 1902, by listing the bet with a "not sent" icon in window 1902, or by any other suitable method. For example, as shown in screen 1950 of FIG. 19*a*, a bets sent window 1952 may be displayed. In the illustration, the user has attempted to send bets for multiple players (i.e., "Pete," "Kevin," and "CM"). As shown in window 1952, a bet 1956 may be shown in a specific color, such as red, to indicate that the bet was not sent. To receive further information on why the bet was not sent, the user may subsequently reposition highlight 1954 from around next button 1904 to bet 1956. When bet 1956 is highlighted, the user interface may then display a message indicating why the bet was not sent (e.g., insufficient funds in the player's account). Once the user is done viewing the bets sent, the viewer may proceed with the user interface by selecting next button 1904.

Figure 20:
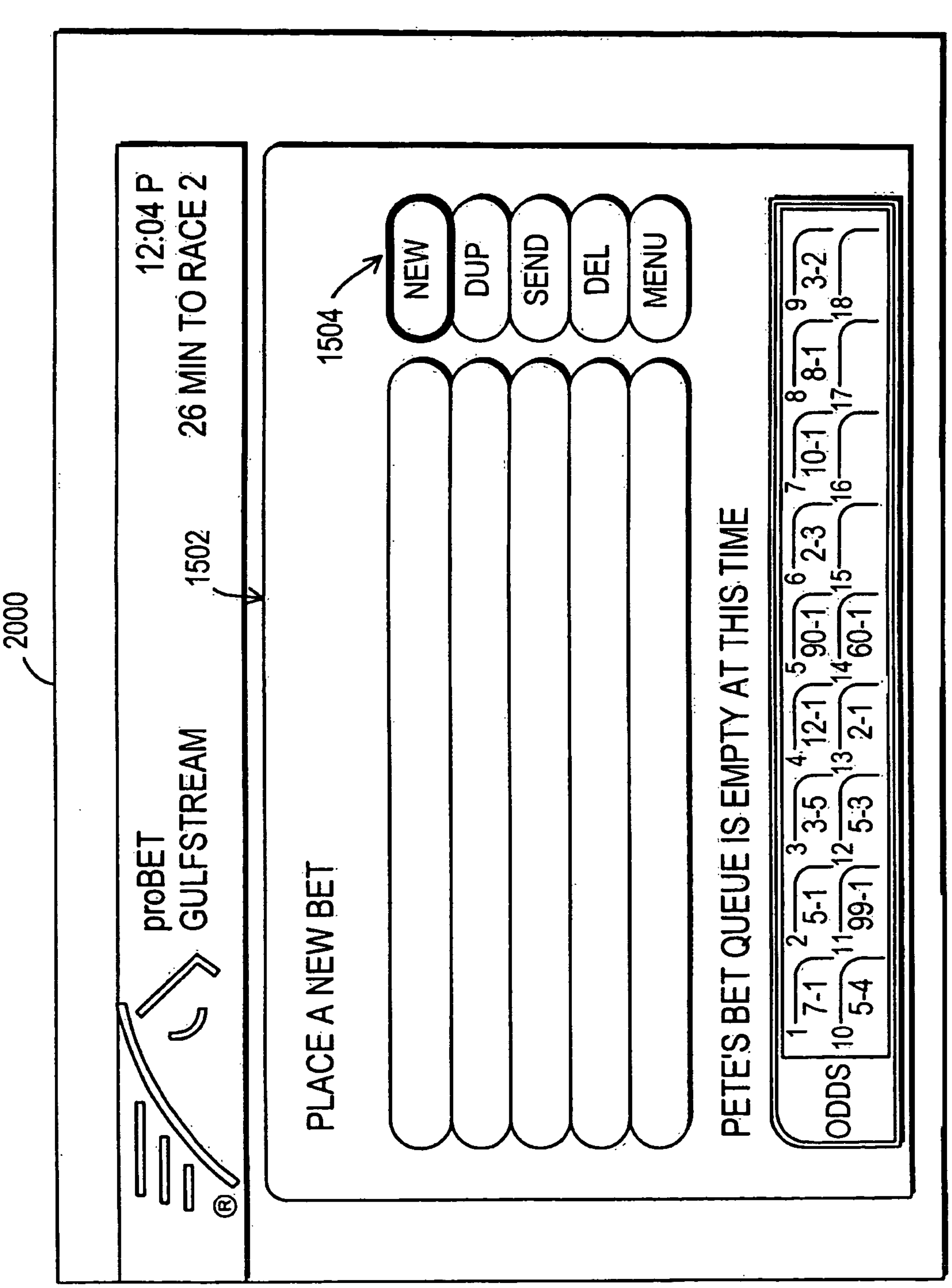

After next button 1904 has been selected, screen 2000 is displayed as shown in FIG. 20 with bet queue 1502 cleared of the bets that were sent. Any unsent bets could also preferably be cleared. Alternatively the unsent bets could be retained and the user given an option to edit those bets by proceeding through the selections of FIGS. 9-14. At this point, as shown in FIG. 8, the user may proceed by selecting one of action selections 1504 as described above in connection with FIG. 15.

Figure 21:
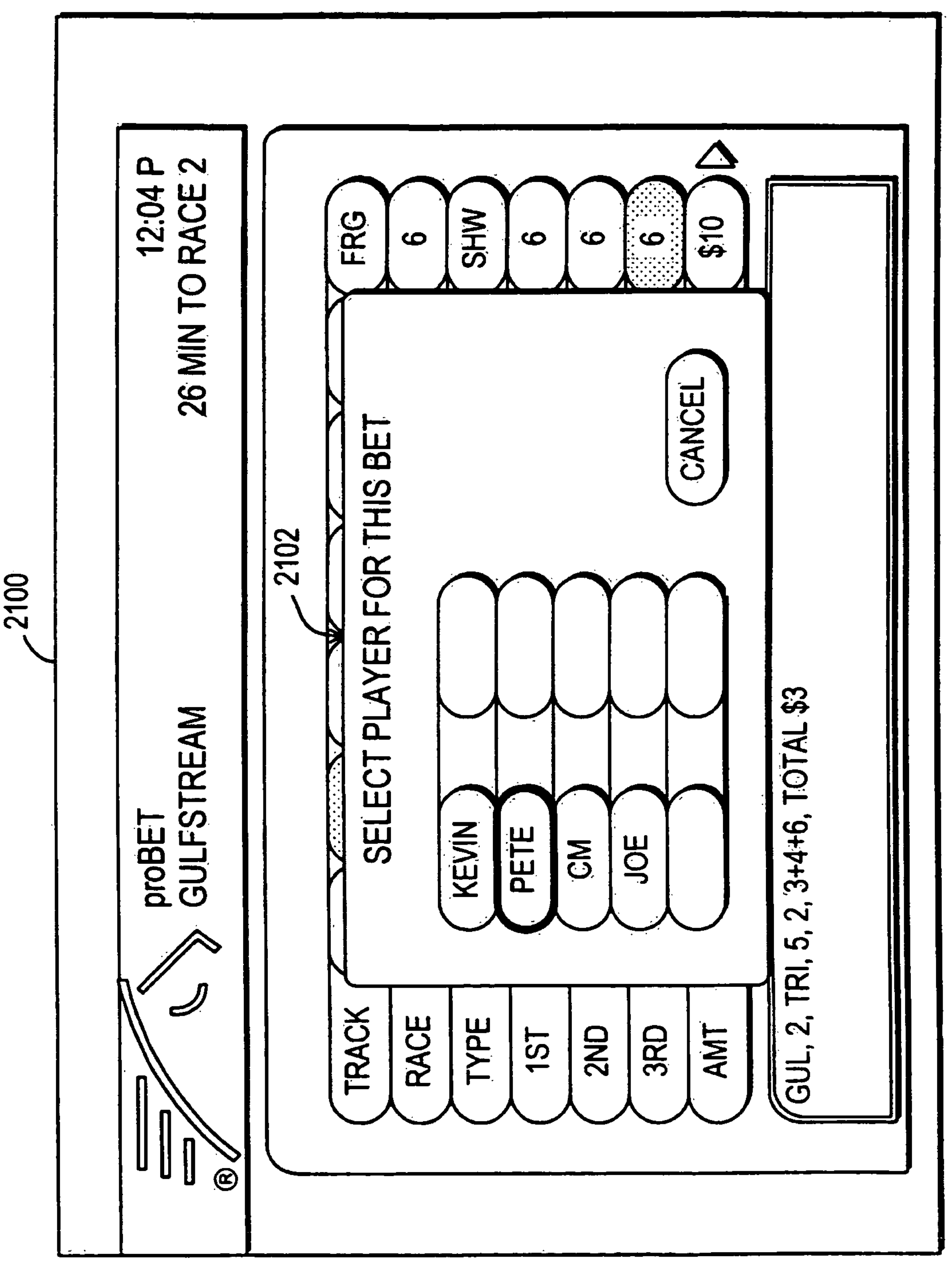
Figure 22:
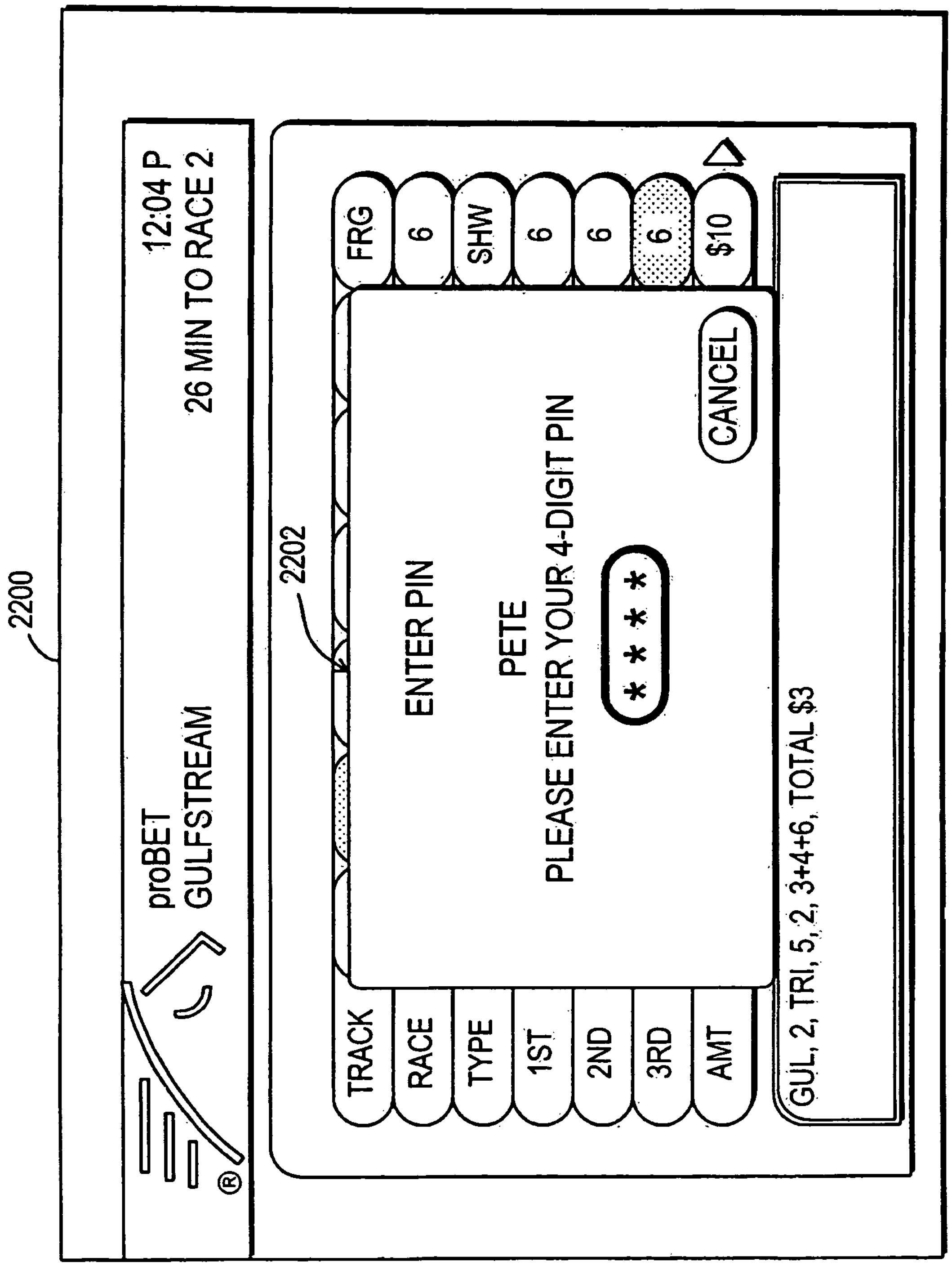
Figure 23:
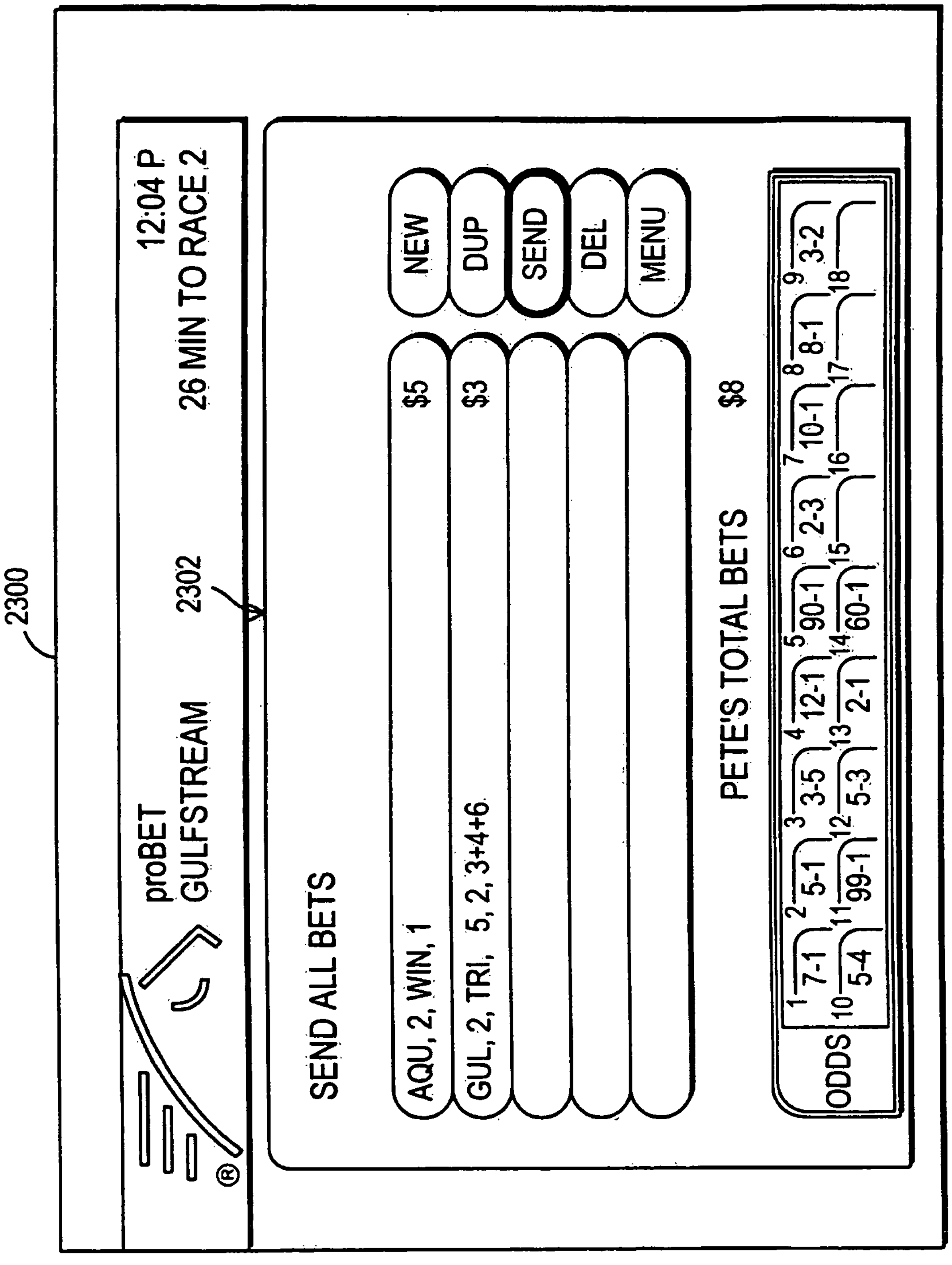

As mentioned above, after a user has confirmed a bet in screen 1400 of FIG. 14, the user will proceed to screen 2100 of FIG. 21 when multiple players are accessing the user interface. As shown in FIG. 21, screen 2100 includes a player identification window 2102. Using window 2102, the user can then identify the desired player's account. After the user has identified the desired player's account (as shown, Pete's), the user is required to enter a pin in pin-entry window 2202 of screen 2200 shown in FIG. 22. Pin-entry window 2202 operates substantially the same as pin-entry window 1602 described in connection with FIG. 16. Likewise, once the pin has been successfully entered, the user is then presented with a queue window 2302 as shown in screen 2300 of FIG. 23.

Queue window 2302 operates substantially the same as queue window 1502 described in connection with FIG. 15.

Figure 24:
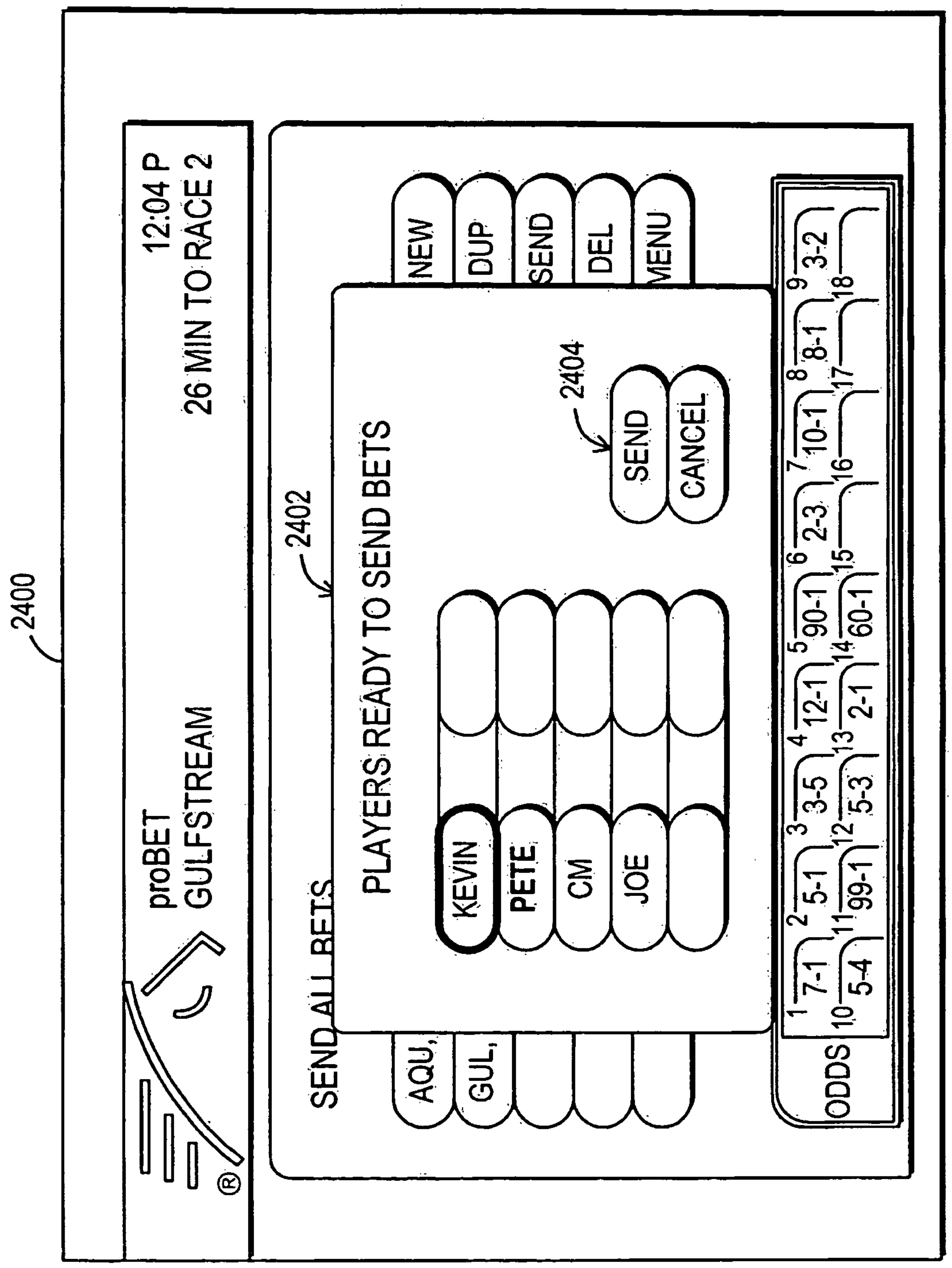
Figure 25:
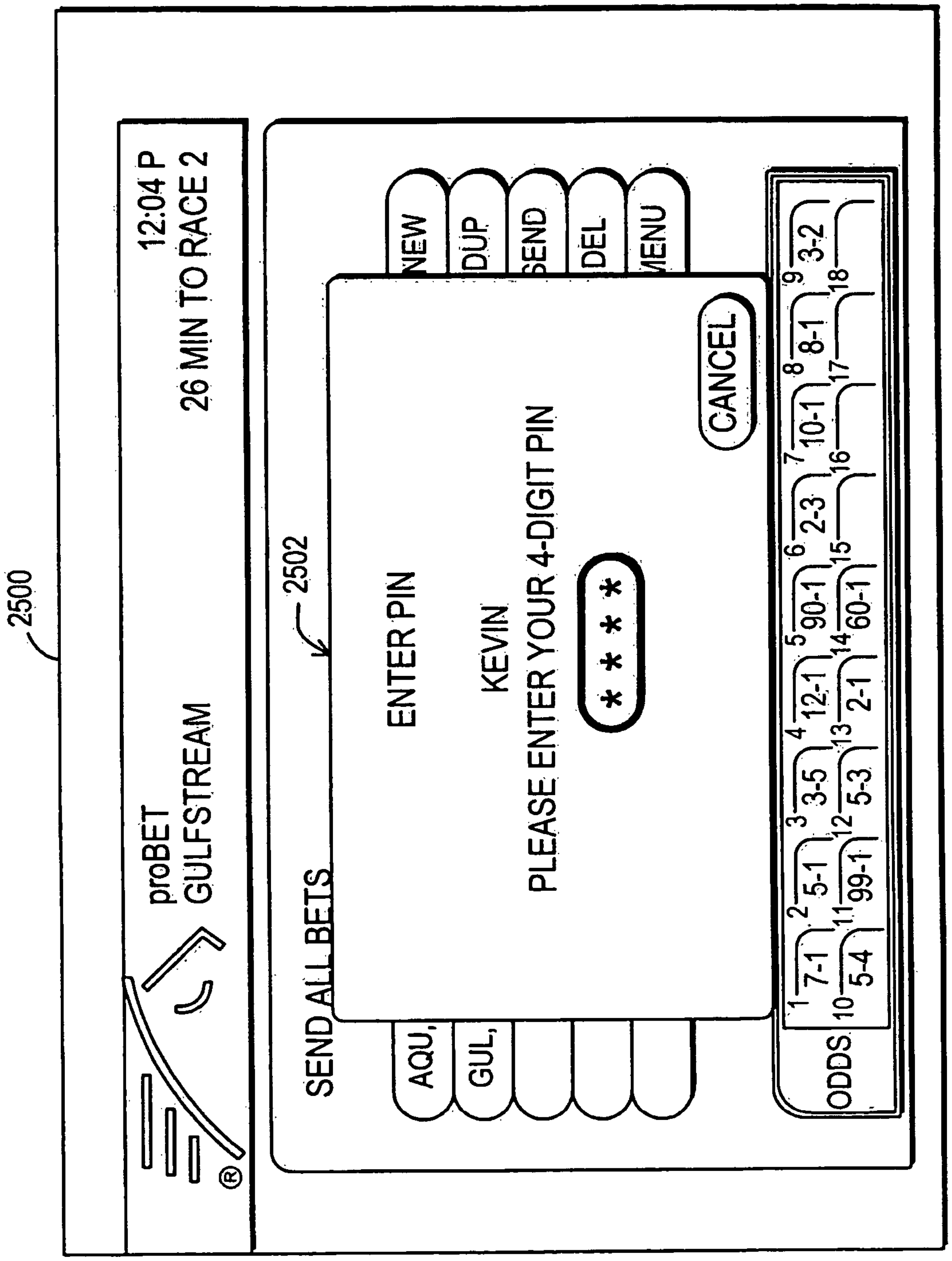

When the user selects to send all bets from queue window 2302, the user is then presented with a player send selection window 2402 as shown in screen 2400 of FIG. 24. Using window 2402, the user then indicates each of the player accounts for which bets are to be sent. Once the user is finished, the user selects send button 2404 from window 2402 to proceed to screen 2500 of FIG. 25. As shown in FIG. 25, the user is then prompted for the pin of each player selected in window 2402 before the corresponding bets can be sent to hub 102. Once each pin has been entered, the user interface performs the functions illustrated in FIGS. 17-20 (and described in connection therewith) as shown in FIG. 8.

As shown in FIGS. 9-14, the proBET mode of the illustrated embodiment of the present invention provides a very efficient interface for the experienced wagerer. Using this interface, the wagerer can typically make all of the selections required to make a wager on a single screen. At the same time the wagerer is not bogged down by being presented with unnecessary information, such as the full horse names or race start times, with which the wagerer is already familiar. On the other hand, for the less experienced wagerer, an interface such as that in the proBET mode may be too intimidating because of its inherent brevity. For such a user, the present invention provides a novice interface as illustrated in the Build-A-Bet mode show in FIGS. 26-53.

Figure 26:
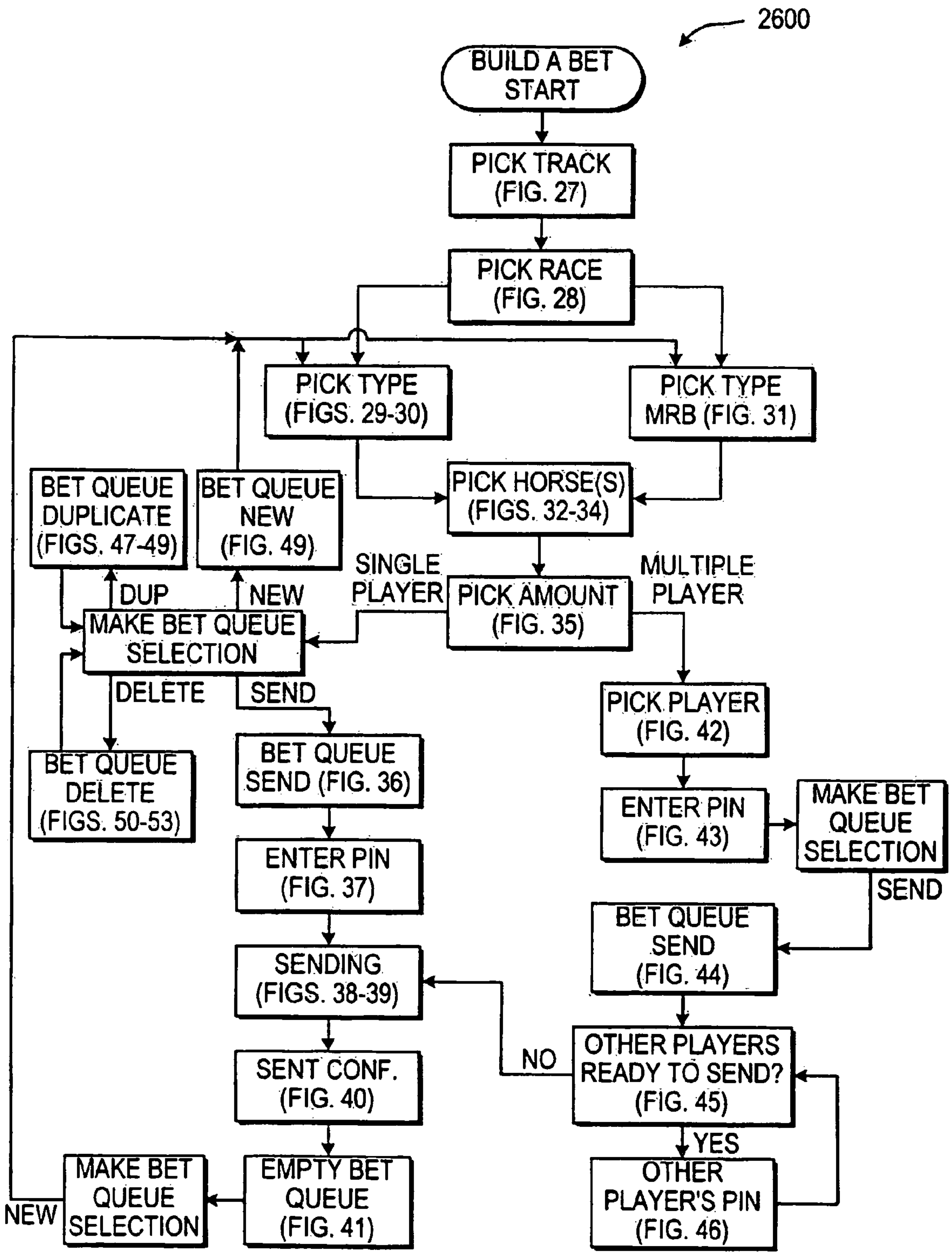
FIG. 26 is a flow diagram illustrating a build a bet mode that may be presented in a set-top box or computer user interface in accordance with one embodiment of the present invention.
Figure 27:
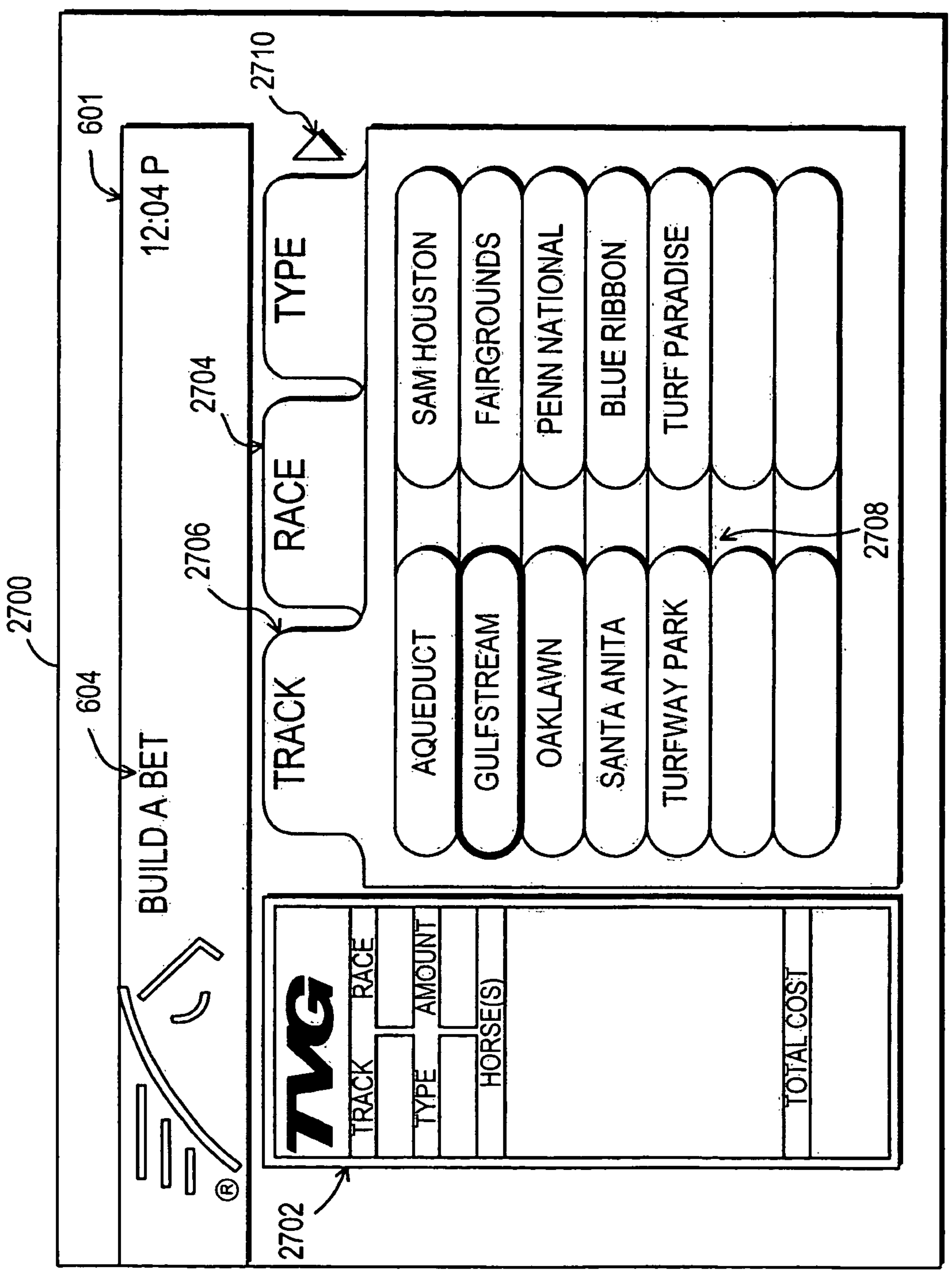
FIGS. 27-53 are illustrations of screen displays that may be presented as part of the build a bet mode in a set-top box or computer user interface in accordance with one embodiment of the present invention.

To activate the Build-A-Bet mode, the user selects "Build-A-Bet" option 706 from menu 702 (FIG. 7), and thereby causes series 2600 of screen displays 2700-5300 (FIGS. 27-33) illustrated in FIG. 26 to be presented. More particularly, when a user selects option 706 (FIG. 7), screen 2700 is displayed as shown in FIG. 27. As can be seen, in screen 2700, when "Build-A-Bet" option 706 is selected, current function indicator 604 in status bar 601 indicates that the user interface is in the Build-A-Bet mode. In this mode, a ticket window 2702 and tab options 2704 are displayed.

Ticket window 2702 shows a simulated wagering ticket that is updated as the user makes his or her selections.

Tab options 2704 show the information that is required for the user to place a wager. For example, the left-most tab 2706 indicates that the user must select a track for the wager. A track is selected by selecting one of track options 2708. As with other menu selections, in the Build-A-Bet mode, the user may select an option 2708 by positioning the highlight that is shown around the "Gulfstream" option to a desired option and pressing the select key on a remote control, or by any other suitable method. Although only three tab options 2704 are illustrated in screen 2700, arrow 2710 may be presented to indicate that other tab options are available to be selected. To move between tabs, the user may press a right or left arrow key on a remote control (or make any other suitable input) to move the highlight illustrated around "Gulfstream" to other tabs.

Figure 28:
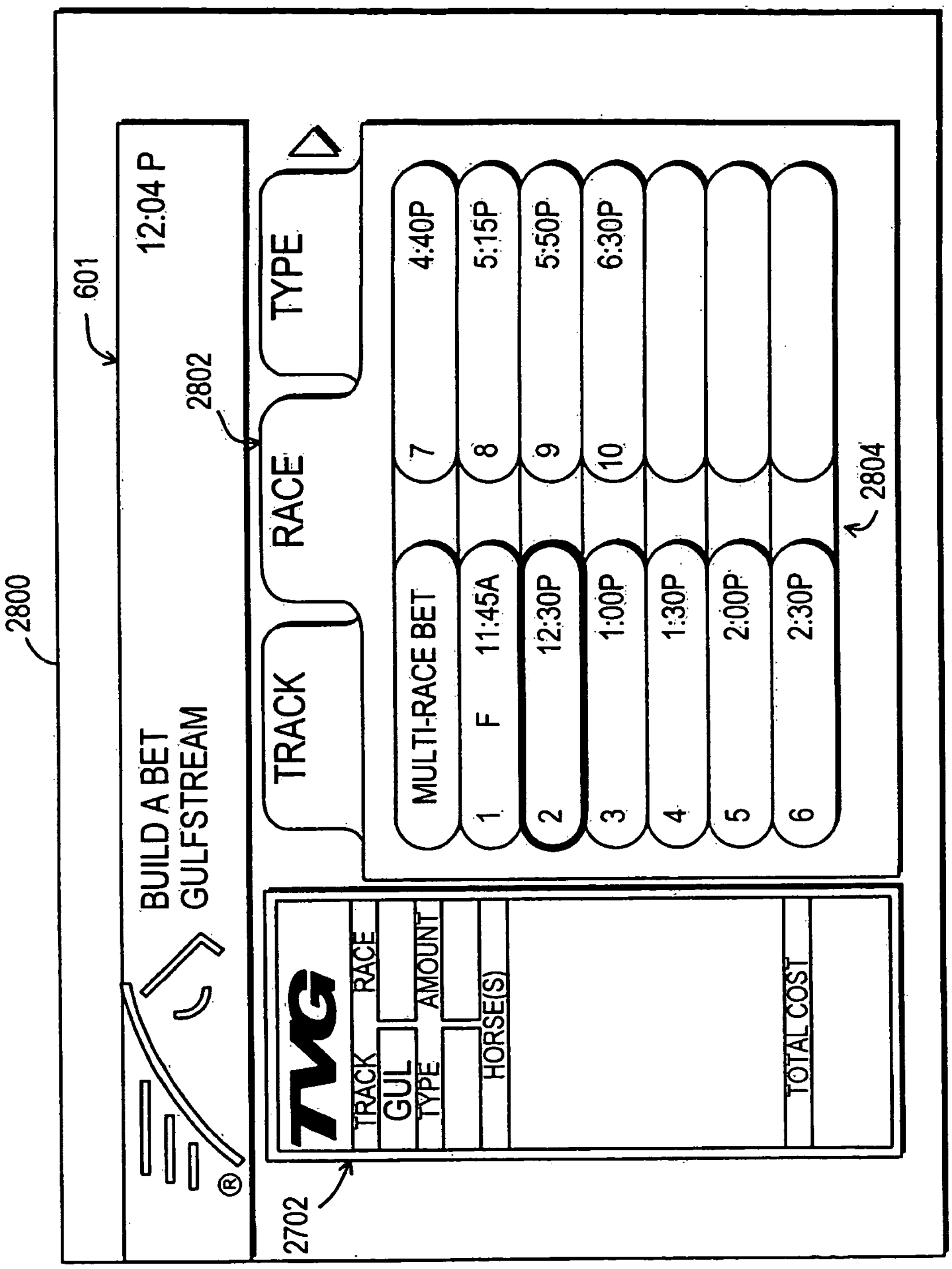

Once a user has selected a track from screen 2700, the user interface next presents a screen 2800 as illustrated in FIG. 28. As shown, screen 2800 indicates the track selection made by the user in the status bar 601 and ticket window 2702. At this point, the user is preferably required to select a race at the selected track. This may be done by either manually selecting race selection tab 2802 or by tab 2802 automatically being selected, and then by picking one of race options 2804. As shown, some races, such as race "1" may be finished (as indicated by "IF") and thus may not be selectable.

Figure 29:
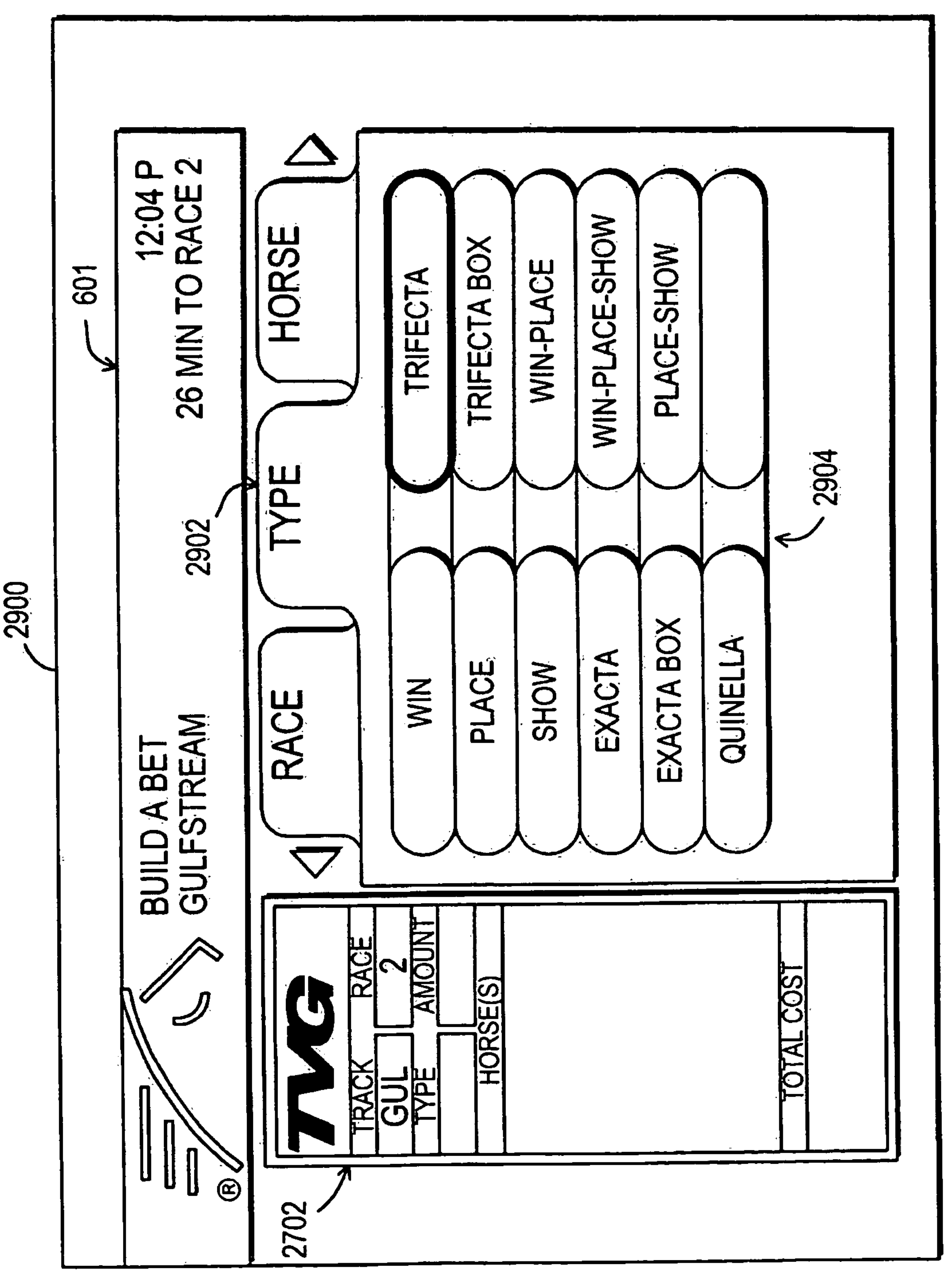
Figure 30:
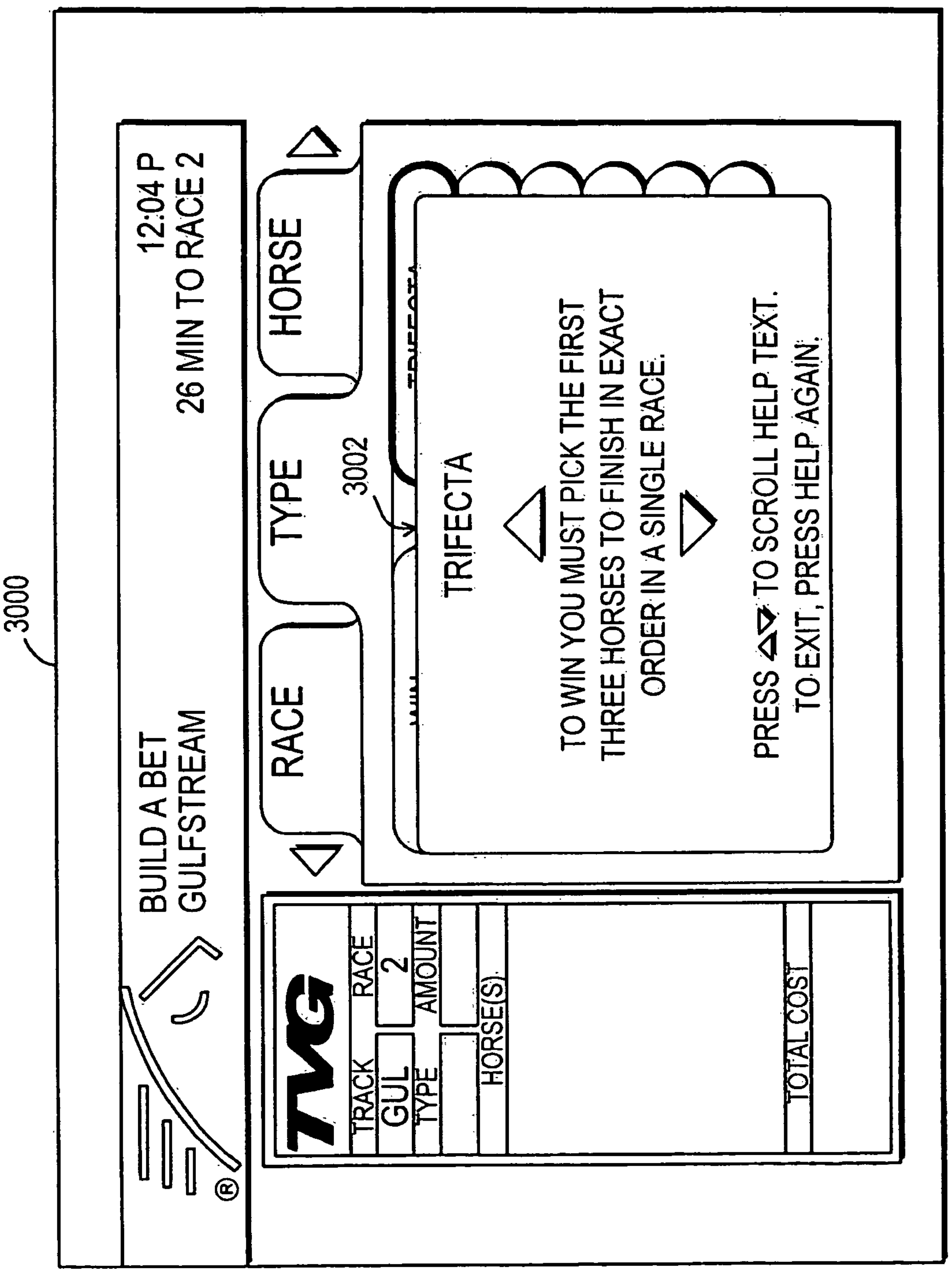

After a user has made a race selection in screen 2800, as with the track selection and subsequent wager selections, the race selection is indicated in ticket window 2702 as shown in screen 2900 of FIG. 29. As also shown, the race selection may be indicated in status bar 601. The user is then prompted for a wager type selection from one of wager options 2904 in wager type tab 2902. As shown in screen 3000 of FIG. 30, if a user is uncertain about what an individual bet or wager type is, the user may highlight the bet or wager type (as shown in FIG. 29) and then press a help button on a remote control (for example), or otherwise select a help function, to access a help window 3002. This help window preferably provides a description of what the wager type requires for the user to win.

Figure 31:
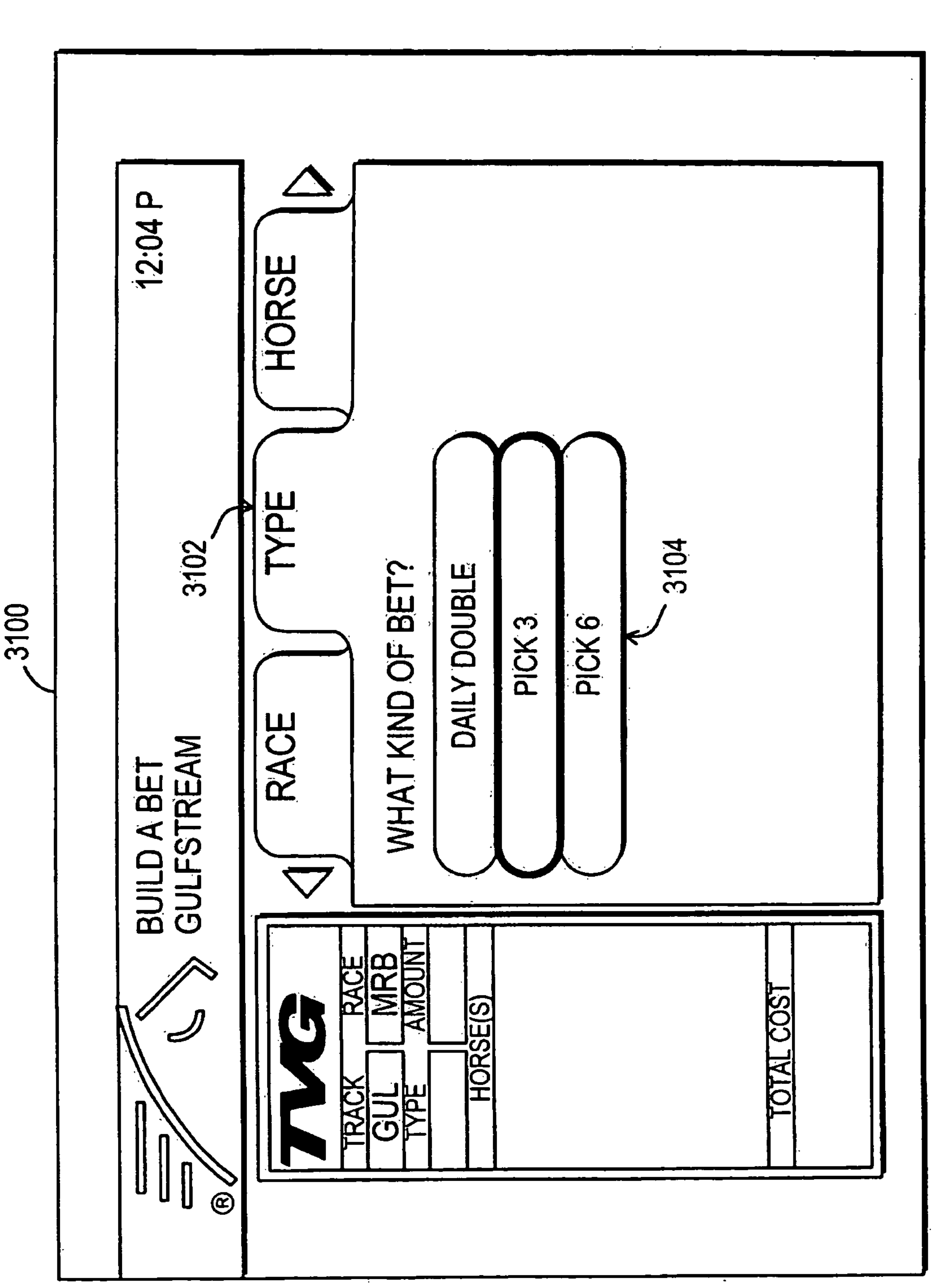

If, in response to screen 2800 shown in FIG. 28, the user selects a "Multi-Race Bet", the user interface will preferably show a bet type tab 3102 as illustrated in screen 3100 of FIG. 31. As can be seen, tab 3102 includes wager type options 3104 for a "daily double", a "pick 3", and a "pick 6".

Figure 32:
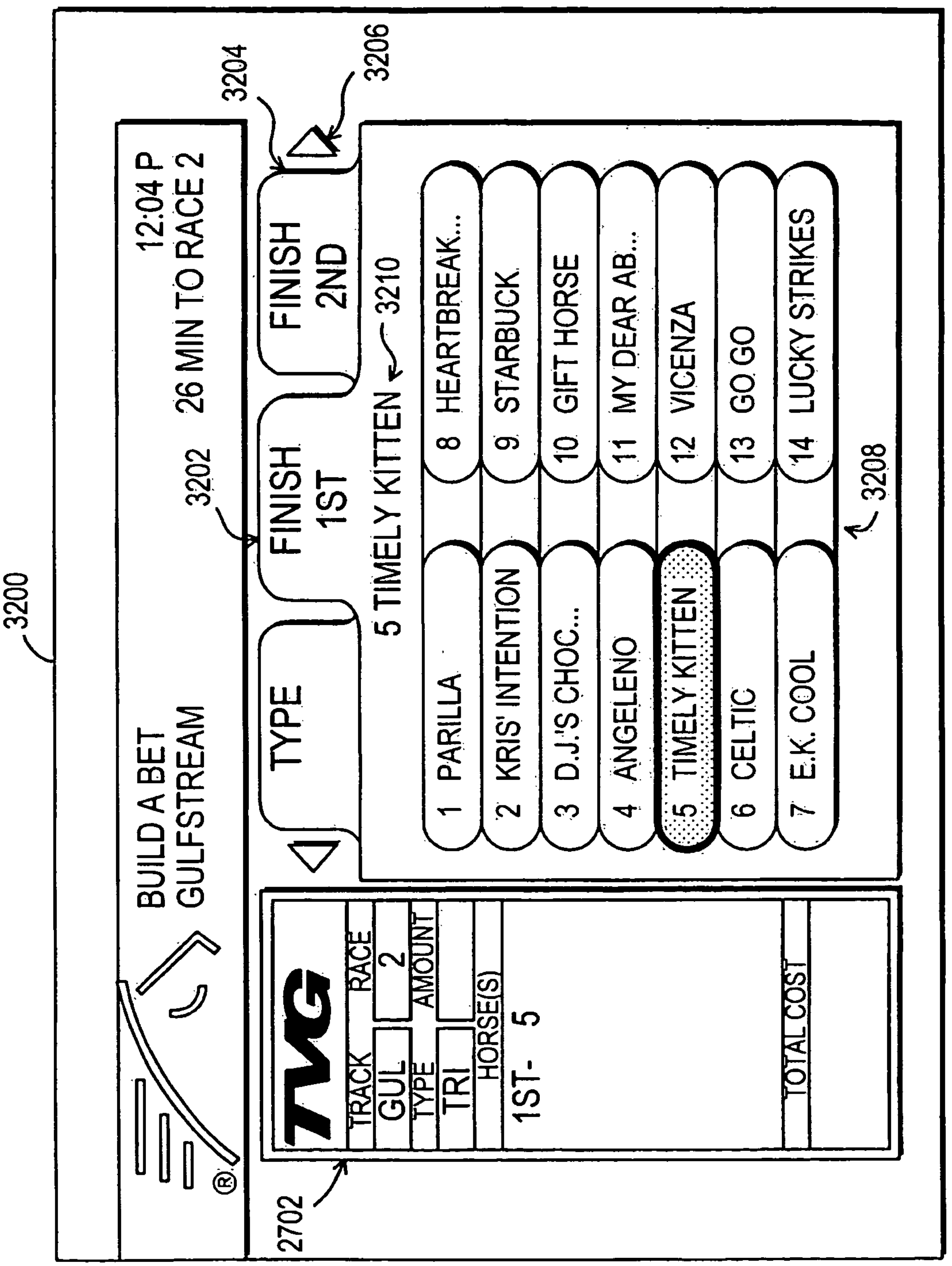

Assuming that the user has picked race "2" and a "trifecta" wager type, a screen 3200 is then displayed as shown in FIG. 32. Once again, ticket window 2702 is updated to show the race and wager type selections. Because the user has selected a trifecta wager type, the user interface now includes a finish first tab 3202, a finish second tab 3204, and a finish third tab (not shown, but indicated by arrow 3206). In response to finish first tab 3202, the user is required to select at least one of finish first selections 3208. As the user highlights each of selections 3208, the full name of the selection highlighted may be displayed in a display field 3210. As illustrated, the user has selected "5 Timely Kitten". This selection is also indicated in ticket window 2702. After the user has selected the finish first selection, the user selects at least one finish second selection from finish second tab 3202 (shown in screen 3300 of FIG. 33) and at least one finish third selection from finish third tab 3402 (shown in screen 3400 of FIG. 34). As these selections are made, each is preferably indicated in ticket window 2702.

Figure 32A:
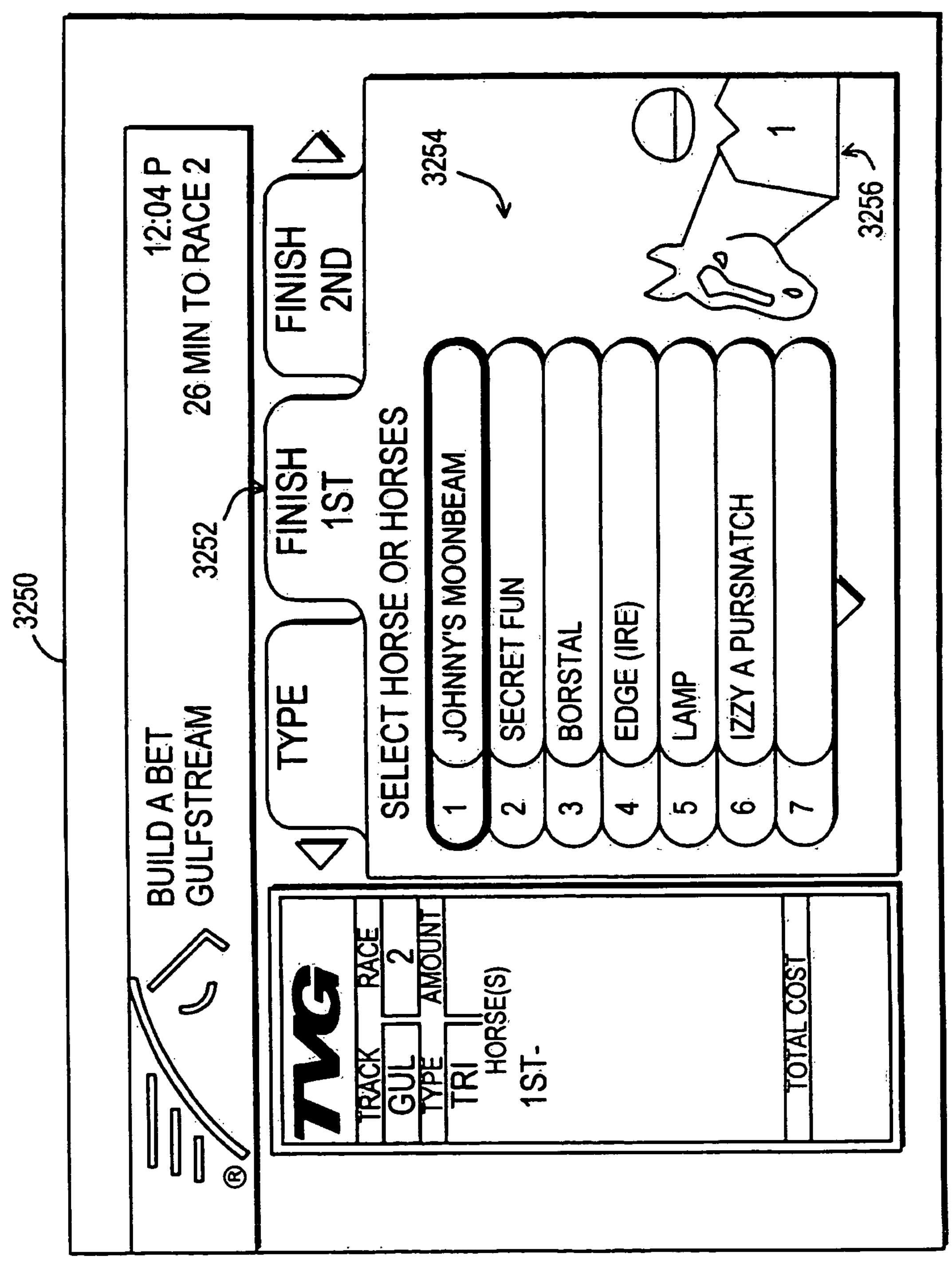
Figure 33:
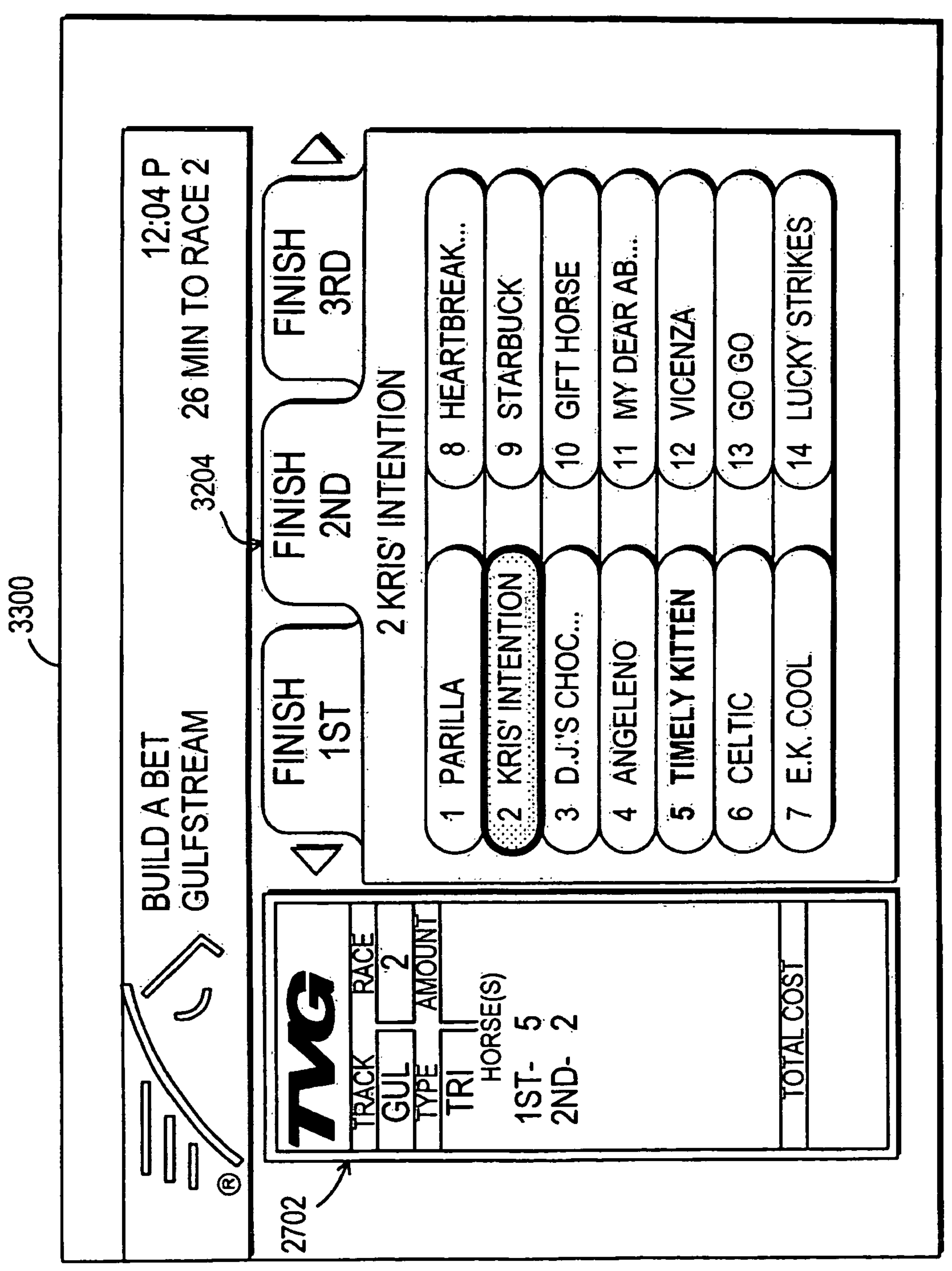
Figure 34:
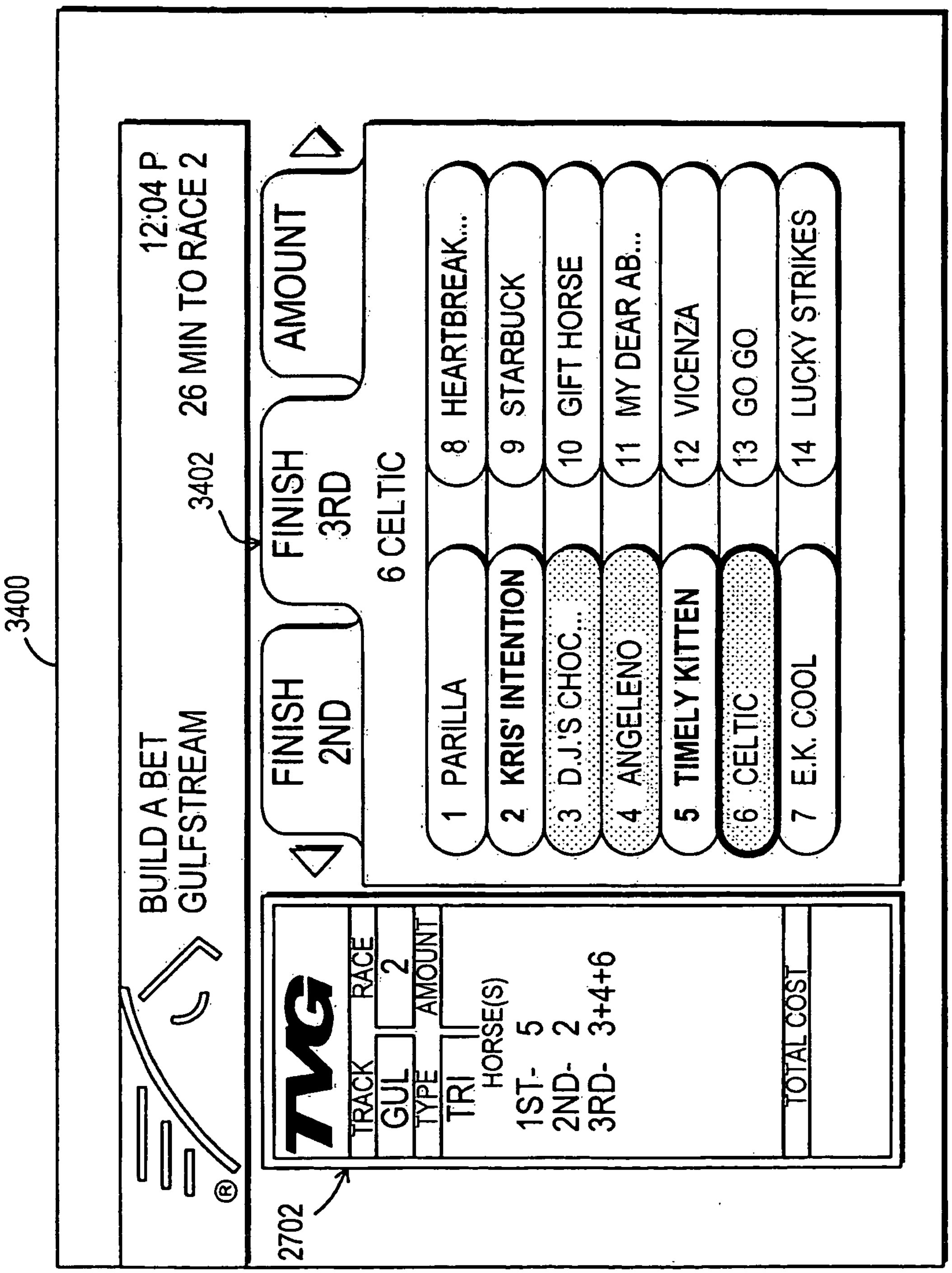

In an alternate embodiment of the user interface of the present invention, the user is presented with a horse selection interface that shows each jockey's and/or horse's colors as the user highlights different horses in the selection interface. For example, as shown in screen 3250 of FIG. 32*a*, a finish first tab 3252 is used to select a horse to come in first place. Tab 3252 includes finish first selections 3254 and a color indicator 3256. As illustrated, color indicator 3256 is shown as an image of a jockey and a horse. As the user highlights a different one of selections 3254, the color of the jockey image changes to match that of the silks worn by the jockey riding the highlighted horse. Similarly, the color of the horse image in indicator 3256 may change to match the actual color of the highlighted horse. Although color indicator is illustrated as an image of a jockey and a horse, the indicator could be any other image, object, or shape. Moreover, multiple color indicators 3256 could also be used, or the color indicator 3256 could be incorporated into one or more of selections 3254. This feature of showing the jockey's and/or horse's colors may be implemented in any horse selection screen of the present invention.

In still other embodiments of the present invention, one or more still or moving images of a jockey and/or a horse could be presented as the user highlights each horse. Such images could be positioned in a portion of the screen, such as the area taken by indicator 3256 in screen 3250, or could be presented temporarily in a partial or full screen overlay, or in a underlying display where a portion of the user interface is partially transparent.

In yet other embodiments of the present invention, one or more pieces of information related to the jockey and/or horse could be presented as the user highlights each horse. Such information could include handicapping information, the odds for that horse to win, place, or show, the name of the jockey, the name of the trainer, and/or any other suitable information.

Figure 35:
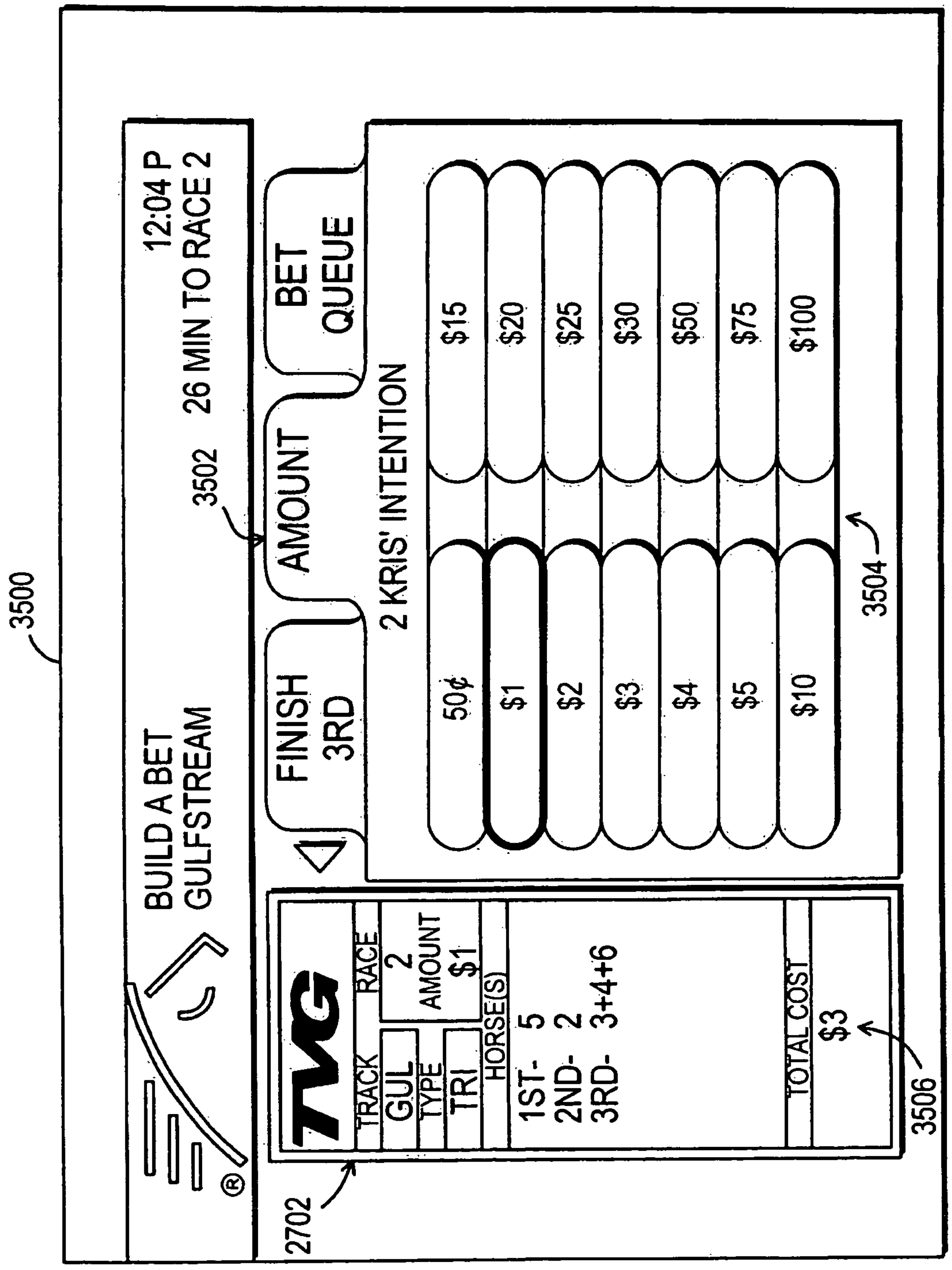

Next, as shown in screen 3500 of FIG. 35, the user is required to select an amount for the wager from amount options 3504 in amount tab 3502. As similarly described in connection with FIG. 13 above, when the user positions the highlight on different amount options 3504, total cost field 3506 in ticket window 2702 is preferably updated to indicate how each highlighted amount option affects the total cost of the bet.

Figure 36:
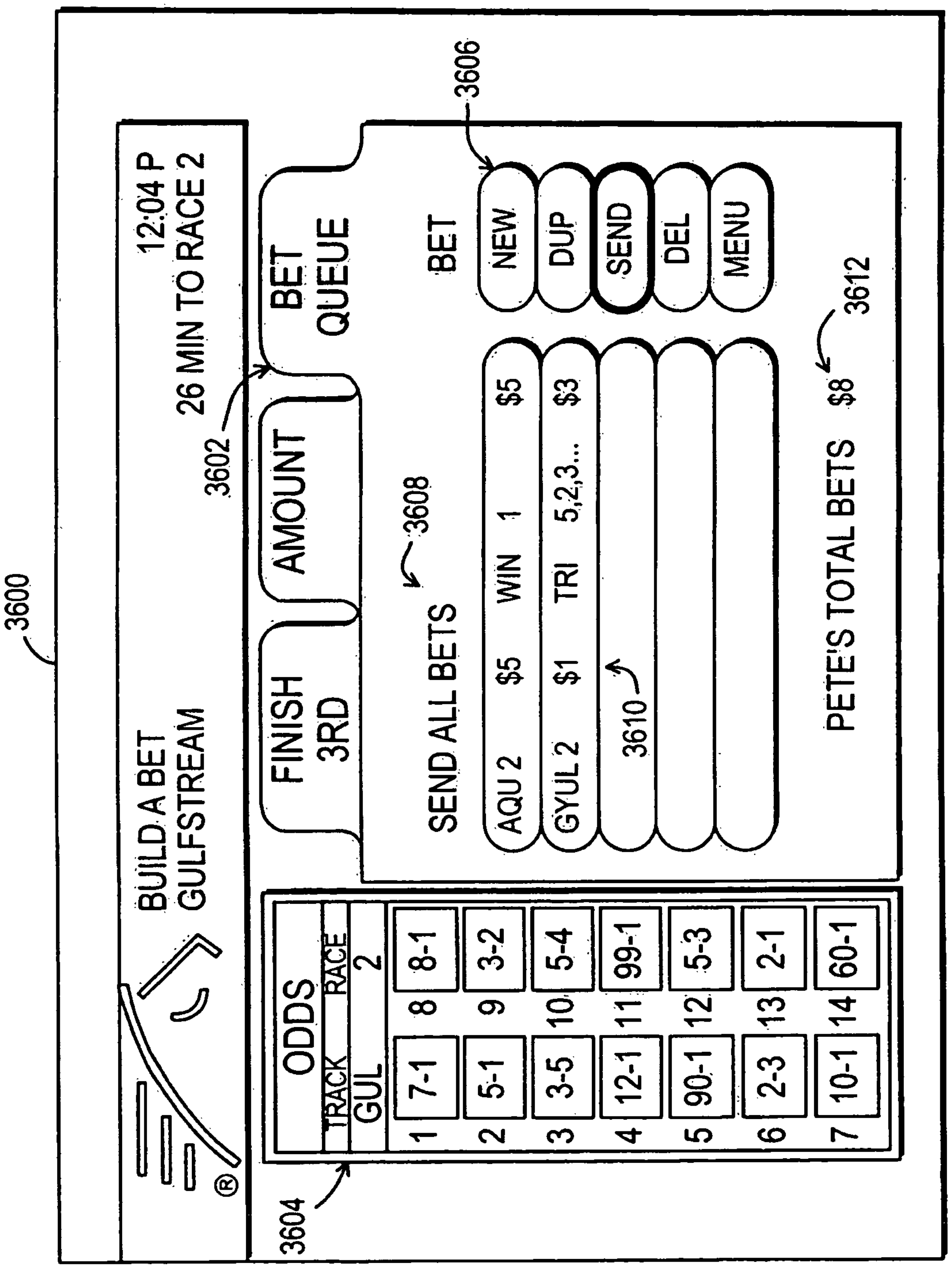

As can be seen from FIG. 26, once the user has selected an amount for the wager from screen 3500, the user interface may proceed to screen 3600 (FIG. 36) if a single player is active or screen 4200 (FIG. 42) if multiple players are active. The user interface may determine whether a single player is or multiple players are active by referring to the status of the players setup as illustrated in and discussed in connection with FIG. 115. If only a single player is active, as shown in FIG. 36, the user is shown a bet queue 3610 as part of bet queue tab 3602. Also included in tab 3602 are action selections 3606, an action indicator 3608, and a total bet indicator 3612. Also displayed in screen 3600 is an odds window 3604. Odds window 3604 operates substantially the same as odds window 1512 described above in connection with FIG. 15. Action selections 3606, action indicator 3608, bet queue 3610, and total bet indicator 3612 operate substantially the same as action selections 1504, action indicator 1506, bet queue 1508, and total bet indicator 1510, respectively, of FIG. 15.

Figure 37:
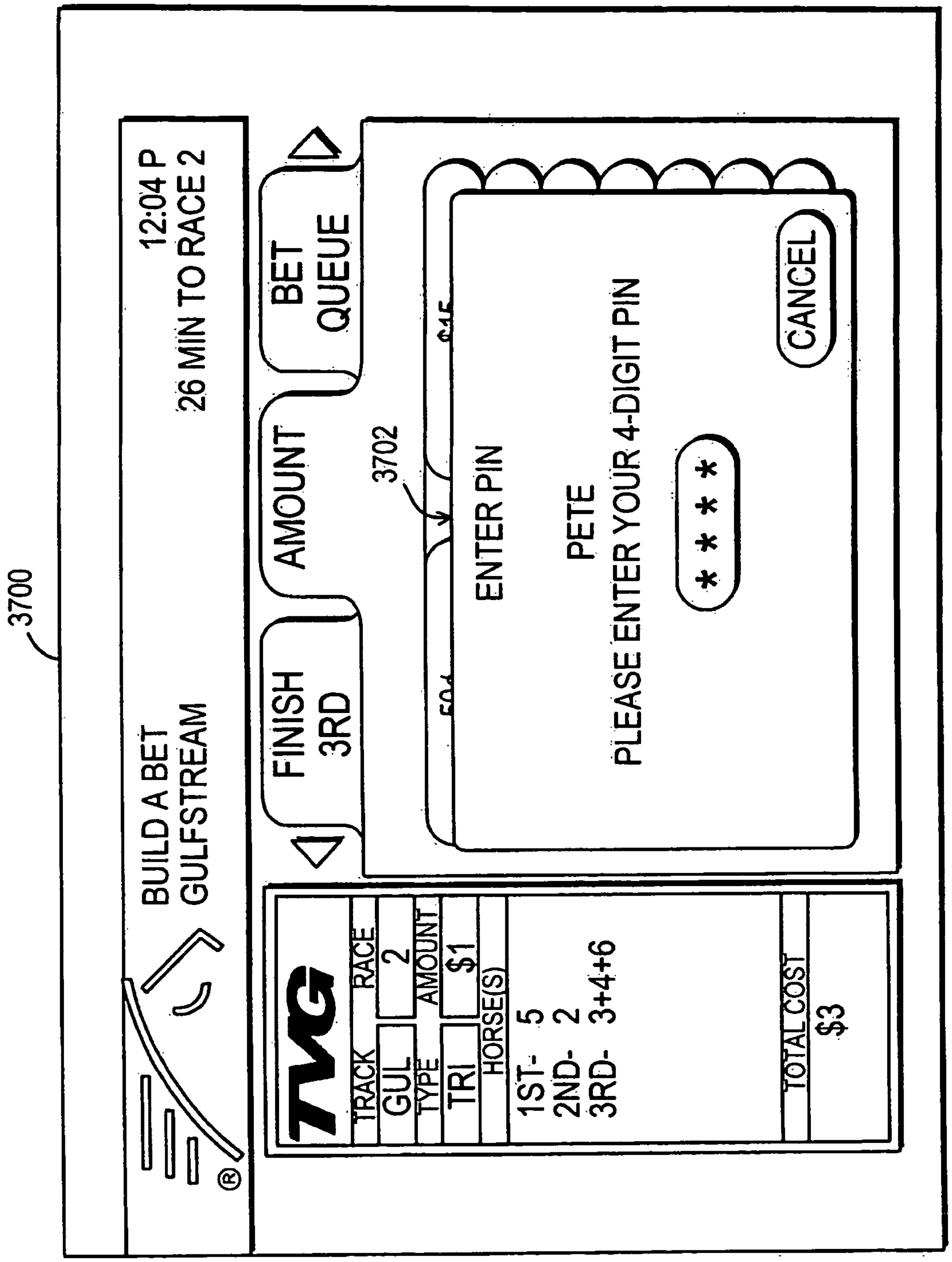
Figure 38:
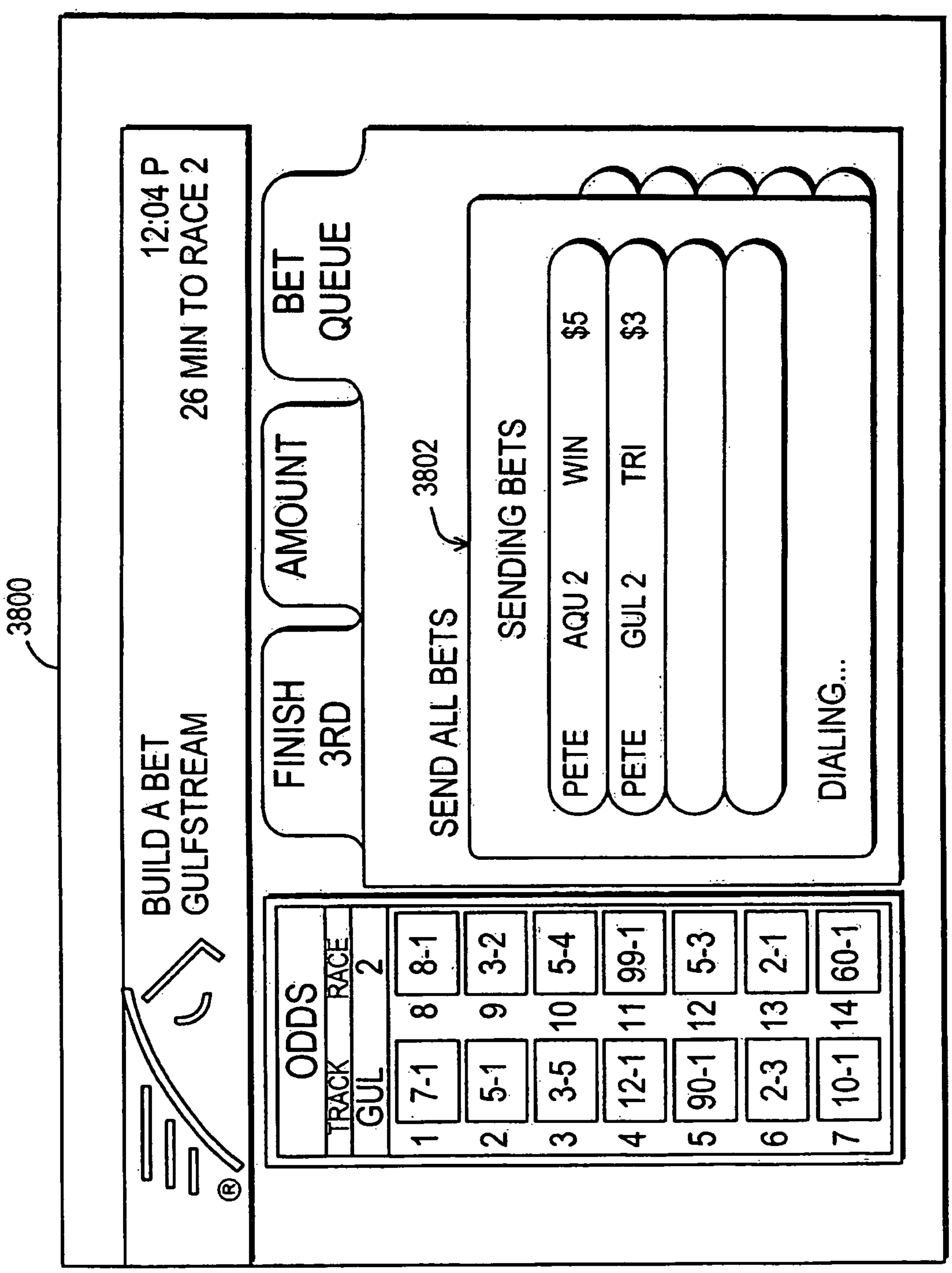
Figure 39:
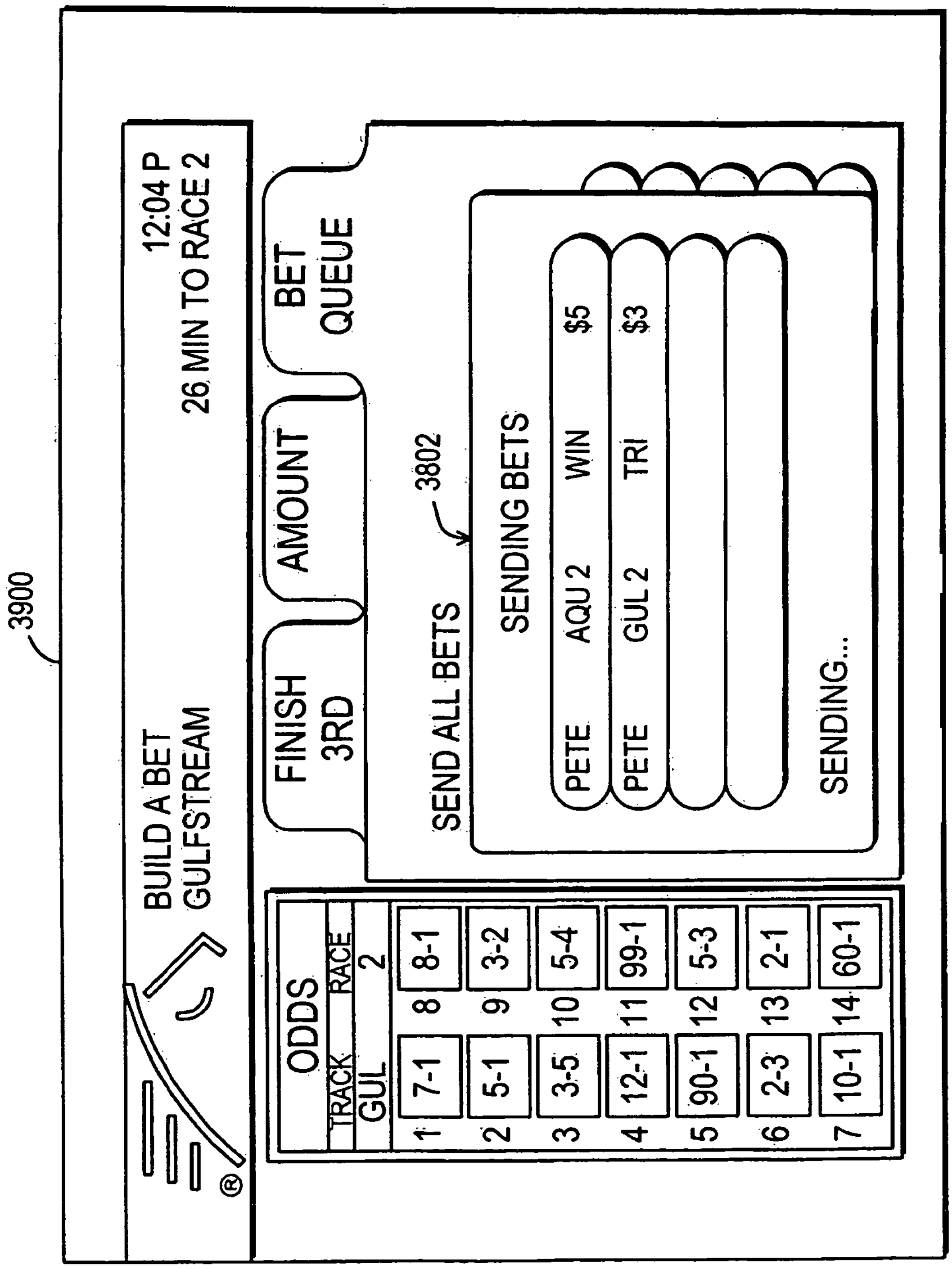
Figure 40:
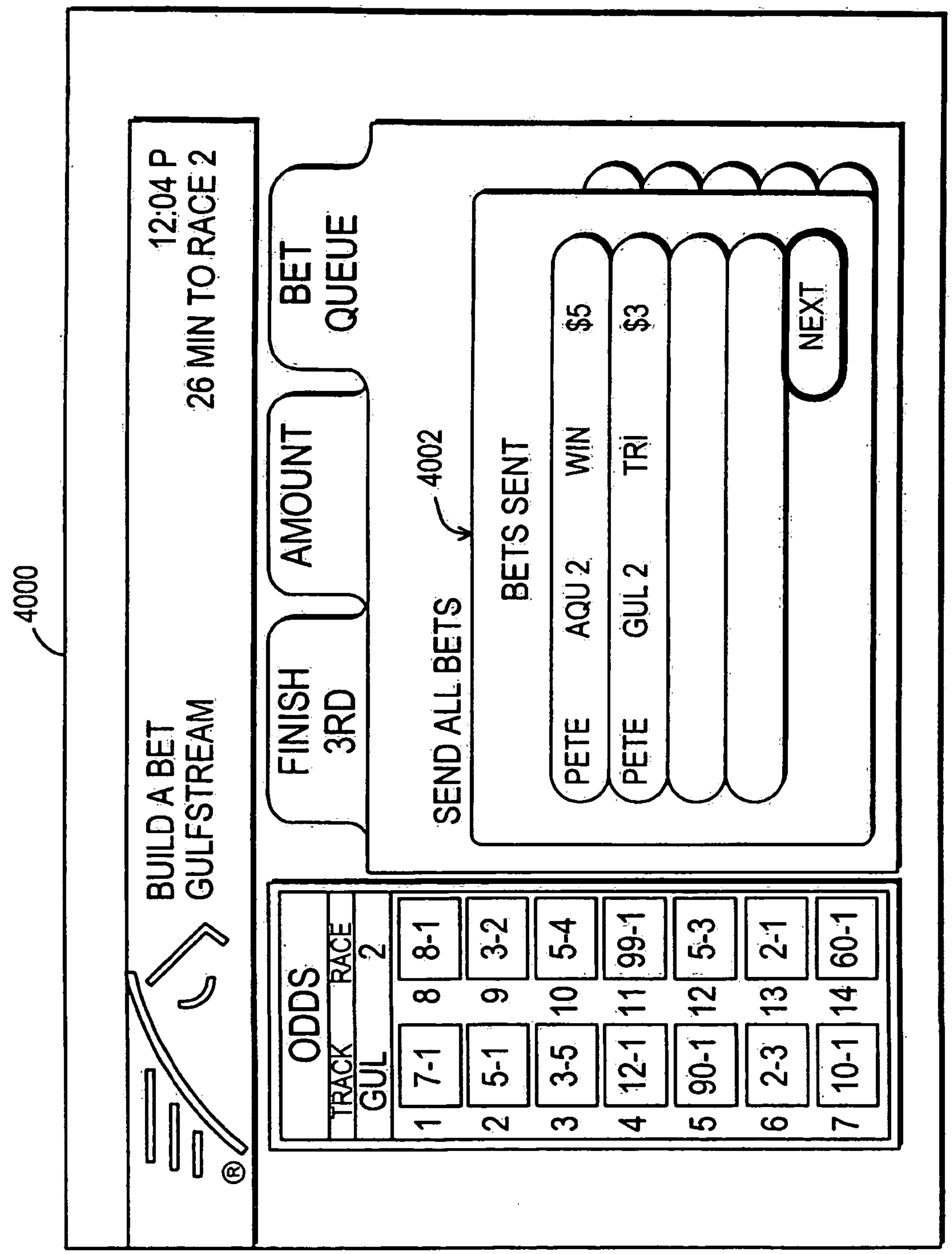
Figure 41:
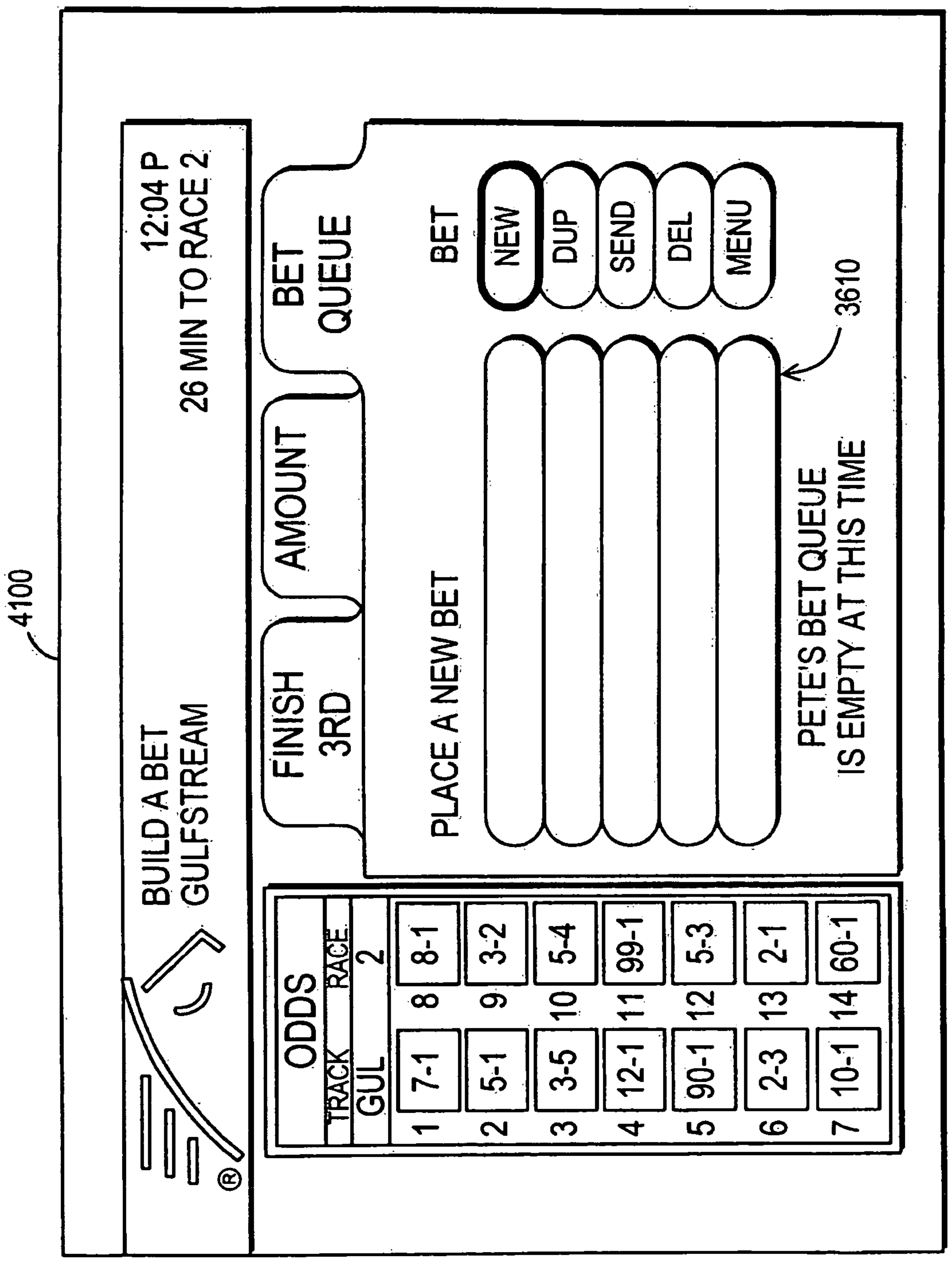

If the user selects the "Send" action selection 3606 from screen 3600 of FIG. 36, the user interface then prompts the user for a pin using a pin-entry window 3702 as shown in screen 3700 of FIG. 37. After the user has properly entered the required pin, the user interface then displays a sending bets window 3802 and sends the bets as shown in screens 3800 and 3900 of FIGS. 38 and 39, respectively. Finally, once the bets have been sent, the user interface displays bets sent window 4002 as shown in screen 4000 of FIG. 40. The operation of windows 3702, 3802, and 4002 is substantially the same as windows 1602, 1702, and 1902 as described above in connection with FIGS. 16-19. After the user interface has sent all of the bets, bet queue 3610 is cleared as illustrated in screen 4100 of FIG. 41.

Figure 42:
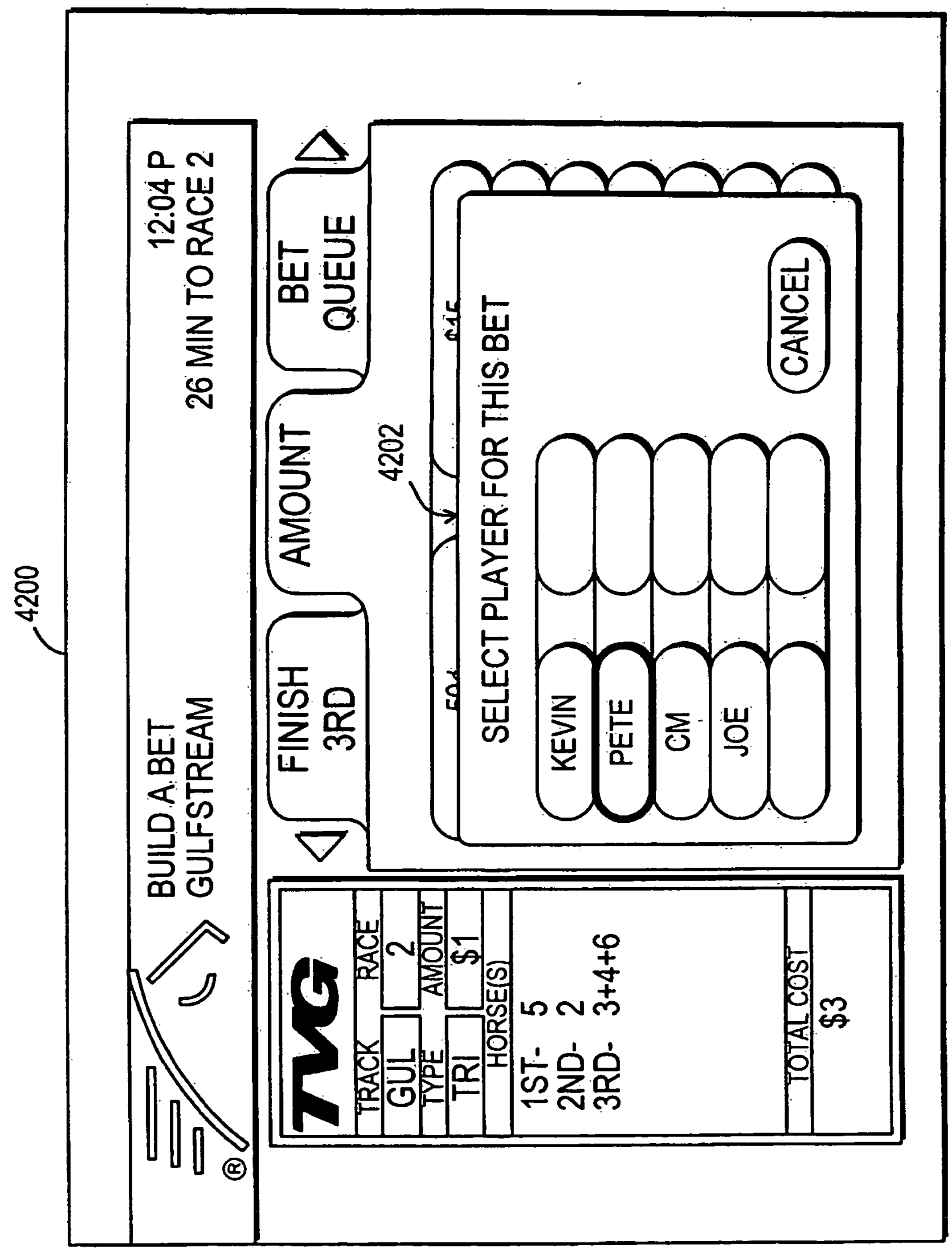
Figure 43:
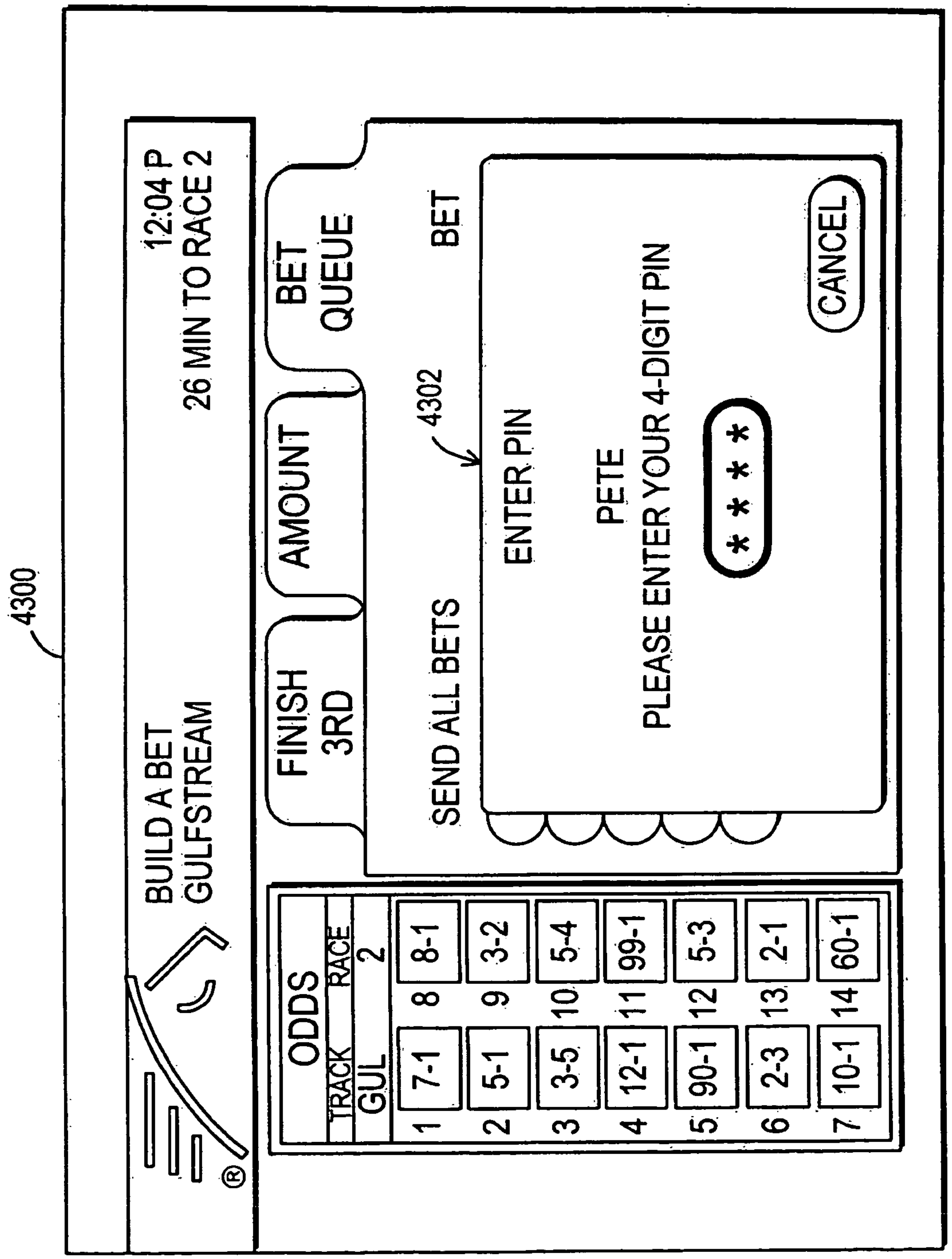
Figure 44:
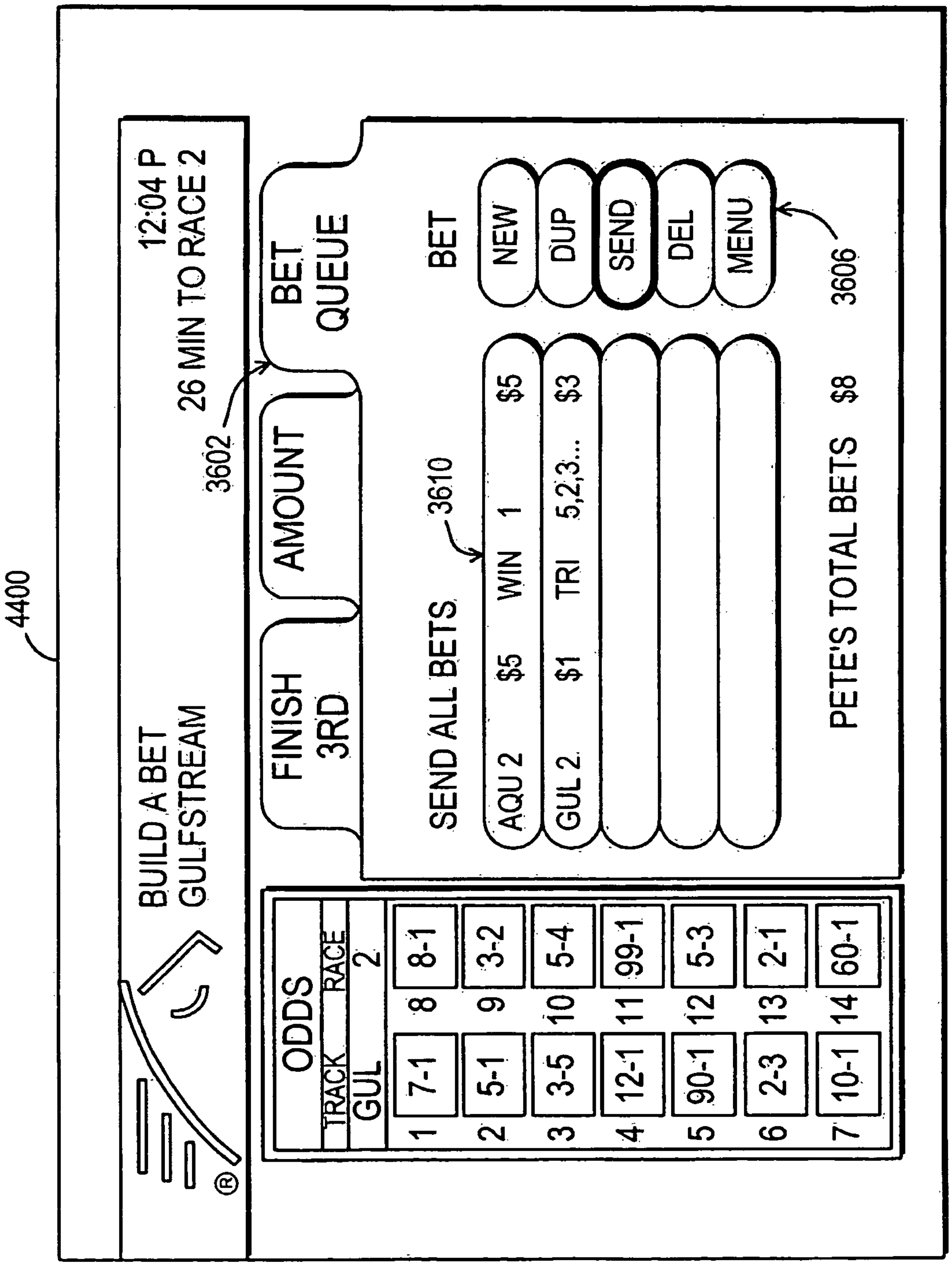
Figure 45:
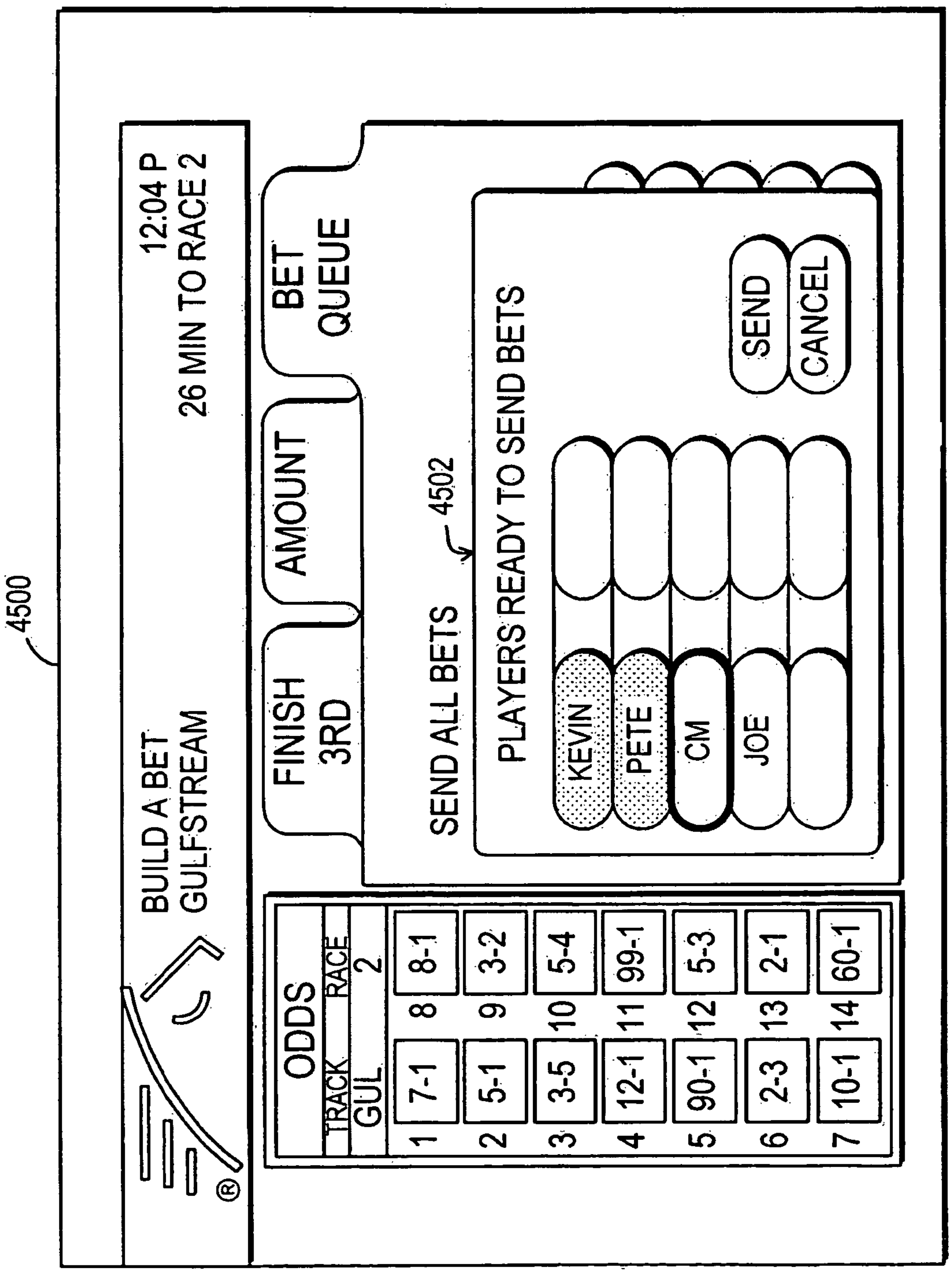
Figure 46:
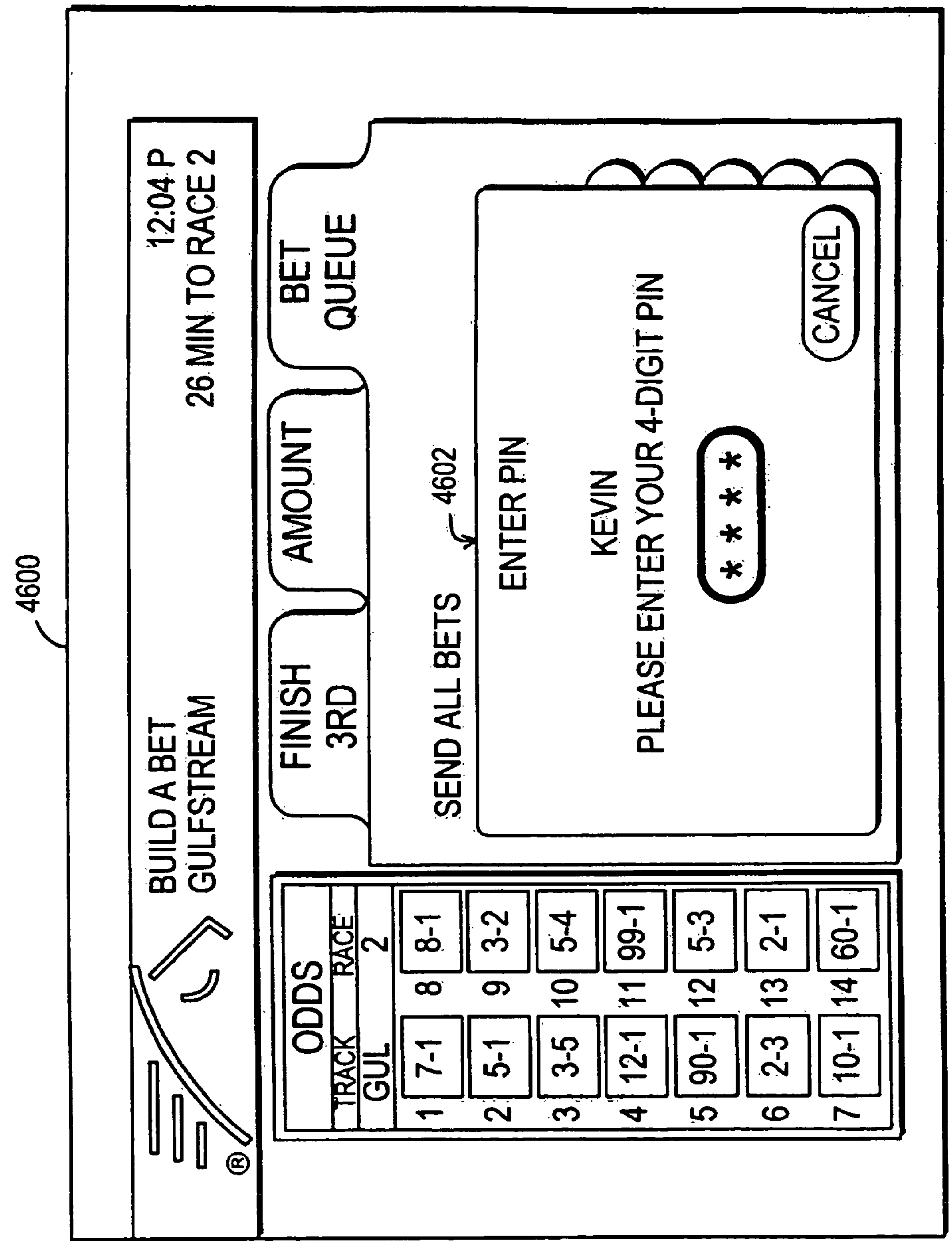
Figure 47:
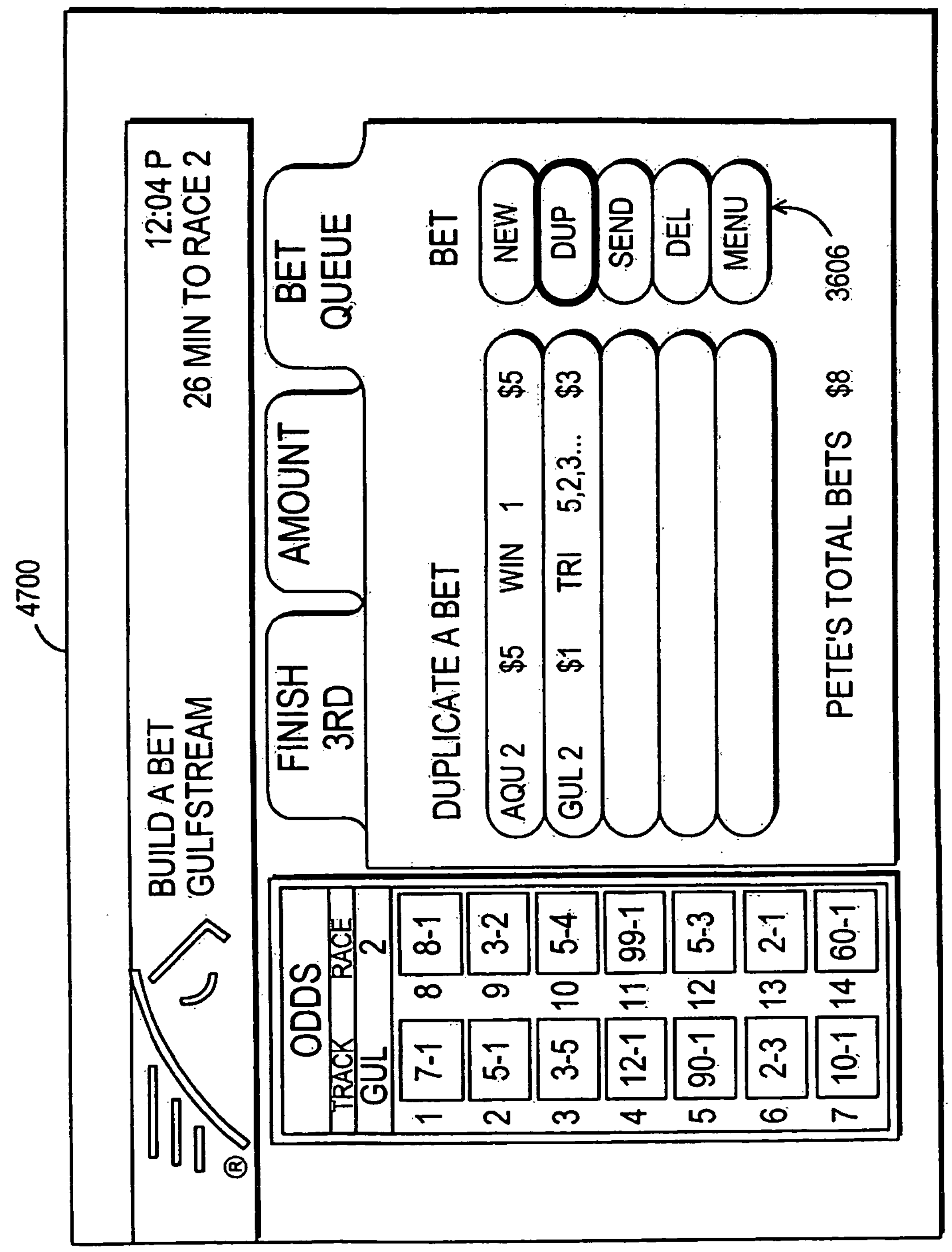
Figure 48:
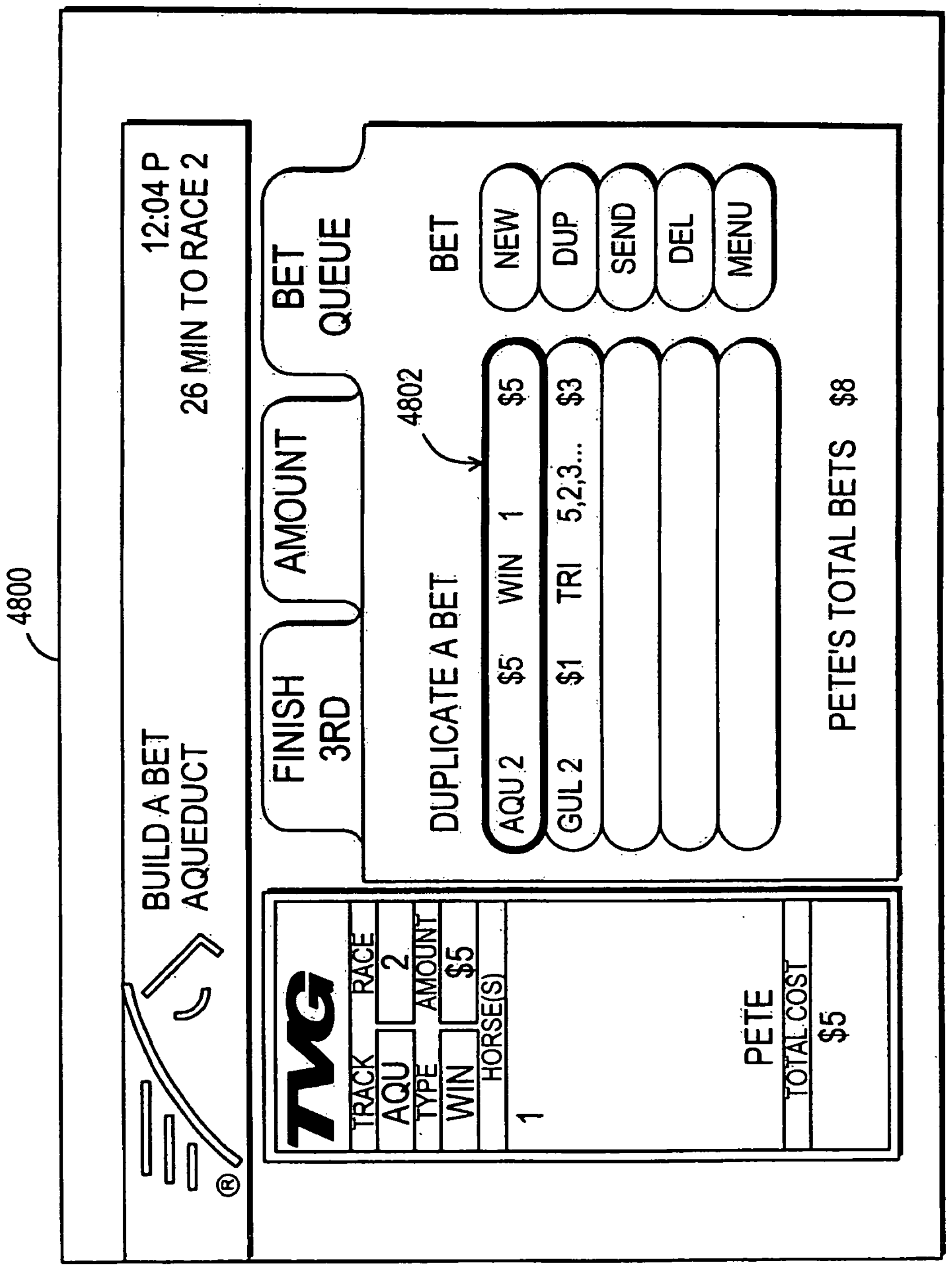
Figure 49:
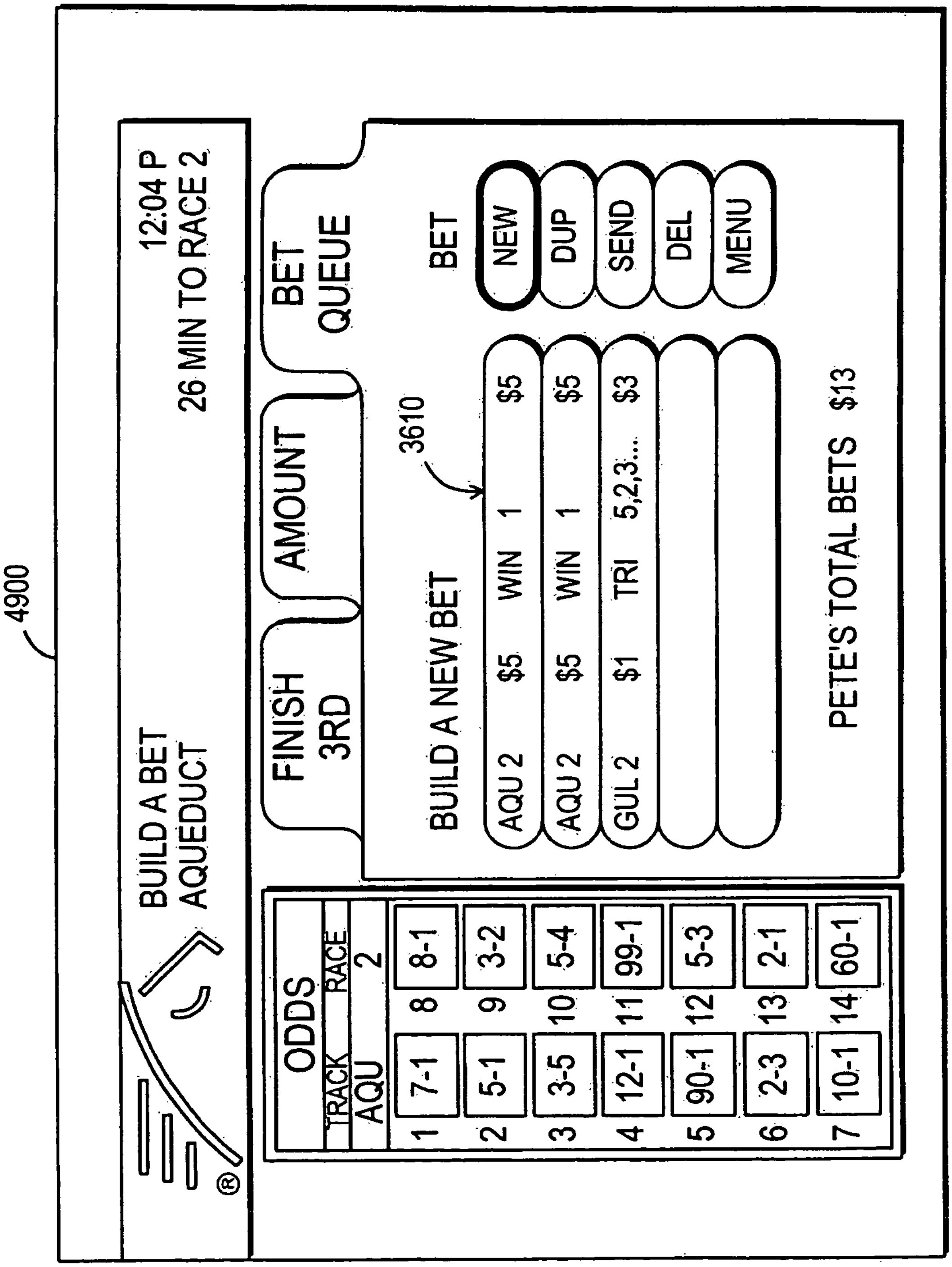

Turning back to screen 3500 of FIG. 35, once the user has selected an amount for the wager, the user interface will display screen 4200 as illustrated in FIG. 42 if multiple players are active. As shown in screen 4200, the user is then prompted for a player name associated with the most-recent wager using player selection window 4202. After a player name has been selected from screen 4200, the user interface then prompts the user for a pin for that player's account using pin-entry window 4302 as shown in screen 4300 of FIG. 43. Next, all of the bets for that player are displayed in bet queue 3610 of tab 3602 as shown in screen 4400 of FIG. 44. If the user selects "Send" action selection 3606, the user interface then prompts the user to indicate which player accounts have bets that are ready to be sent using a player selection window 4502 as shown in screen 4500 of FIG. 45. For each player selected using window 4502, the user interface also prompts the user for that player's pin using pin-entry window 4602 as shown in screen 4600 of FIG. 46. After all of the players have been selected and the corresponding pins entered, as shown in FIG. 26, the user interface then sends the bets as described in connection with FIGS. 38-41 above.

Whenever bets are in bet queue 3610 (or in bet queue 1508 of FIG. 15), in addition to having the option of sending those bets, the user also has the option of duplicating or deleting those bets. The user may duplicate a bet by selecting the "Dup" action selection 3606 as shown in screen 4700 of FIG. 47. Next the user is required to select the bet that he or she desires to duplicate as illustrated in screen 4800 of FIG. 48. This may be done by highlighting the desired bet using highlight 4802 and pressing a select button on a remote control. Finally, as shown in screen 4900 of FIG. 49, the selected bet will then be shown as duplicated in bet queue 3610.

Figure 50:
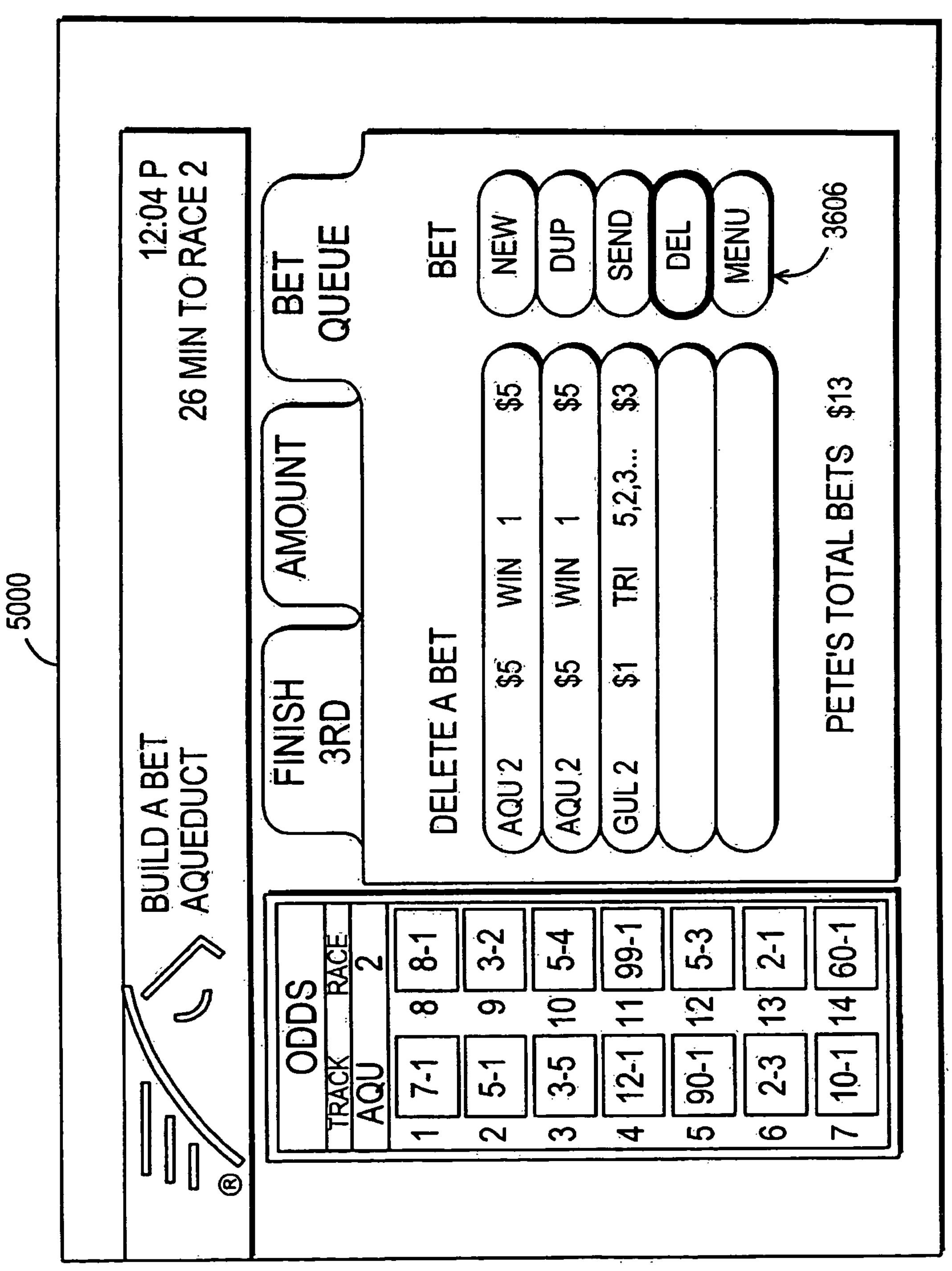
Figure 51:
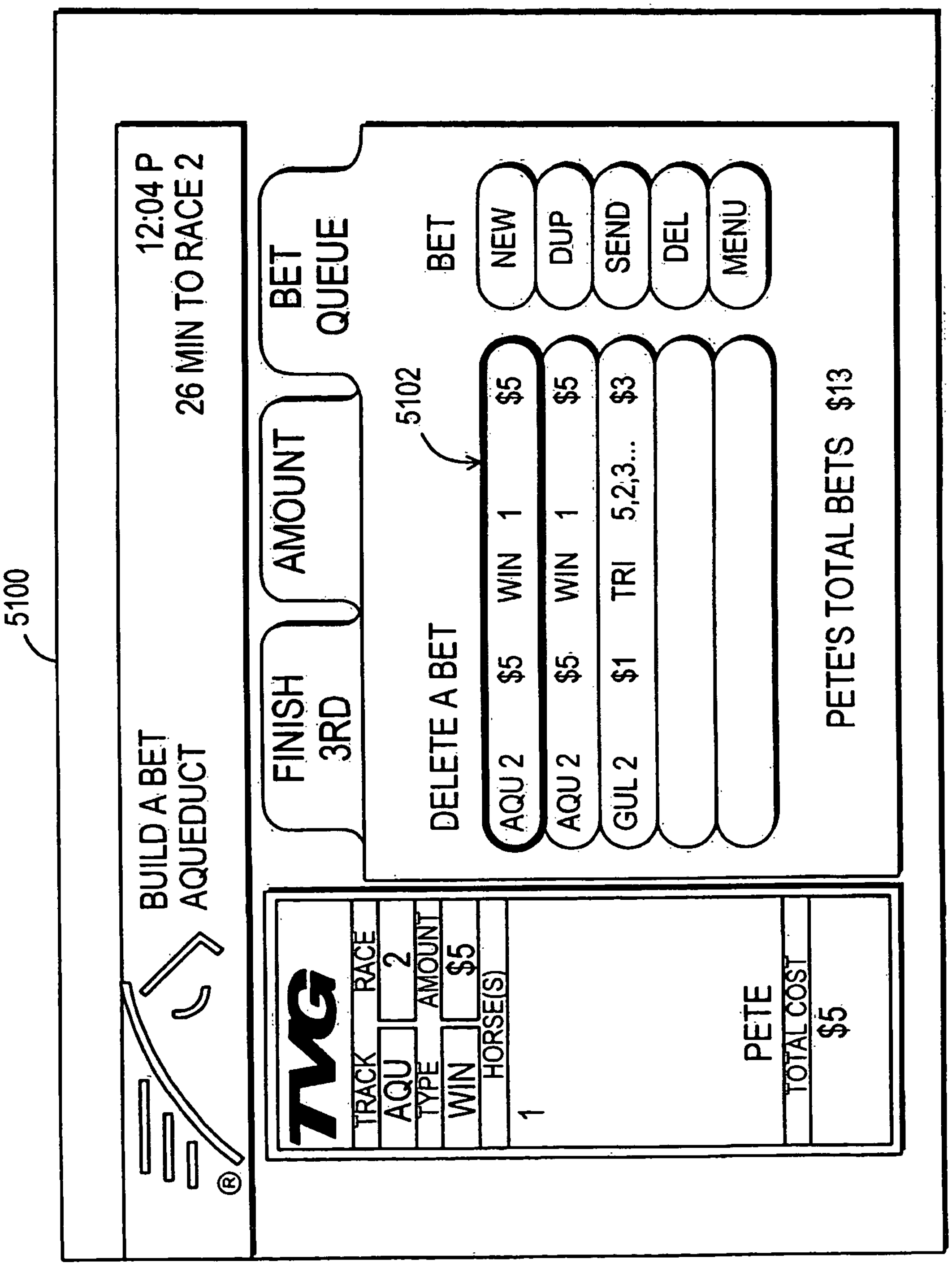
Figure 52:
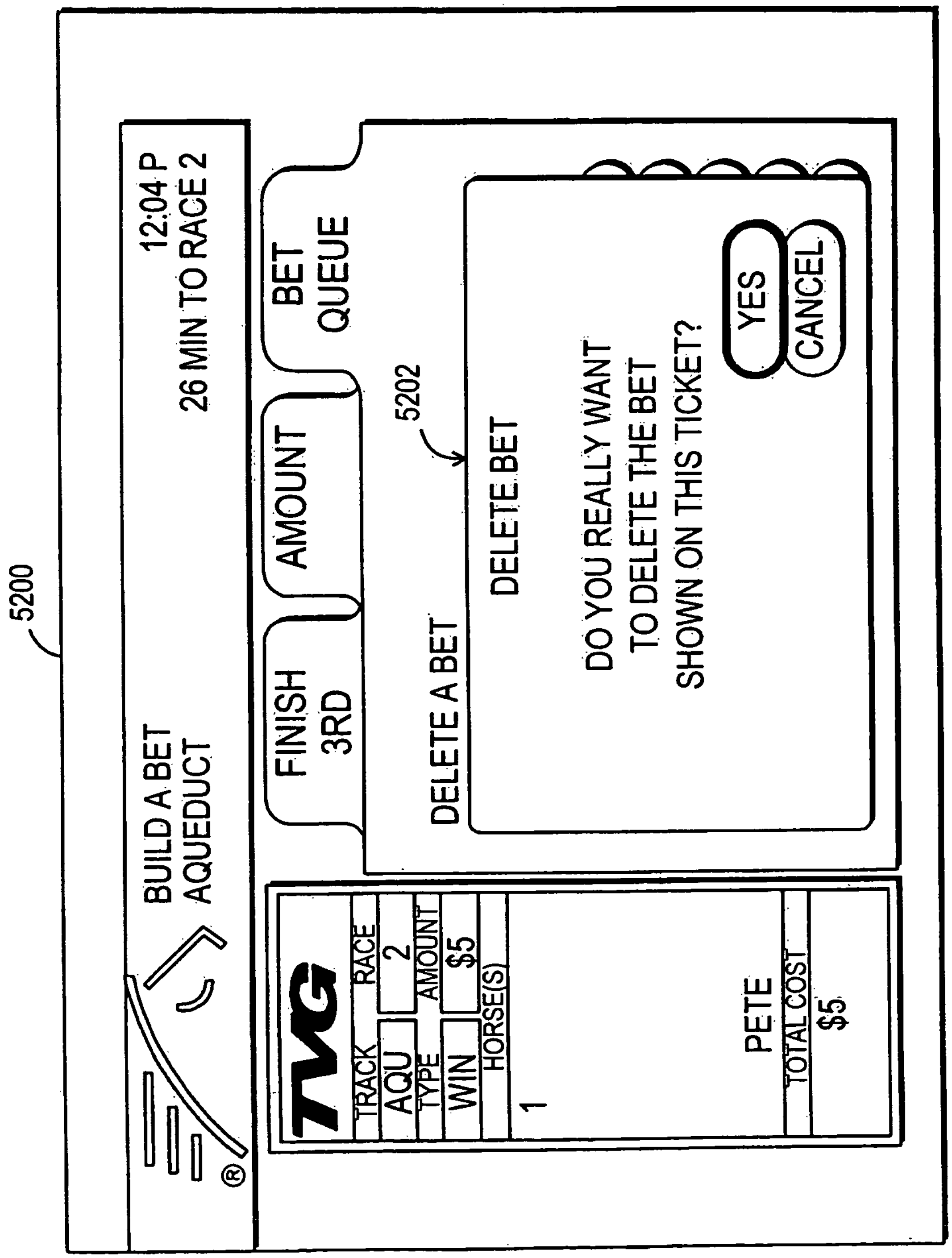
Figure 53:
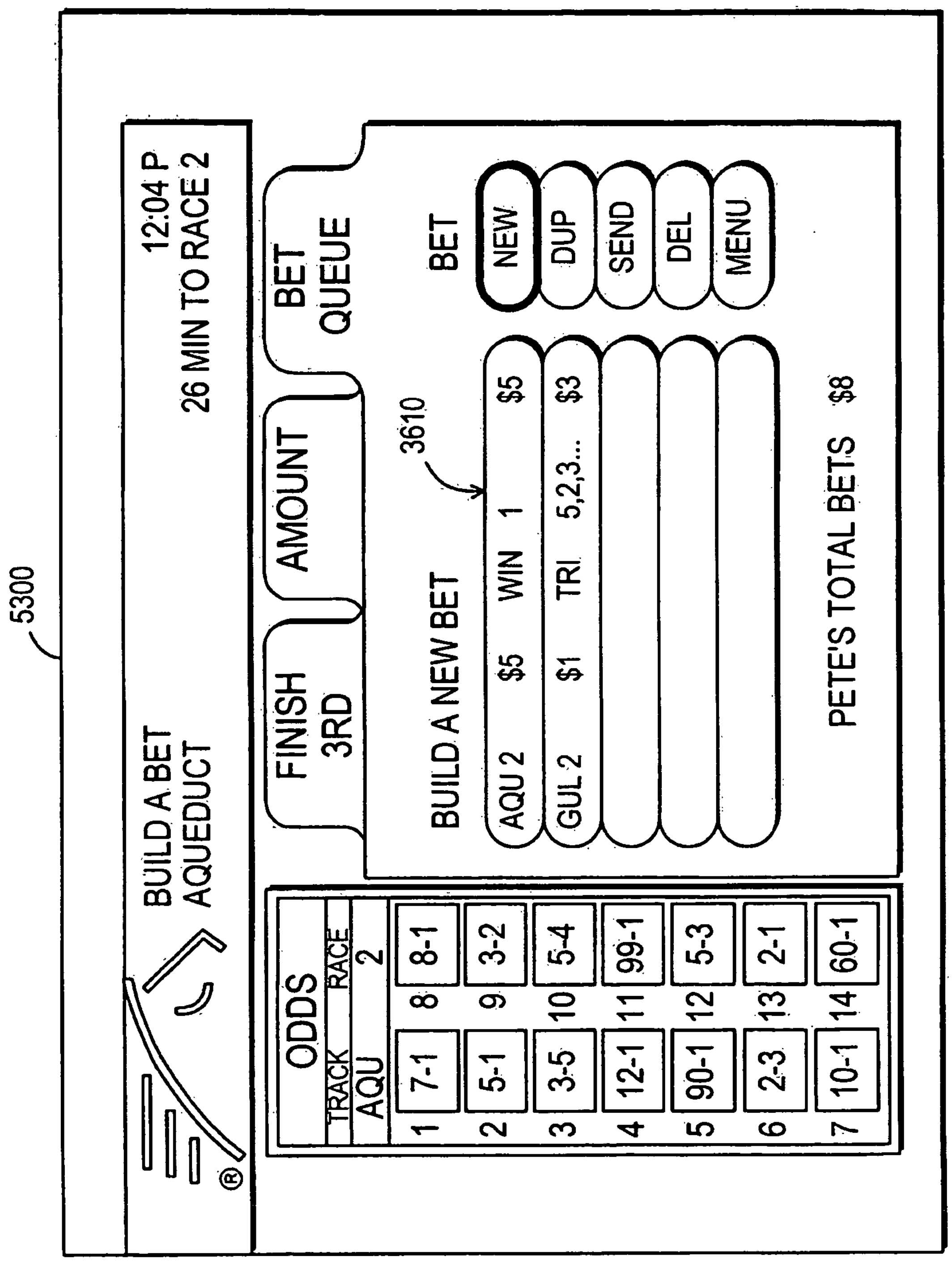

If the user selects the "Del" action selection 3606 from screen 5000 of FIG. 50, the user interface will allow the user to delete a bet already placed. The user interface will next prompt the user to select a desired bet to be deleted. As shown in screen 5100 of FIG. 51, this may be done by positioning a highlight 5102 on a bet and pressing a select button on a remote control. Once a bet is selected, the user interface will then prompt the user to confirm that the selected bet is to be deleted by displaying a delete bet confirmation window 5202 as shown in screen 5200 of FIG. 52. Finally, after the user has confirmed that the bet is to be deleted, the bet will be removed from bet queue 3610 as shown in screen 5300 of FIG. 53.

Figure 54:
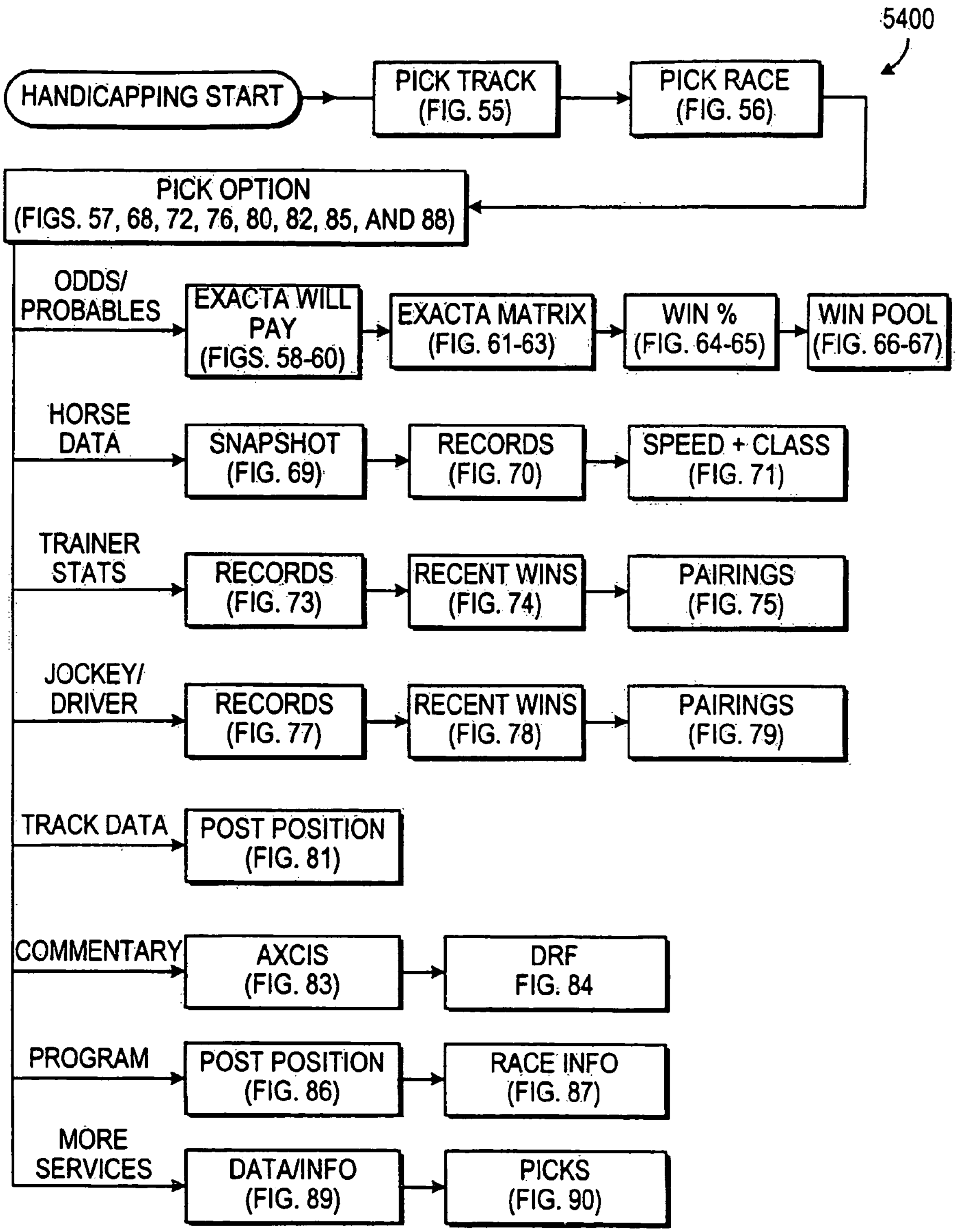
FIG. 54 is a flow diagram illustrating a handicapping mode that may be presented in a set-top box or computer user interface in accordance with one embodiment of the present invention.
Figure 55:
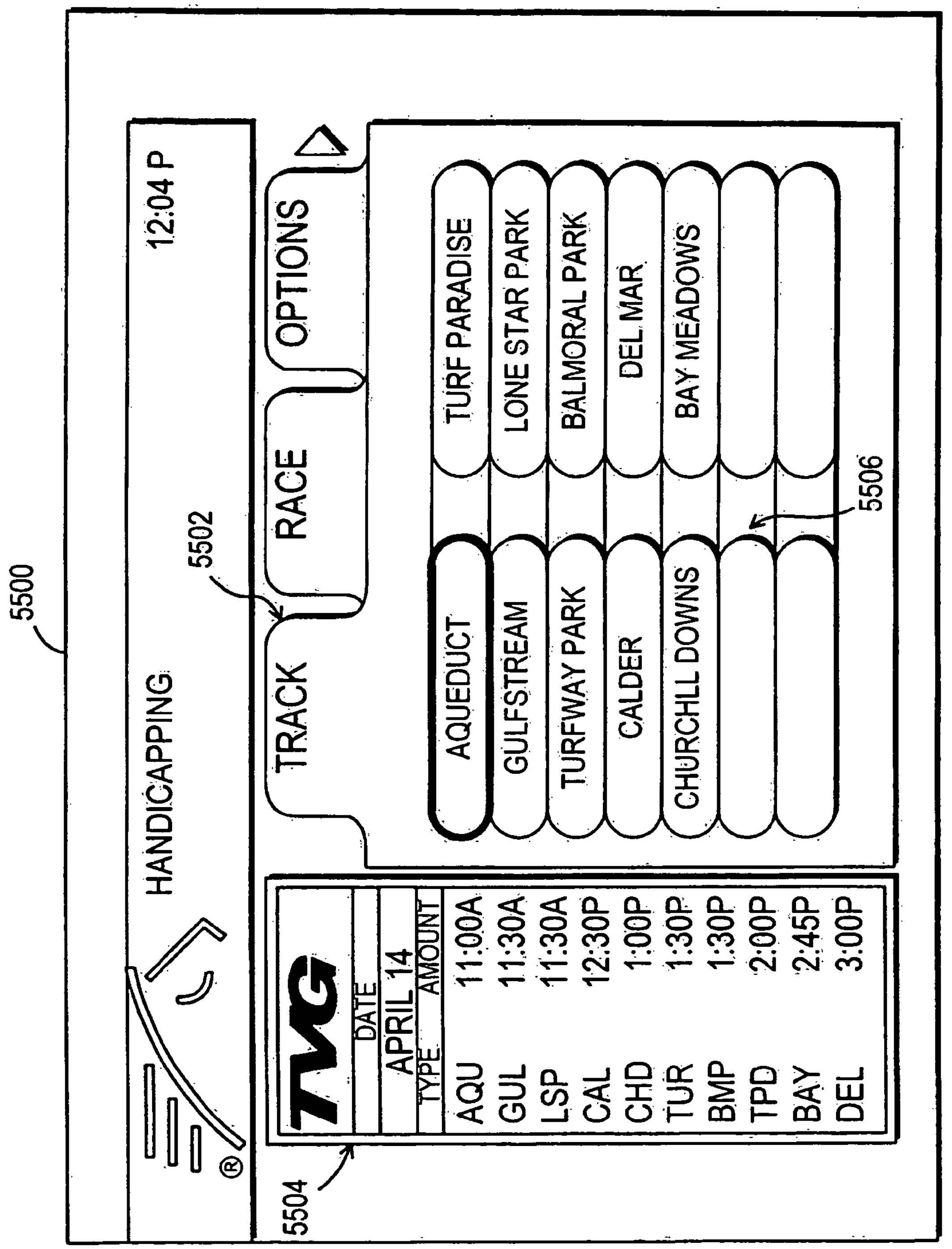
FIGS. 55-90 are illustrations of screen displays that may be presented as part of the handicapping mode in a set-top box or computer user interface in accordance with one embodiment of the present invention.

If the user selects "Handicapping" option 708 from main menu 702 as shown in screen 700 of FIG. 7, the user interface will present a series 5400 of screen displays 5500-9000 (FIGS. 55-90) as illustrated in FIG. 54. More particularly, after a user has selected option 708, the user interface will first display a track selection screen 5500 as illustrated in FIG. 55. As shown, screen 5500 includes a track selection tab 5502 and a first race time listing window 5504. Window 5504 preferably includes a date, a listing of the abbreviated names of tracks available for selection, and a listing of the time for a first race at each of those tracks. Tab 5502 includes a set of track options 5506 that may be selected by a user to indicate the track for which handicapping data is desired.

Figure 56:
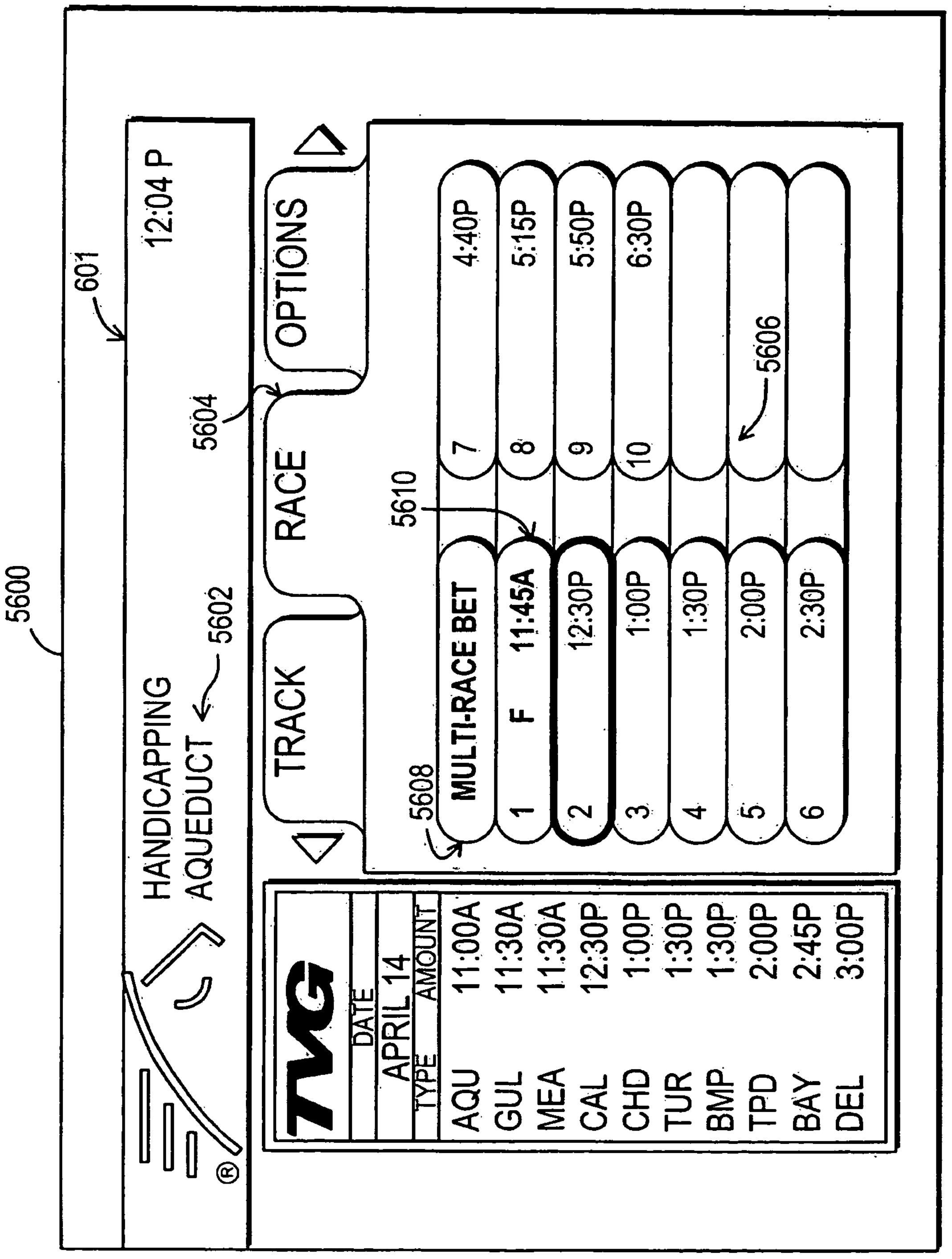

After the user has selected a track from screen 5500, screen 5600 is displayed, as shown in FIG. 56, to allow the user to select a race for which handicapping data is desired. As shown in FIG. 56, the track selected by the user is indicated in a field 5602 of status bar 601 of screen 5600. Also displayed in screen 5600 is a race tab 5604. Tab 5604 includes a set of race options 5606. As illustrated, some of these options 5608 and 5610 may be blacked out to indicate that the race is not available for selection. In this example, option 5610 is not available because race "1" has already been finished (as indicated by the "F" in option 5610) and option 5608 is not available because it is a multi-race bet that includes race "1".

Figure 57:
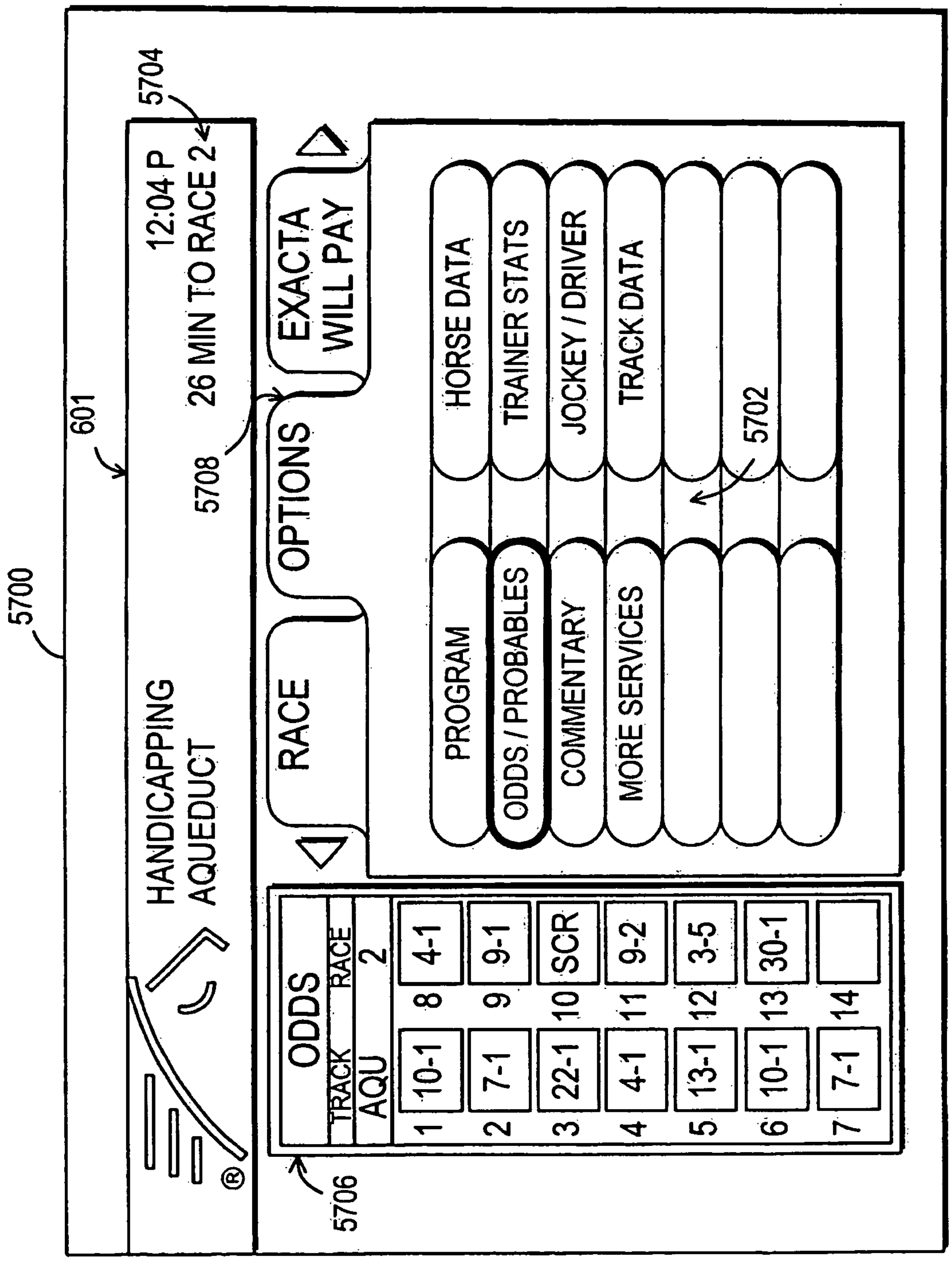

Once the user has selected a race option 5606, screen 5700 is displayed to allow the user to select one of handicapping mode options 5702 from "Options" tab 5708 as shown in FIG. 57. Preferably also included in screen 5700 are an indication 5704 of the time remaining until the selected race in status bar 601 and an odds display window 5706 that displays the odds for each horse to win in the selected race.

Figure 58:
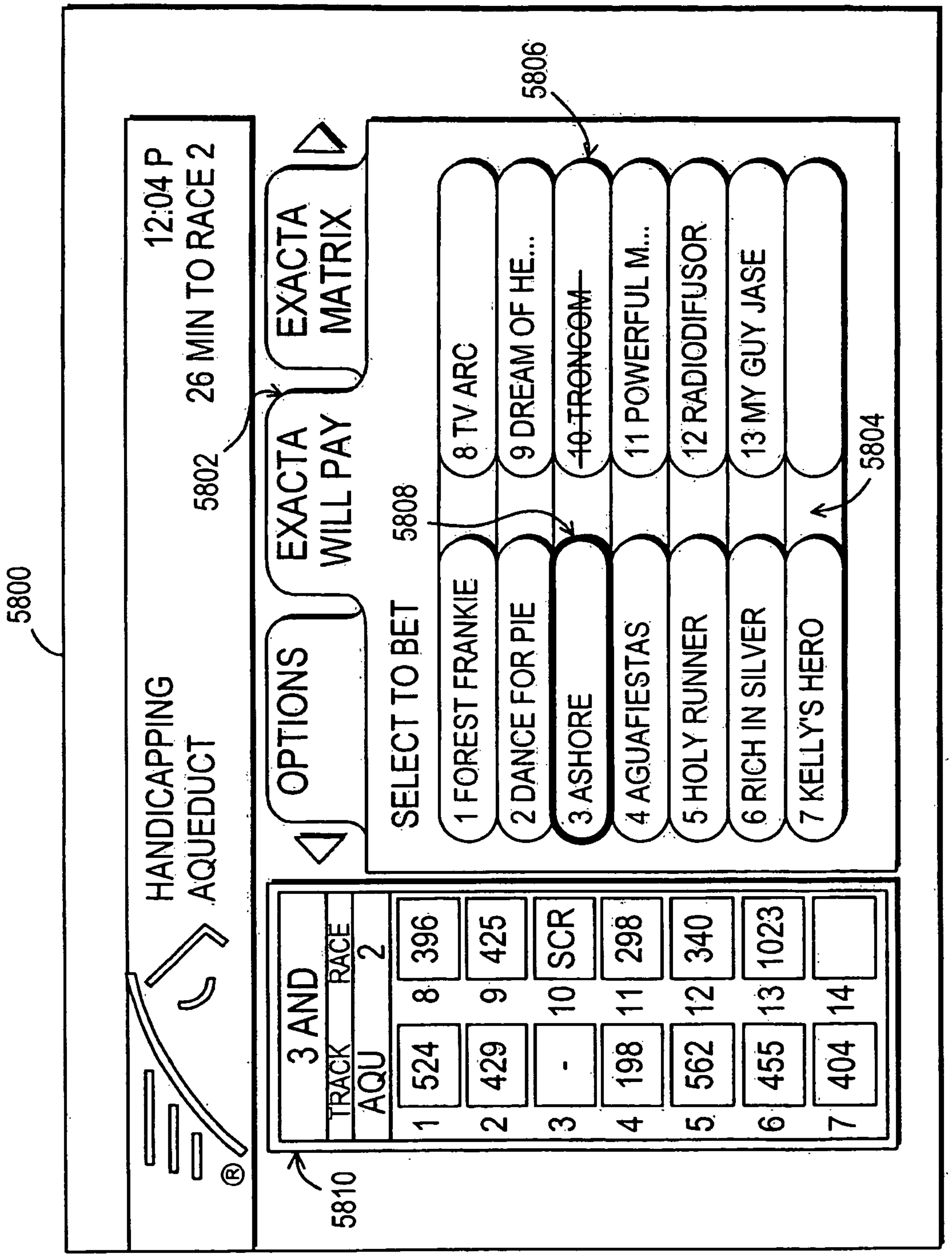

If the user selects the "Odds/Probabilities" option 5702 from tab 5708, "Exacta Will Pay" tab 5802 in screen 5800 is next displayed to allow the user to see the payout on a $2 bet for an exacta bet including a selected horse and each other horse. To see these payouts, the user must highlight one horse from horse selection options 5804 that are displayed in tab 5802. As shown in FIG. 58, one or more horses 5806 may be scratched from the available options. Once the user has highlighted a horse 5808, payout window 5810 is displayed with an indication of the highlighted horse ("3 and"), the selected track ("AQU"), the selected race ("2"), and the payout for each other horse. In payout window 5810, the payout for horse "3" is indicated as "-" because a user cannot make an exacta wager on horses "3 and 3", and the payout for horse "10" is indicated as "scr" because horse "10" has been scratched.

Figure 59:
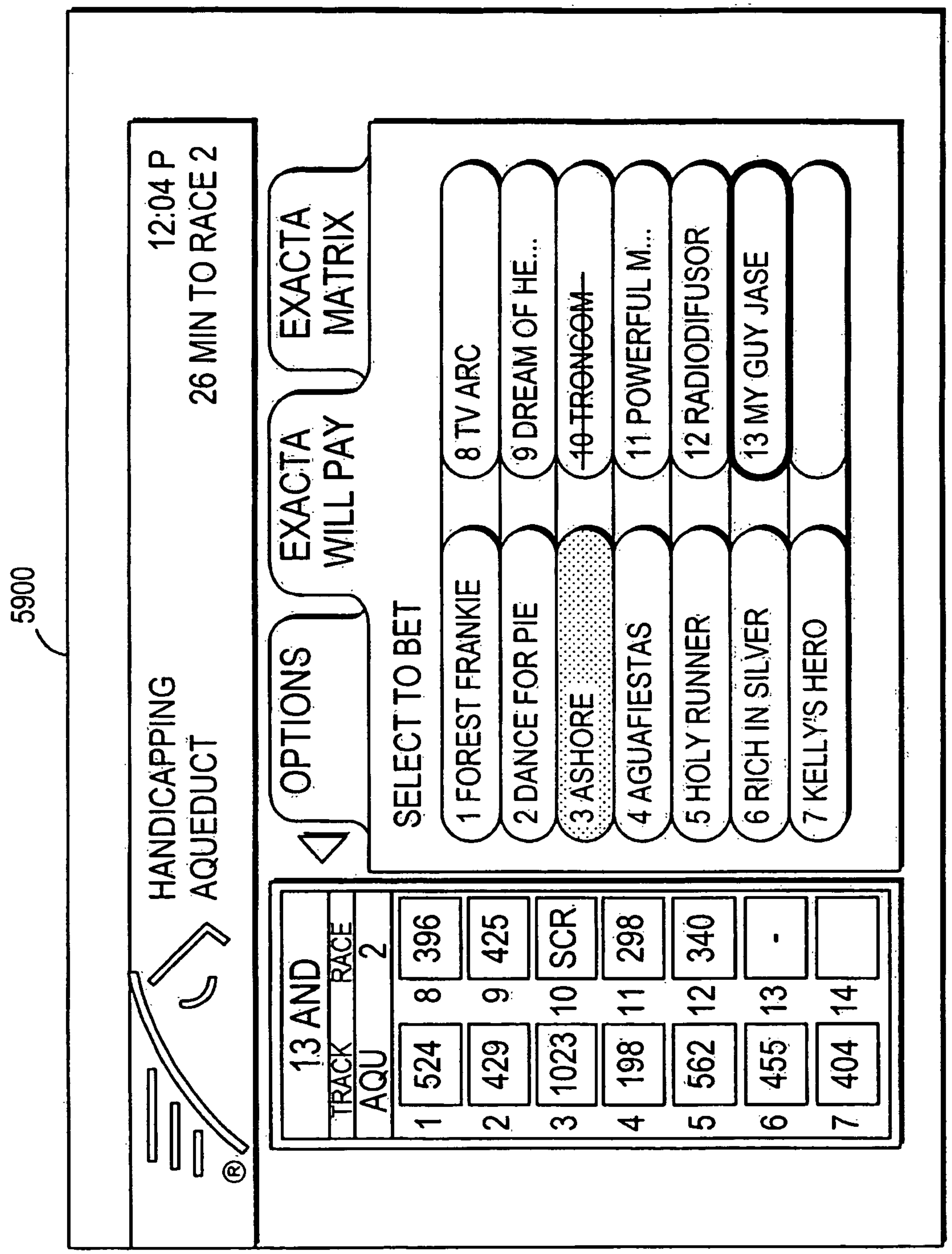
Figure 60:
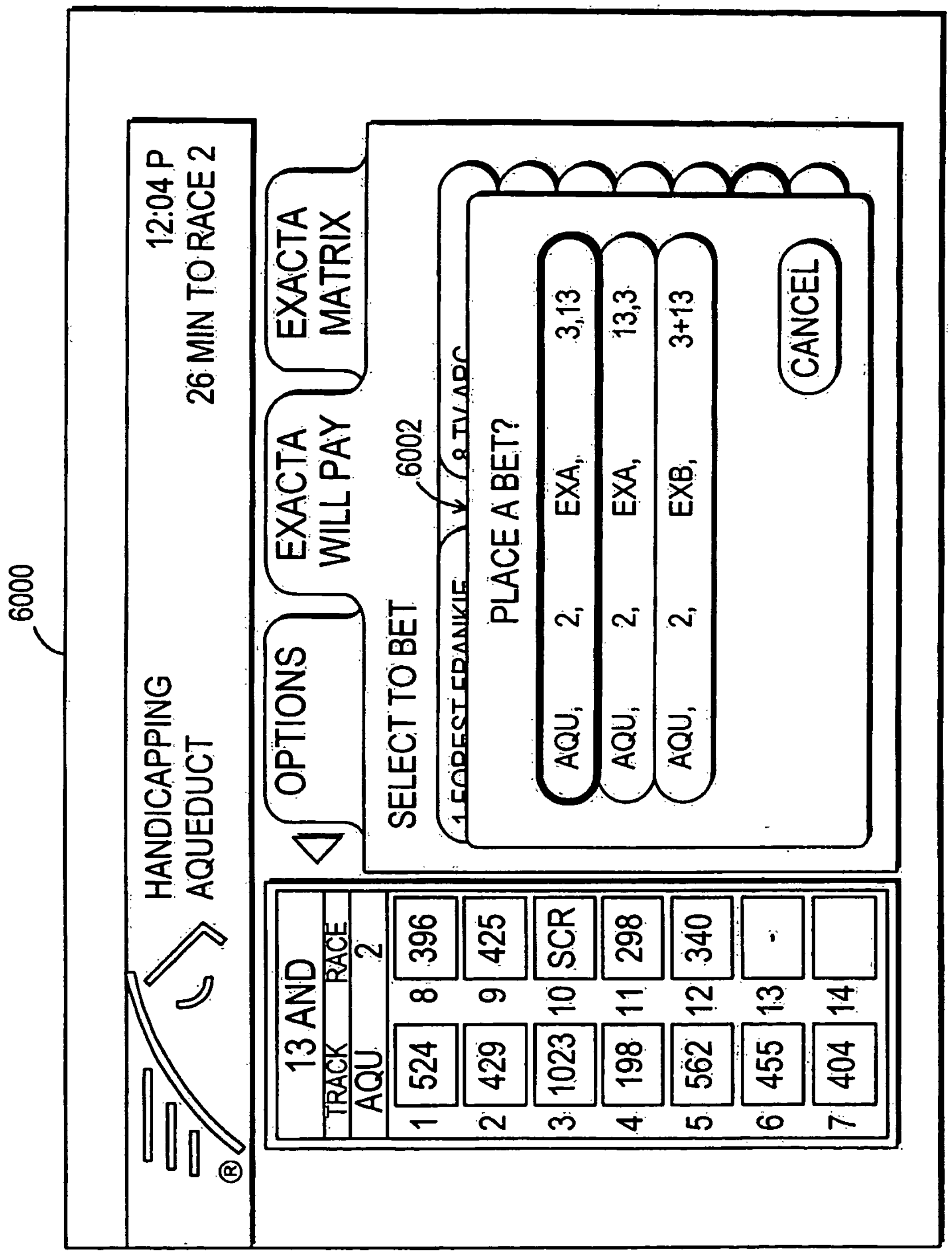

If a particular payout in window 5810 is appealing to the user, the user may then select the desired combination as shown in screen 5900 of FIG. 59. As shown, the user has selected horse "13" and highlighted horse "3". Next, as shown in screen 6000 of FIG. 60, the user interface will prompt the user to see if the user desires to place a wager on the selected pair using a bet window 6002. Window 6002 may include a list of different bet types available to the user based on the user's horse selections. For example, as illustrated, the user can select an exacta bet for horse "3" then "13" or horse "13" then "3", or the user can select an exacta box bet for horses "3" and "13". From within window 6002, the user may select to place one or more of the displayed bets.

Figure 61:
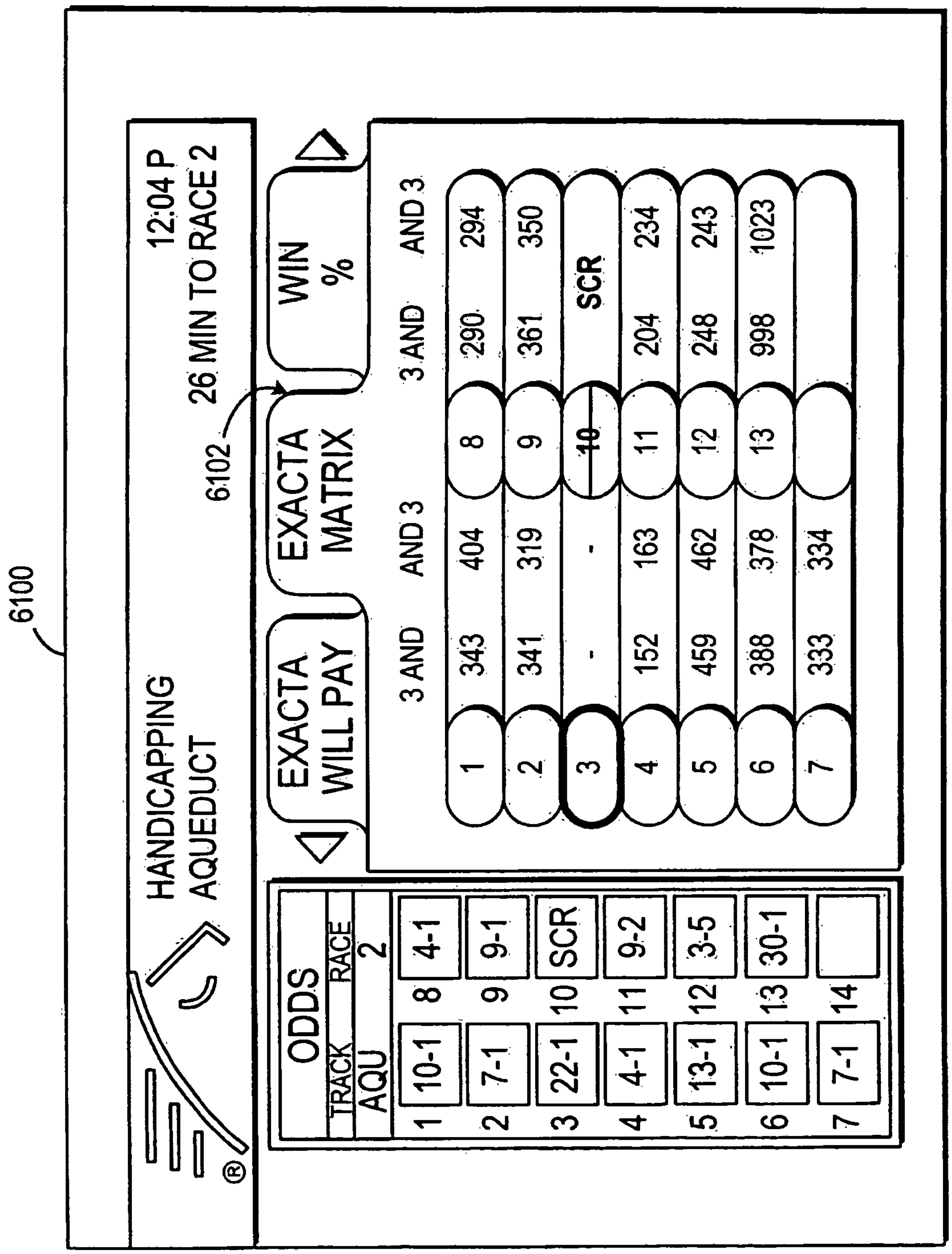

Additionally or alternatively to using the "Exacta Will Pay" tab 5802 when the user selects the "Odds/Probabilities" option 5702, the user may also operate the "exacta matrix" tab 6102, as shown in screen 6100 of FIG. 61, to see the payout on a $2 exacta bet including a highlighted horse and each other horse. As the user highlights each horse (as illustrated, horse "3"), tab 6102 is updated to show the exacta payout for the two combinations of the highlighted horse and each other horse.

Figure 62:
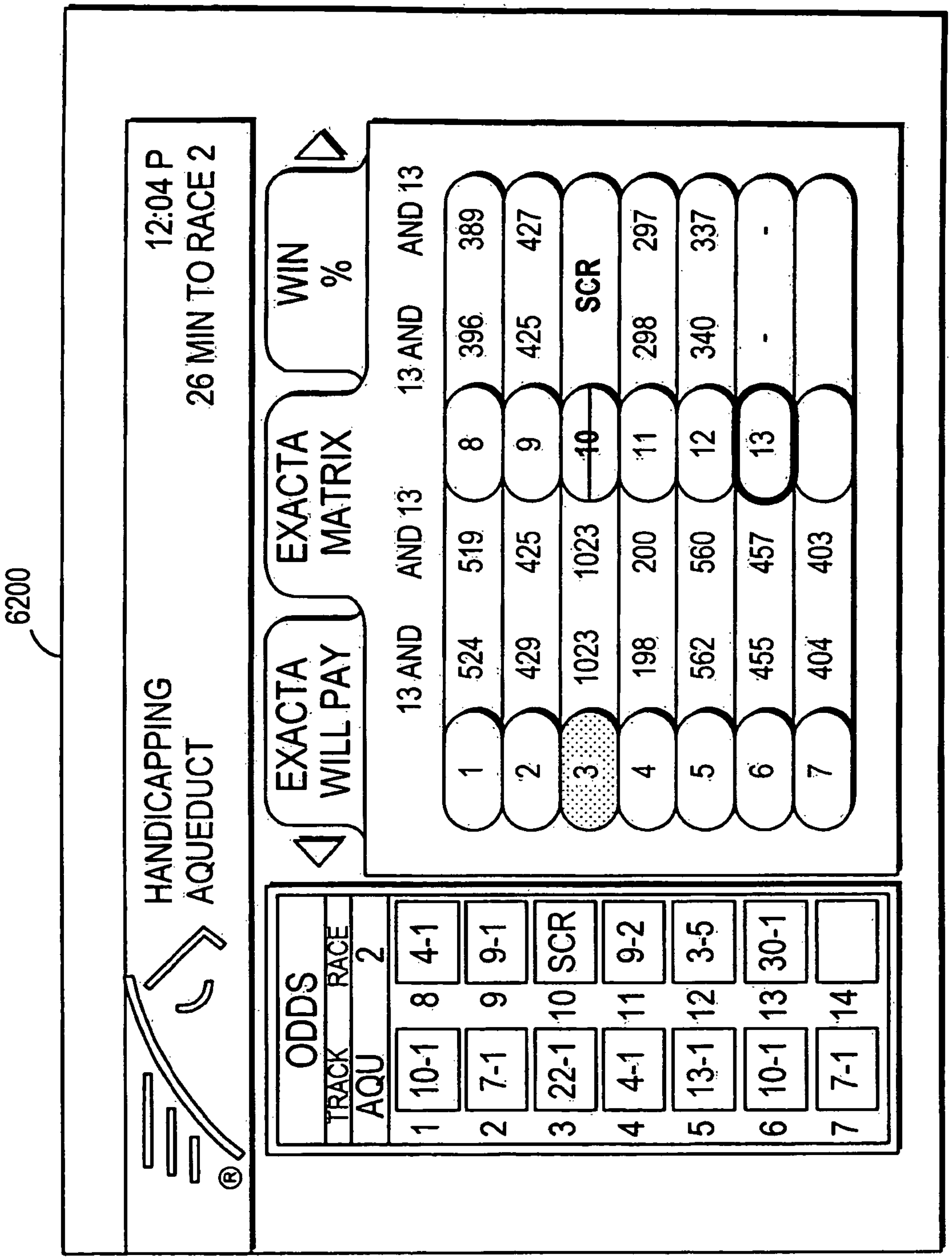
Figure 63:
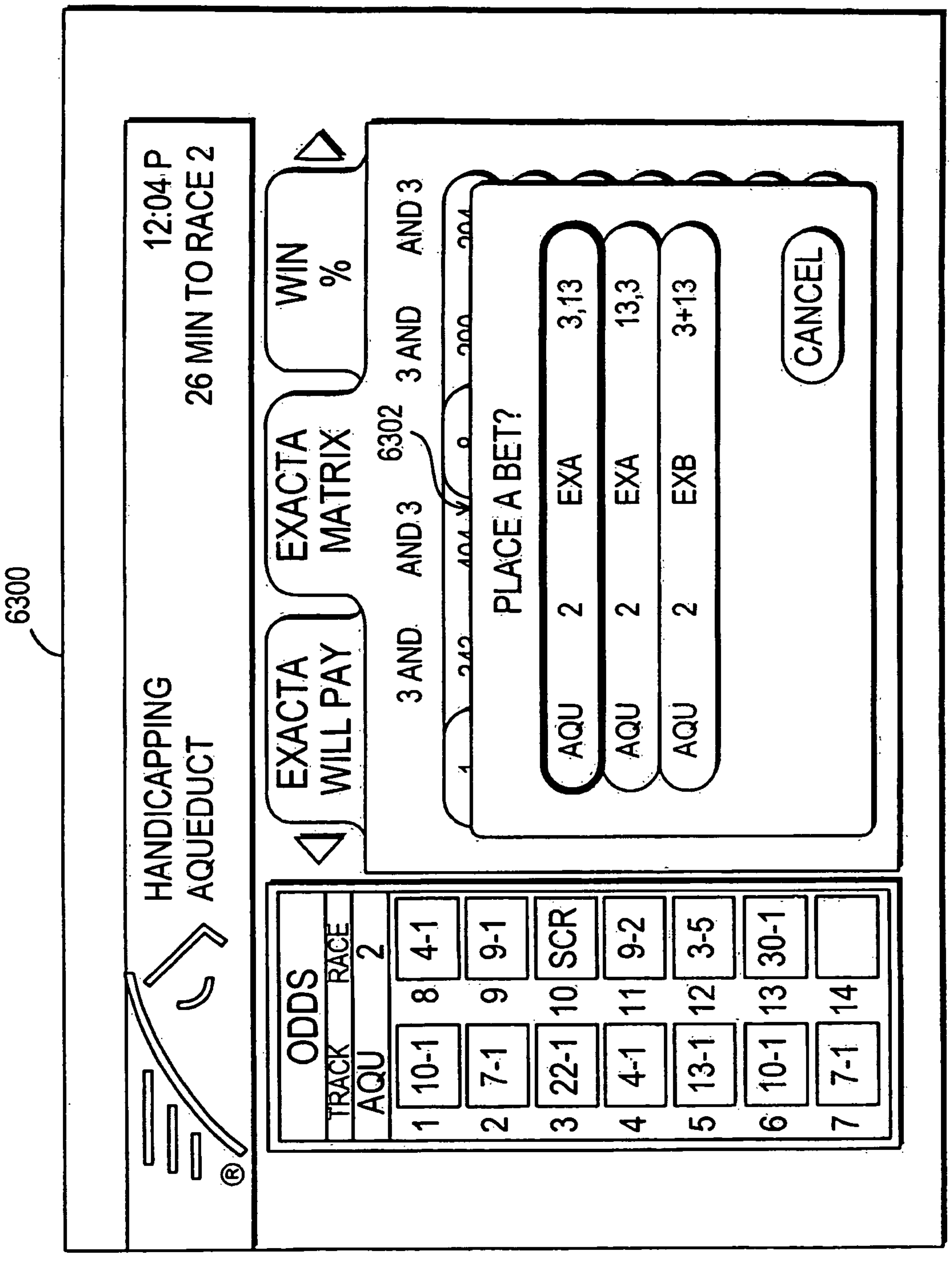

As with "Exacta Will Pay" tab 5802, once the user has selected a first horse, the user may then also select a second horse to construct a wager as shown in screen 6200 of FIG. 62. As illustrated, the user has selected horse "3" and is in the process of selecting horse "13". Next, the user interface will display a bet window 6302 as shown in screen 6300 of FIG. 63. Window 6302 operates substantially the same as window 6002 shown in FIG. 60.

Figure 64:
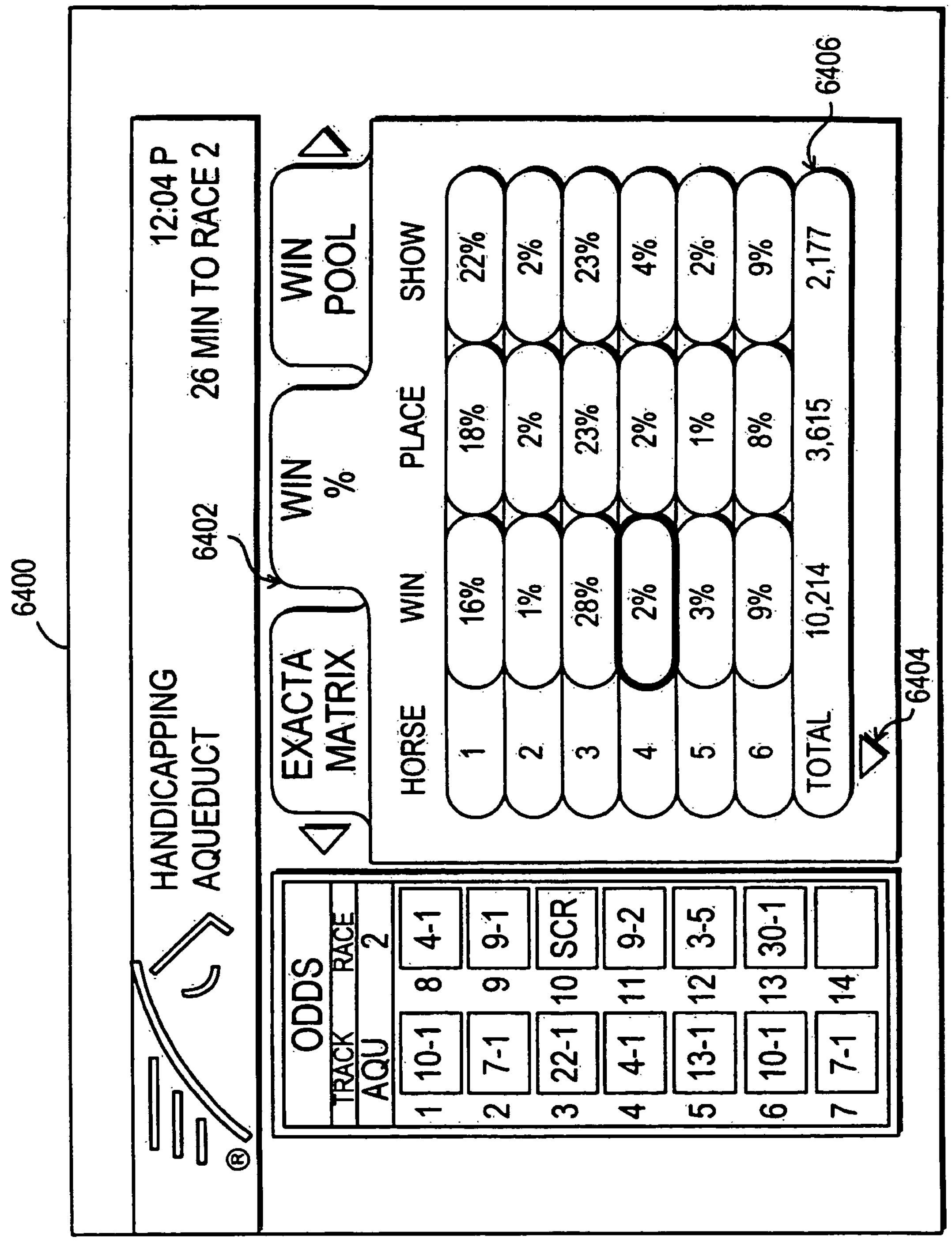
Figure 65:
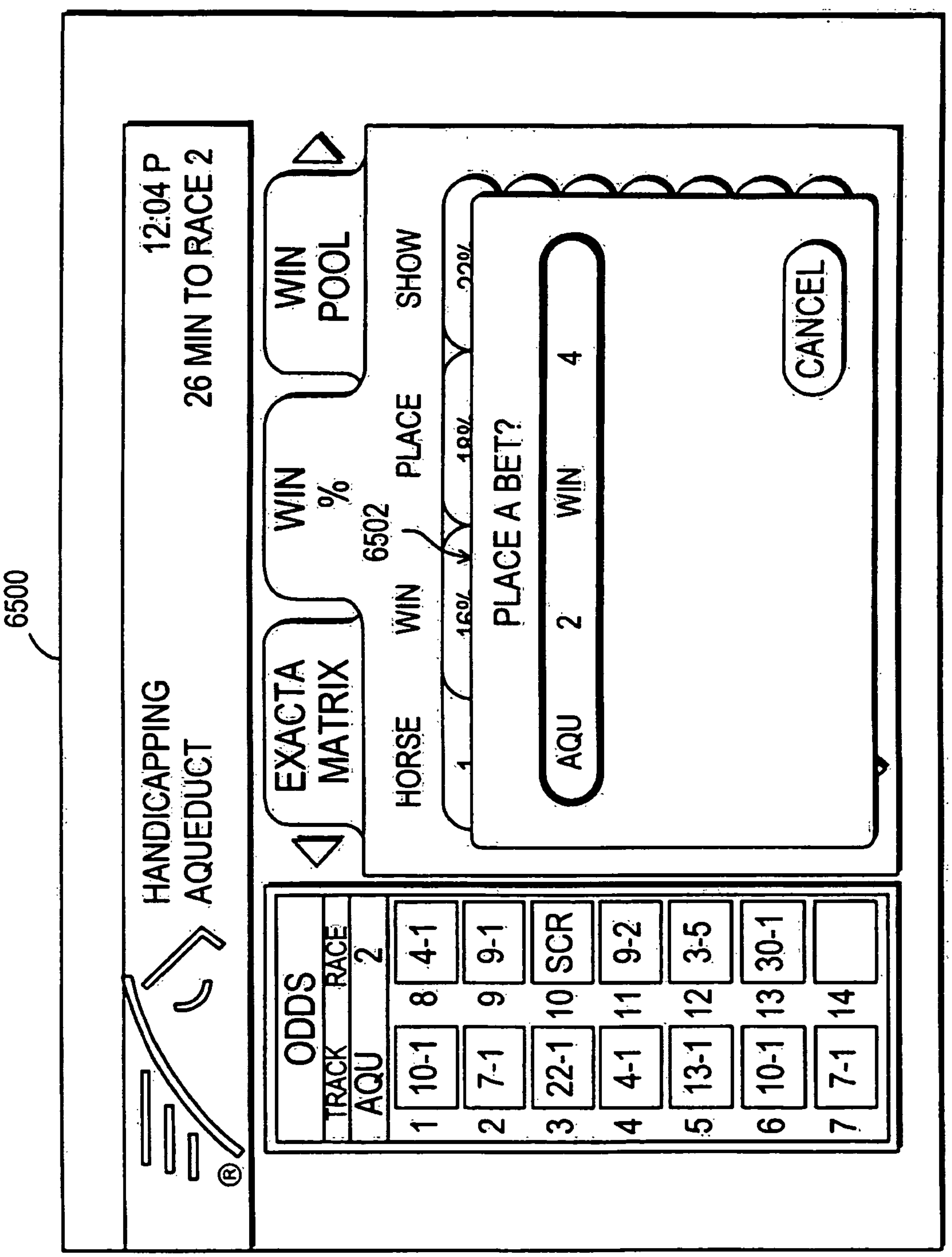

Also available to the user upon selecting "Odds/Probabilities" option 5702 is the "Win Percent" tab 6402 shown in screen 6400 of FIG. 64. As illustrated, tab 6402 includes an indication of the percentage of all bets placed so far that have been placed for each horse to win, place, and show. Although only six horses are shown, arrow 6404 indicates that other horses are available upon scrolling the listing downward. Total display 6406 indicates the total value of the wagers placed for any horse to win, place, or show. As with tabs 5802 (FIG. 58) and 6102 (FIG. 61), the user may then select a horse and then place a wager on that horse. For example, as illustrated in bet window 6502 of screen 6500 of FIG. 65, the user has selected horse "4" to win at "Aqueduct" in race "2".

Figure 66:
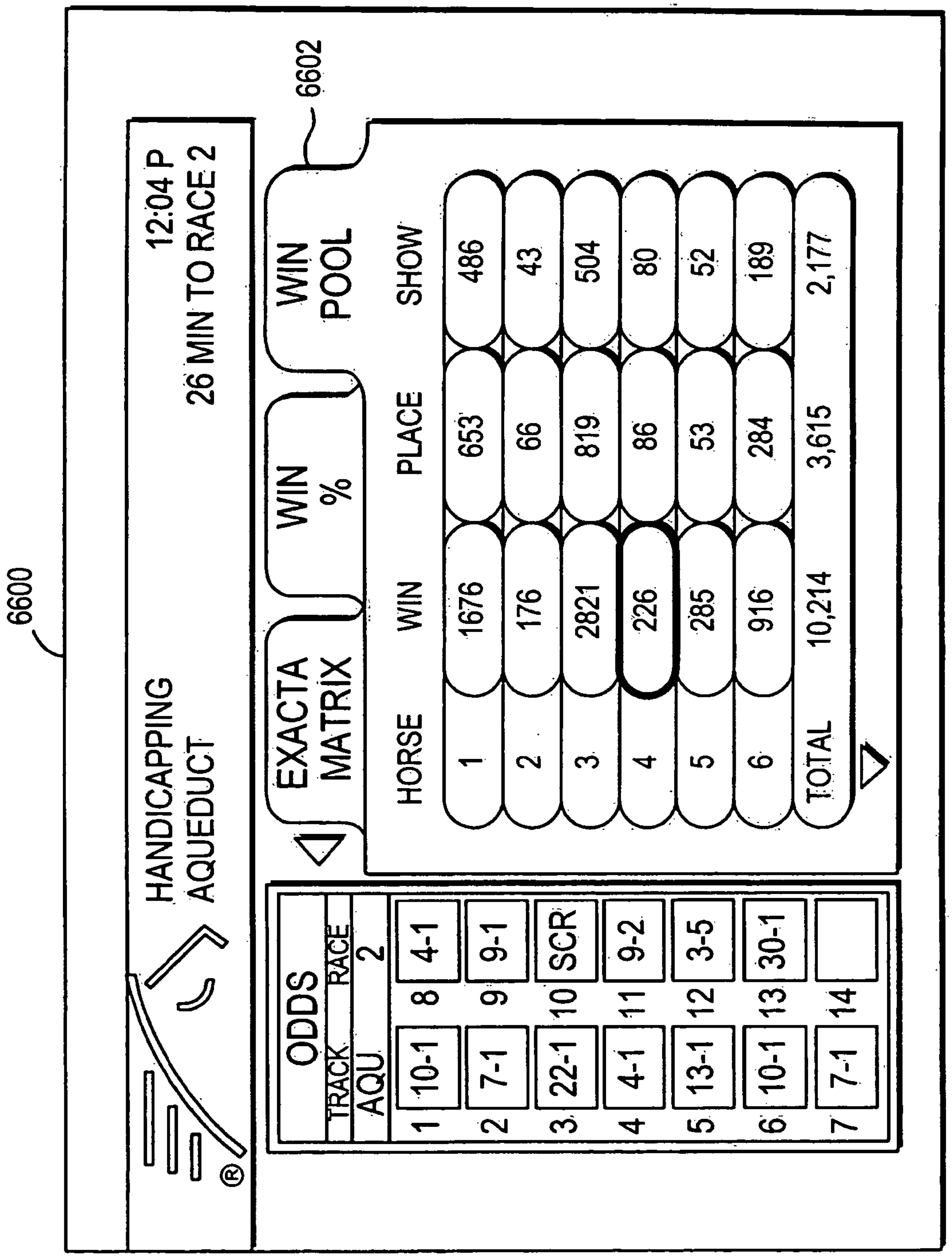
Figure 67:
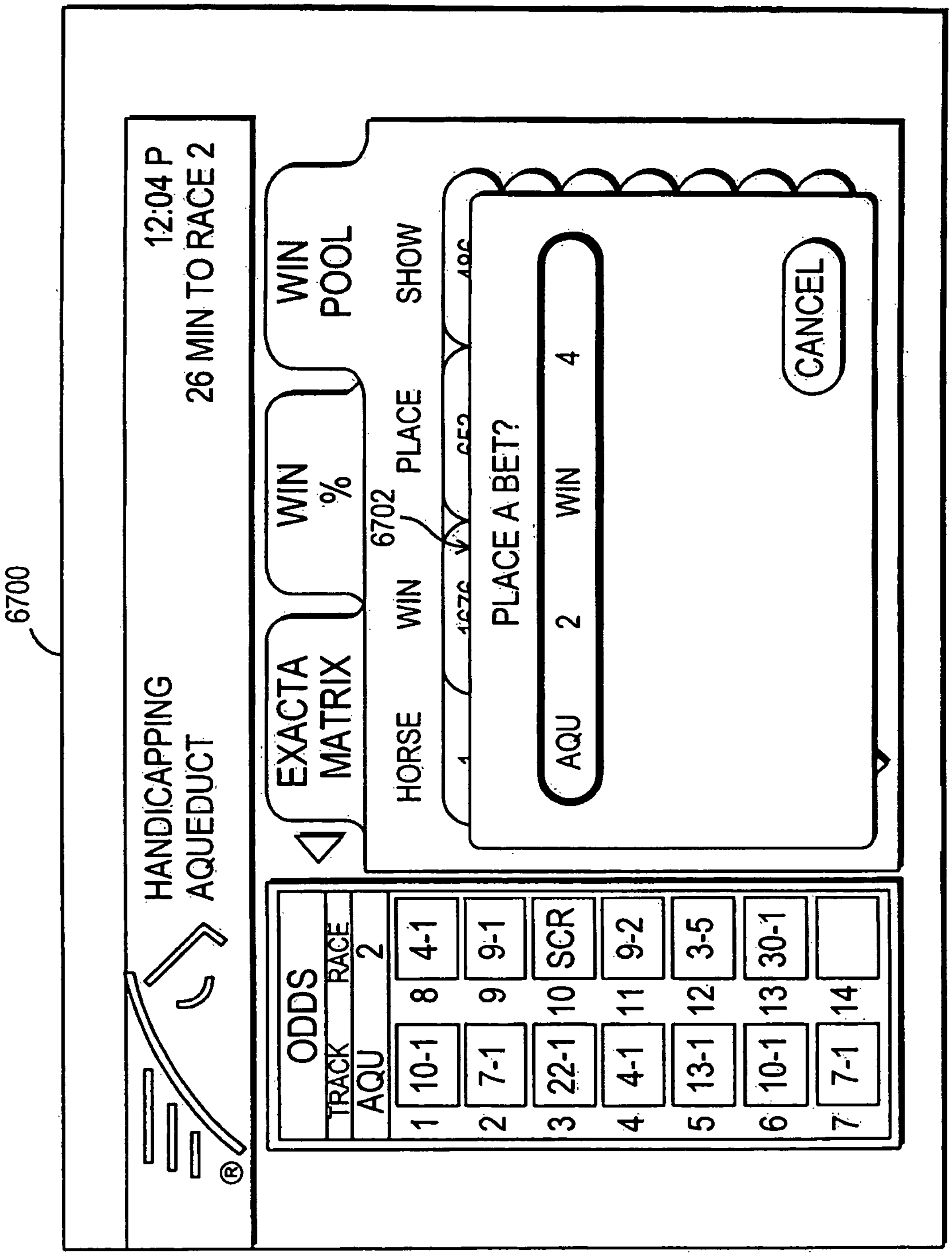

Upon selecting "Odds/Probabilities" option 5702, the user may also select the "Win Pool" tab 6602 as shown in screen 6600 of FIG. 66. As can be seen, tab 6602 displays the total value of the wagers placed for each horse to win, place, or show. As with the "Win Percent" tab 6402, the user may select a horse from tab 6602 and place a wager using bet window 6702 as illustrated in screen 6700 of FIG. 67.

Although "Exacta Will Pay" tab 5802 (FIG. 58), "Exacta Matrix" tab 6102 (FIG. 61), "Win Percent" tab 6402 (FIG. 64), and "Win Pool" tab 6602 (FIG. 66) as illustrated are configured for exacta and win bets, these features of the user interface of the present invention could be implemented using any other suitable betting type. For example, "Exacta Will Pay" tab 5802 and "Exacta Matrix" tab 6102 could alternately be implemented as a "Trifecta Will Pay" tab and a "Trifecta Matrix" tab. As another example, "Win Percent" tab 6402 and "Win Pool" tab 6602 could be implemented as a "Show Percent" tab and a "Show Pool" tab. In order to facilitate implementing these features with other bet types, the present invention may display a bet type selection tab, such as tab 2902 as shown in screen 2900 of FIG. 29, prior to displaying tabs 5802, 6102, 6402, and 6602.

Figure 68:
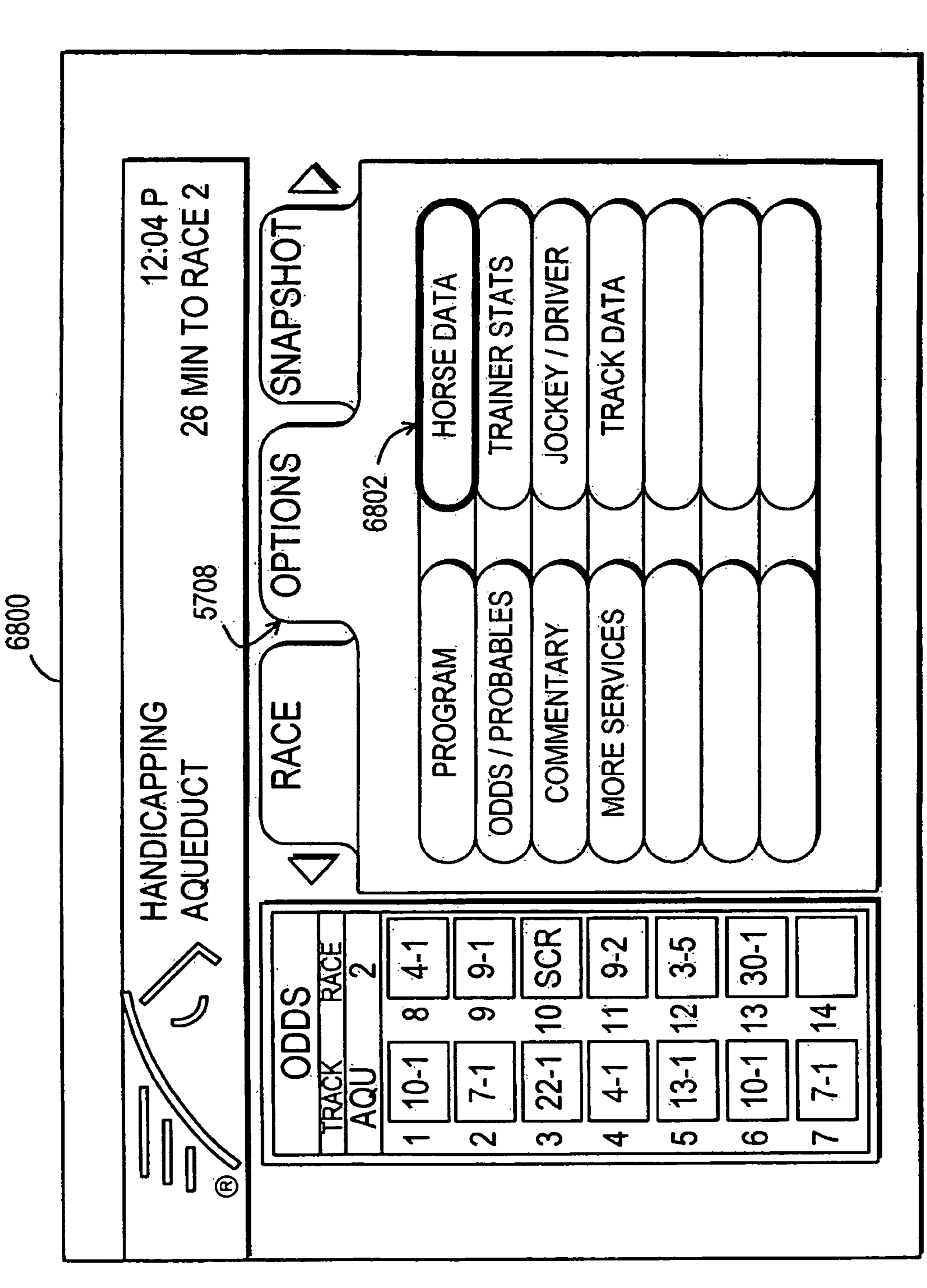
Figure 69:
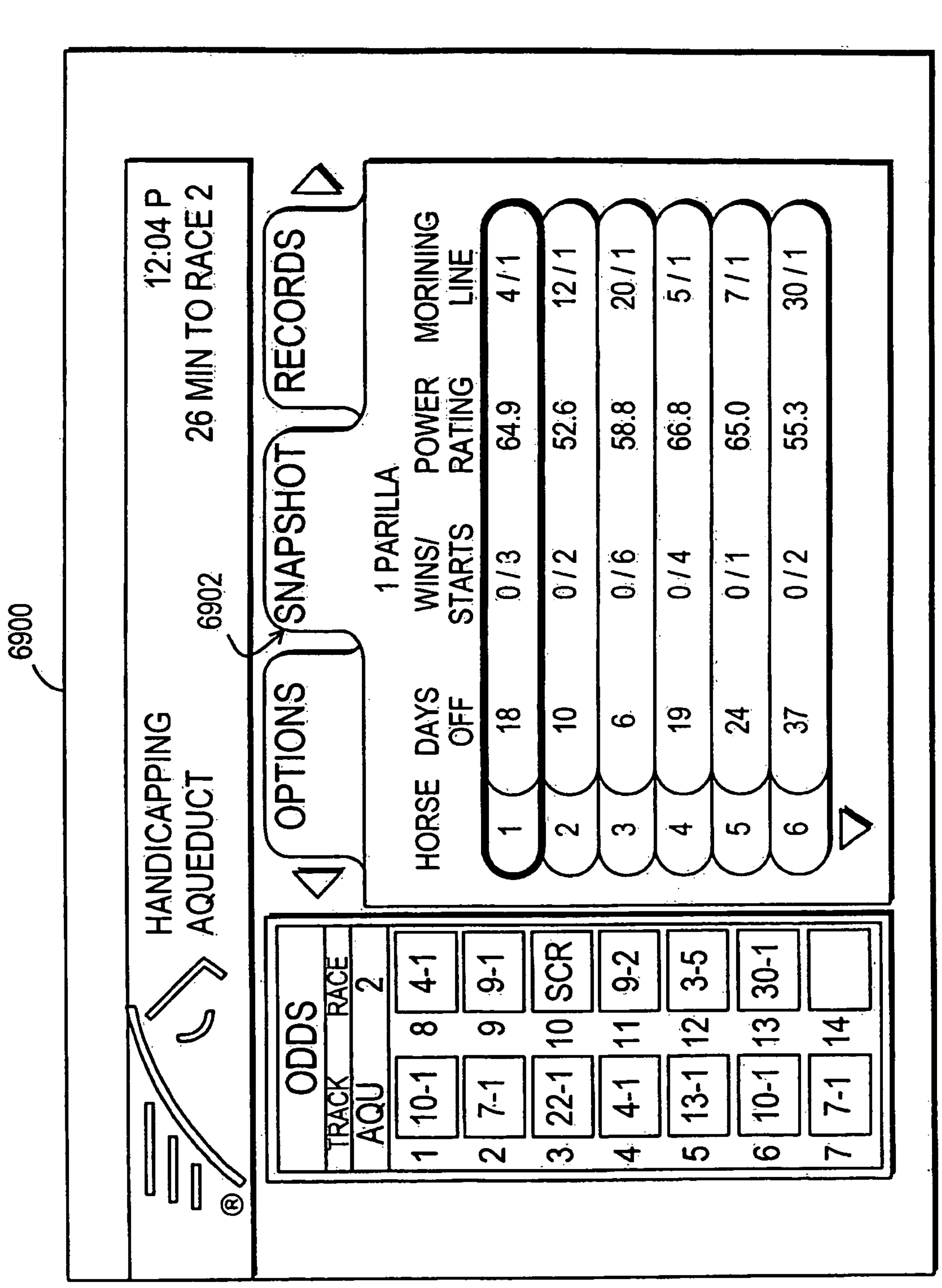
Figure 70:
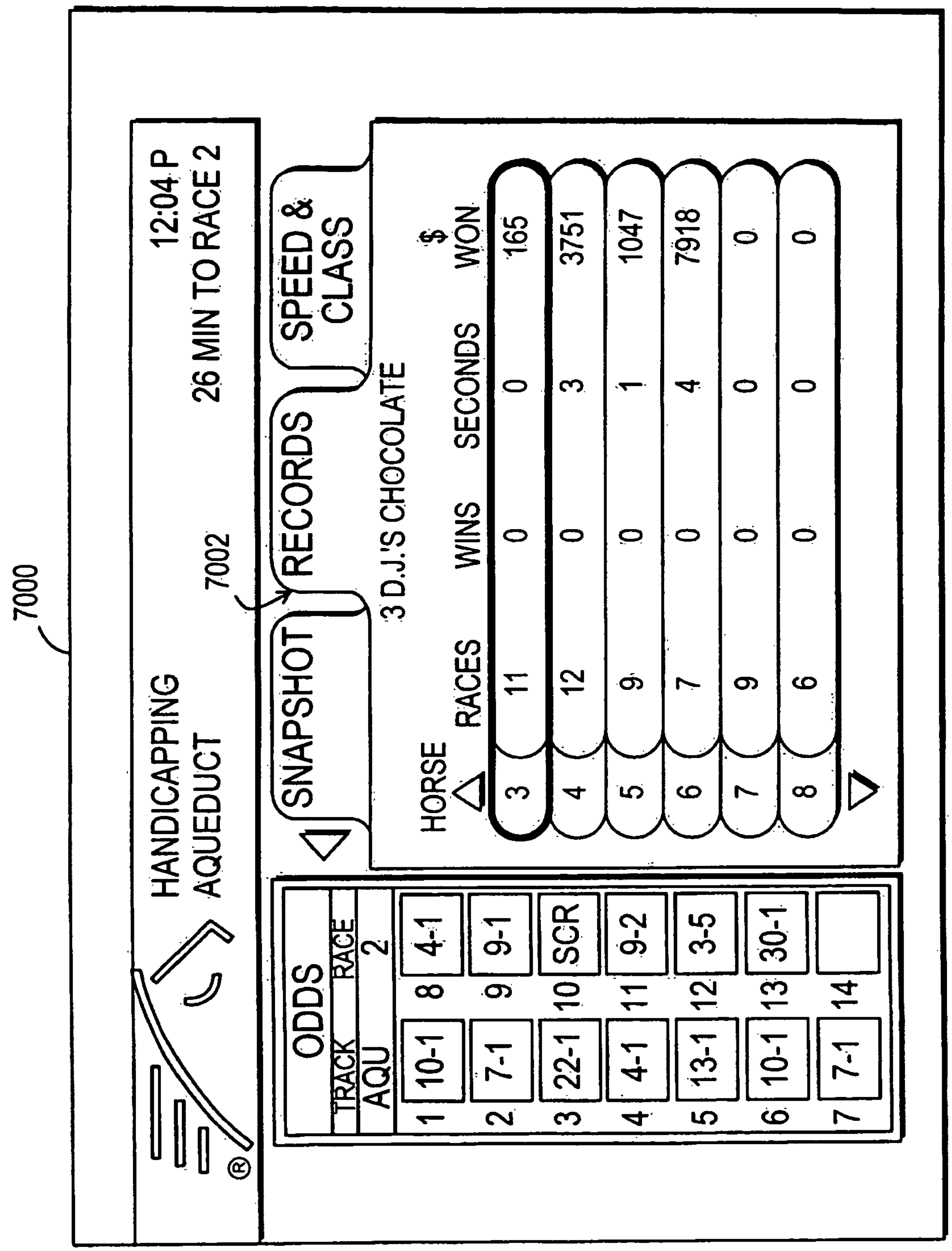
Figure 71:
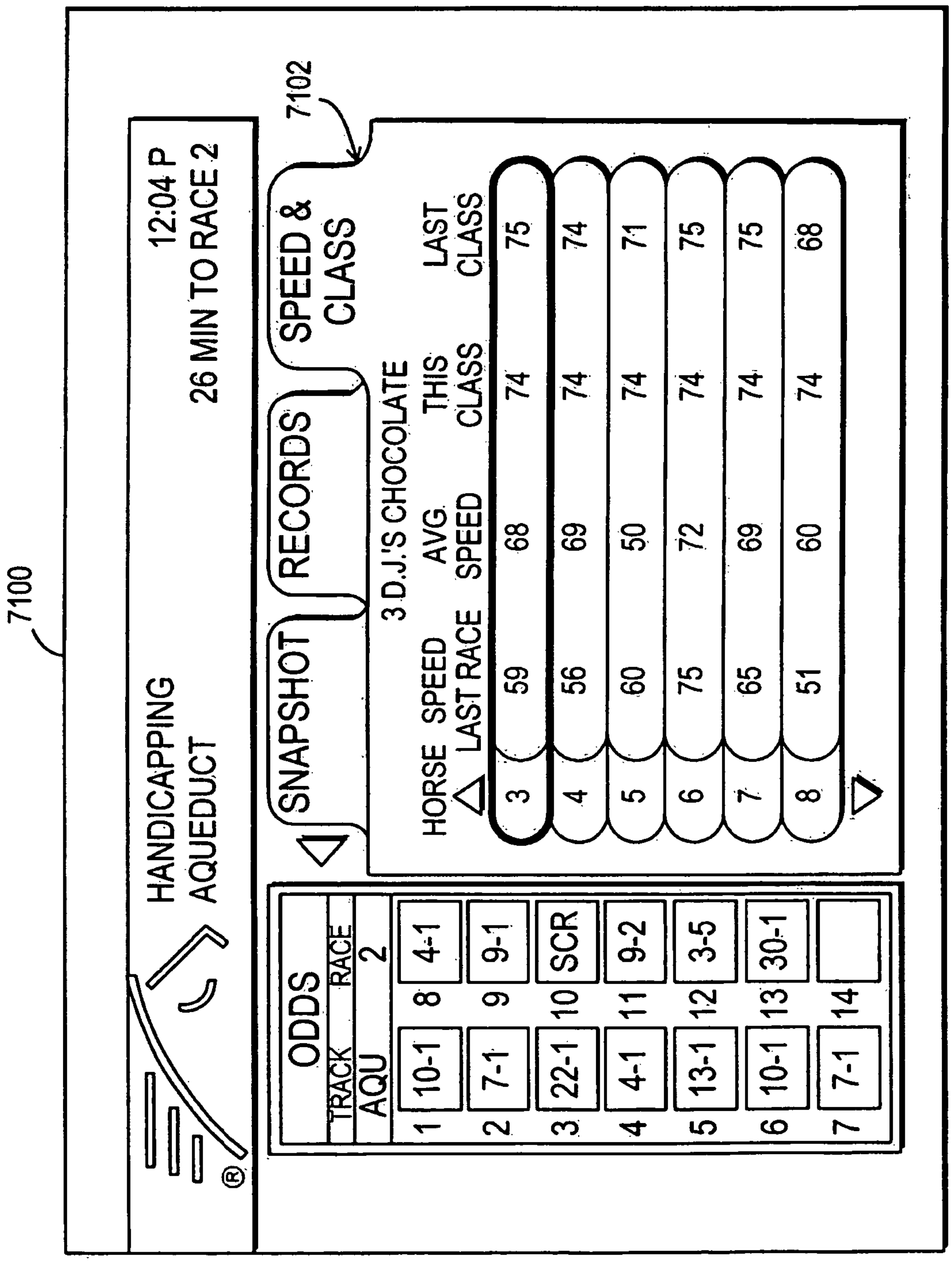

If the user selects "Horse Data" option 6802 from handicapping "Options" tab 5708 as shown in screen 6800 of FIG. 68, the user will then be given the option of seeing "snapshot", "records", and "speed & class" data for each horse. As shown in screen 6900 of FIG. 69, the snapshot data is displayed in a "Snapshot" tab 6902. The snapshot data may include the number of days off, the number of wins and starts, a power rating, and the morning line for each horse. The power rating may be any suitable method for comparing horses. As shown in screen 7000 of FIG. 70, the record data is displayed in a "Records" tab 7002. The records data may include the number of races by, the number of wins for, the number of second places for, and the amount won from wagers on, each horse. As shown in screen 7100 of FIG. 71, the speed and class data is displayed in a "Speed and Class" tab 7102. The speed and class data may include the speed in the last race, the average speed, the current class, and the last class for each horse.

Figure 72:
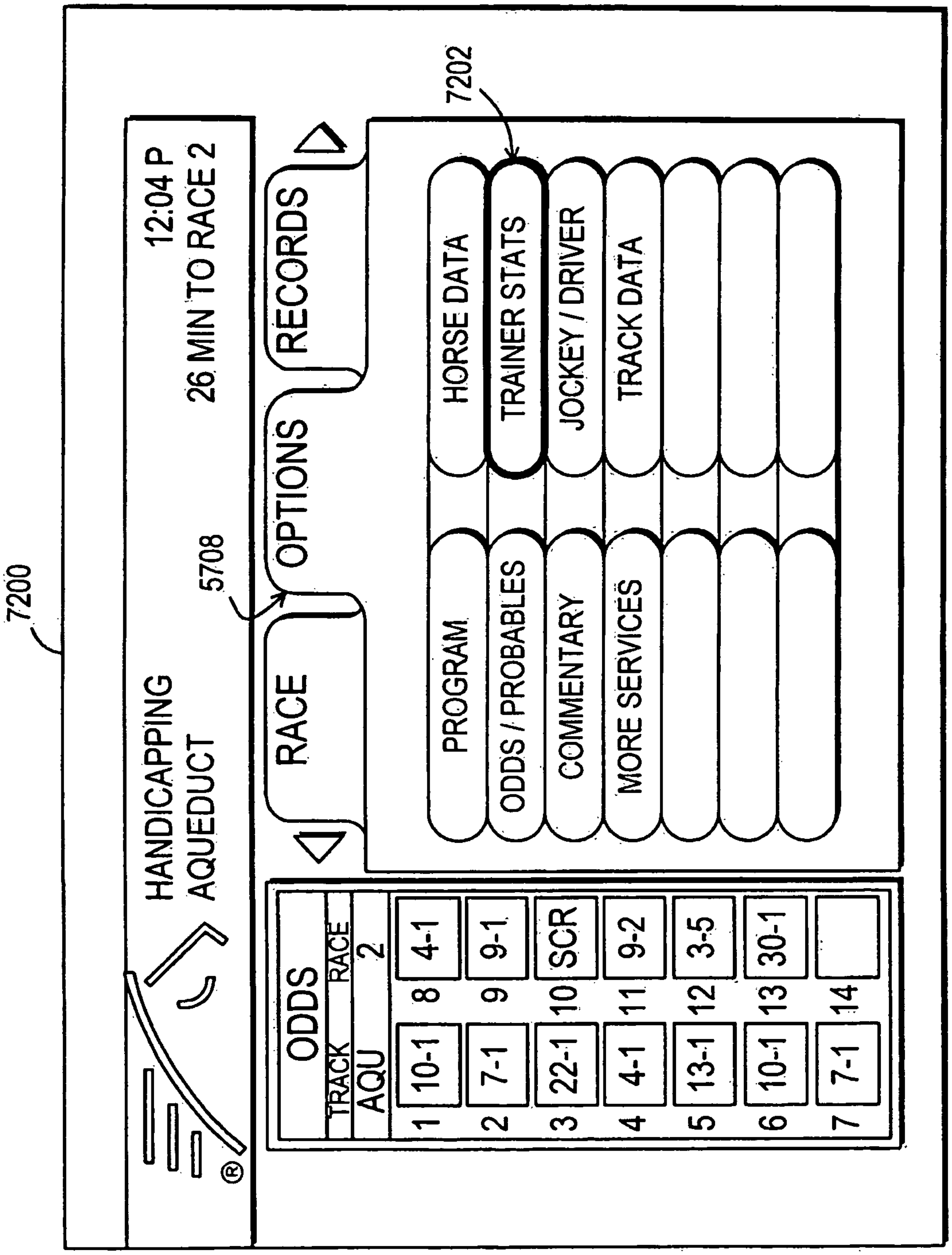
Figure 73:
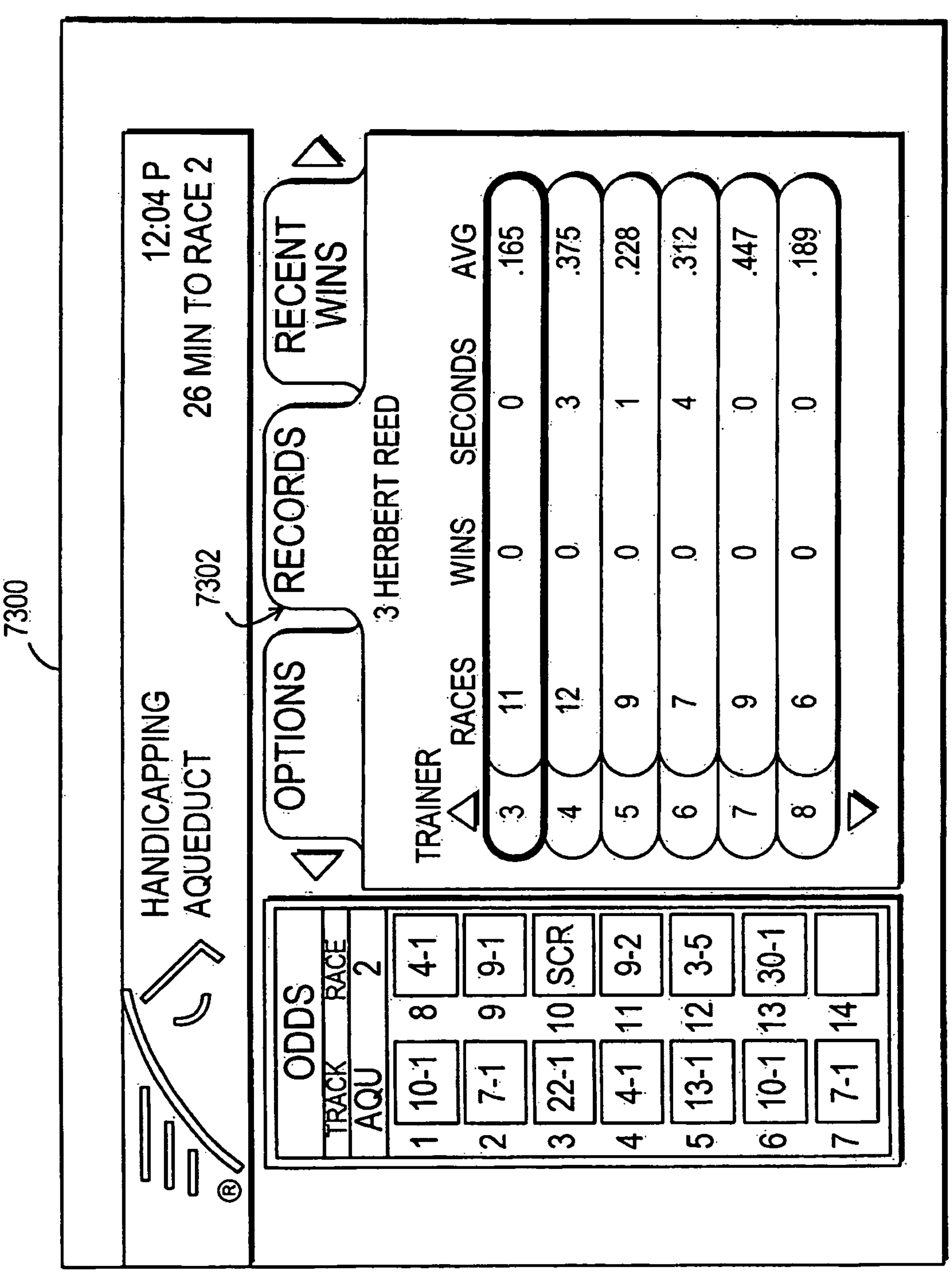
Figure 74:
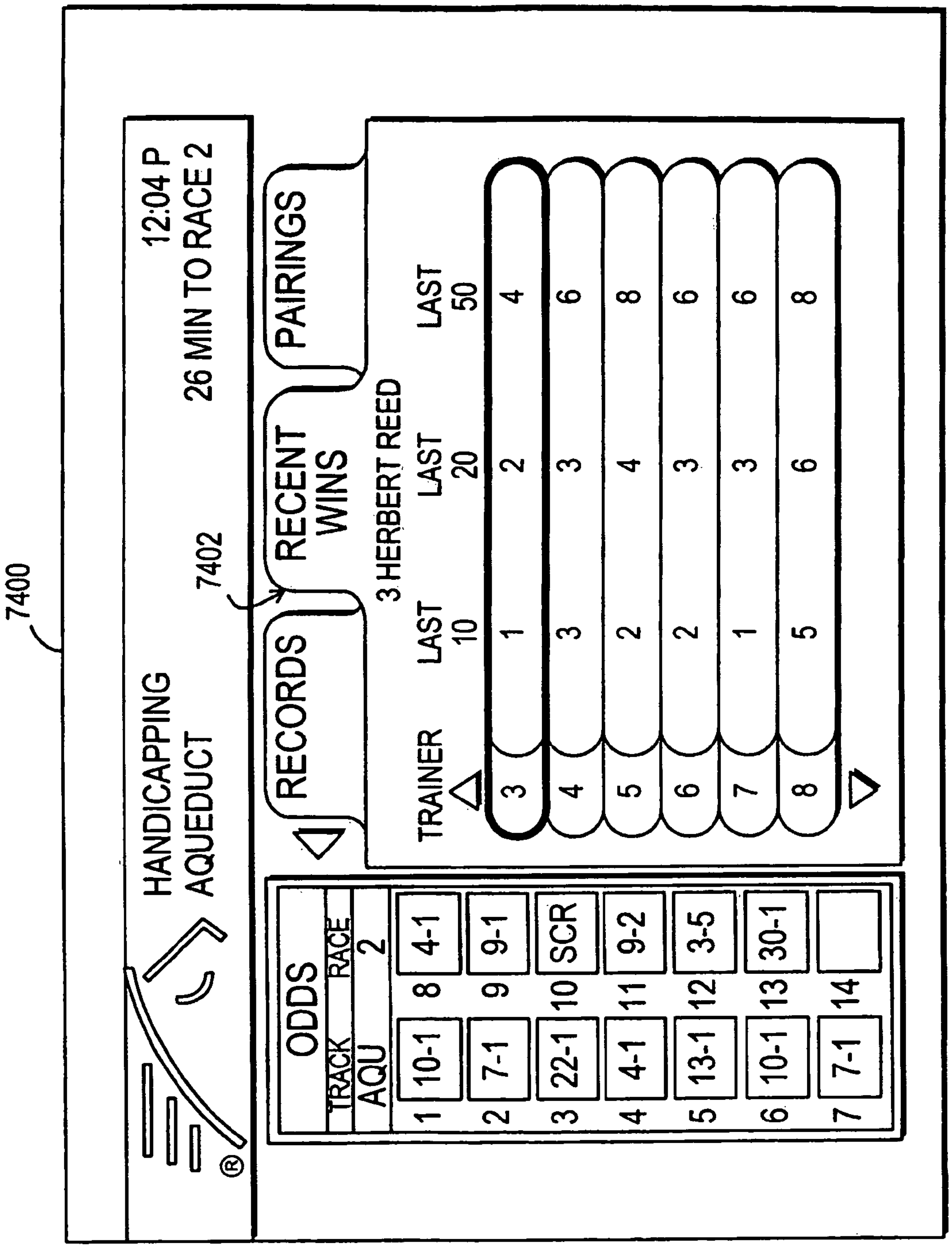
Figure 75:
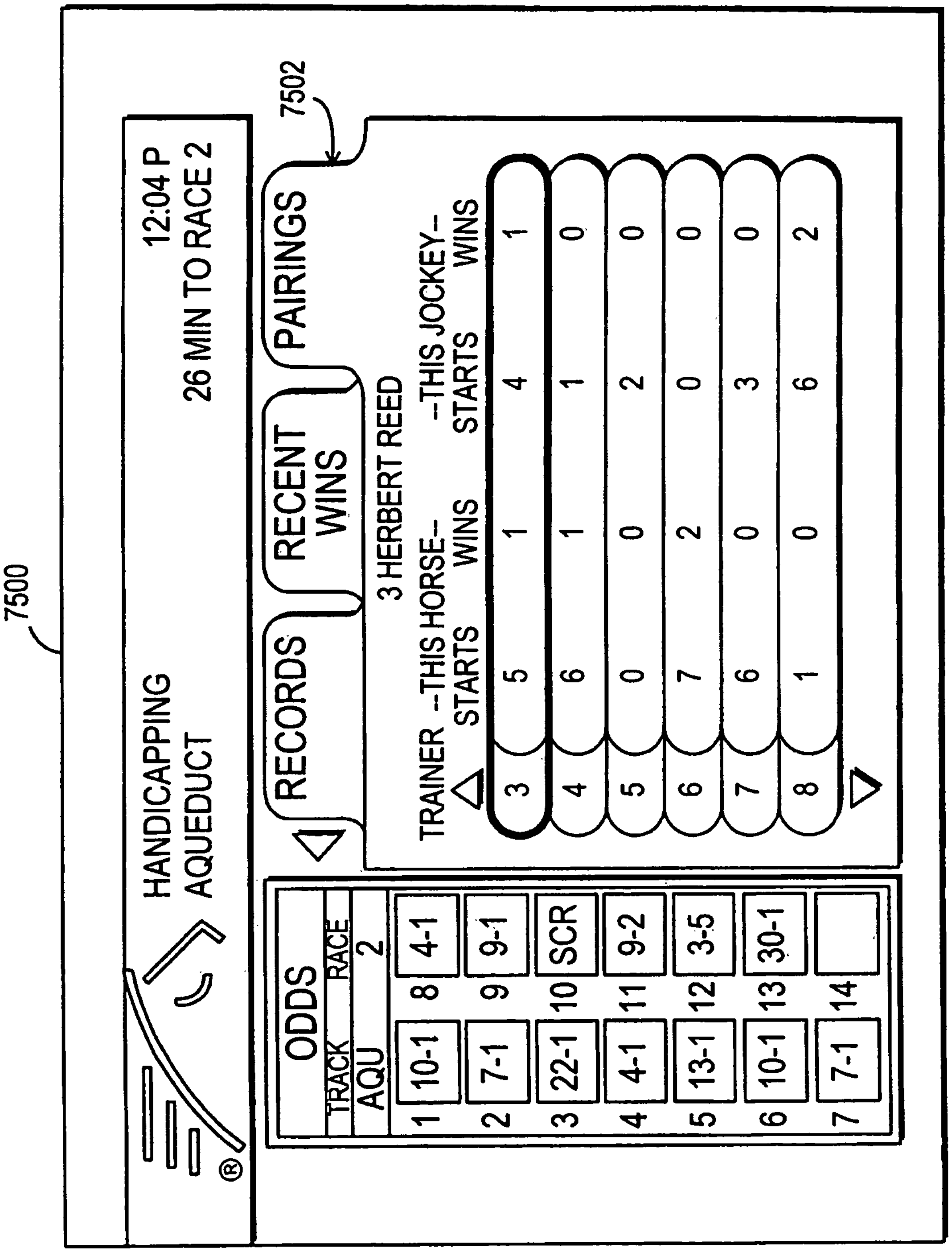

The user may also view trainer statistics by selecting a "Trainer Stats" option 7202 from tab 5708 as shown in screen 7200 of FIG. 72. After the user has selected option 7202, the user may then view records data, recent wins data, and pairings data for the trainer of each horse. As shown in screen 7300 of FIG. 73, the records data is displayed in a "Records" tab 7302. The records data may include the number of races, wins, and second places, and the average for the trainer of each horse. As shown in screen 7400 of FIG. 74, the recent wins data is displayed in a "Recent Wins" tab 7402. The recent wins data may include the number of wins in the last 10 races, 20 races, and 50 races for the trainer of each horse. As shown in screen 7500 of FIG. 75, the pairings data is displayed in a "Pairings" tab 7500. The pairings data may include the number of starts and wins with this horse, and the number of starts and wins with this jockey, for the trainer of each horse.

Figure 76:
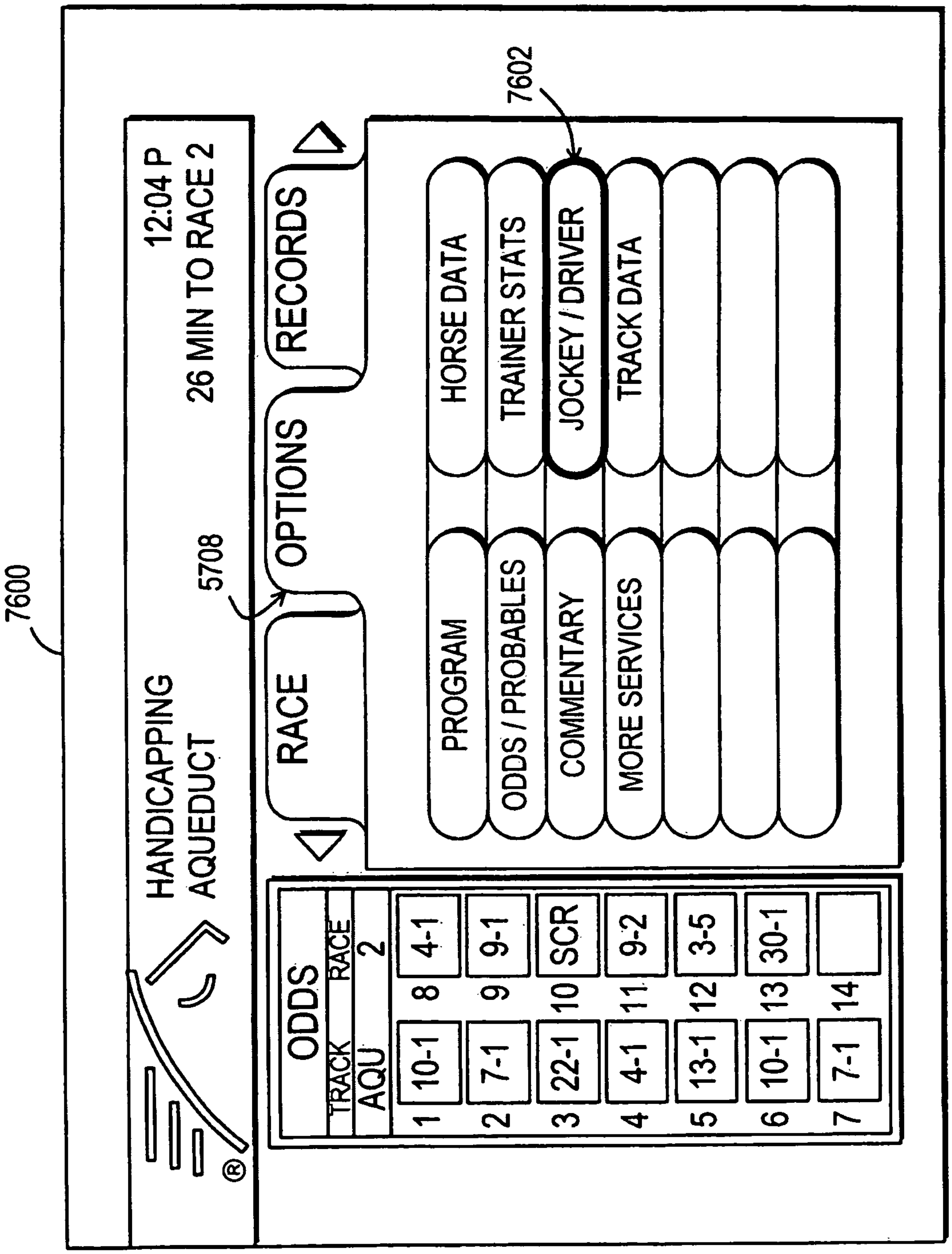
Figure 77:
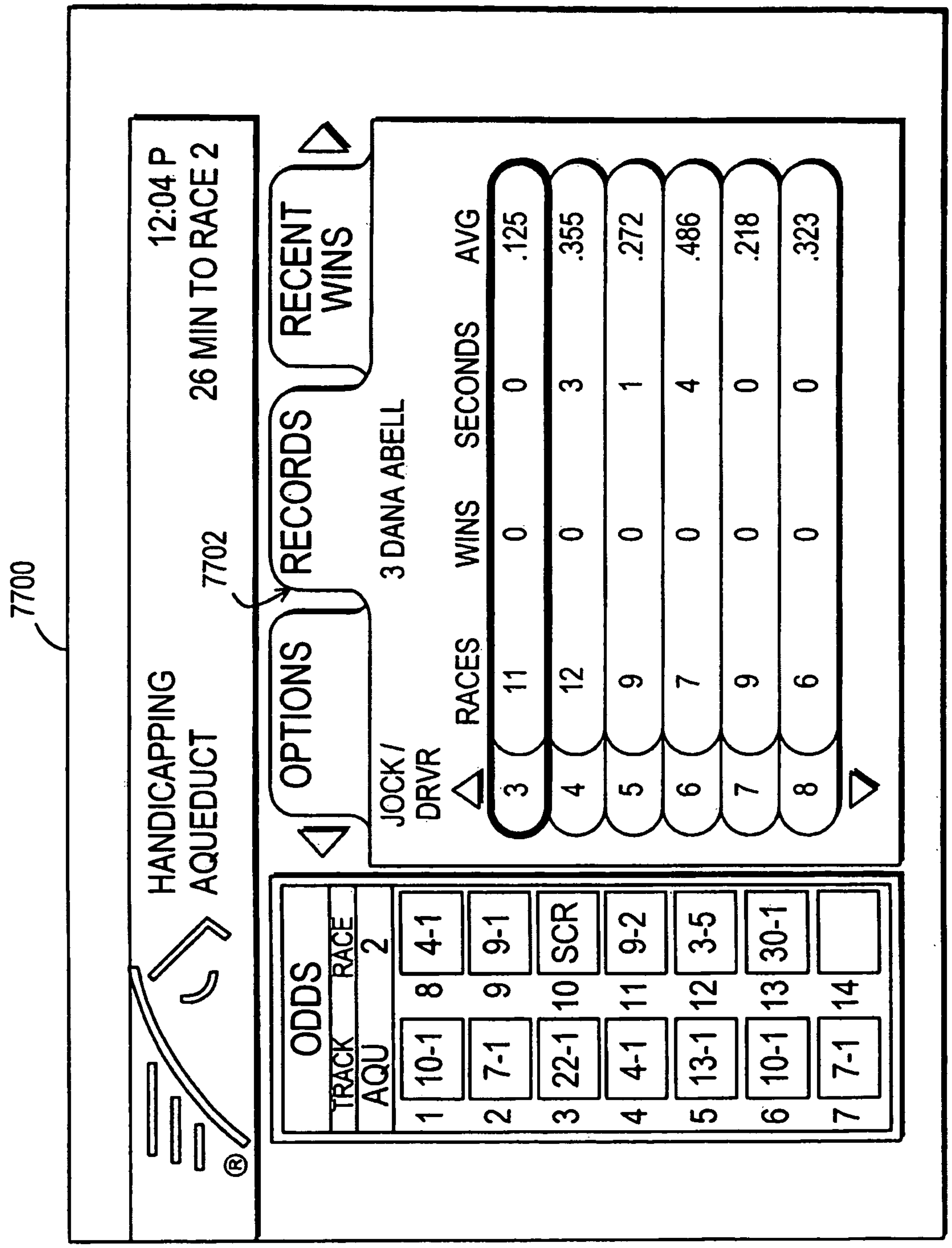
Figure 78:
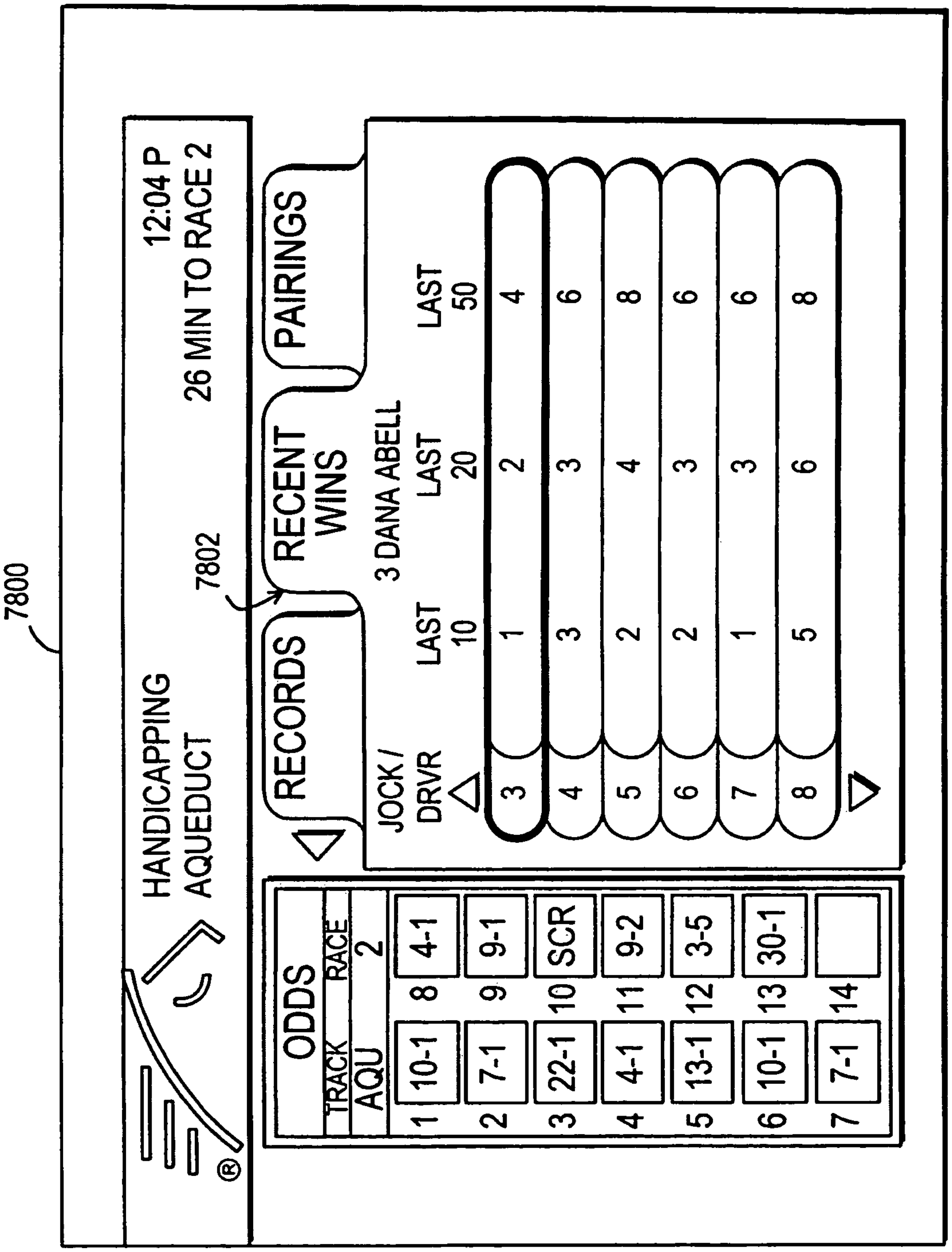
Figure 79:
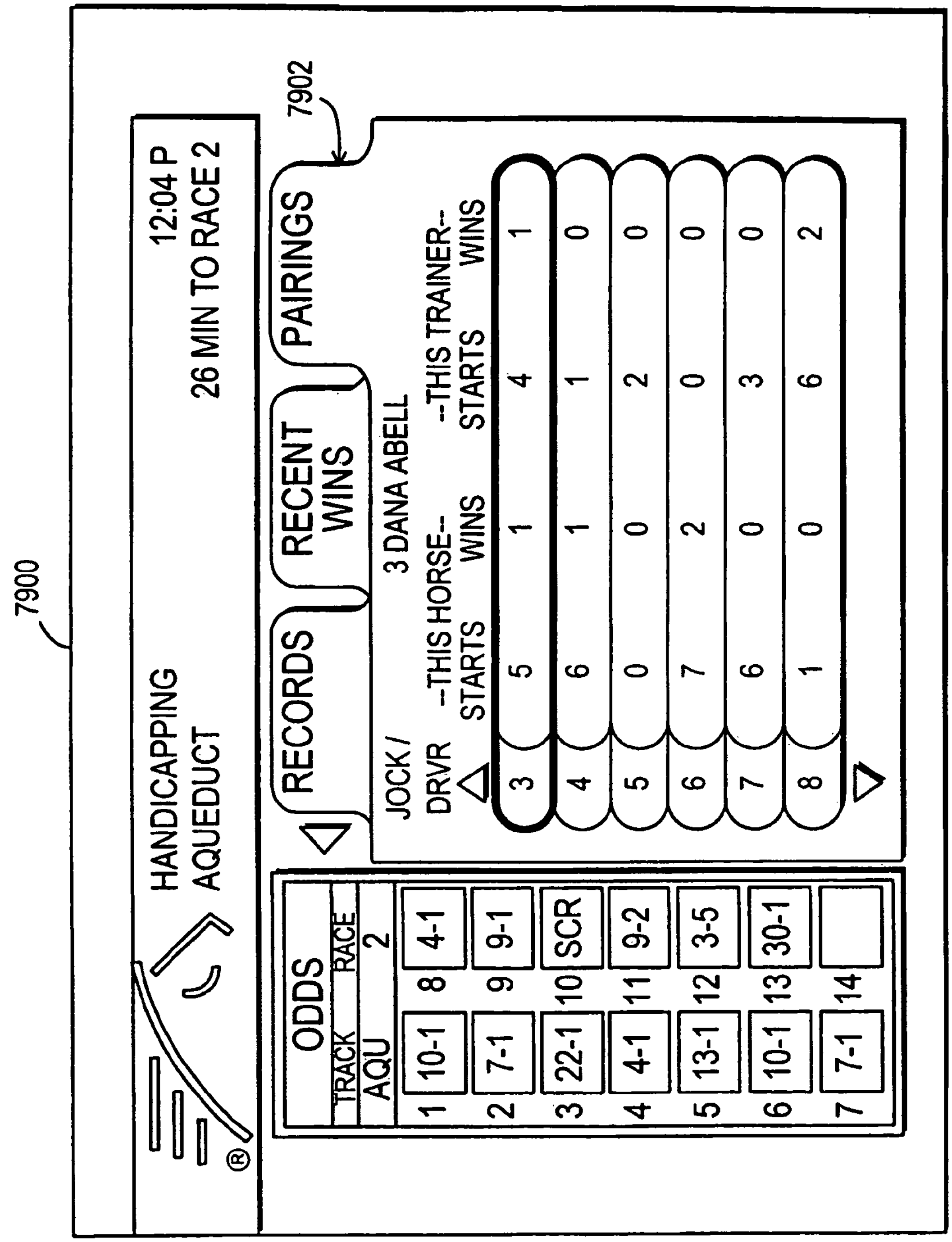

To view jockey and driver handicapping data, the user may select "Jockey/Driver" option 7602 from tab 5708 as shown in screen 7600 of FIG. 76. After the user has selected option 7602, the user may then view records data, recent wins data, and pairings data for the jockey or driver of each horse. As shown in screen 7700 of FIG. 77, the records data is displayed in a "Records" tab 7702. The records data may include the number of races, wins, and second places, and the average for the jockey or driver of each horse. As shown in screen 7800 of FIG. 78, the recent wins data is displayed in a "Recent Wins" tab 7802. The recent wins data may include the number of wins in the last 10 races, 20 races, and 50 races for the jockey or driver of each horse. As shown in screen 7900 of FIG. 79, the pairings data is displayed in a "Pairings" tab 7900. The pairings data may include the number of starts and wins with this horse, and the number of starts and wins with this trainer, for the jockey or driver of each horse.

Figure 80:
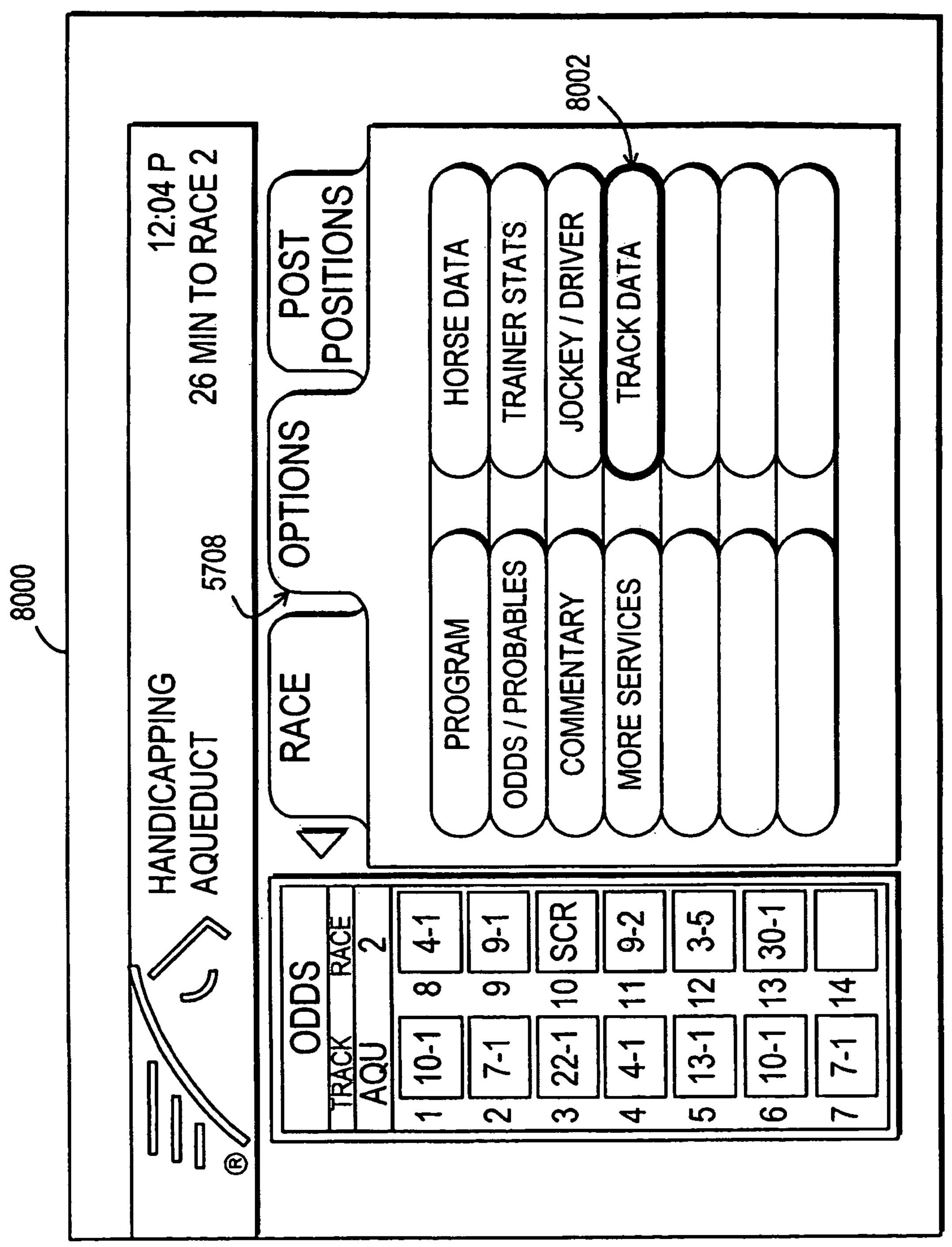
Figure 81:
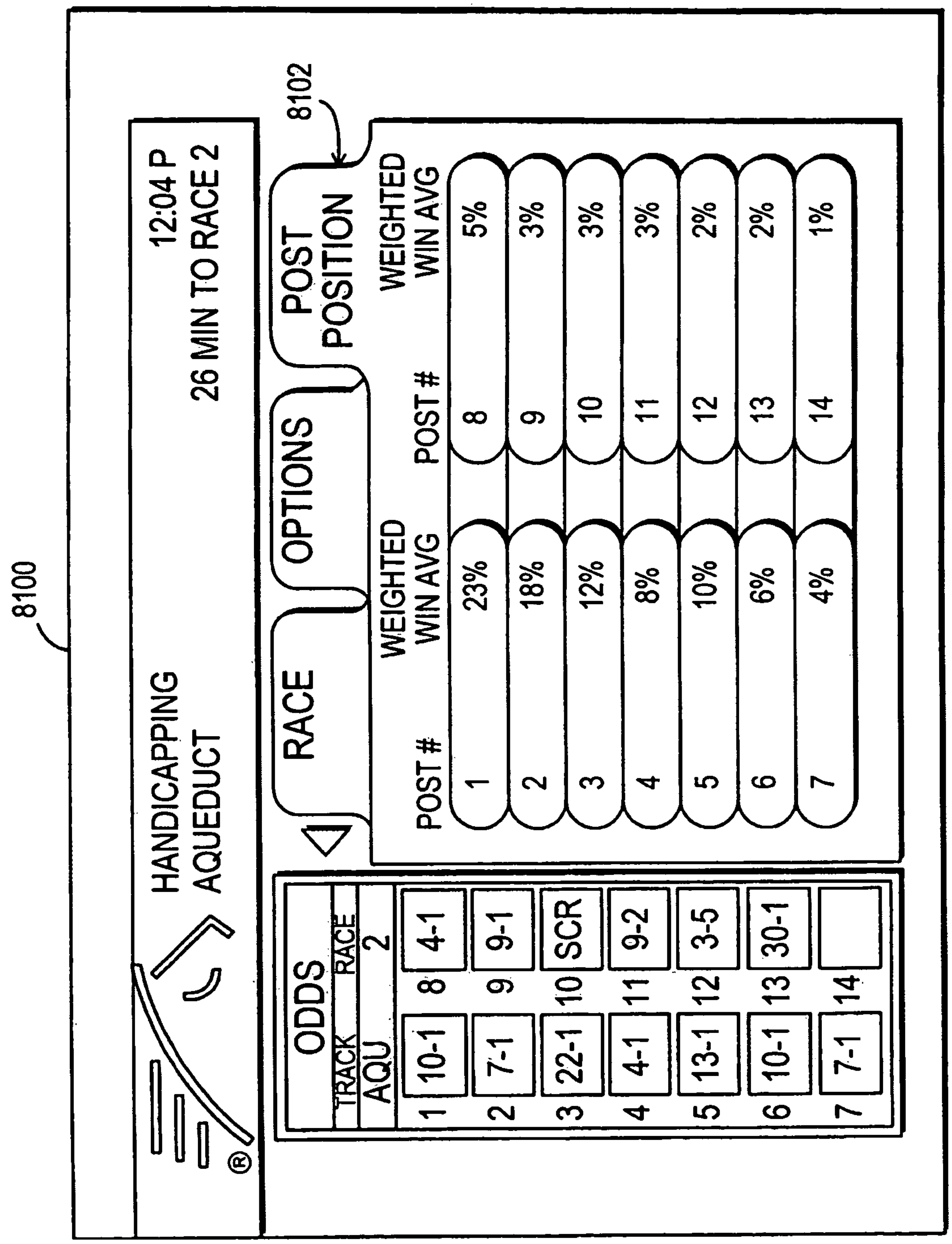

To view track statistics data, the user may select "Track Data" option 8002 from tab 5708 as shown in screen 8000 of FIG. 80. Once the user has selected option 8002, a "Post Position" tab 8102 is displayed as illustrated in screen 8100 of FIG. 81. As can be seen, tab 8102 includes a weighted win average for each post position of the track. The weighted win average can be calculated using any suitable method.

Figure 82:
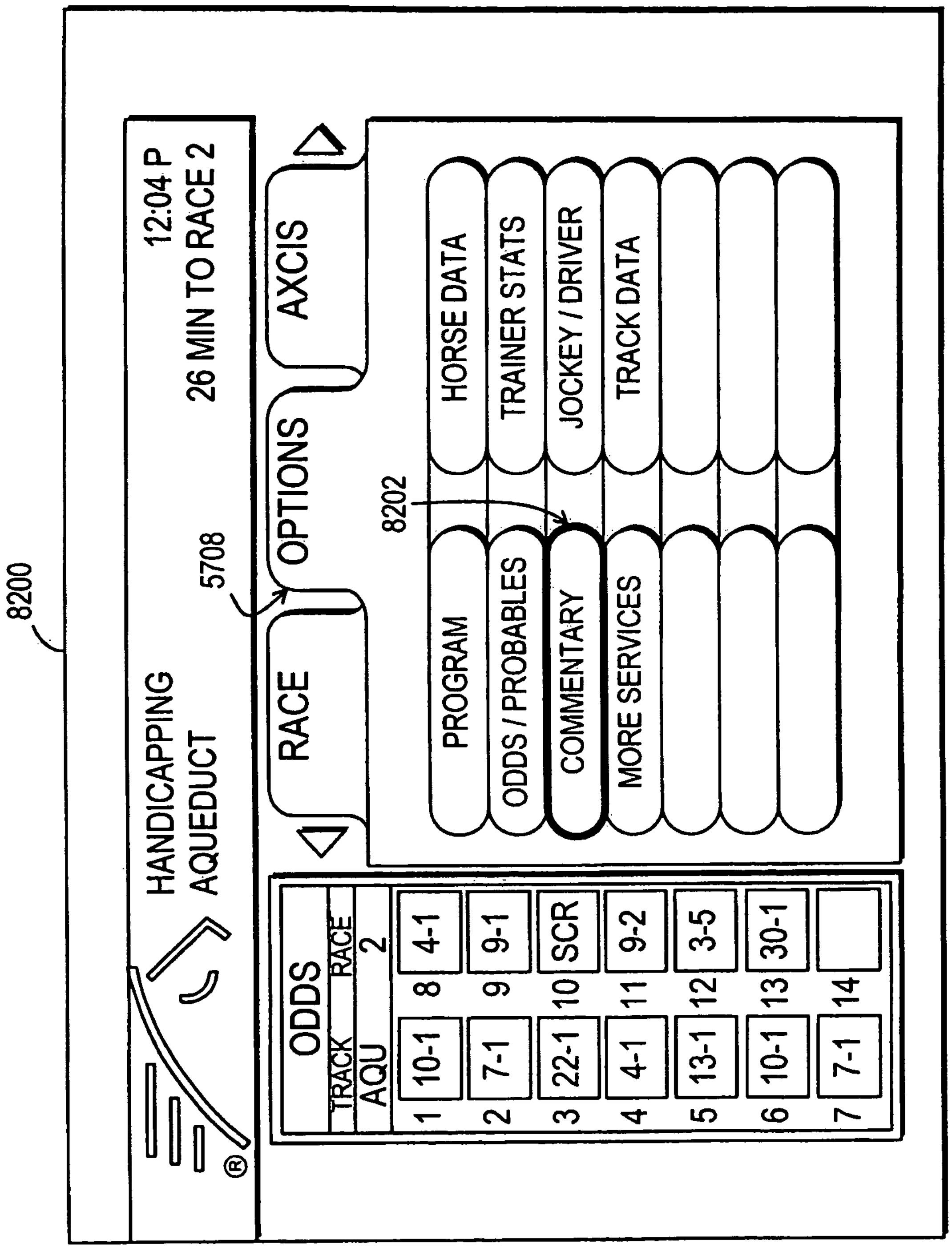
Figure 83:
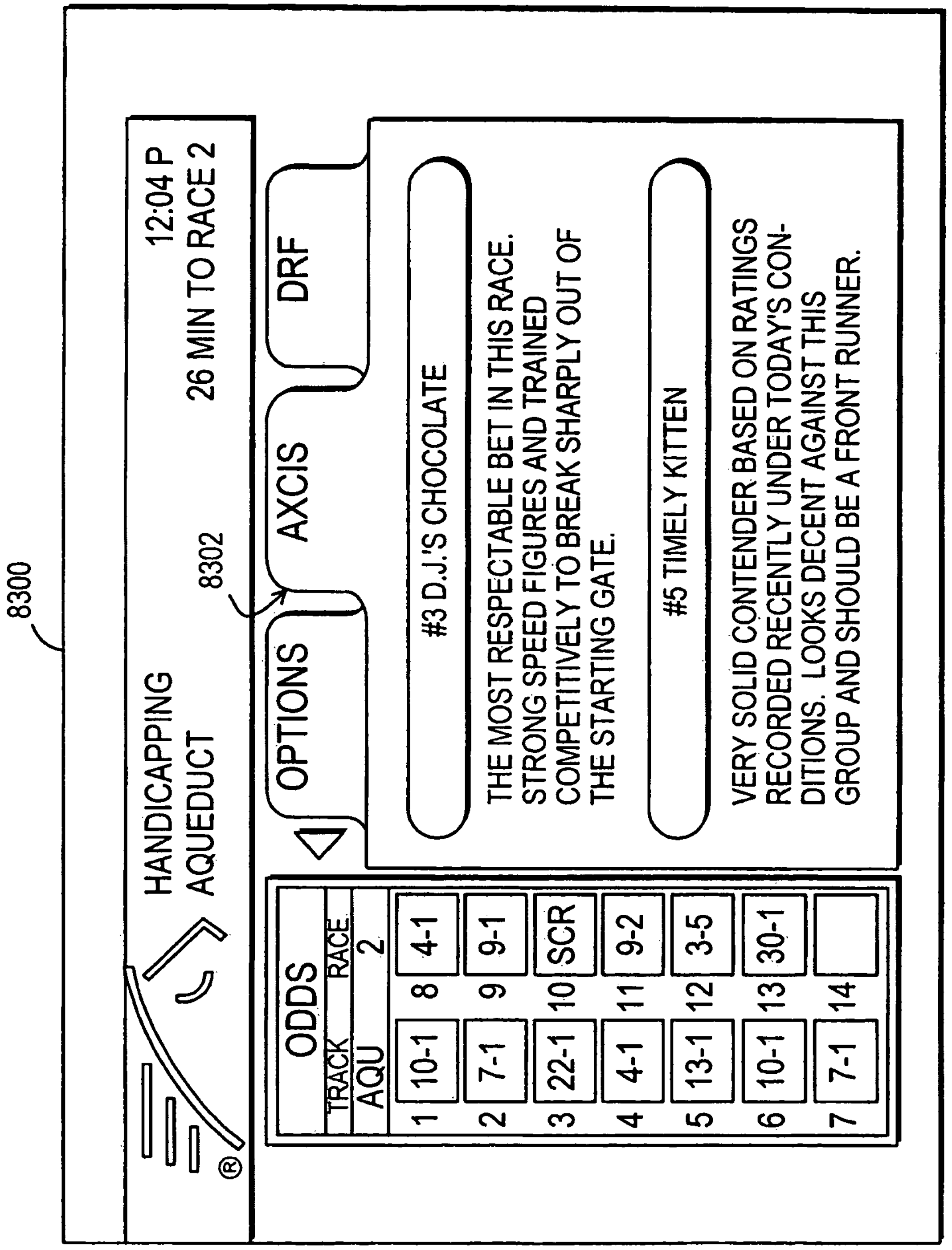
Figure 84:
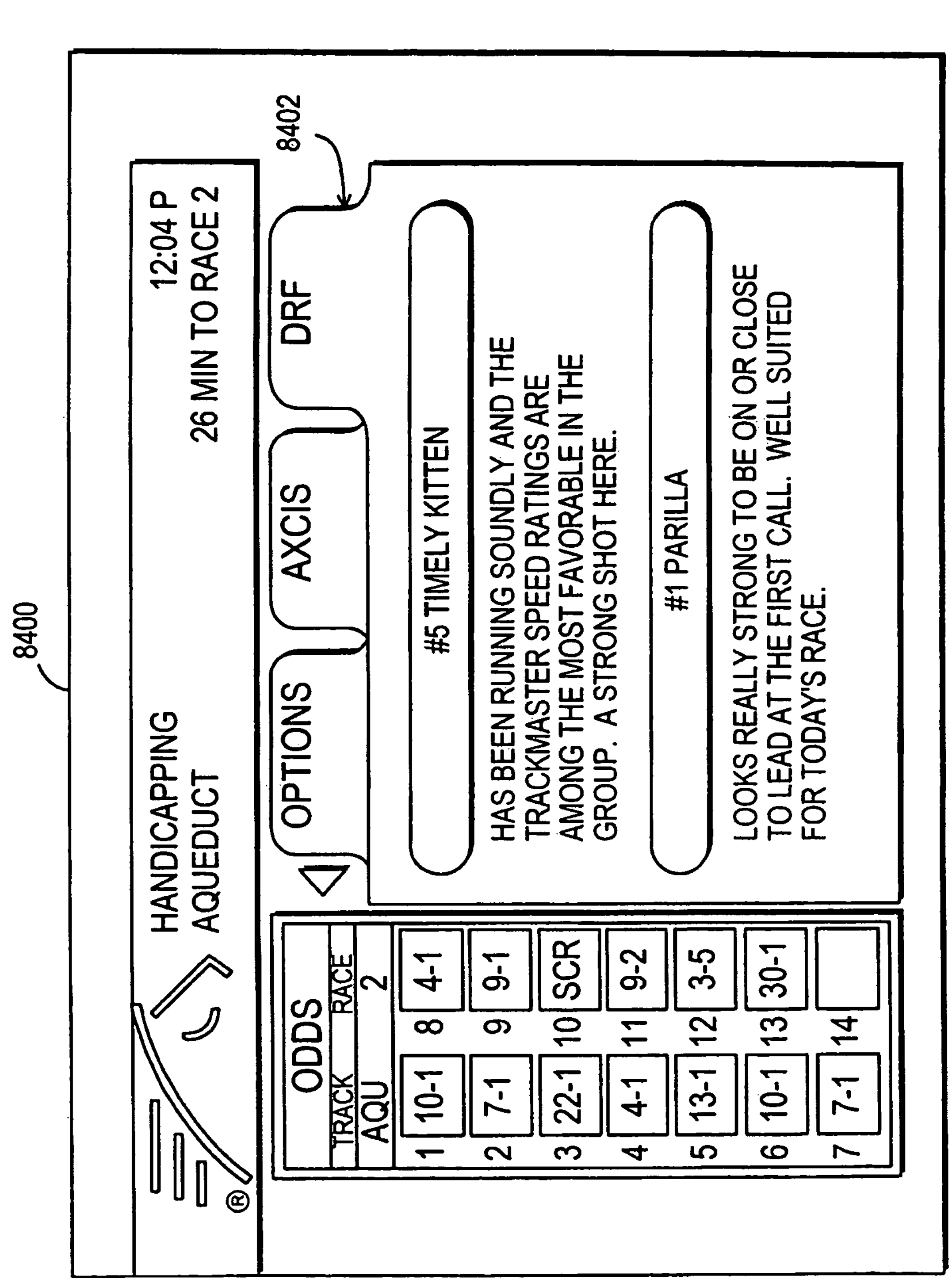

The user can view commentary data by selecting the "Commentary" option 8202 from tab 5708 as shown in screen 8200 of FIG. 82. Upon selecting option 8202, the user may view commentary data from any handicapping data provider 118 connected to system 100 (FIG. 1). For example, handicapping data may be available from two handicapping data providers 118 (FIG. 1) called "AXCIS" and "DRF". To access this data, the user can select "AXCIS" tab 8302 (as shown in screen 8300 of FIG. 83) or "DRF" tab 8402 (as shown in screen 8400 of FIG. 84).

Figure 85:
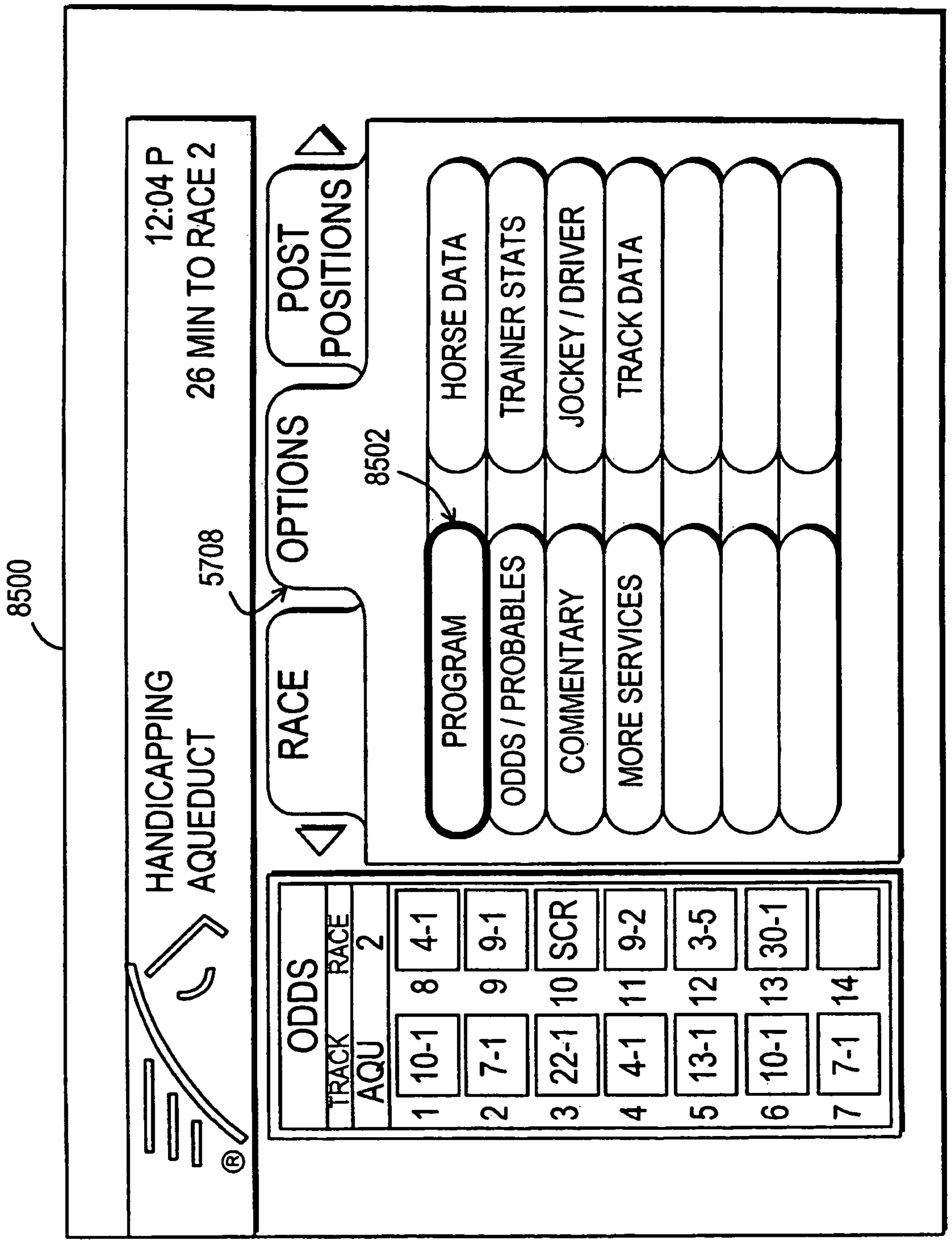
Figure 86:
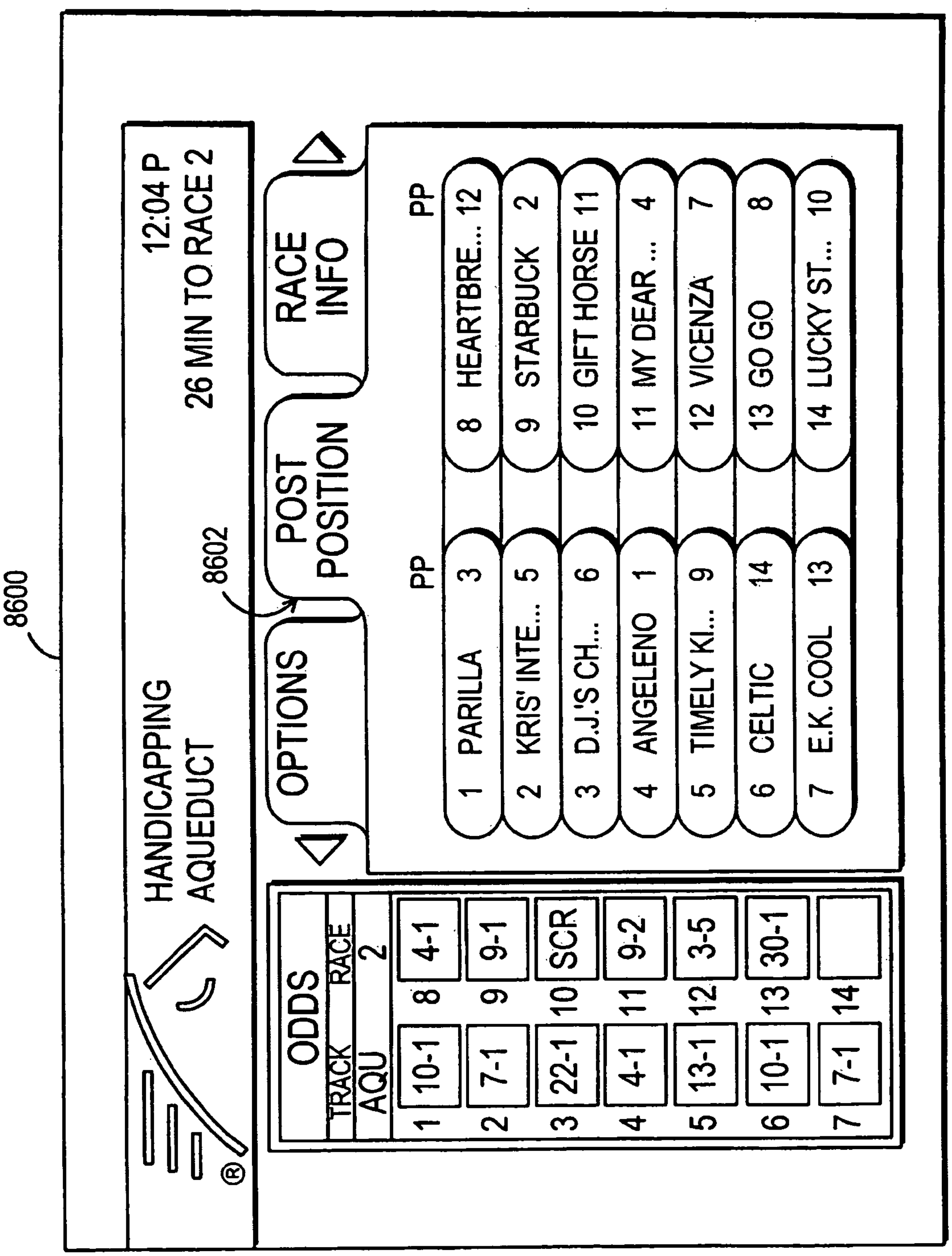
Figure 87:
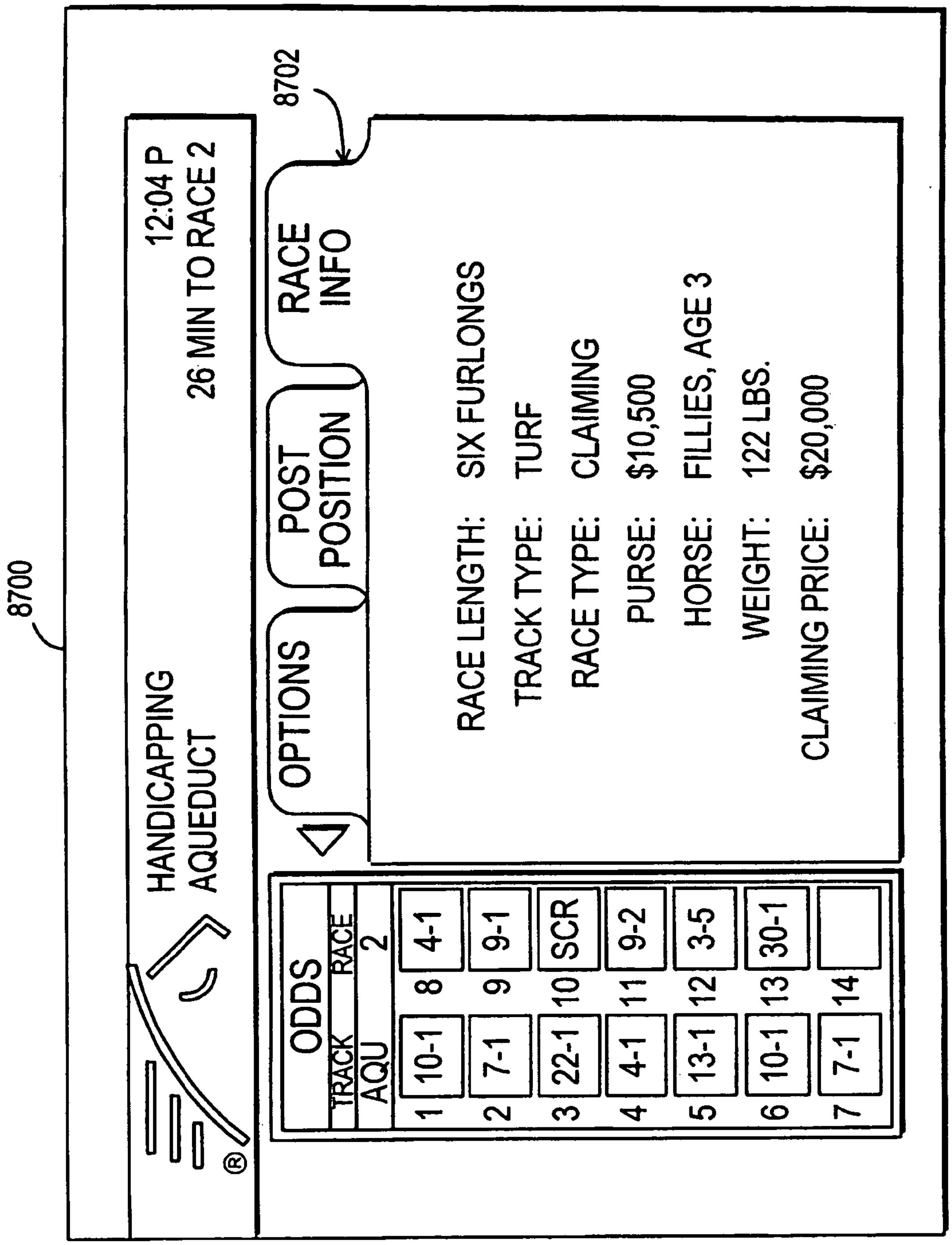

To view program data regarding the selected race, the user can select "Program" option 8502 from tab 5708 as shown in screen 8500 of FIG. 85. Once the user has selected option 8502, the user may then view the post position for each horse from a "Post Position" tab 8602 (as shown in screen 8600 of FIG. 86) or race information from a "Race Info" tab 8702 (as shown in screen 8700 of FIG. 87). The race information may include the race length, the track type (e.g., turf, mud, etc.), the race type (e.g., claiming), the purse amount, the horse category, the jockey weight class, the claiming price, and any other suitable information.

Figure 88:
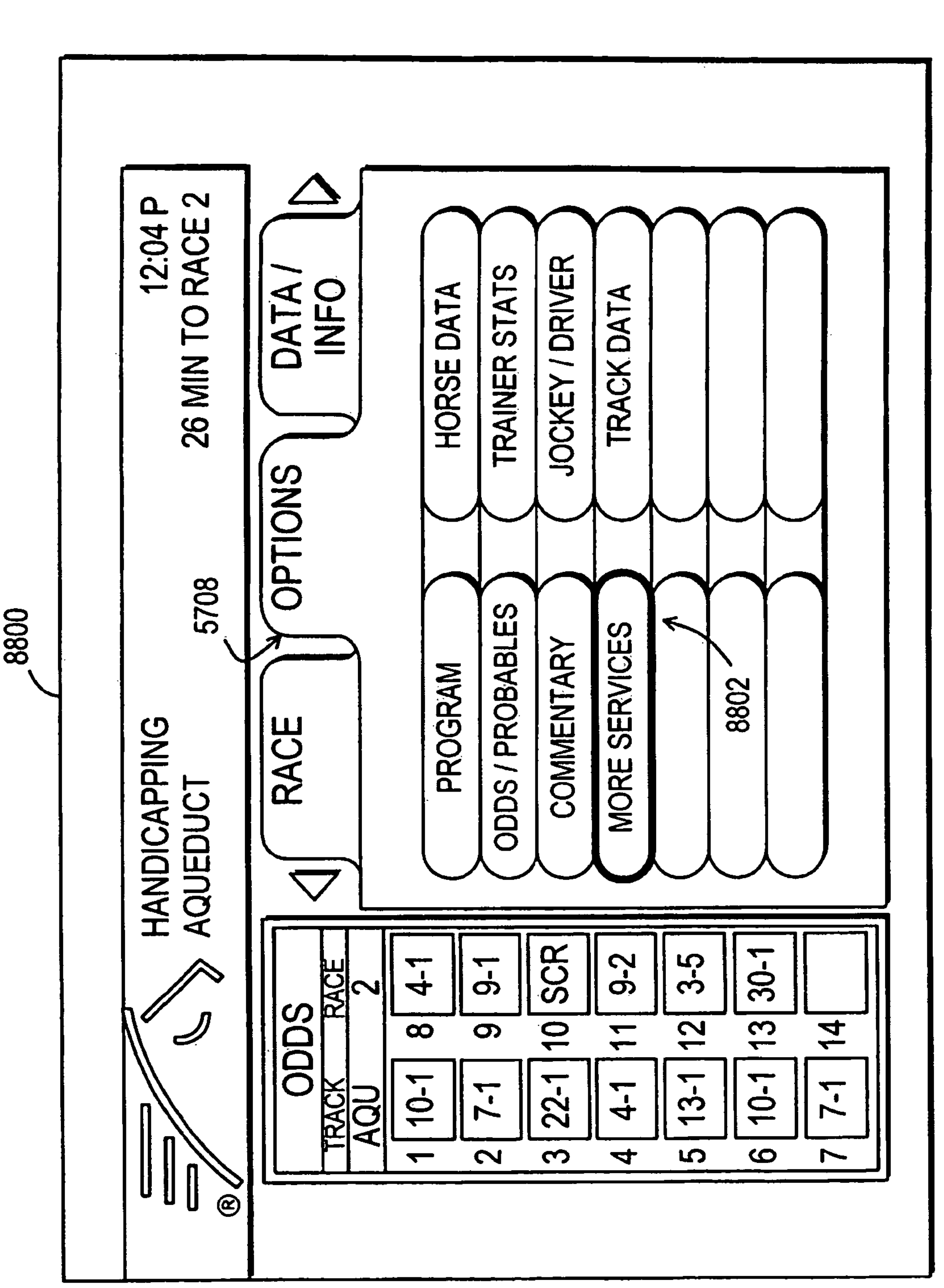
Figure 89:
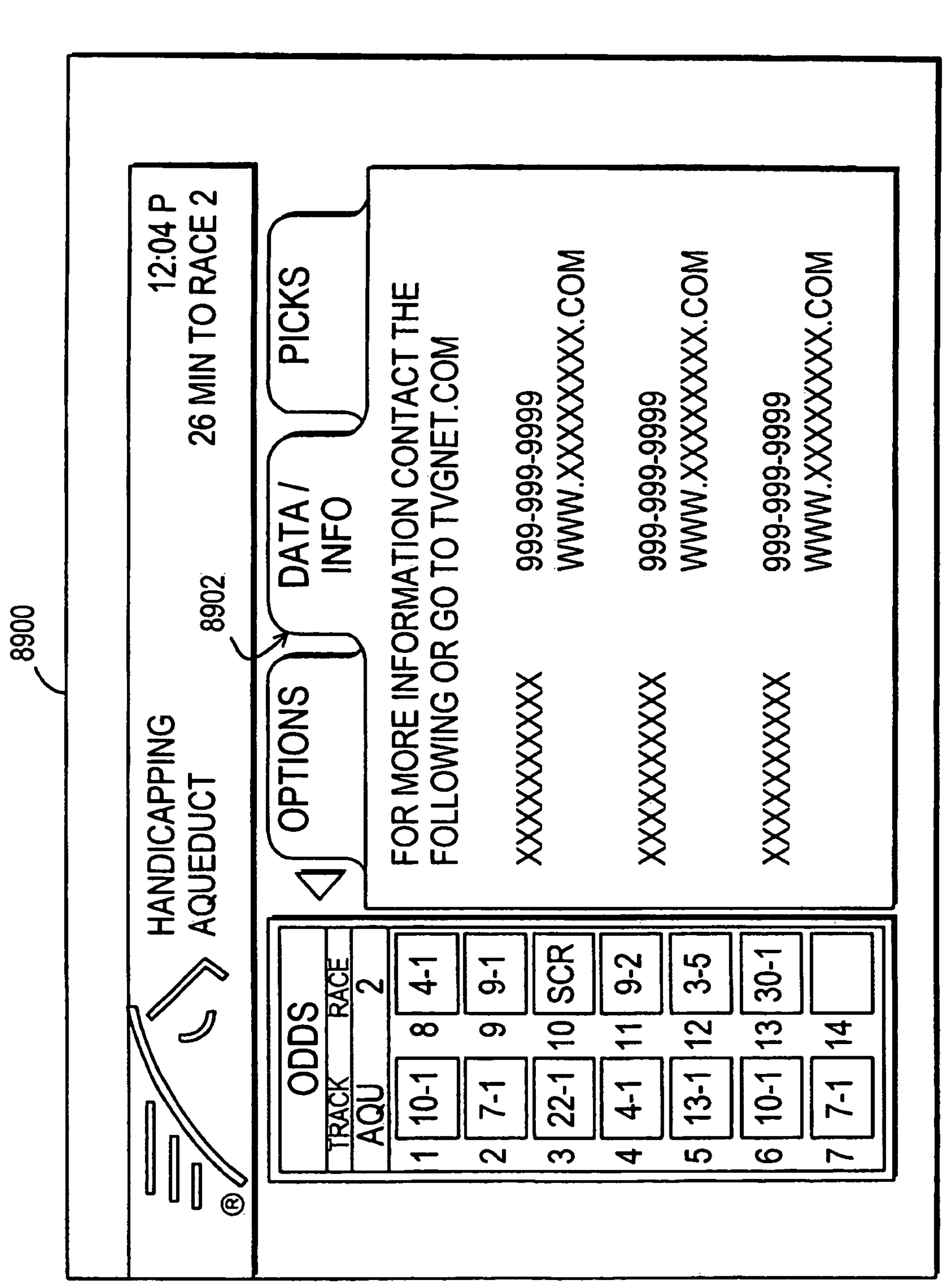
Figure 90:
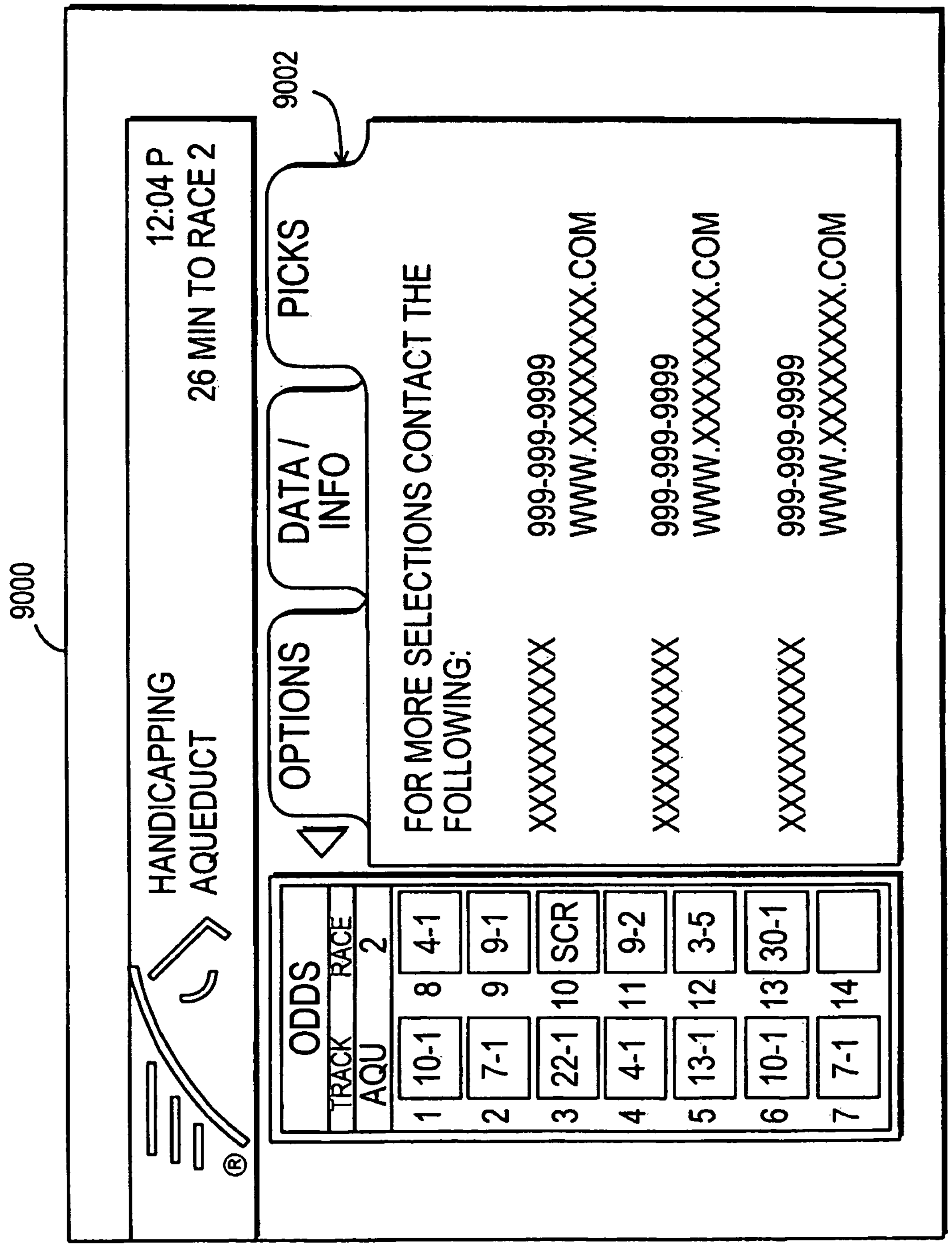

Finally, from tab 5708, the user may select "More Services" option 8802 as shown in screen 8800 of FIG. 88 to receive information on other data, information, and picks that are available. As shown in screens 8900 (FIG. 89) and 9000 (FIG. 90), the user may receive information, such as telephone numbers and Internet addresses that may be used by the user to receive additional data, information, or picks, using a "Data/Info" tab 8902 and a "Picks" tab 9002. Although not shown, in some embodiments of the present invention, the user may be prompted for a pin using a pin-entry window when "picks" tab 9002 is shown. Then, if the pin is entered, picks data may be displayed to the user for a fee.

Figure 91:
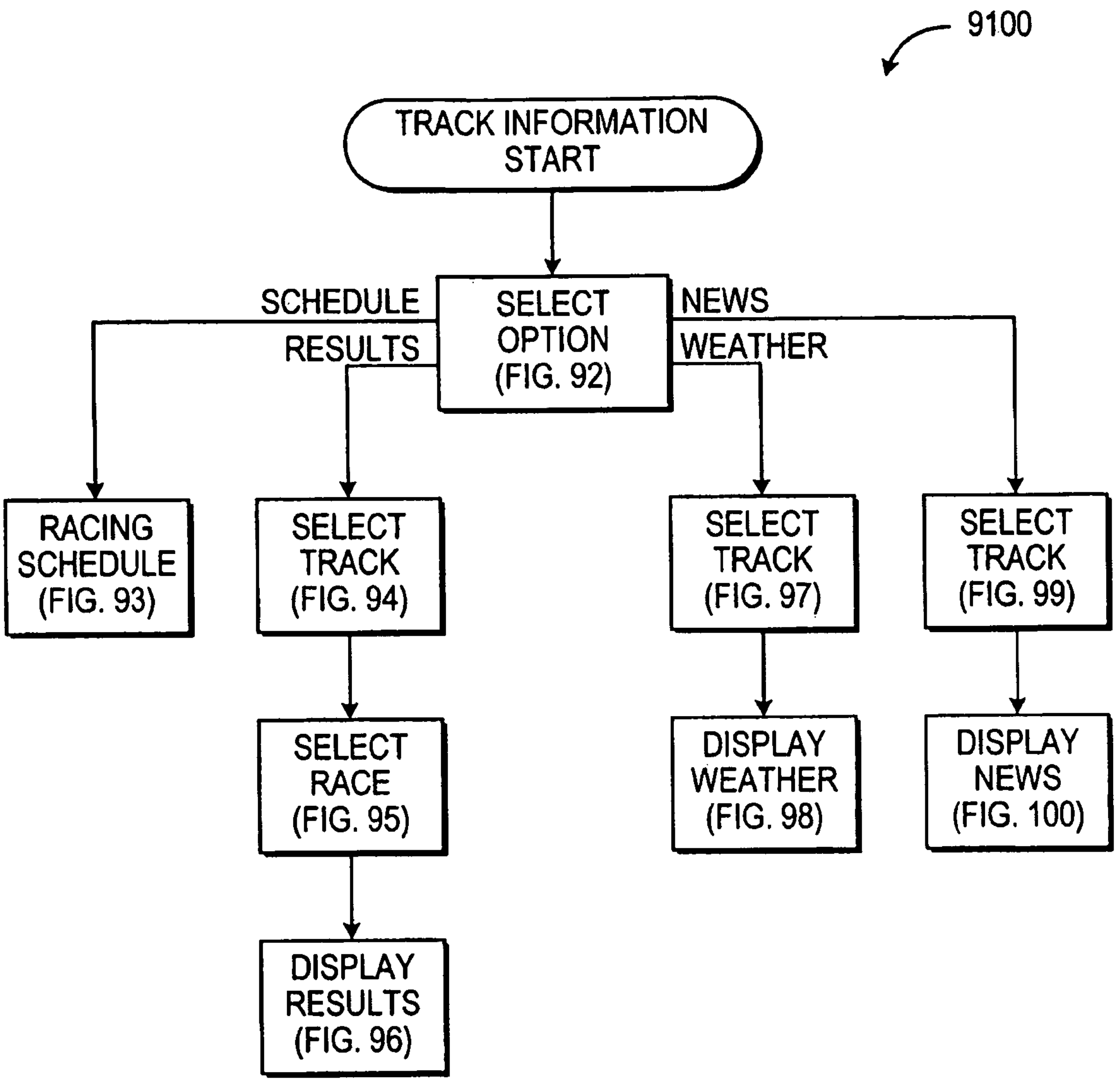
FIG. 91 is a flow diagram illustrating a track information mode that may be presented in a set-top box or computer user interface in accordance with one embodiment of the present invention.
Figure 92:
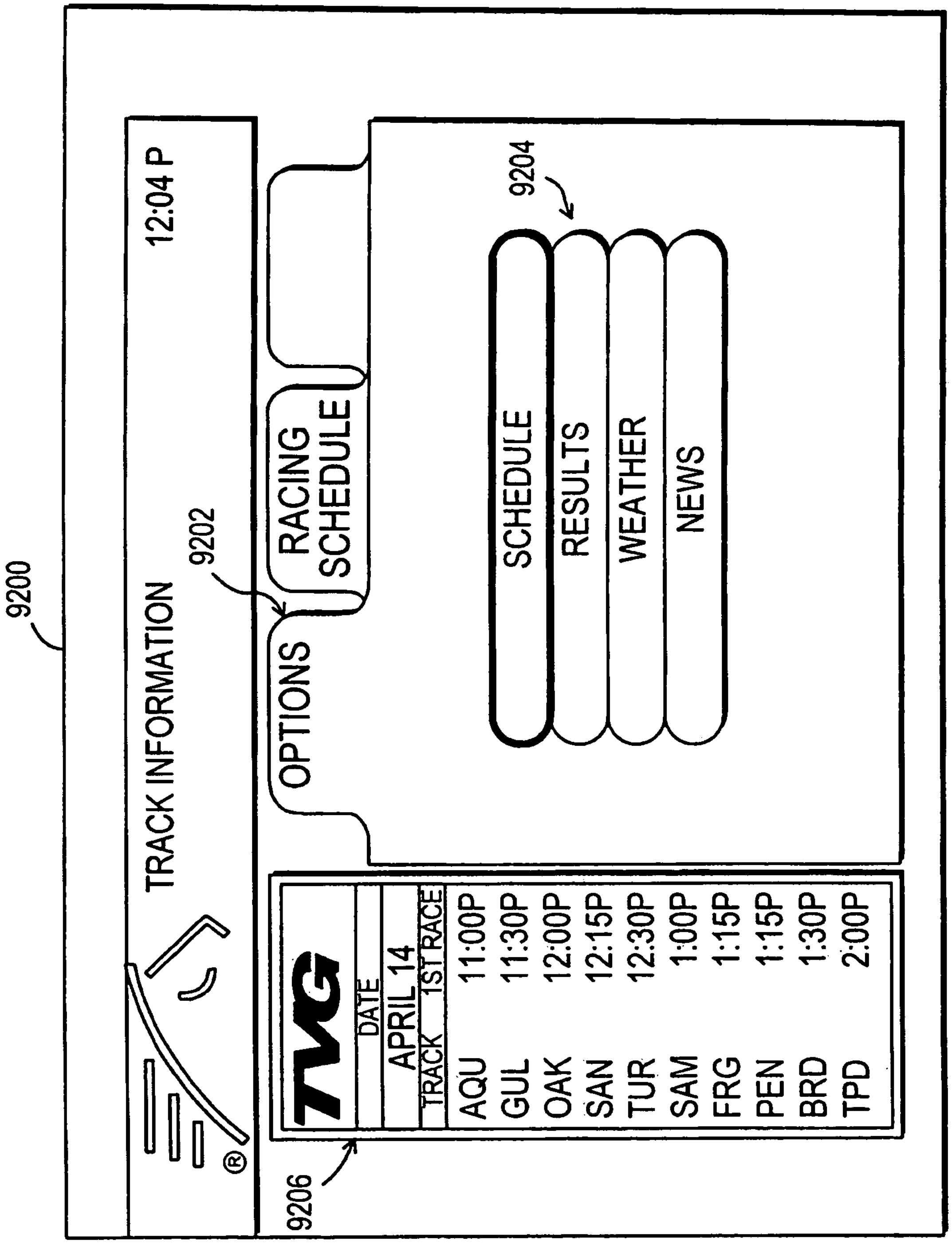
FIGS. 92-100 are illustrations of screen displays that may be presented as part of the track information mode in a set-top box or computer user interface in accordance with one embodiment of the present invention.
Figure 93:
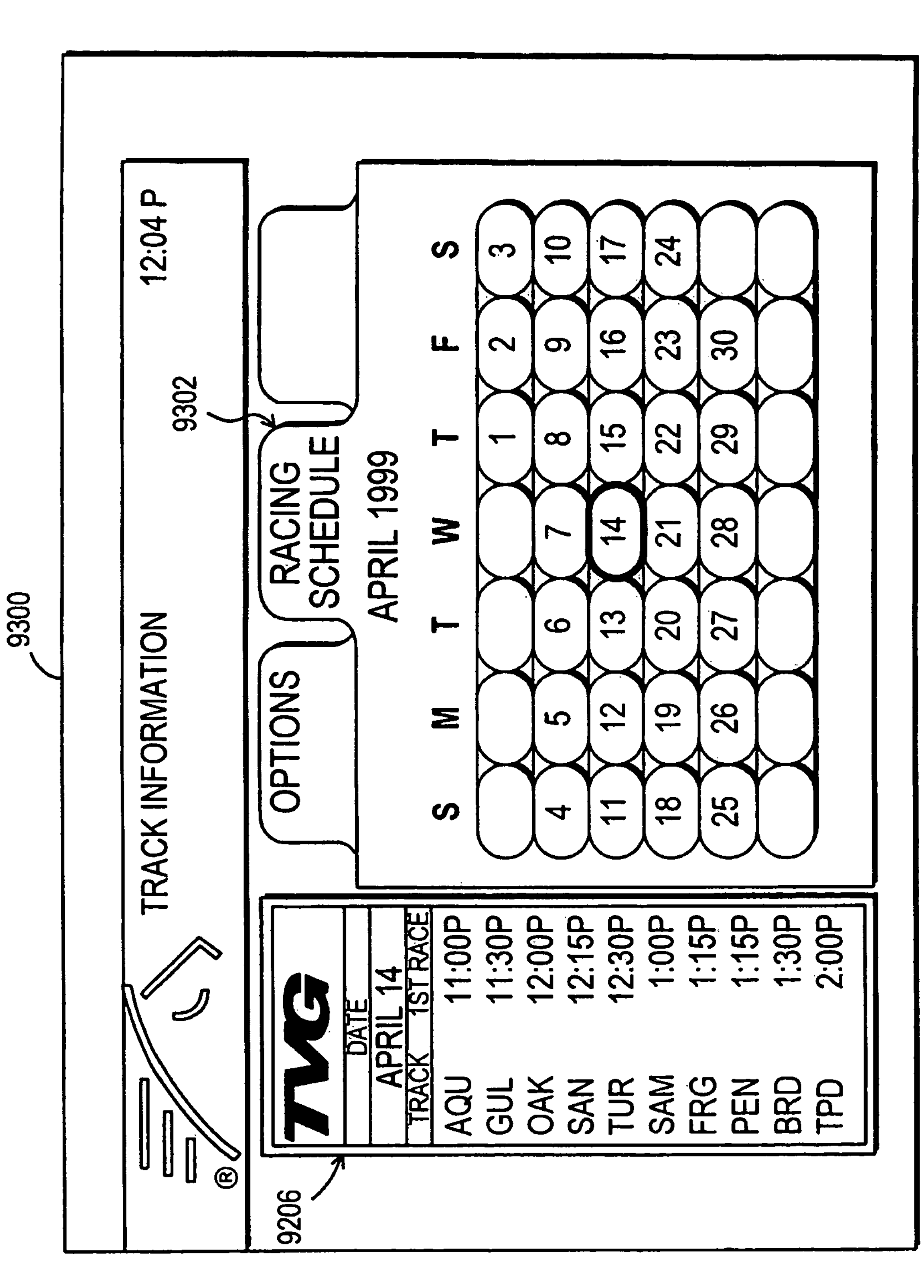

From main menu 700 (FIG. 7), the user can select "Track Information" option 710 to receive information including schedules, results, weather, and news. As shown in FIG. 91, when the user selects option 710, the user may access series 9100 of screen displays 9200-10000 (FIGS. 92-100). More particularly, when the user selects option 710, the user interface first displays screen 9200 as shown in FIG. 92. As illustrated, screen 9200 includes an "Options" tab 9202 and a first-race-time listing window 9206. "Options" tab 9202 includes "Schedule", "Results", "Weather", and "News" options 9204. Window 9206 includes a listing of each available race track and the starting time for the first race at that track. When the user selects "Schedule" option 9204 from tab 9202, a "Racing Schedule" tab 9302 is displayed as shown in screen 9300 of FIG. 93. Using tab 9302, the user can select a day for which racing schedule information is desired. To view days other than the days shown, the user can preferably scroll past the first and last days listed. Once a day has been selected, window 9206 displays the racing schedule information for the selected day.

Figure 94:
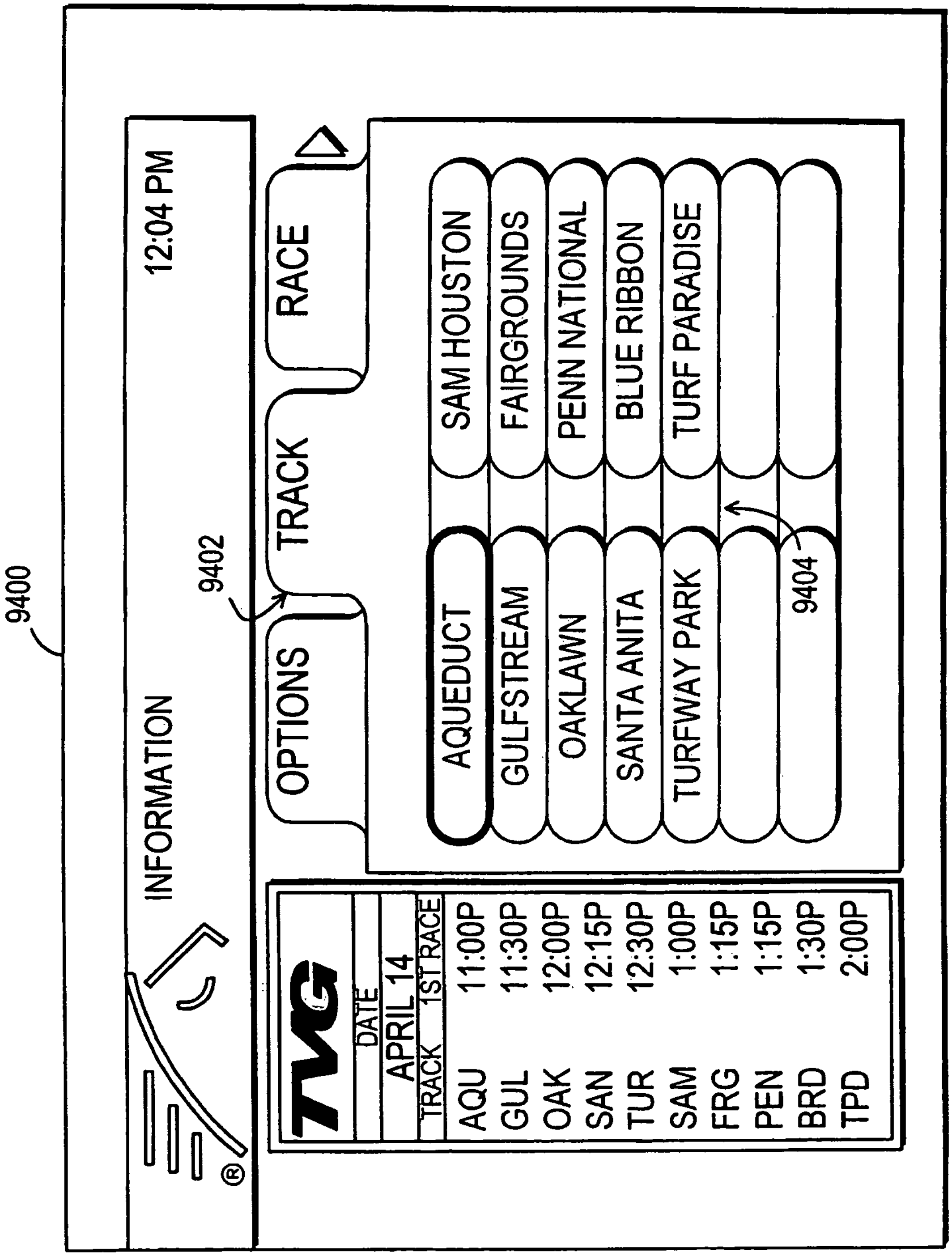
Figure 95:
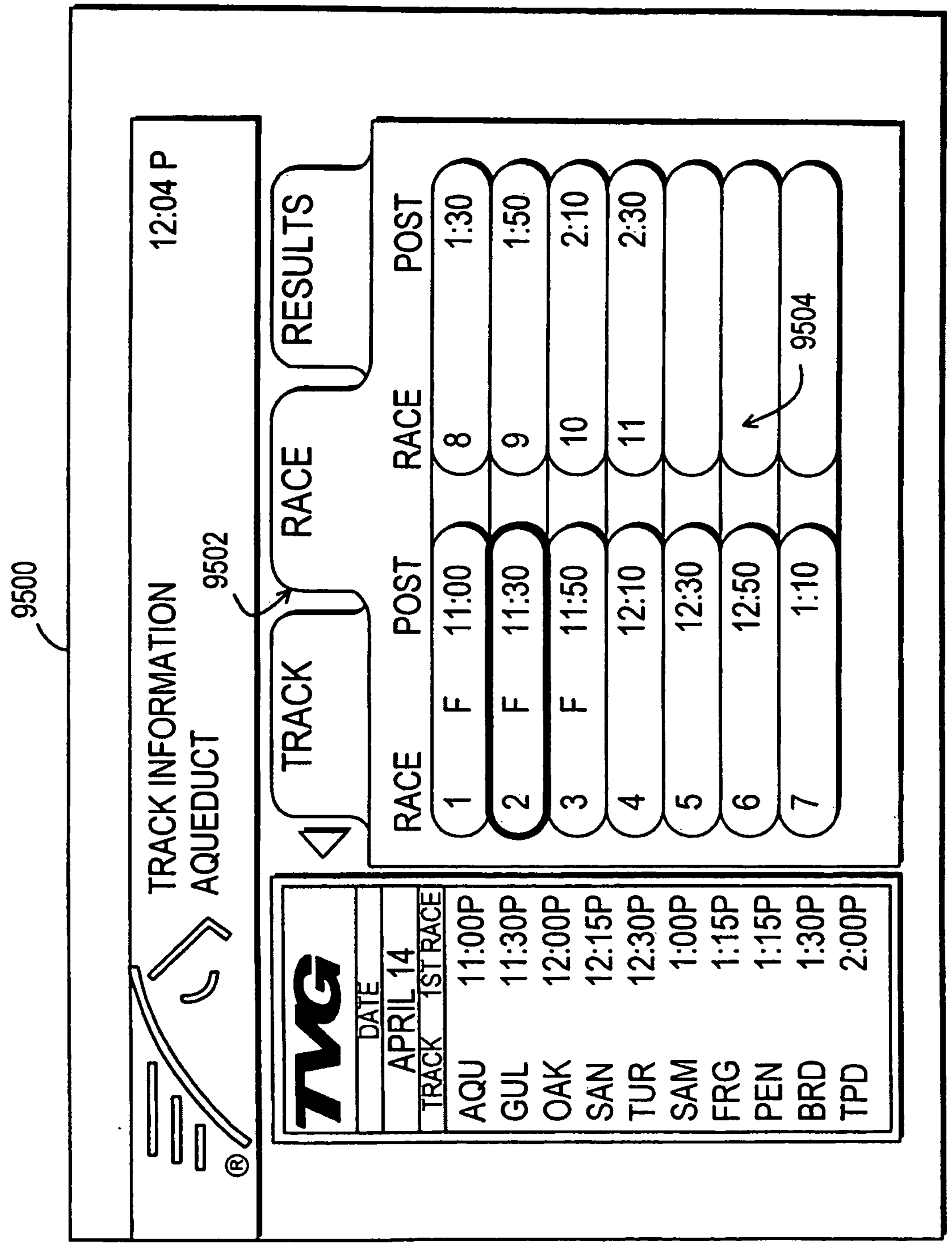

If the user selects "Results" option 9204 from tab 9202, the user interface first displays a "Track" selection tab 9402 as illustrated in screen 9400 of FIG. 94. Using this tab, the user can select a race track from track options 9404 for which results data is desired. Once the user has selected a track, the user interface prompts the user to select a specific race from race options 9504 at that track using a "Race" selection tab 9502 as shown in screen 9500 in FIG. 95. Each race option 9504 may include a race number, an indicator that indicates if the race is finished (as shown "F"), and a post time. Because the user is seeking to display results, preferably only races that have been completed may be selected.

Figure 96:
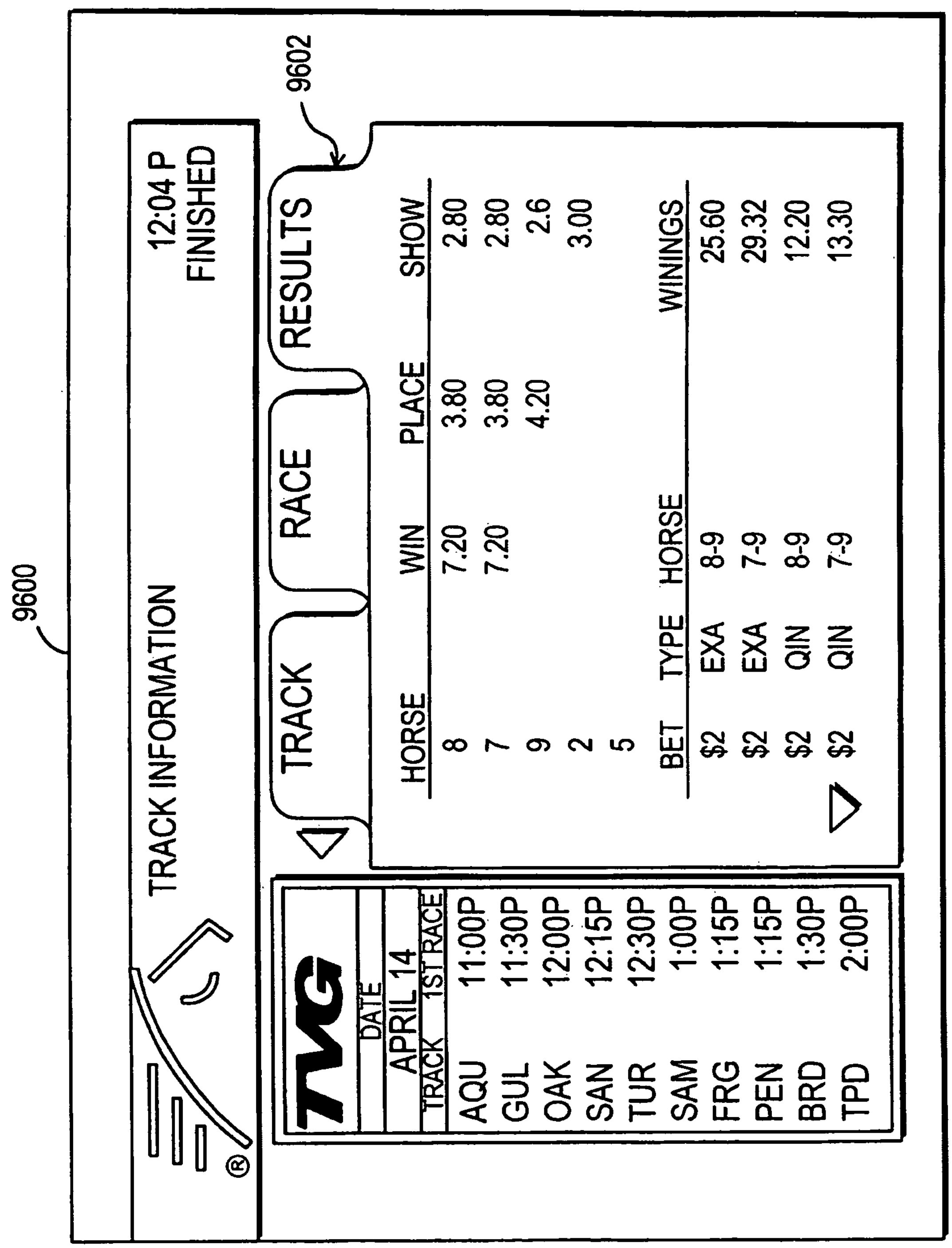

Once the user has selected a race, screen 9600 as shown in FIG. 96 is displayed. As can be seen screen 9600 includes a "Results" tab 9602 that may include a listing of the first five (or any suitable number) of finishing horses and the payouts for those horses in the win, place, and show wager types with a $2 bet. Tab 9602 may also include a listing of the payouts for other types of bets such as exacta, quinella, etc.

Figure 97:
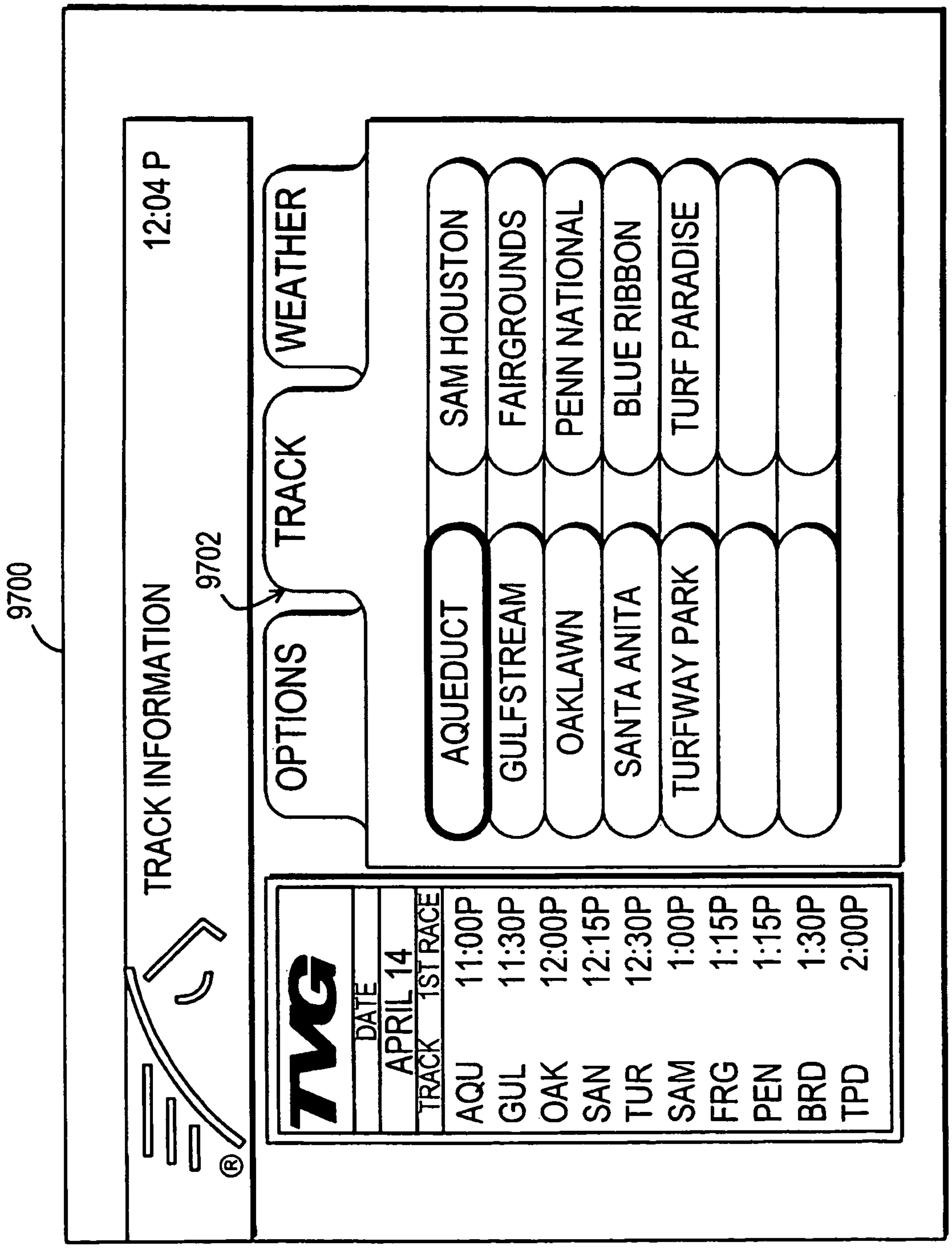
Figure 98:
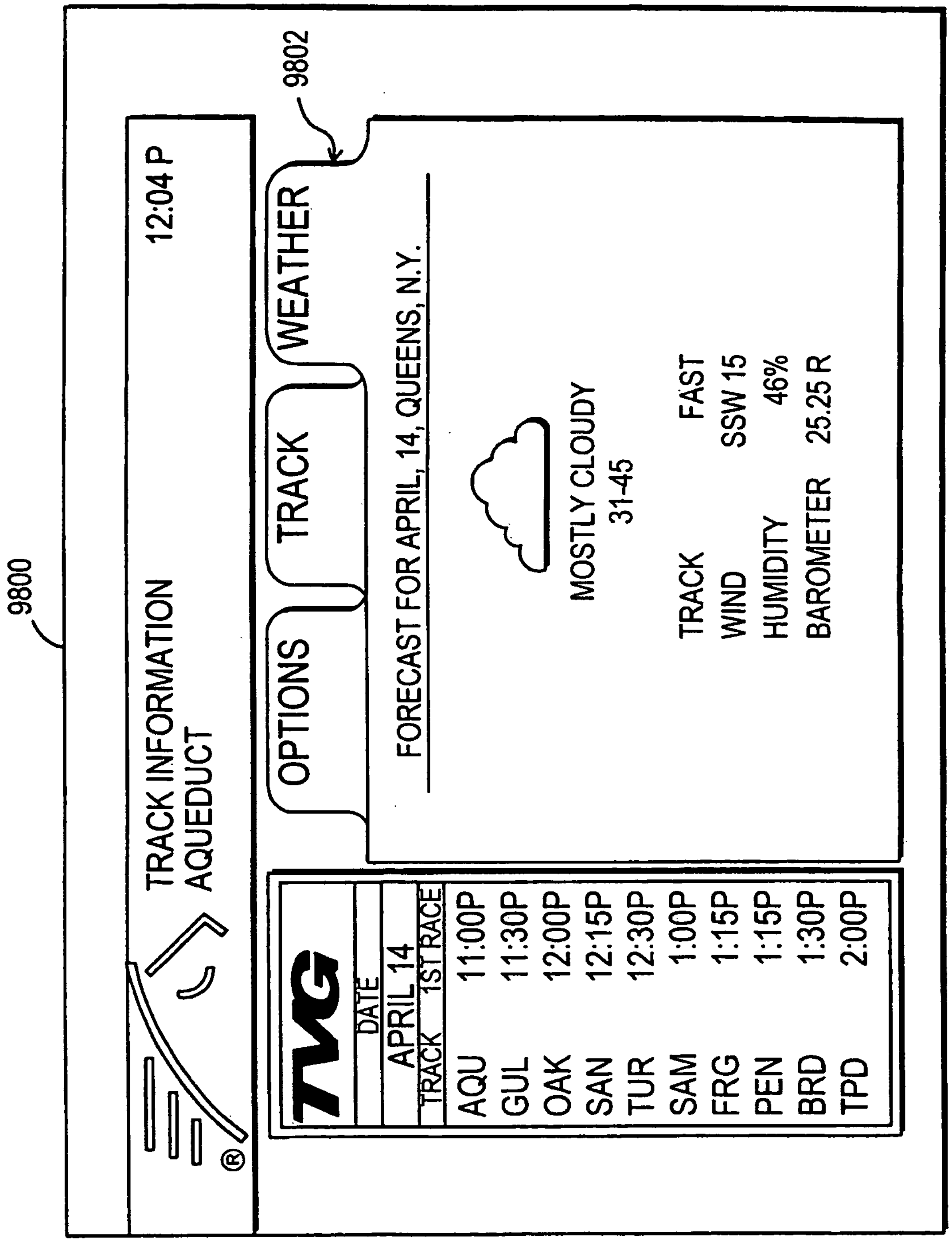

If the user selects "Weather" option 9204 from options tab 9202 (FIG. 92), the user interface presents a "Track" selection tab 9702 as shown in screen 9700 of FIG. 97. Using tab 9702, the user may then select a track for which the user would like weather information. Once the user has selected a track, the user interface displays a weather tab 9802 that displays weather information for the selected track as shown in screen 9800 of FIG. 98. As shown, this weather information may be forecast data or current condition data, and may include an indication of the date, city, cloud coverage, temperature, track condition, wind level and direction, humidity, barometric pressure, and any other suitable information.

Figure 99:
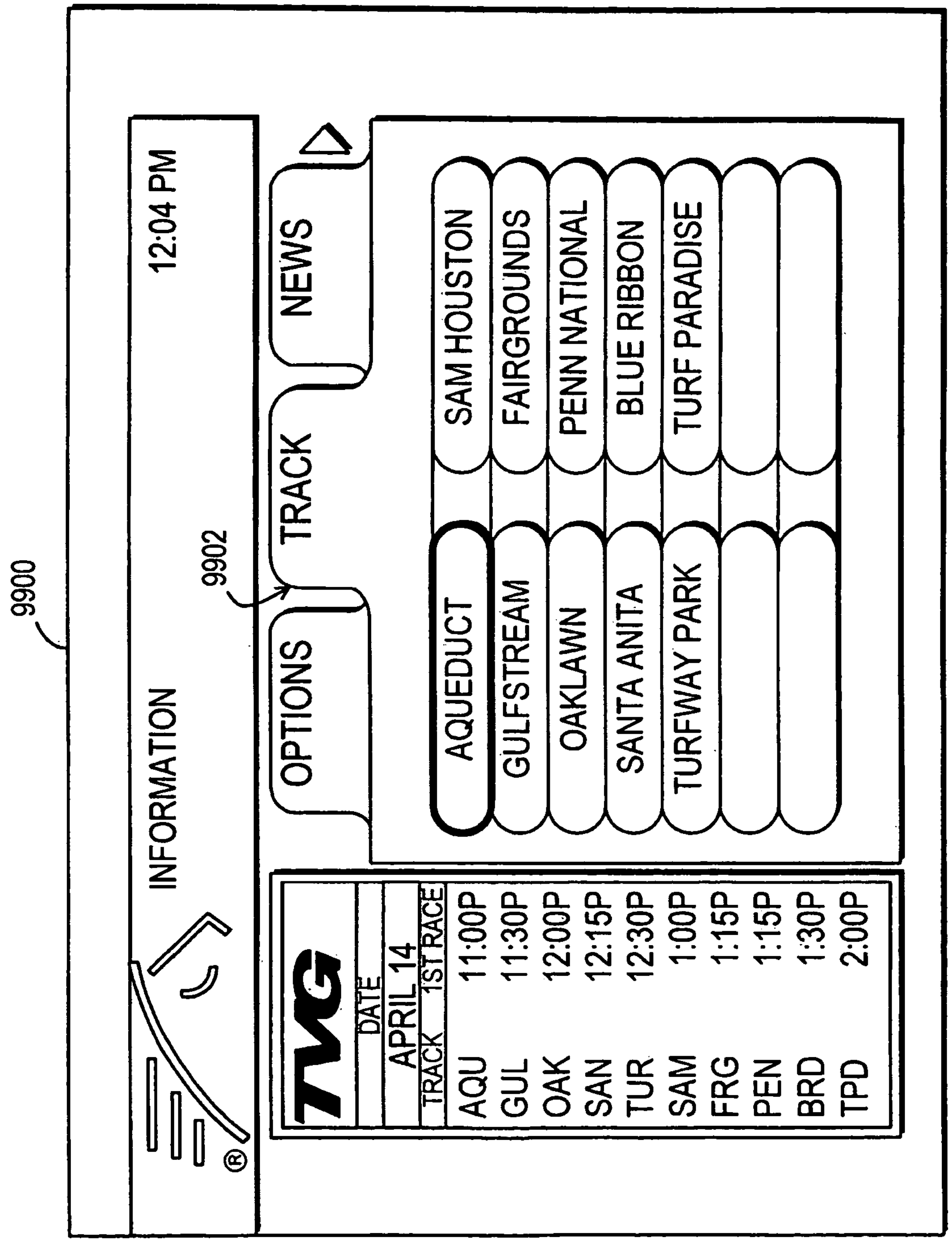
Figure 100:
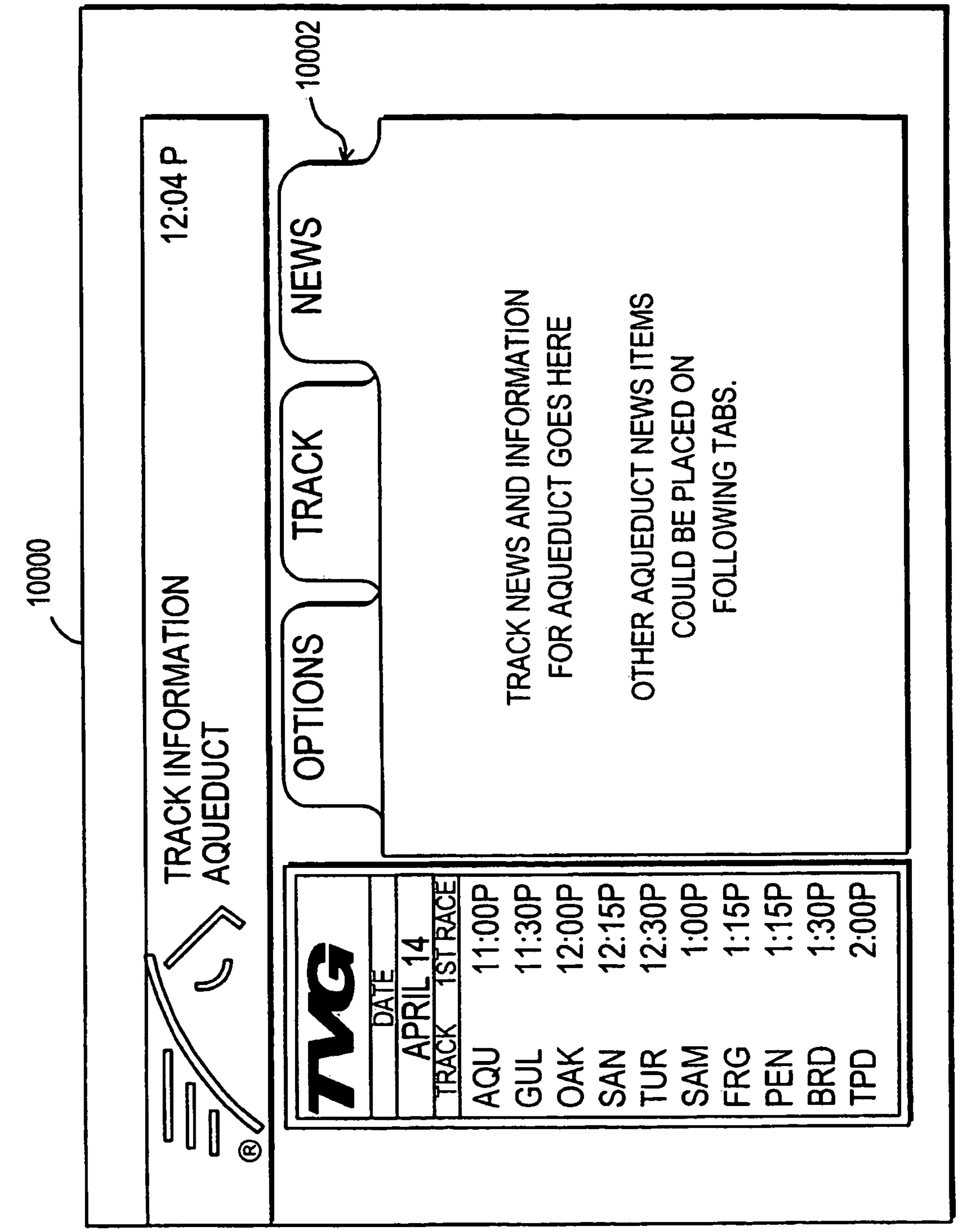

If the user selects "News" option 9204 from tab 9202 (FIG. 92), the user interface presents a "Track" selection tab 9902 as shown in screen 9900 of FIG. 99. Using tab 9902, the user selects a track for which the user would like news information. Once the user has selected a track, the user interface then displays a "News" tab 10002 that displays any track related news that may be of interest to the user, as shown in screen 10000 of FIG. 100.

Figure 101:
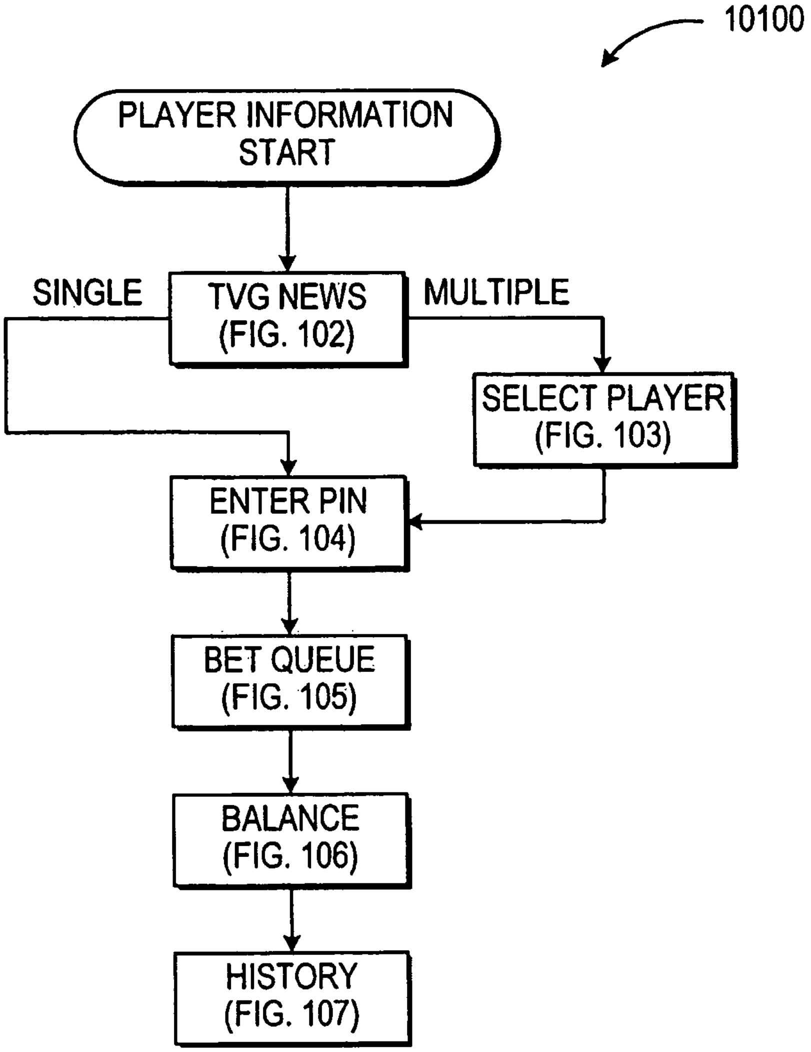
FIG. 101 is a flow diagram illustrating a player information mode that may be presented in a set-top box or computer user interface in accordance with one embodiment of the present invention.
Figure 102:
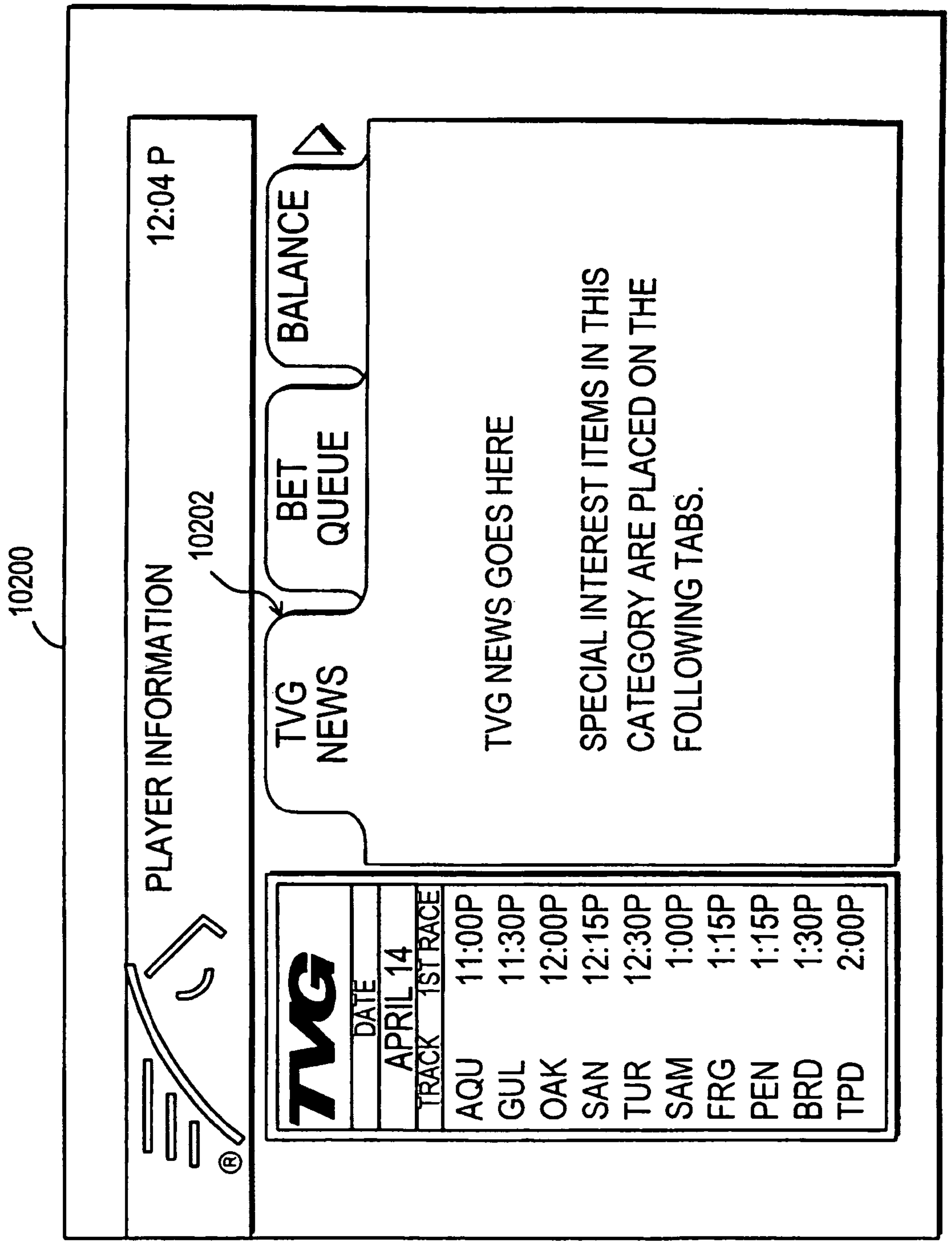
FIGS. 102-107 are illustrations of screen displays that may be presented as part of the player information mode in a set-top box or computer user interface in accordance with one embodiment of the present invention.
Figure 103:
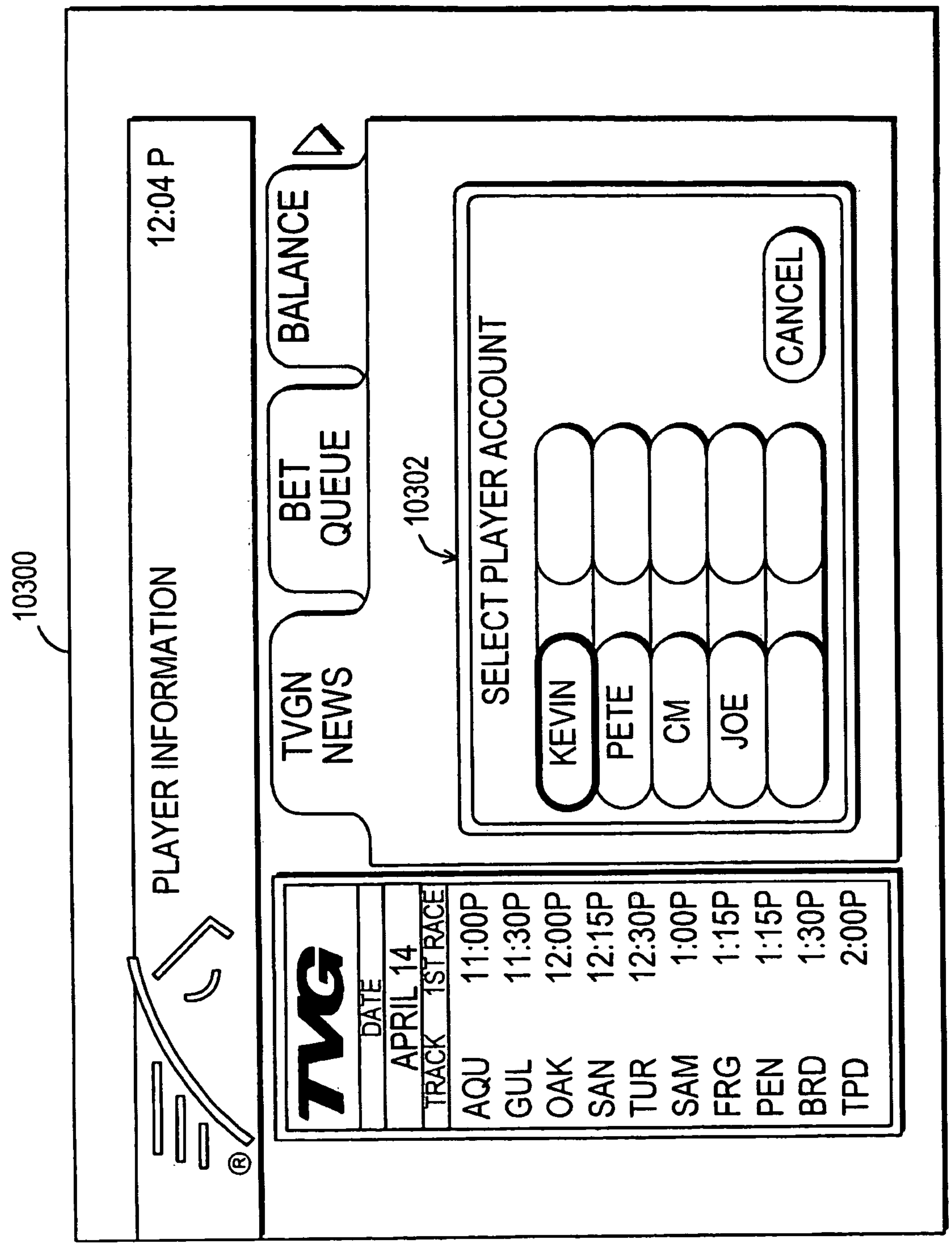

To receive information relating to a player's accounts, the user may select the "Player Information" option 712 from main menu 702 (FIG. 7). Once the user has selected option 712, the user interface presents a series 10100 of screen displays 10200-10700 (FIGS. 102-107) as shown in FIG. 101. More particularly, a "News" tab 10202 may first be displayed as shown in screen 10200 of FIG. 102. Tab 10202 may include any news related to the service provided by the operator of system 100 (FIG. 1). This information may be particular to the user or one of the player accounts, or may be general information. If multiple players are currently accessing the user interface, the user interface preferably next prompts the user to identify a player account using player selection window 10302 as shown in screen 10300 in FIG. 103.

Figure 104:
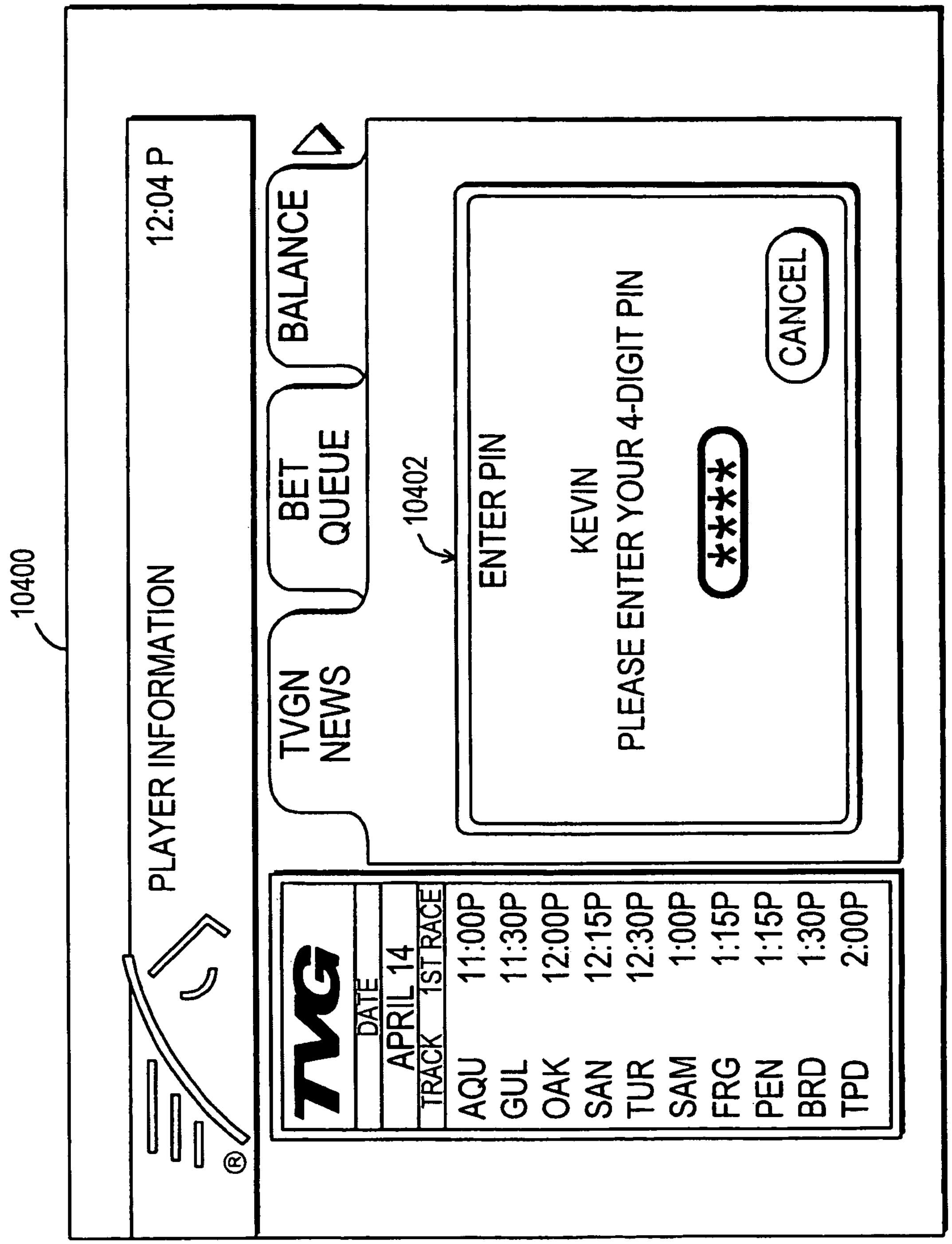

Once the user has selected a player account from window 10302 or if only a single player is accessing the system, then the user interface next asks the user to enter a pin for the current account using a pin-entry window 10402 as shown in screen 10400 in FIG. 104. Once the user has entered the proper pin, the user interface next allows the user to display a "Bet Queue" tab 10502 as shown in screen 10500 of FIG. 105. Tab 10502 operates substantially the same as tab 3602 described above in connection with FIG. 36. The user may also display a "Balance" tab 10602 as shown in screen 10600 of FIG. 106. As illustrated, tab 10602 shows the current balance of the selected player's account. The user may further display a "History" tab 10702 as shown in screen 10700 of FIG. 107. As shown, tab 10702 shows the selected player's wagering history. This wagering history may be for only a limited period of time, and may include the date, the track, the race, the per bet amount, the type, the selected horses, the total cost, and any other suitable information for each wager in the player's history (or a portion thereof). For example, the history display may only list bets having time stamps that were assigned to those bets by wagering data hub 102, subscriber management system 110, or a tote company 114 during a certain period of time (e.g., at least ten minutes ago through to seven days ago).

Figure 105:
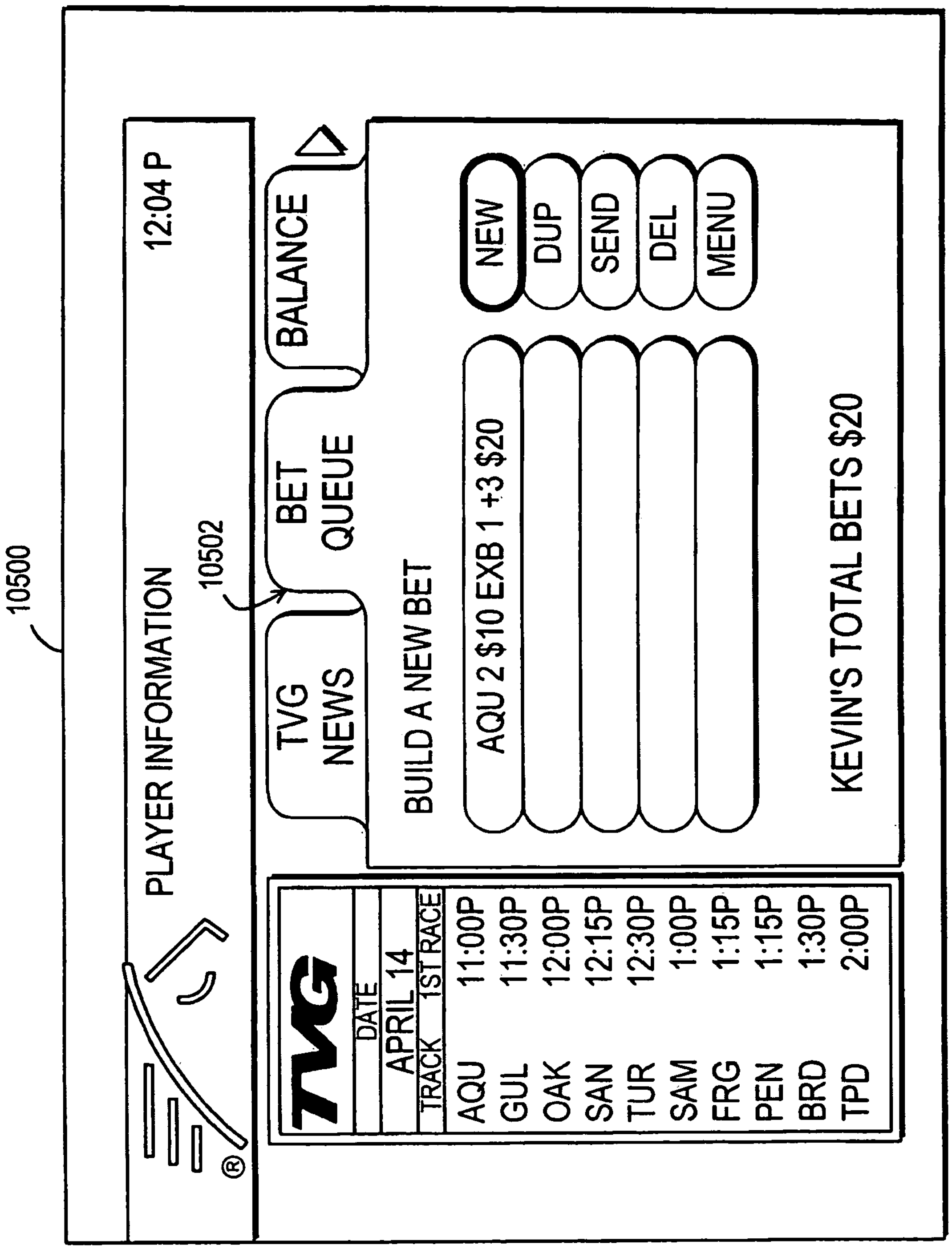
Figure 106:
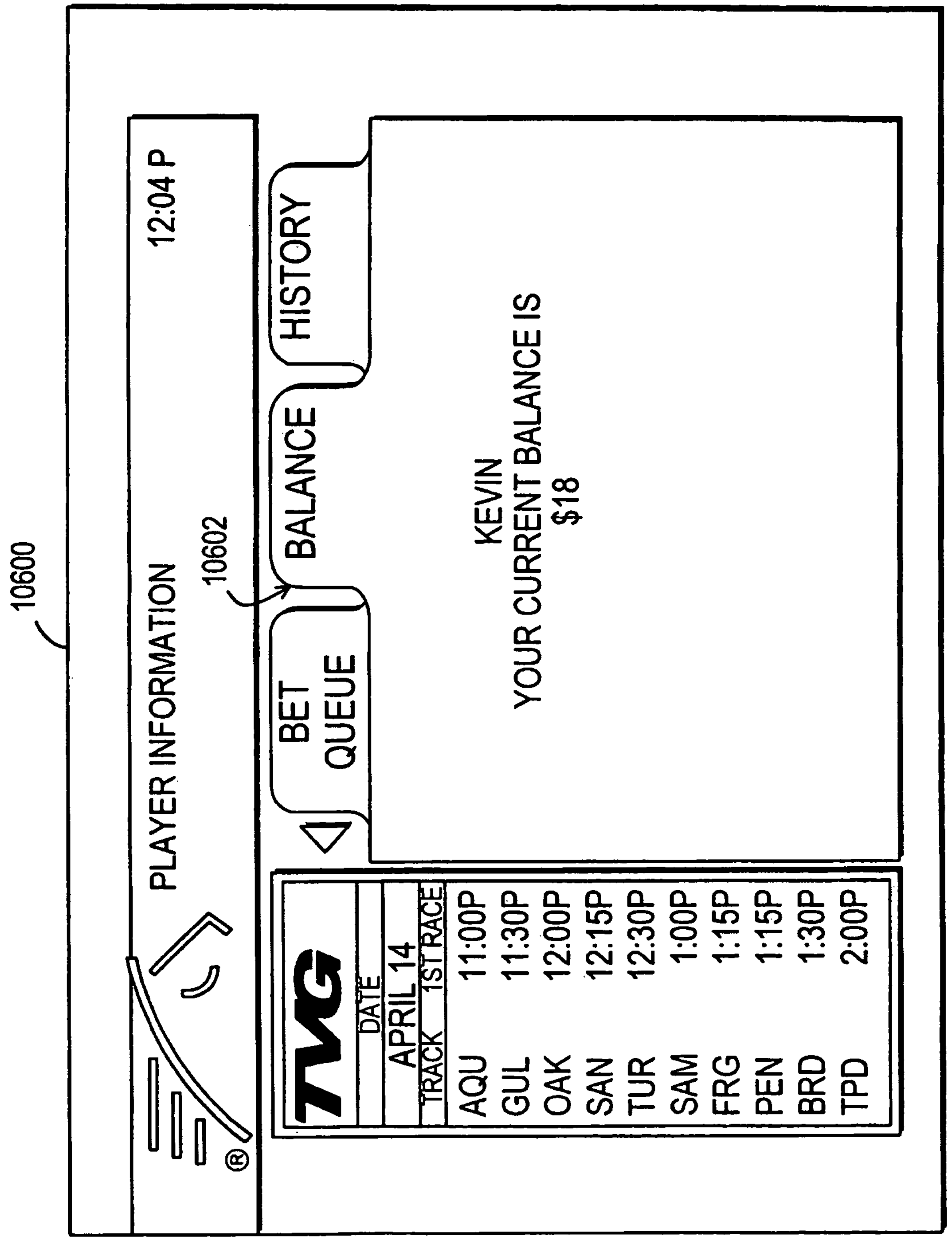
Figure 107:
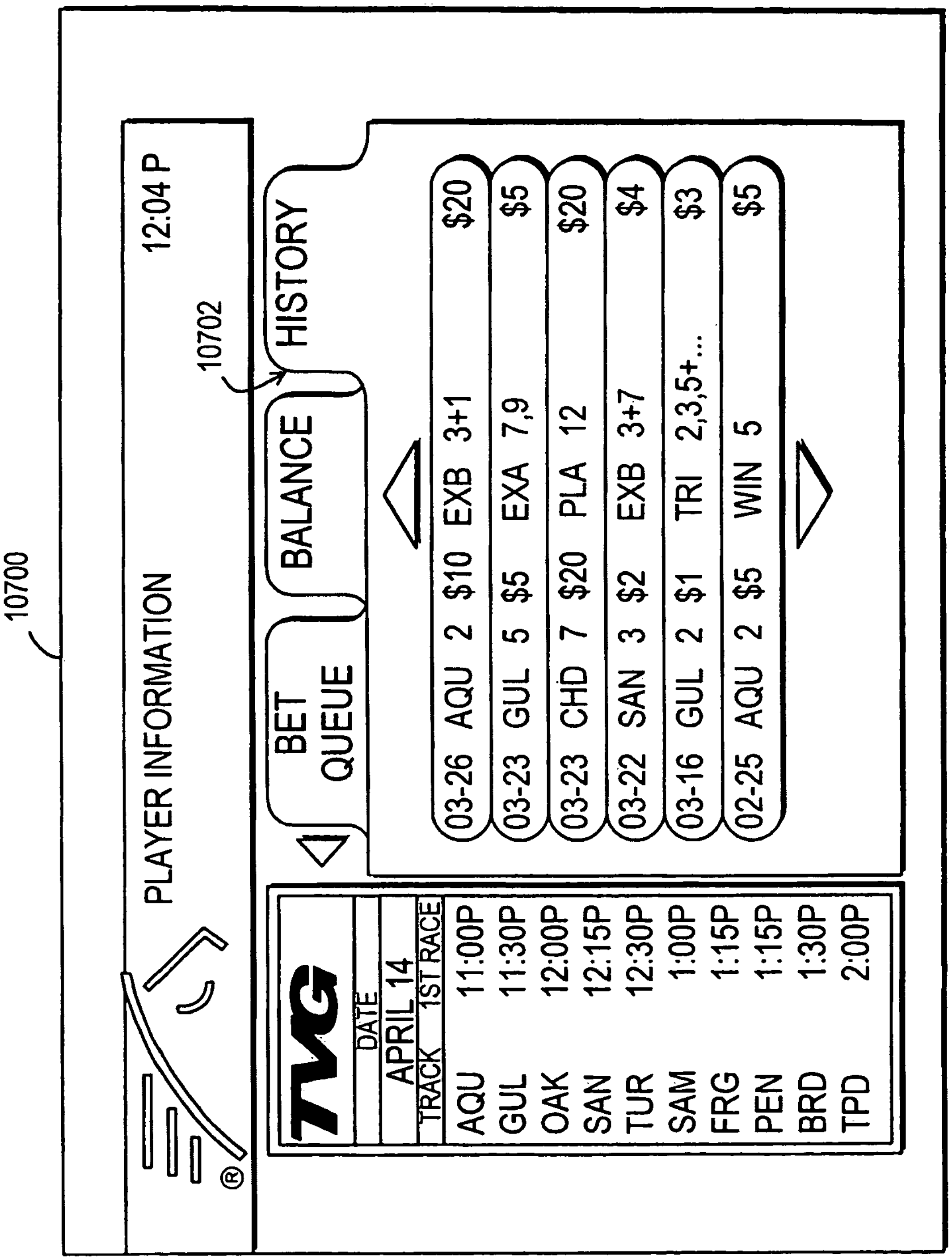

As explained above in connection with FIGS. 1-3, by providing centralized data storage using wagering data hub 102 and subscriber management system 110, the player account information displayed in FIGS. 105-107 may reflect wagers made using a set-top box 104, a telephone 106, and/or a computer 108.

Figure 108:
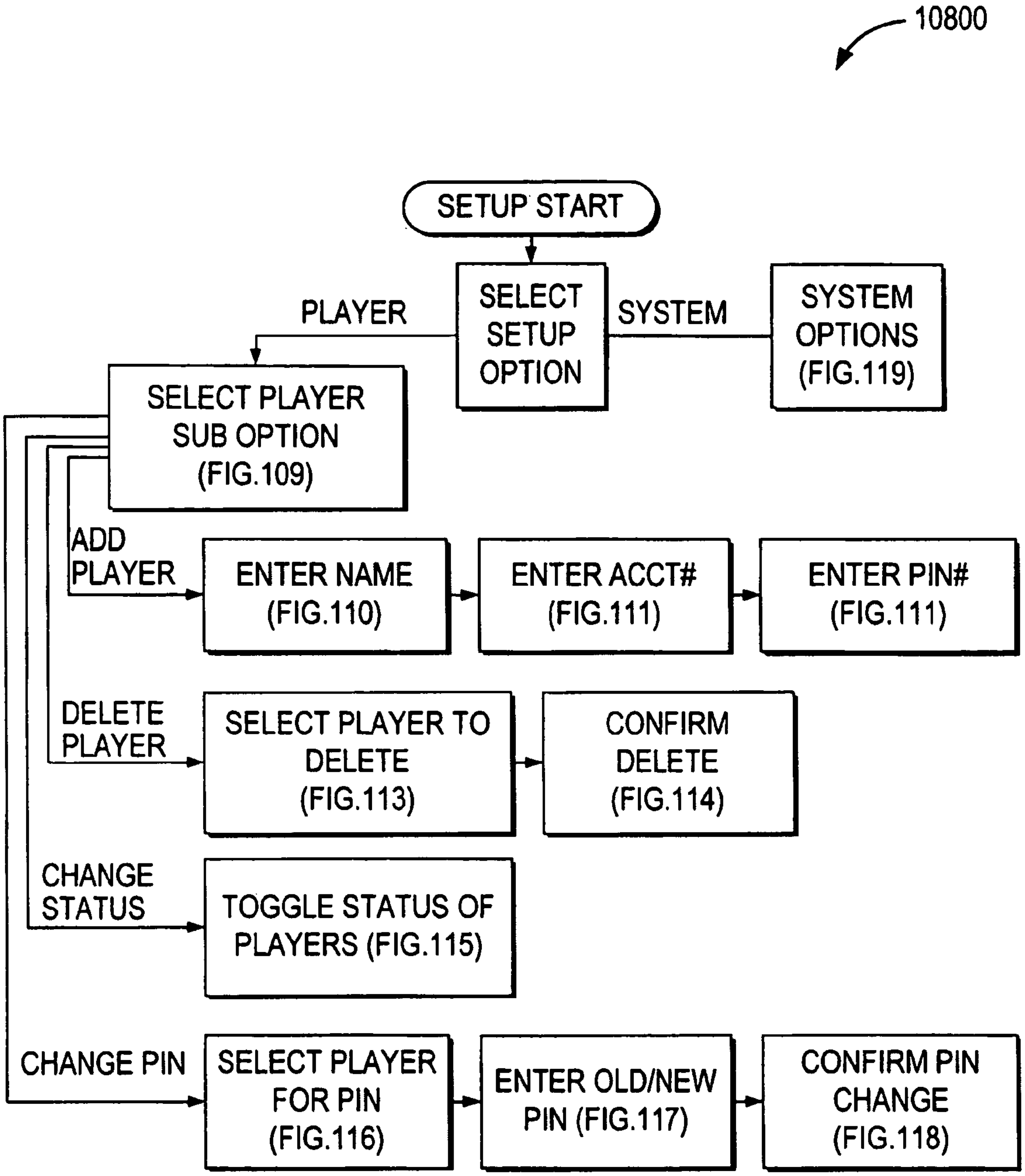
FIG. 108 is a flow diagram illustrating a setup mode that may be presented in a set-top box or computer user interface in accordance with one embodiment of the present invention.
Figure 109:
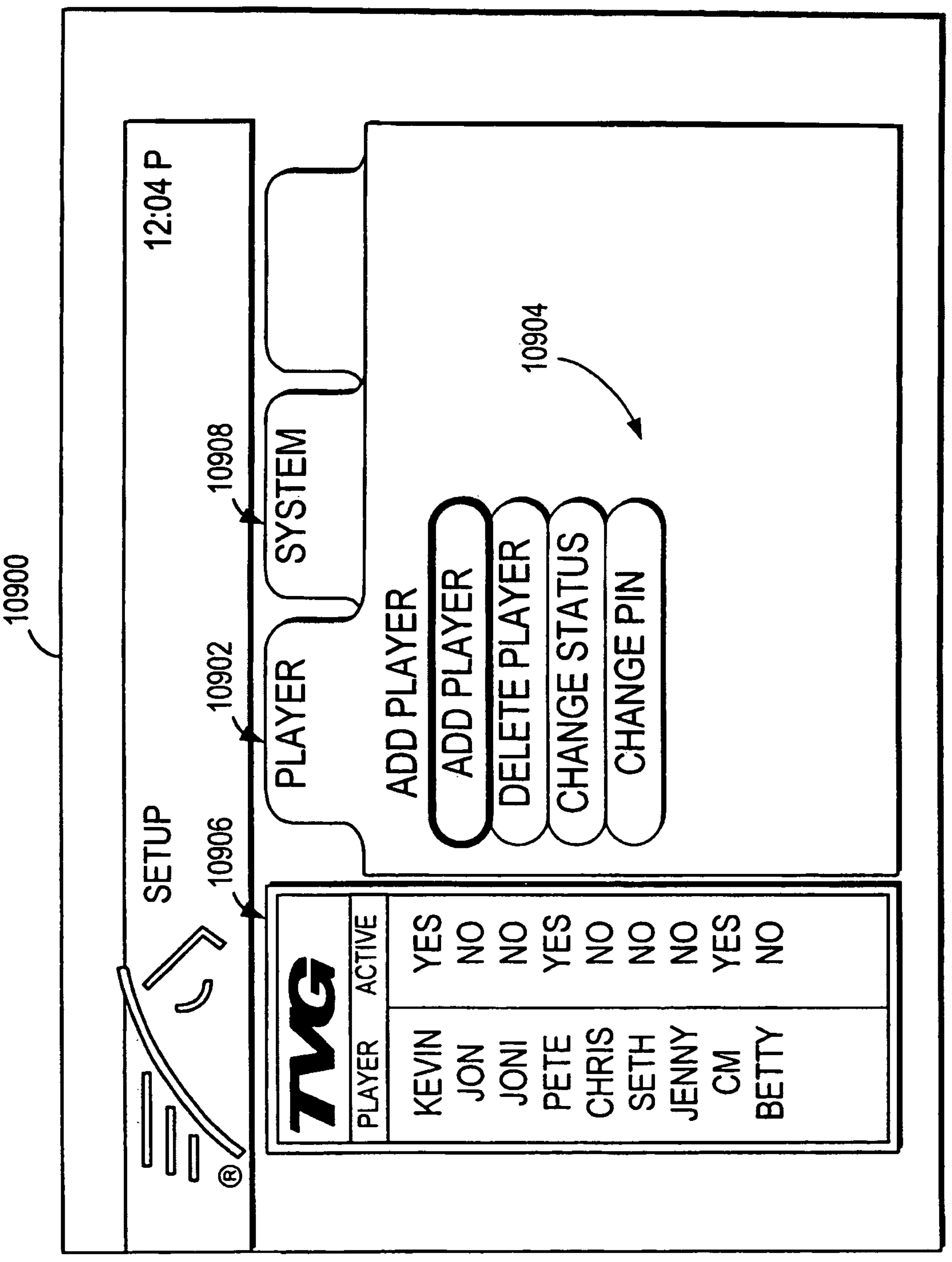
FIGS. 109-119 are illustrations of screen displays that may be presented as part of the setup mode in a set-top box or computer user interface in accordance with one embodiment of the present invention.
Figure 110:
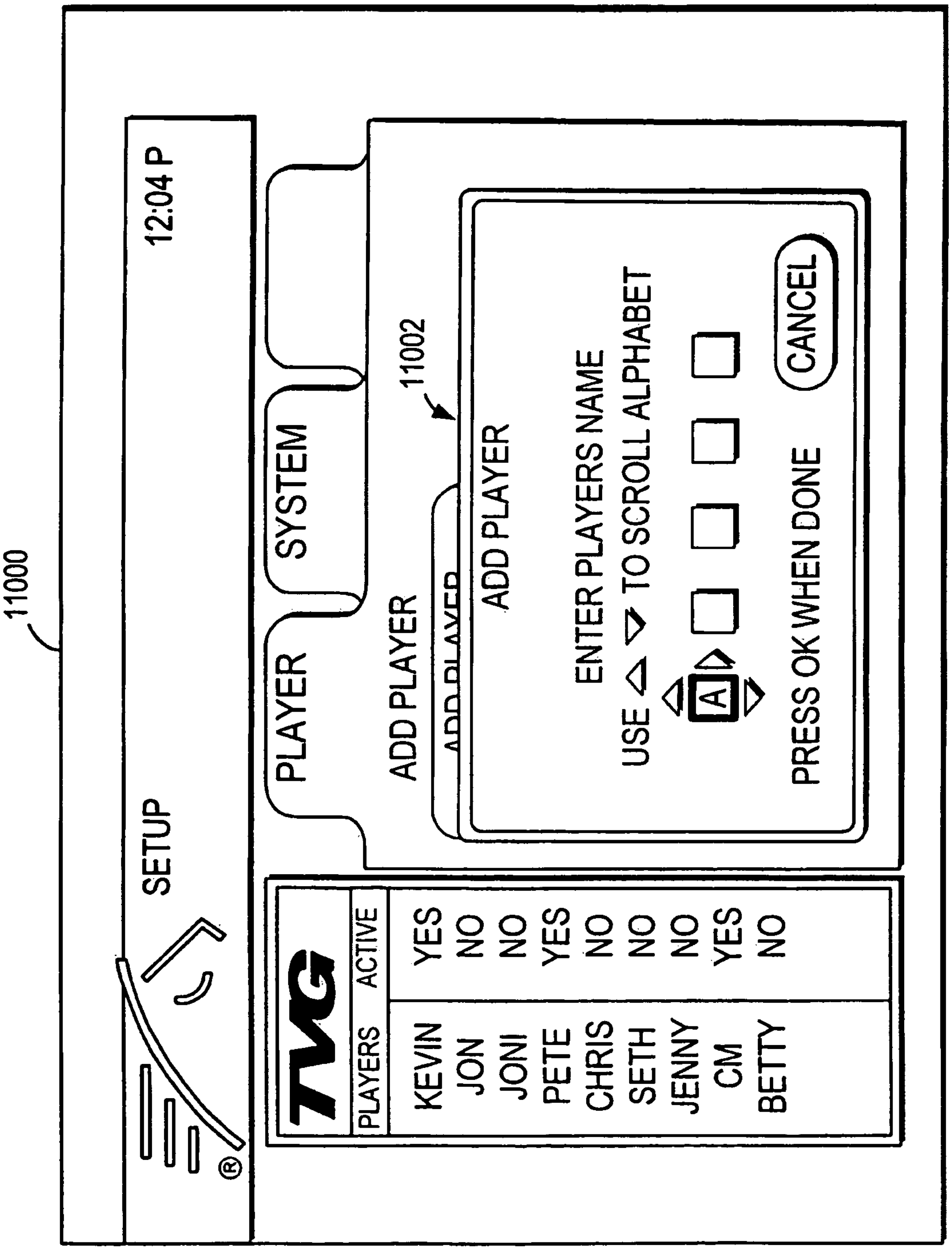
Figure 111:
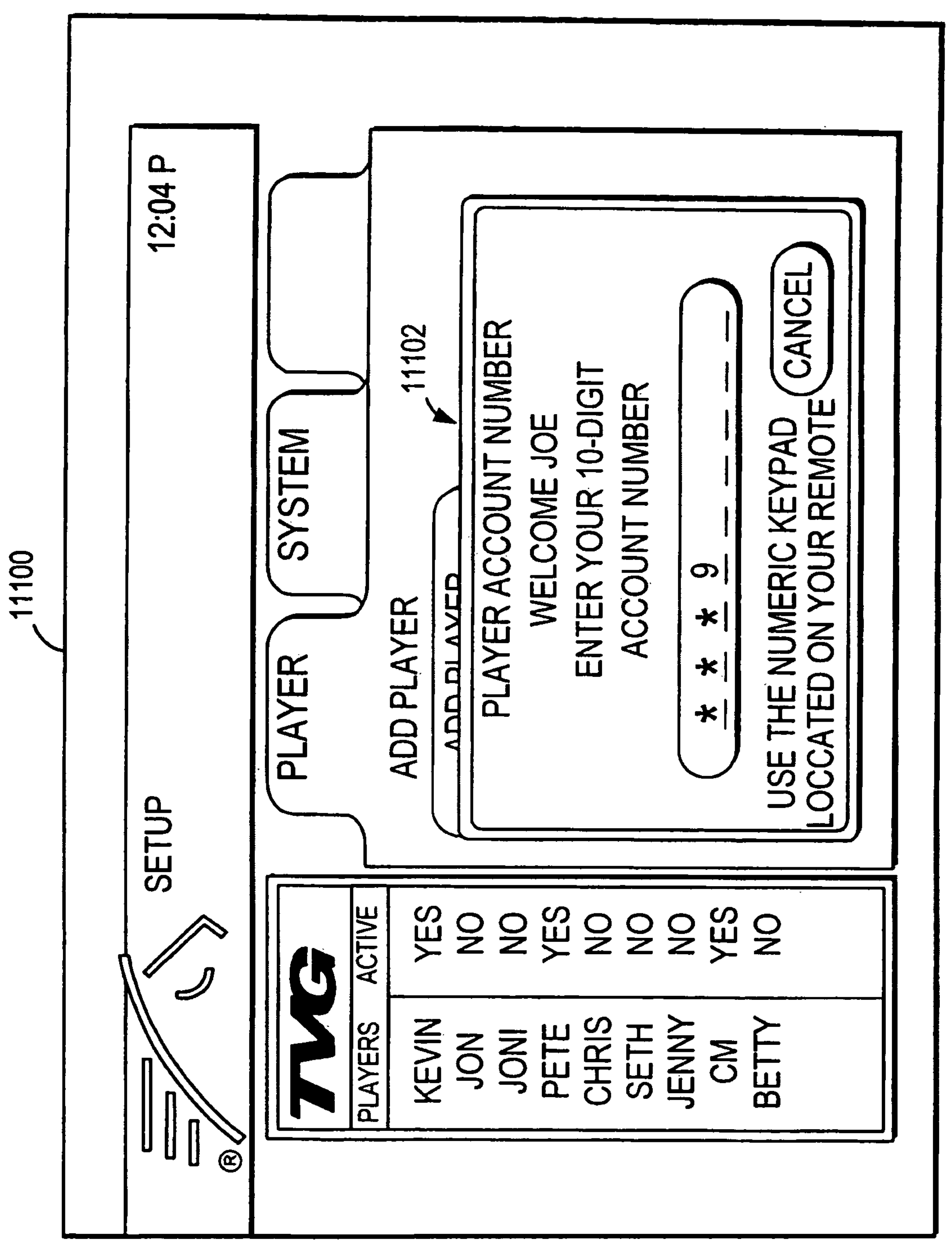
Figure 112:
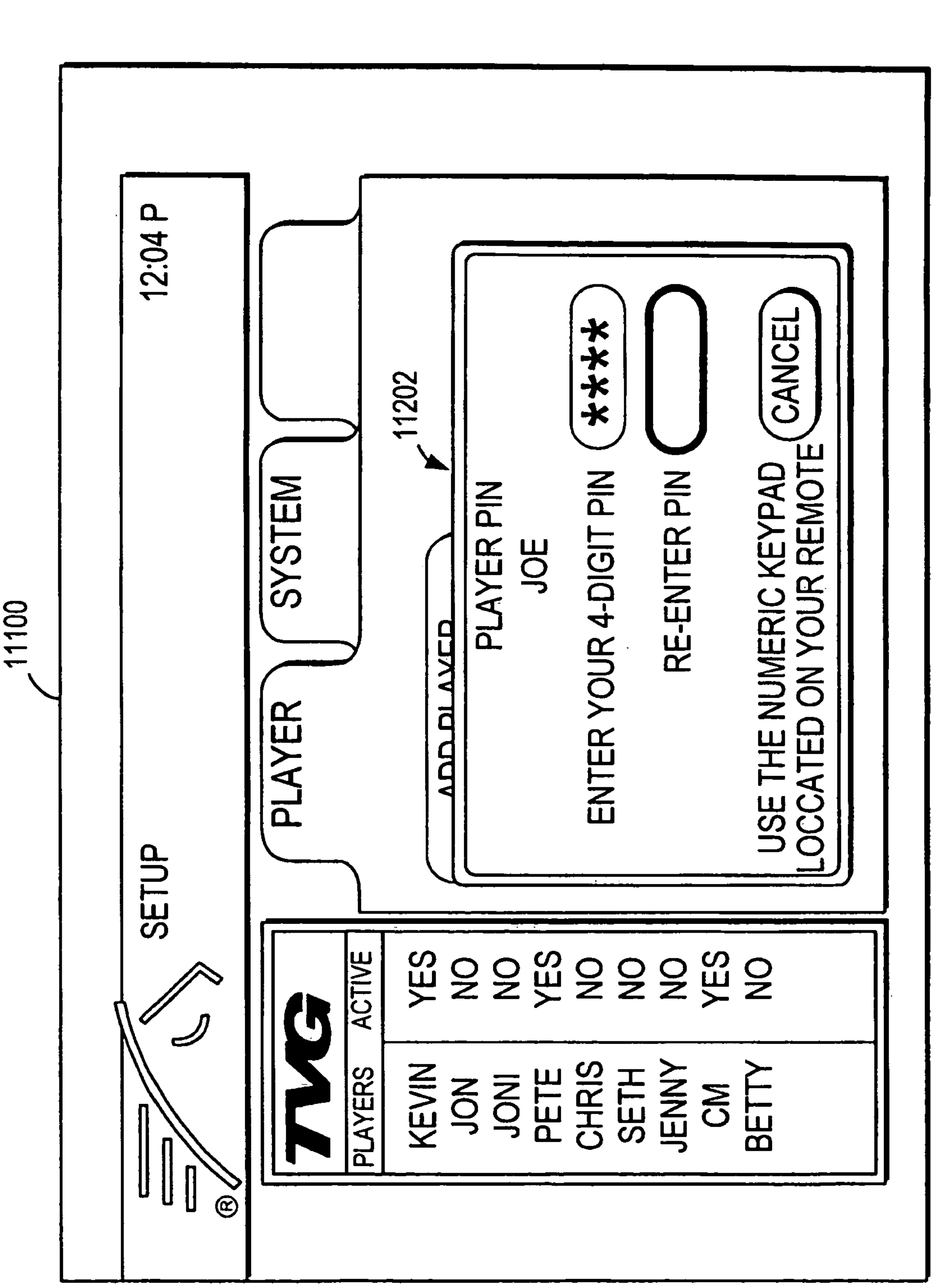

If the user selects "Setup" option 714 from main menu 702 (FIG. 7), the user interface enables the user to maintain the player accounts and telephone settings. As shown in FIG. 108, upon selecting option 714, the user interface enables the user to access series 10800 of screen displays 10900-11900 (FIGS. 109-119) as shown in FIG. 108. More particularly, after the user has selected option 714, screen 10900 as shown in FIG. 109 is displayed. Screen 10900 includes a "Player" options tab 10902, a "System" options tab 10908, and a players status window 10906. Players status window 10906 shows a list of the players setup in the user interface and whether those players are active.

"Players" options tab 10902 enables the user to add a player, delete a player, change the status of a player, and change the pin of a player. These functions are initiated by selecting one of options 10904. If the user selects "Add Player" option 10904, add player window 11002 is displayed as shown in screen 11000 of FIG. 110. Using window 11002, the user can enter the name of the player to be added. Next, using a player account window 11102 as shown in screen 11100 of FIG. 111, the user can enter the account number for the player. This account number may be a pre-arranged account number assigned by the operator of system 100 (FIG. 1), may be a credit card number, or may be any other suitable number to identify the owner of the player's account. Then, using player pin window 11202 as shown in screen 11200 of FIG. 112, the user can enter a pin for the new account. This pin is preferably entered twice to insure that it has been entered correctly. Finally, as shown in screen 11300 of FIG. 113, players status window 11304 is updated to show the new player "JOE".

Figure 113:
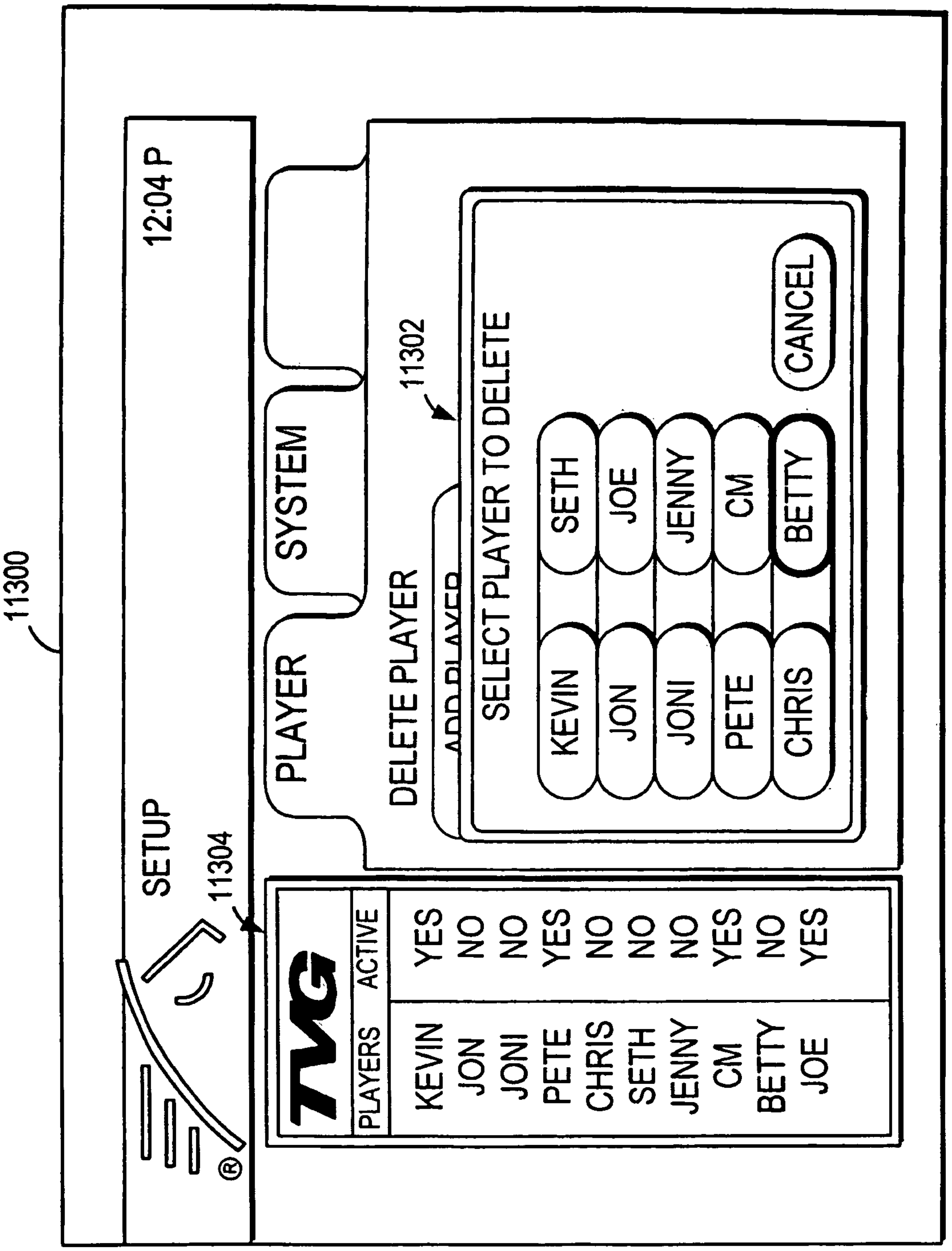
Figure 114:
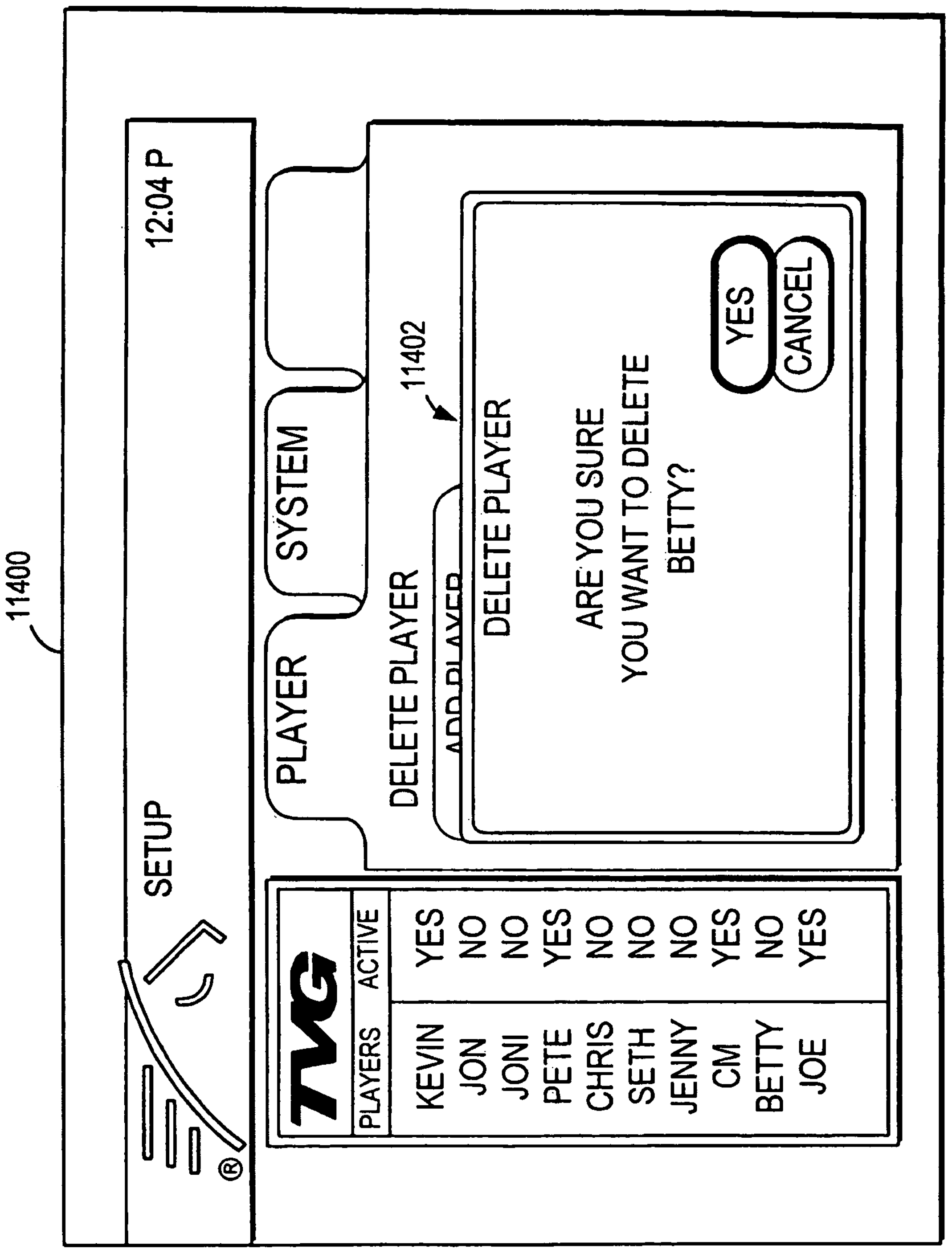

As also shown in screen 11300 of FIG. 113, if the user selects "Delete Player" option 10904 from tab 10902 (FIG. 109), a delete player window 11302 is displayed. Using window 11302, the user can then select the player to be deleted. Next, as shown in screen 11400 of FIG. 114, a delete player confirmation window 11402 will be displayed to confirm the user's player deletion choice. Upon selecting the "Yes" option in window 11402, the selected player (as shown "BETTY") will be deleted. This deletion will then be shown in players status window 11504 as illustrated in screen 11500 of FIG. 115. In preferred embodiments of the present invention, only selected players may be authorized to delete player accounts. For example, the first player account entered into the user interface may be designated as the interface owner. Whenever a user then attempts to delete a player account, the user may be prompted to enter a pin that corresponds to the owner's account. As another example, many or all players may be authorized to delete player accounts.

Figure 115:
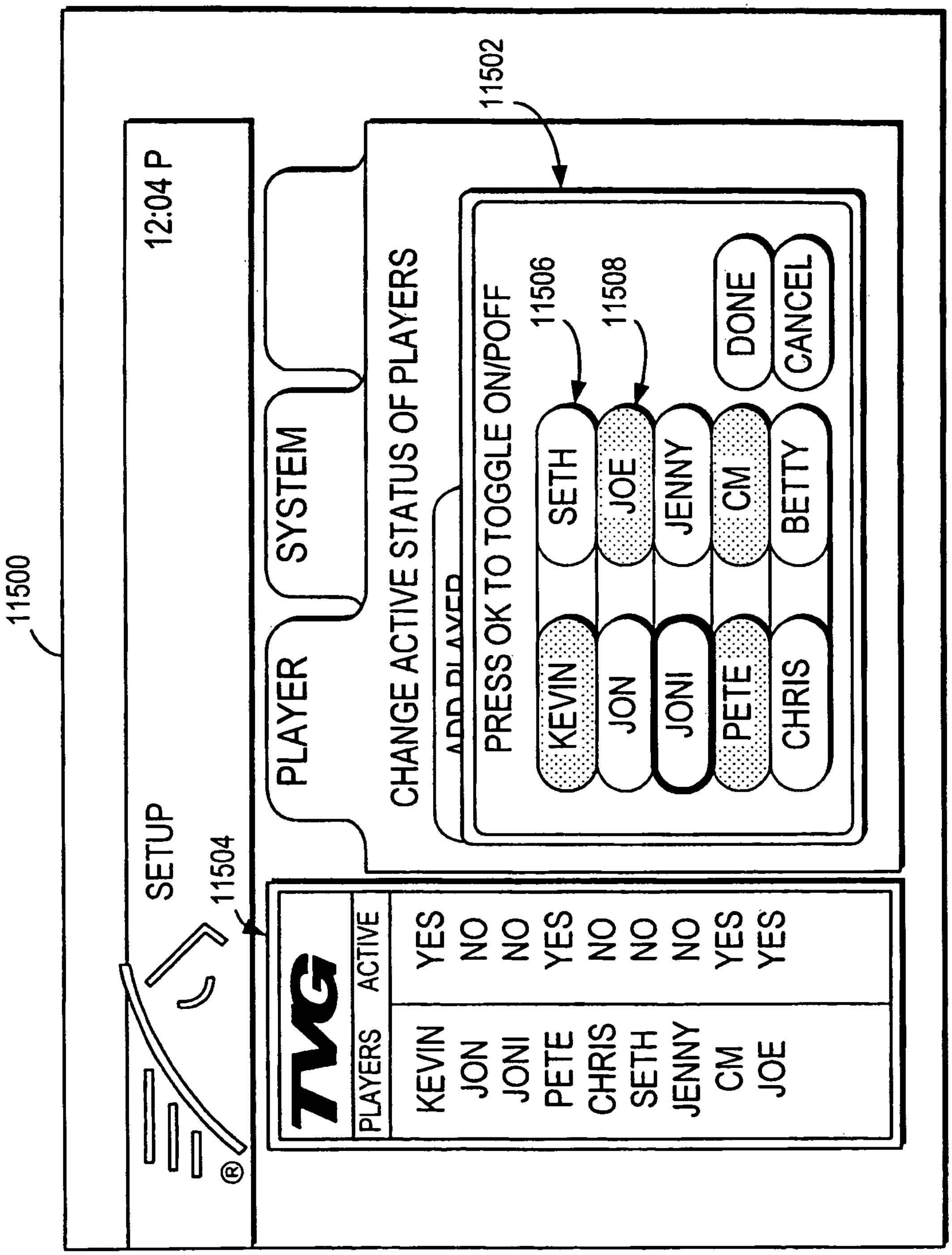
Figure 116:
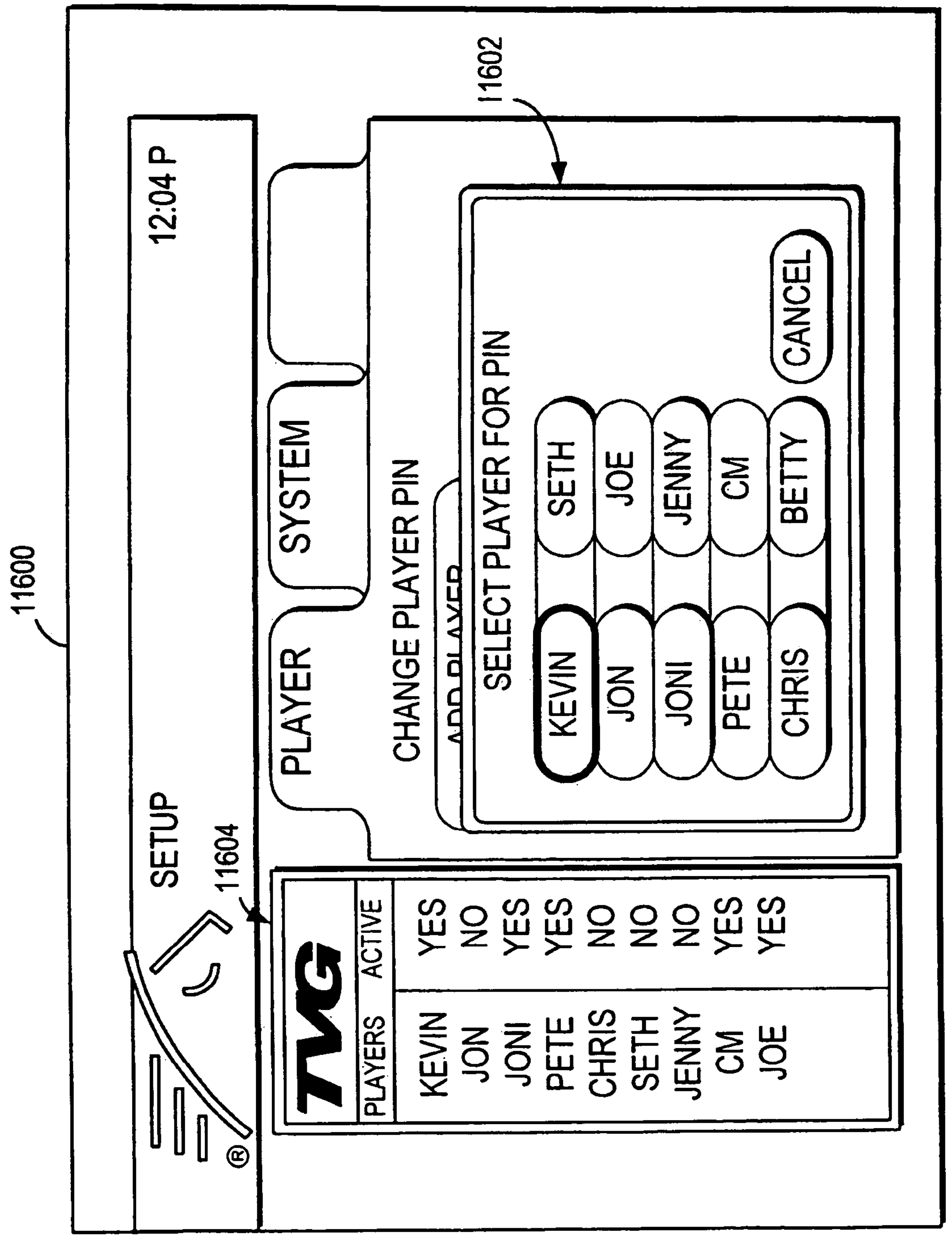
Figure 117:
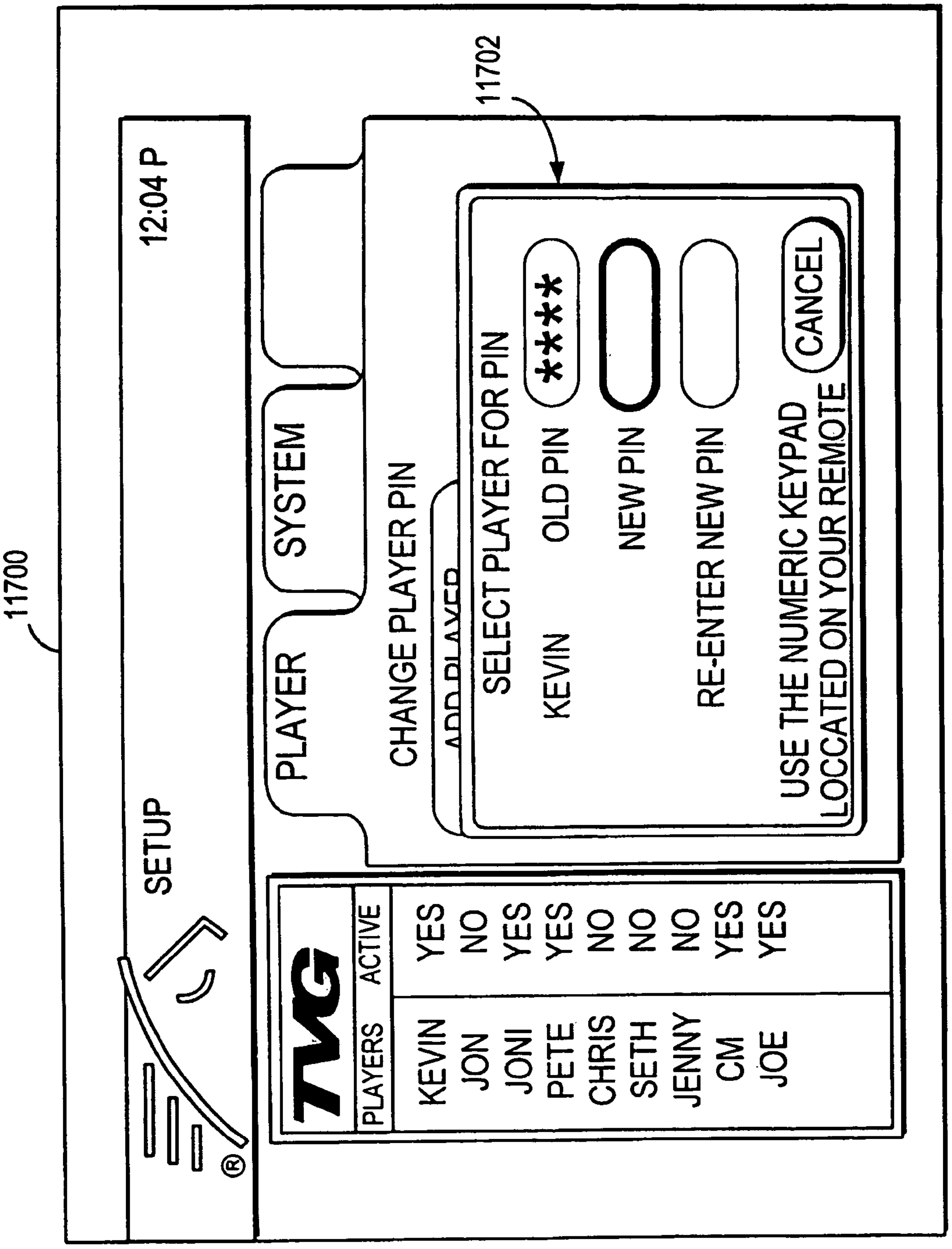
Figure 118:
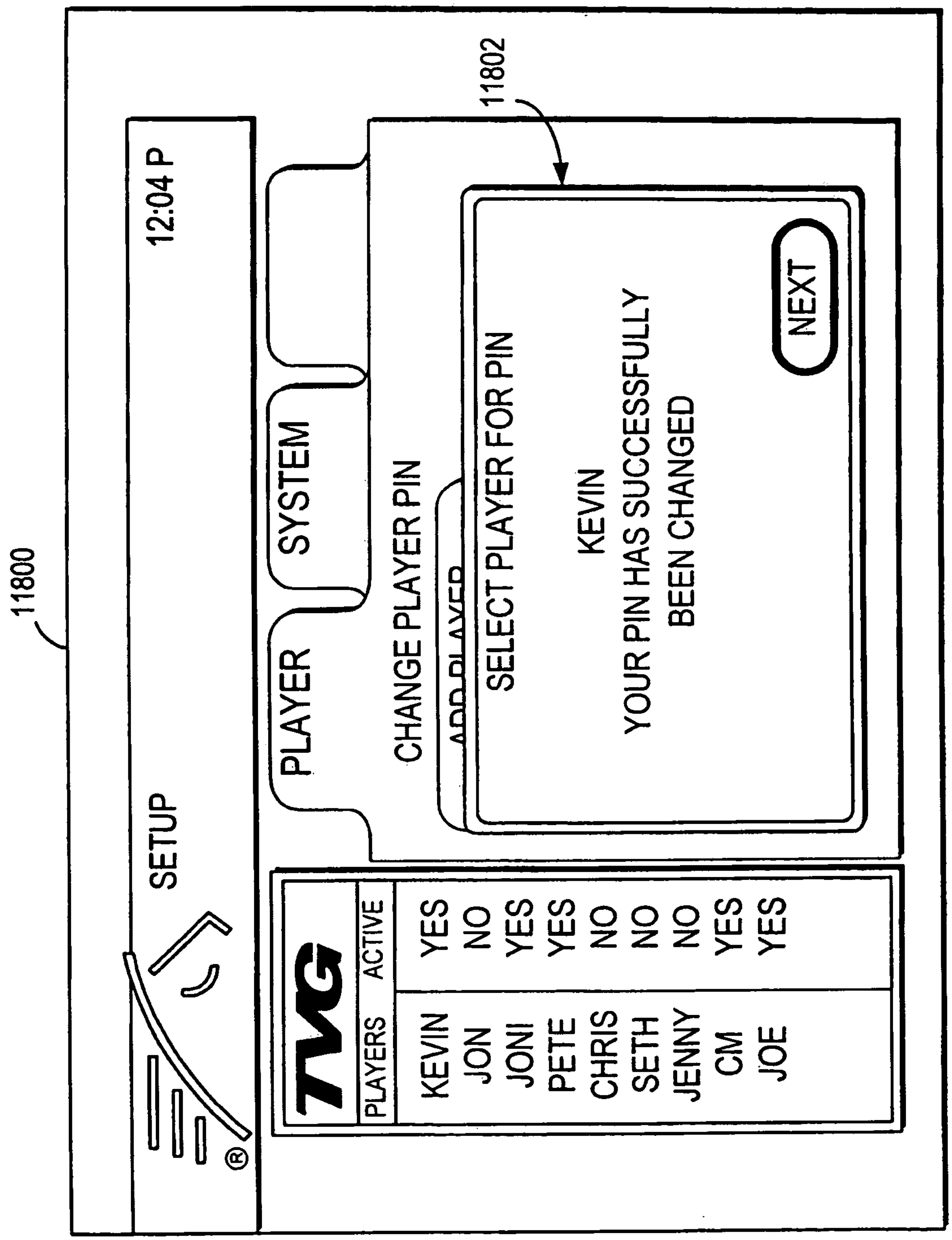

If the user selects "Change Status" option 10904 from tab 10902 (FIG. 109), toggle status window 11502 will be displayed as shown in screen 11500 of FIG. 115. In some embodiments, player account names shown in a dark color (e.g., name 11506) are not active and player account names in a light color (e.g., name 11508) are active. By selecting any player name, the status of the account will change from active to not active or vice versa. As shown in players status window 11604 in screen 11600 of FIG. 116, by toggling the status of player "JONI", the "active" status for this player was changed from "NO" to "YES".

In order to change the pin associated with a player account, the user may select "Change Pin" option 10904 of tab 10902 (FIG. 109). Upon selecting option 10904, player selection window 11602 is displayed as shown in screen 11600 of FIG. 116. After selecting the player account for which the pin is to be changed, a change player pin window 11702 is displayed as shown in screen 11700 of FIG. 117. Once the user has entered the old pin for the account and has entered the new pin for the account twice, the pin change is confirmed using pin change confirmation window 11802 as shown in screen 11800 of FIG. 118.

Figure 119:
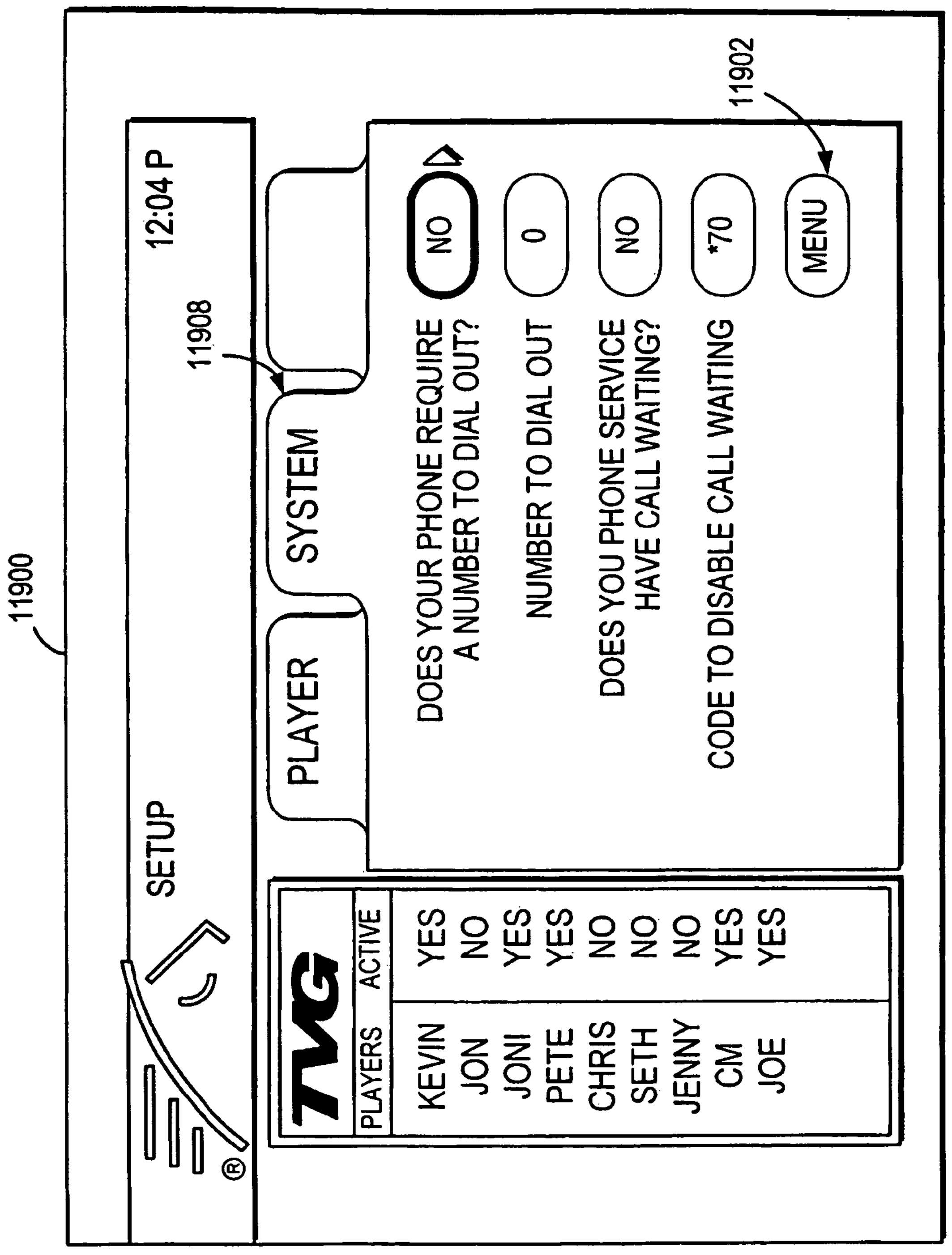

If the user selects "System" option tab 10908 from screen 10900 of FIG. 109, the remainder of the tab is displayed as shown in screen 11900 of FIG. 119. Using tab 10908, the user can indicate whether a number is needed to dial out and, if so, what that number is. The user can also indicate whether the telephone service has a "call waiting" feature and, if so, what the disable code is for that service. Finally, the user can select a "Menu" option 11902 in tab 10908 to activate a drop down menu as described in FIGS. 120-122.

Figure 120:
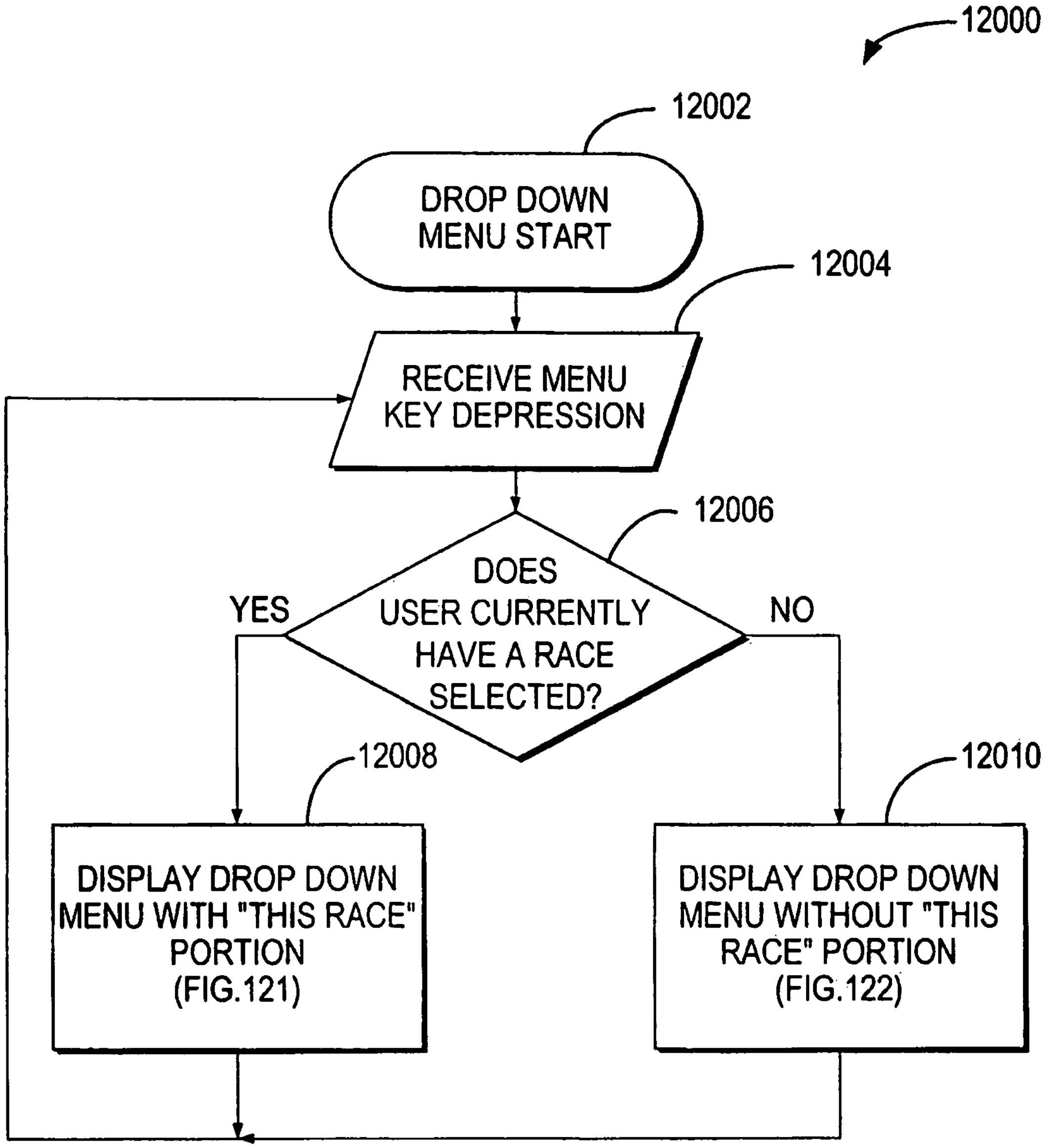
FIG. 120 is a flow diagram illustrating the functioning of drop down menus that may be presented in a set-top box or computer user interface in accordance with one embodiment of the present invention.

The user interface also provides a series of drop down menus that can be access from the above-described screens 900-11900 (FIGS. 9-119). Using these drop down menus, the user can navigate to other parts of the user interface or exit the user interface. As shown in FIG. 120, when the user interface detects that a user has pressed a menu key (or has made any other suitable indication to initiate display of a drop down menu, such as selecting a menu option from a bet queue tab) at step 12004, the user interface next determines if the user has a race currently selected at step 12006. If it is determined that the user does have a race currently selected, then, at step 12008, the user interface displays a drop down menu with a "This Race" portion, such as in menu 12102 of screen 12100 FIG. 121. If it is determined that the user does not have a race currently selected, then, at step 12010, the user interface displays a drop down menu without a "This Race" portion, such menu 12202 of screen 12200 in FIG. 122.

Figure 121:
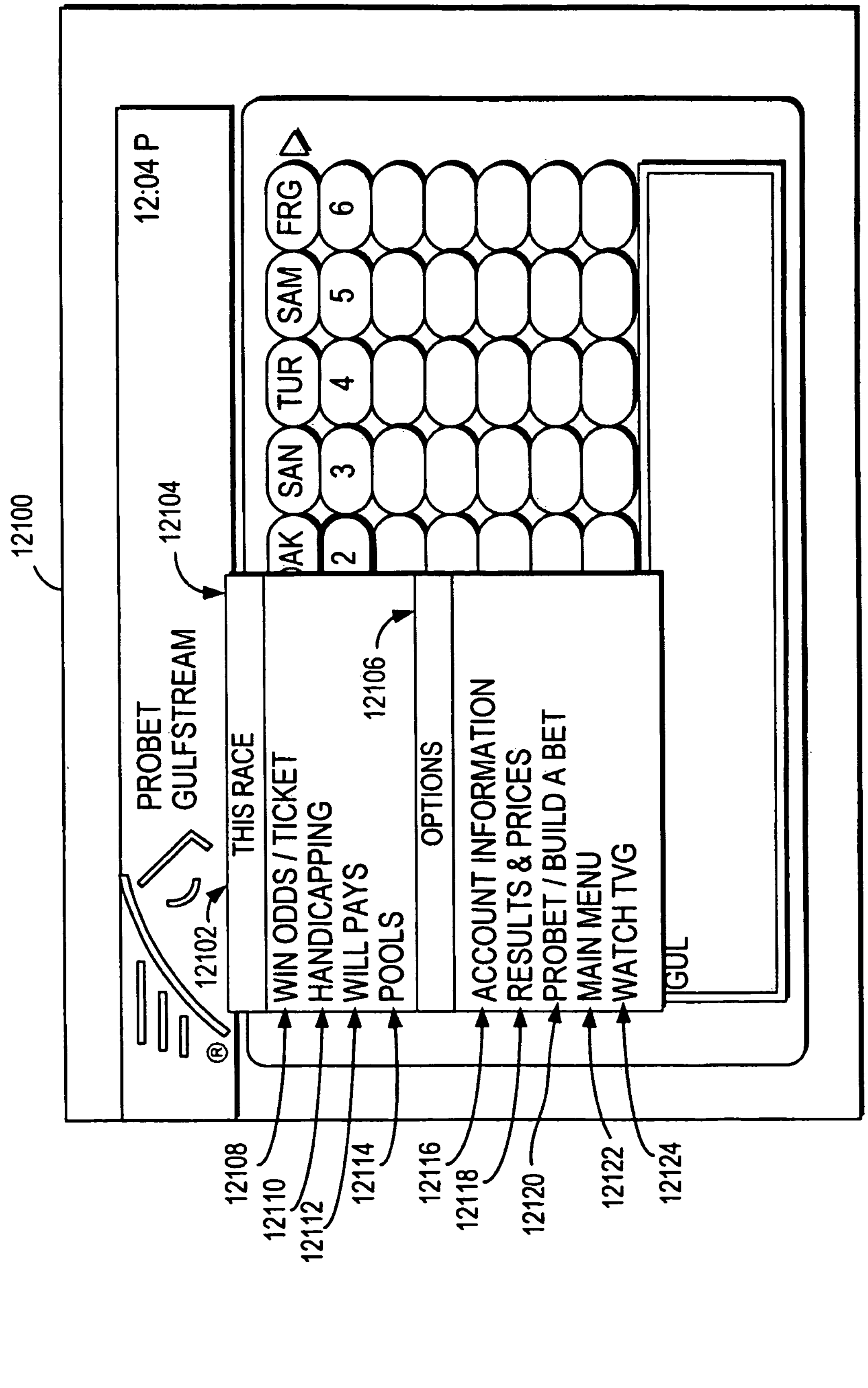
FIGS. 121-122 are illustrations of drop down menus that may be presented in a set-top box or computer user interface in accordance with one embodiment of the present invention.

Turning to FIG. 121, drop down menu 12102 is discussed in more detail. As shown, menu 12102 includes two portions 12104 and 12106. "This Race" portion 12104 is tied to the currently selected race. In screen 12100, the user is using the proBET feature and thus the user has selected a race for the purpose of placing a bet. Selecting a race, however, may be done for any purpose, such as getting handicapping data as shown in screen 5700 of FIG. 57.

When the user selects one of choices 12108, 12110, 12112, and 12114 from "This Race" portion 12104 of drop down menu 12102, the user interface will present screens related to the particular function selected, but with the race already selected. For example, when the user selects "Win Odds/Ticket" choice 12108, the user interface will toggle between displaying a ticket window (such as ticket window 1006 in screen 1100 of FIG. 11 or ticket window 2702 in screen 2900 of FIG. 29) and displaying an odds window (such as odds window 1512 in screen 1500 of FIG. 15 or odds window 3604 in screen 3600 of FIG. 36). When the user selects "Handicapping" choice 12110, the user interface will display options tab 5708 as shown in screen 5700 of FIG. 57. Using options tab 5708, the user can then access handicapping data as illustrated in, and described in connection with, FIG. 54. From "Will Pays" choice 12112, the user can access "Exacta Will Pay" tab 5802 for the selected race as shown in screen 5800 of FIG. 58. Finally, by selecting "Pools" choice 12114, the user may navigate to "Win Pool" tab 6602 for the selected race as shown in screen 6600 of FIG. 66.

Unlike "This Race" portion 12104 of menu 12102, "Option" portion 12106 of menu 12102 is not tied to any particular race. Thus, when one of choices 12116, 12118, 12120, 12122, and 12124 is selected, the feature that is subsequently initiated is not initiated based upon any particular race. More particularly, when the user selects "Account Information" choice 12116, the user interface initiates the series 10100 of screen displays illustrated in FIG. 101. When the user selects "Results & Prices" choice 12118, the user interface initiates the series 9100 of screen displays illustrated in FIG. 91.

When the user selects "proBET/Build-A-Bet" choice 12120, the action taken by the user interface depends on the current area of the user interface being accessed by the user at the time menu 12102 is activated. If the user is not operating in a betting mode, such as one of the screen displays in series 800 of FIG. 8 or one of the screen displays in series 2600 of FIG. 26, the user interface will activate the last betting mode operated by the user. For example, if the last bet placed by the user was in the proBET mode, the user interface would initiate the proBET mode if menu 12102 were initiated from a handicapping screen. If the user is operating in a betting mode, however, the user interface will then toggle the current betting mode (if only two betting modes are available) or rotate the betting mode (if more than two betting modes are available). In doing so, the user interface will preferably transfer all entries already submitted by the user into the new betting mode.

Finally, by selecting "Main Menu" choice 12122 or "Watch TVG" choice 12124, the user may return to main menu 702 (FIG. 7) or view a user television program 500 (FIG. 5), respectively.

As described above in connection with FIG. 120, if the user accesses the drop down menu when a race has not already been selected, the user interface will then present a menu such as menu 12202 of screen 12200 of FIG. 122. As can be seen, menu 12202 does not have a "This Race" portion. Instead, each menu choice displayed is operated independently of any particular race.

When selected, each of choices 12204, 12206, 12214, and 12216 perform substantially the same function as described above in connection with choices 12116, 12118, 12122, and 12124, respectively, of menu 12102. Selecting "proBET" choice 12208 preferably will cause series 800 of screen displays as shown in FIG. 8 to be displayed. Selecting "Build-A-Bet" choice 12210 preferably will cause series 2600 of screen displays as shown in FIG. 26 to be displayed. Finally, selecting "Handicapping" choice 12212 preferably will cause series 5400 of screen displays as shown in FIG. 54 to be displayed.

In some embodiments of the present invention, the context sensitivity of menus 12102 and 12202 may extend beyond that explained above. For example, if drop down menu 12102 is initiated from the proBET mode as shown in screen 12100, option 12120 may only say "BUILD-A-BET" rather than "proBET/BUILD-A-BET" as illustrated. When selected, option 12120 may cause the user interface to switch from the proBET mode to the BUILD-A-BET mode. Similarly, as another example, if either menu 12102 or 12202 were initiated from the Handicapping mode, handicapping options 12110 and 12212 may be replaced with other options.

In some embodiments of the present invention, the user interface facilitates the automatic and manual selection of default entries to many of the prompts presented in the screen displays describes above. Automatic selection of default entries may be implemented when only a single player is active, for example, by monitoring each wager that is placed by a user, and causing a prompt's highlight to initially appear on the most frequently selected selection each time a prompt is displayed. For example, if a user makes trifecta bet types most frequently, the highlight in a wager type selection prompt could initially appear as shown in tab 2902 of screen 2900 of FIG. 29. Automatic selection of default entries could also be implemented by determining the entries that provide the user with the highest probability of winning or that will make the player the most money while still meeting a given minimum probability of winning threshold. For example, the horse with the best odds of winning may be selected as the default horse selection.

Manual selection of default entries could be implemented by adding a "Default" action selection 3606 to bet queue displays such as bet queue tab 3602 (FIG. 36) or by specially selecting an entry. With a "Default" action selection 3606, for example, after a user places a bet, the user could select "Default" action selection 3606. Doing so would cause the selections made by the user for the bet become the default entries. Various methods of specially selecting an entry could also be used to designate default entries. For example, when an entry is selected by pressing a button on a remote control, a selection could be designated as a default by pressing the button for an extended period of time until that selection blinks. As another example, a default button could be added to a remote control so that the user may highlight an entry and press the default button to make the entry a default entry.

Although specific methods for designating entries as default entries are discussed above for both automatic and manual designation, any suitable method for doing so may be used in accordance with the present invention.

Figure 123:
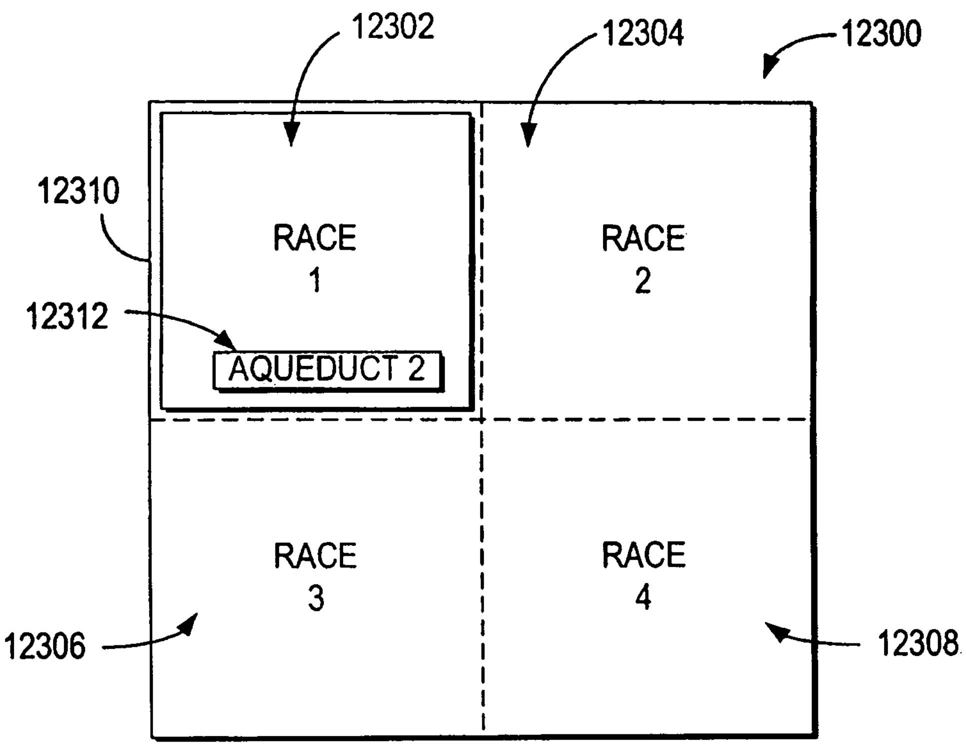
FIG. 123 illustrates an alternate mechanism for initiating a set-top box or computer user interface in accordance with one embodiment of the present invention.

Some embodiments of the present invention may simultaneously display multiple wagering events and enable the user to select one or more of the events to initiate the user interface or to cause a full screen display of the wagering event to be displayed. For example, as shown in screen 12300 of FIG. 123, four race displays 12302, 12304, 12306, and 12308 are presented in different portions of screen 12300. To select one of displays 12302, 12304, 12306, and 12308, a highlight 12310 may be provided to enable the user to position the highlight on a desired display and subsequently or simultaneously select that display. One or more of the displays may also include an indicator 12312 that identifies a displayed track, race, or any other suitable information, or enables the user to select the display.

Upon a user selecting one of multiple displayed wagering events, the present invention may then initiate the user interface and automatically set certain prompts with default entries that correspond to the selected event. For example, if a user is viewing screen 12300 and selects display 12302, the user interface may then be initiated so as to cause the "Build-A-Bet" mode to be accessed. Rather than initiating this mode at "Track" selection tab 2706 (FIG. 27), the user interface may automatically pick "Aqueduct" as the selected track and race "2" as the selected race and therefore present "Type" tab 2902 (FIG. 29) first. Should the user then desire to override the defaults, the user may press a left arrow button on a remote control to switch back to tab 2706 and select the desired track, or to switch back to tab 2802 and select the desired race.

Alternatively, the user interface may first display a full screen of the wagering event selected from screen 12300 as shown in screen 500 of FIG. 5. Using prompt 502, the user could then initiate the user interface.

Figure 124:
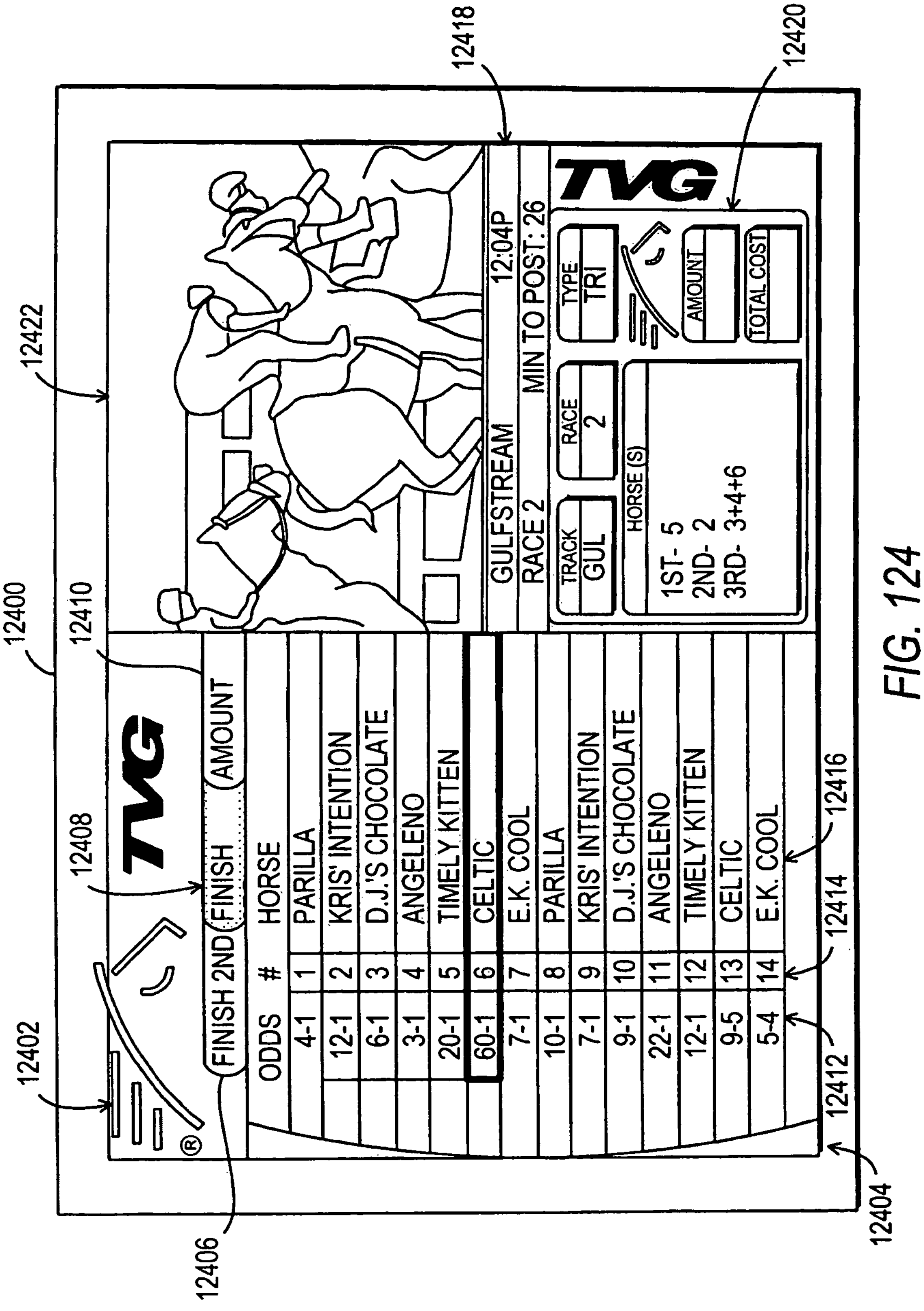
FIGS. 124-126 are illustrations of alternate types of screen displays that may be presented in a set-top box or computer user interface in accordance with one embodiment of the present invention.

Turning to FIG. 124, an alternate embodiment of a user interface in accordance with the present invention is shown. FIG. 124 illustrates a horse selection screen 12400. Screen 12400 includes an overlay 12402 and a background program 12404. Background program may be any television program being watched by the user prior to activating the user interface. As shown, overlay 12402 obstructs a large portion of background program 12404, although overlay 12402 may be implemented to cover any amount of background program 12404 (including the entire program). Within overlay 12402 are a finish second tab 12406, a finish third tab 12408, an amount tab 12410, a status bar 12418, a ticket window 12420, and a wagering event window 12422, as the user is in the process of entering a trifecta wager.

Finish second tab 12406 and finish third tab 12408 operate substantially the same, except that finish second tab 12406 is used to select a horse to come in second, whereas finish third tab 12408 is used to select a horse to come in third, in a wagering event. As can be seen, finish third tab 12408 includes a list of horses 12416, a list of numbers 12414 for those horses, and a list of odds 12412 for those horses to win. List of numbers 12414 shows the colors of the jockeys and/or horses in the area surrounding each number indicated.

Amount tab 12410, status bar 12418, and ticket window 12420 operate substantially the same as amount tab 3504, status bar 601, and ticket window 2702 shown in screens 3500, 600, and 2700 of FIGS. 35, 6, and 27, respectively.

Wagering event window 12422 preferably displays images of a wagering event in which the user is interested. These images may be still images or full motion video, with or without sound. The images may be tied to or independent of the user's wagering selections. For example, when tied to the user's wagering selections, as the user highlights horses in tab 12408, window 12422 may be implemented to display video of the highlighted horse in training, in previous races, or at any other suitable time. When independent of the user's wagering selections, a default wagering event related television channel may be displayed in window 12422 as another example. Such video may be a clip or may be live video. Alternatively, window 12422 could be implemented to display any television program.

Figure 125:
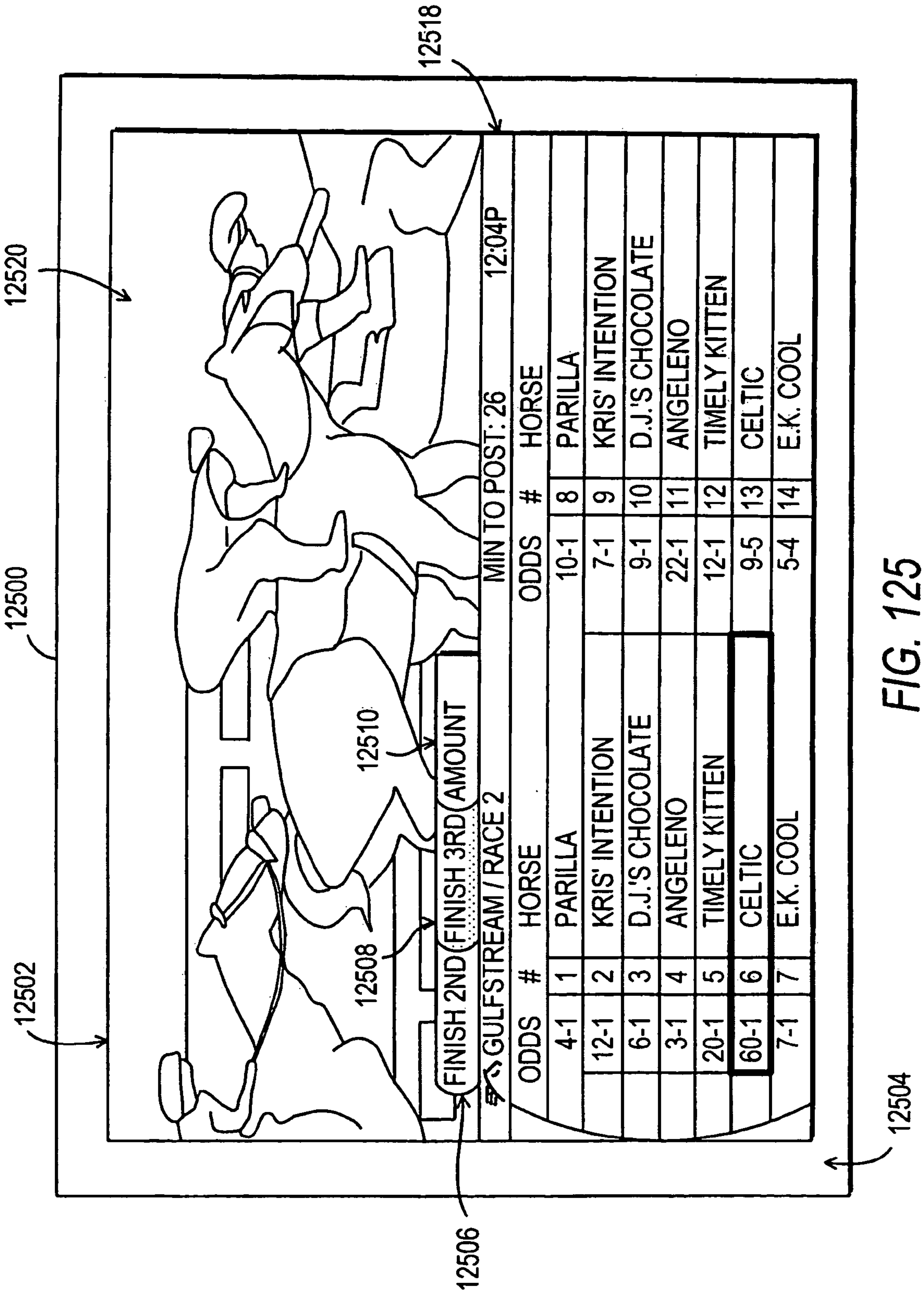

FIG. 125 illustrates still another embodiment of the user interface. As shown, the user interface presents a screen 12500 that includes an overlay 12502 and a background program 12504. As with overlay 12402 and program 12404 of FIG. 124, overlay 12502 may be any size and program 12504 may be any television program. Also, similarly to overlay 12402, overlay 12502 includes a finish second tab 12506, a finish third tab 12508, an amount tab 12510, and a status bar 12518, which operate substantially the same as their counterparts in FIG. 124. Overlay 12502 also includes a wagering event window 12520 that operates substantially the same as window 12422, although window 12520 occupies a much larger portion of window 12402 than window 12422 occupies in overlay 12402. Note that although overlay 12502 does not include a ticket window, a ticket window could be incorporated in overlay 12502 by shortening the displayed portion of tab 12508 to make room for the ticket window.

Figure 126:
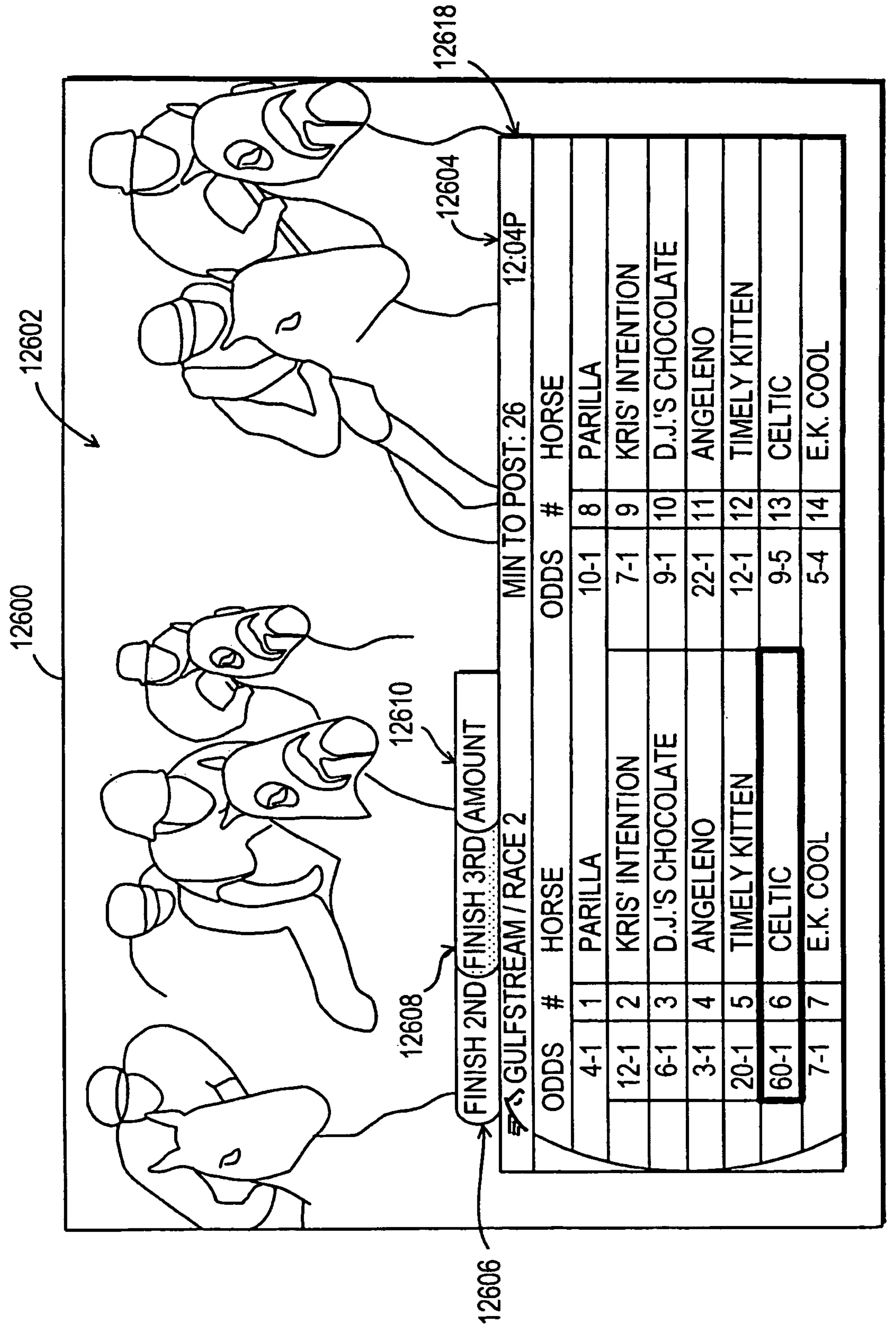

FIG. 126 illustrates yet another embodiment of the user interface. As shown, the user interface presents a screen 12600 that includes a background program 12602 and an overlay 12604. Within overlay 12604 are tabs 12606, 12608, and 12610 and a status bar 12618 that are substantially the same as tabs 12506, 12508, and 12510 and status bar 12518 shown in FIG. 125. As can be seen, overlay 12604 is partially transparent so that program 12602 appears to be visible through overlay 12604. Overlay 12604 may be any amount of transparency, including completely opaque and completely transparent, and the amount of transparency may be user defined.

Figure 127:
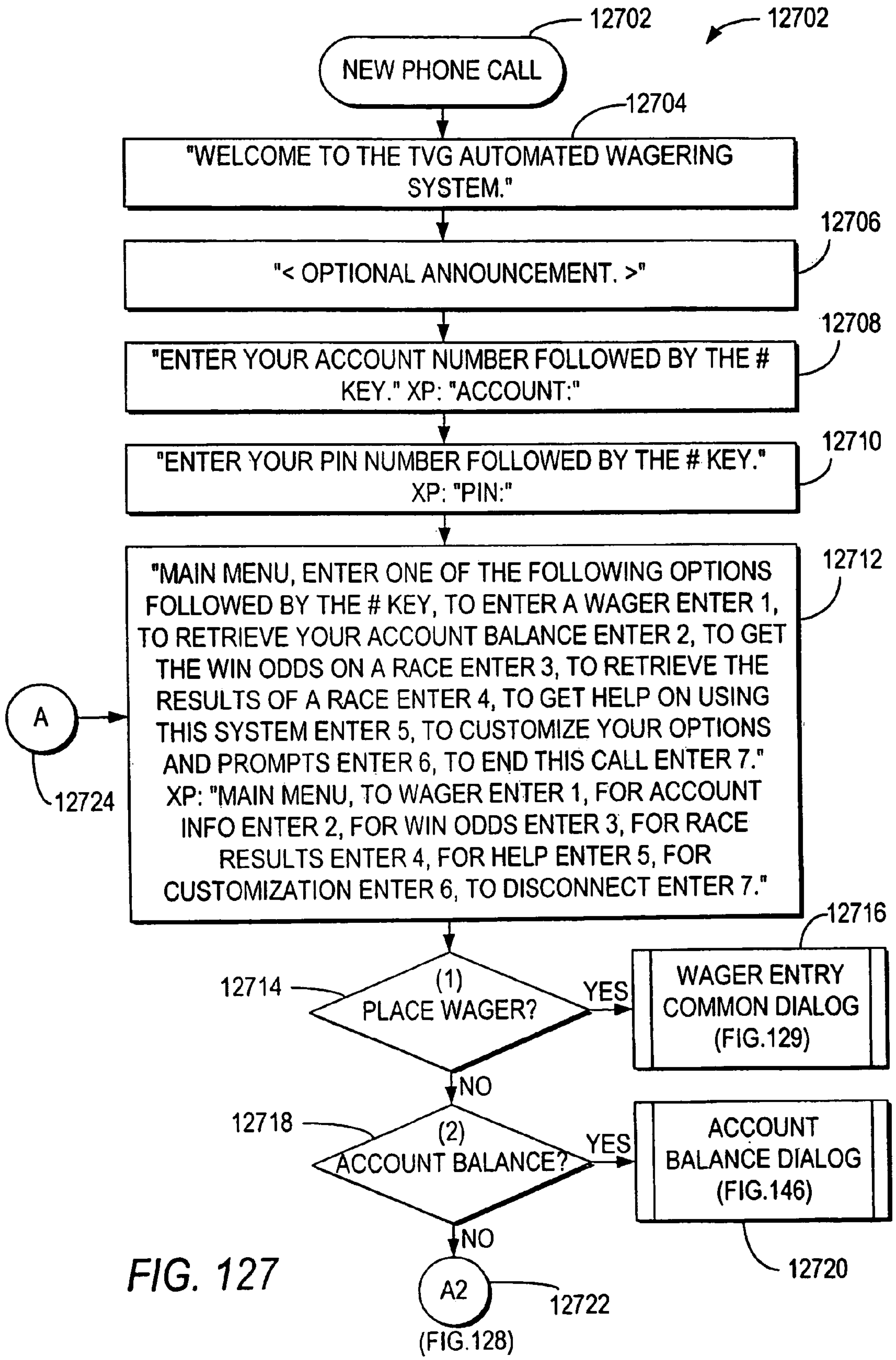
FIGS. 127-151 are flow diagrams illustrating an interactive voice response (IVR) interface that may be presented in accordance with one embodiment of the present invention.
Figure 128:
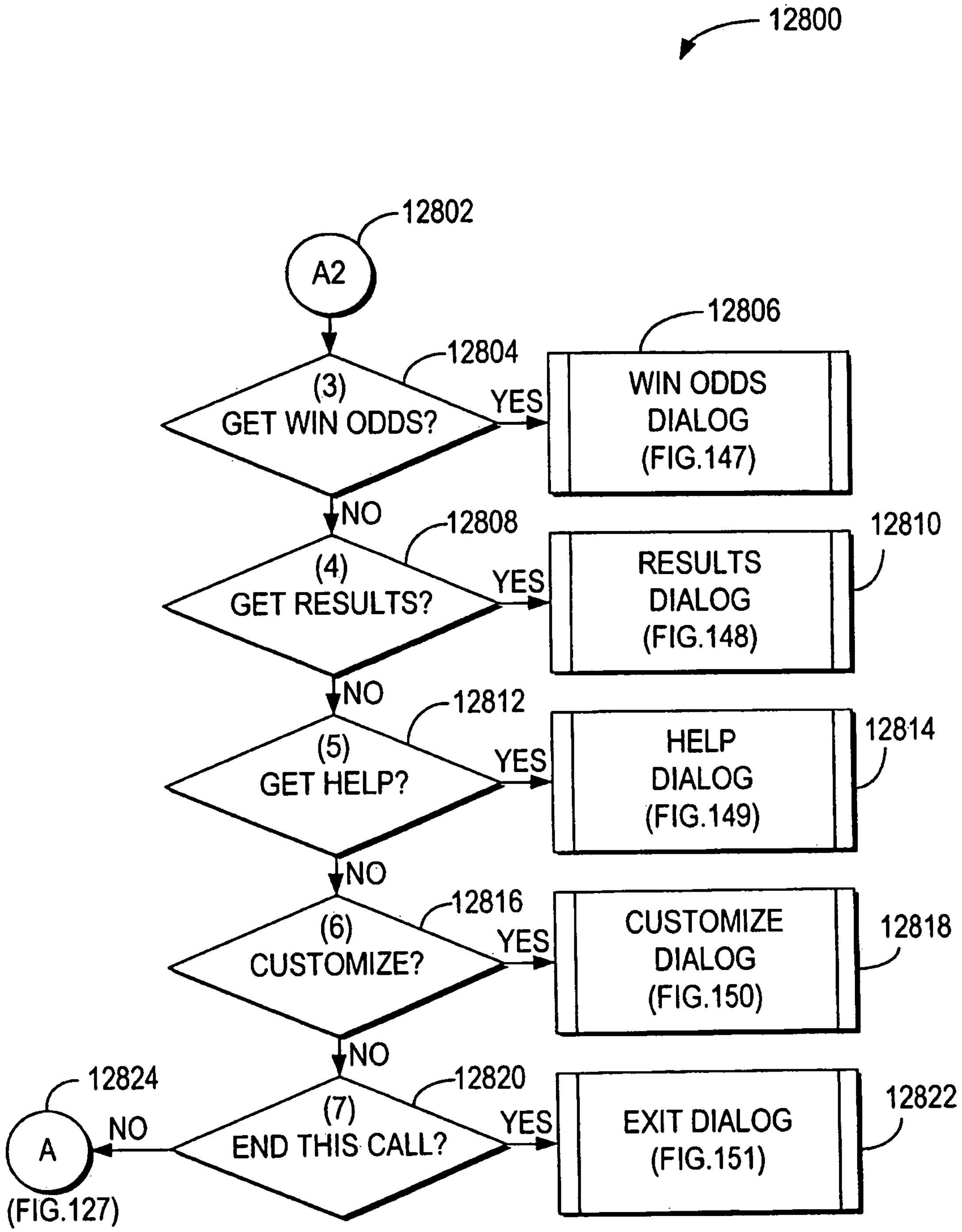

Turning now to FIGS. 127-151, an interactive voice response interface (IVR interface) that may be implemented in IVR server 210 of FIG. 2 is illustrated. Main processes 12700 and 12800 for the IVR interface is illustrated in FIGS. 127 and 128. Process 12700 is initiated when IVR server 210 receives a new phone call at step 12702. Next, process 12700 plays a welcome greeting and any optional messages at steps 12704 and 12706. The user is then prompted to enter a player's account number and pin at steps 12708 and 12710. Once the user has entered a valid account number and pin, a main menu is presented at step 12712. In response to the main menu, the user may then select one of the available options. In the preferred embodiment, the user may select to place a wager, get his or her account balance, get win odds, get results, get help, customize the menu, or end the call. If the user selects to place a wager, process 12700 transfers control to wager entry process 12900 of FIG. 129 by implementing steps 12714 and 12716. If the user selects to get the account balance, process 12700 transfers control to account balance process 14600 of FIG. 146 by implementing steps 12718 and 12720. Otherwise process 12700 transfers control to process 12800 by implementing steps 12722 and 12802 (FIG. 128).

After process 12800 has begun at step 12802, the process then determines if the user has selected to get win odds, get results, get help, customize the menu, or end the call. If the user selects to get win odds, process 12800 transfers control to win odds process 14700 of FIG. 147 by implementing steps 12804 and 12806. If the user selects to get results, process 12800 transfers control to results process 14800 of FIG. 148 by implementing steps 12808 and 12810. If the user selects to get help, process 12800 transfers control to help process 14900 of FIG. 149 by implementing steps 12812 and 12814. If the user selects to customize the menu, process 12800 transfers control to customize process 15000 of FIG. 150 by implementing steps 12816 and 12818. Finally, if the user selects to end the call, process 12800 transfers control to exit process 15100 of FIG. 151 by implementing steps 12820 and 12822. Otherwise, process 12800 loops back to step 12712 of process 12700 by implementing steps 12824 and 12724 (FIG. 127).

The wager entry process is illustrated in FIGS. 129-145. Once the wager entry process has been initiated at step 12902, the user is prompted for a track selection at step 12904 and then the user's track selection is verified at step 12906. Similarly, process 12900 next prompts the user for a race number, verifies the race number selection, prompts the user for a wager type, and verifies the wager type selection at steps 12908, 12910, 12912, and 12914. Then process 12900 transfers control to process 13000 (FIG. 130) by implementing steps 12916 and 13002.

Next, through processes 13000 and 13100 (FIG. 131), the IVR interface determines the wager type selected by the user, and transfers control to the appropriate process. If the user has selected a win wager, a place wager, or a show wager, the process transfers control to win, place, show wager process 13200 by implementing steps 13004 and 13006, steps 13008 and 13010, or steps 13012 and 13014, respectively. If the user has selected a win/place wager, a win/show wager, or a win/place/show wager, the process transfers control to win/place, win/show, win/place/show wager process 13300 by implementing steps 13016 and 13018, steps 13020 and 13022, or steps 13024 and 13026.

Figure 129:
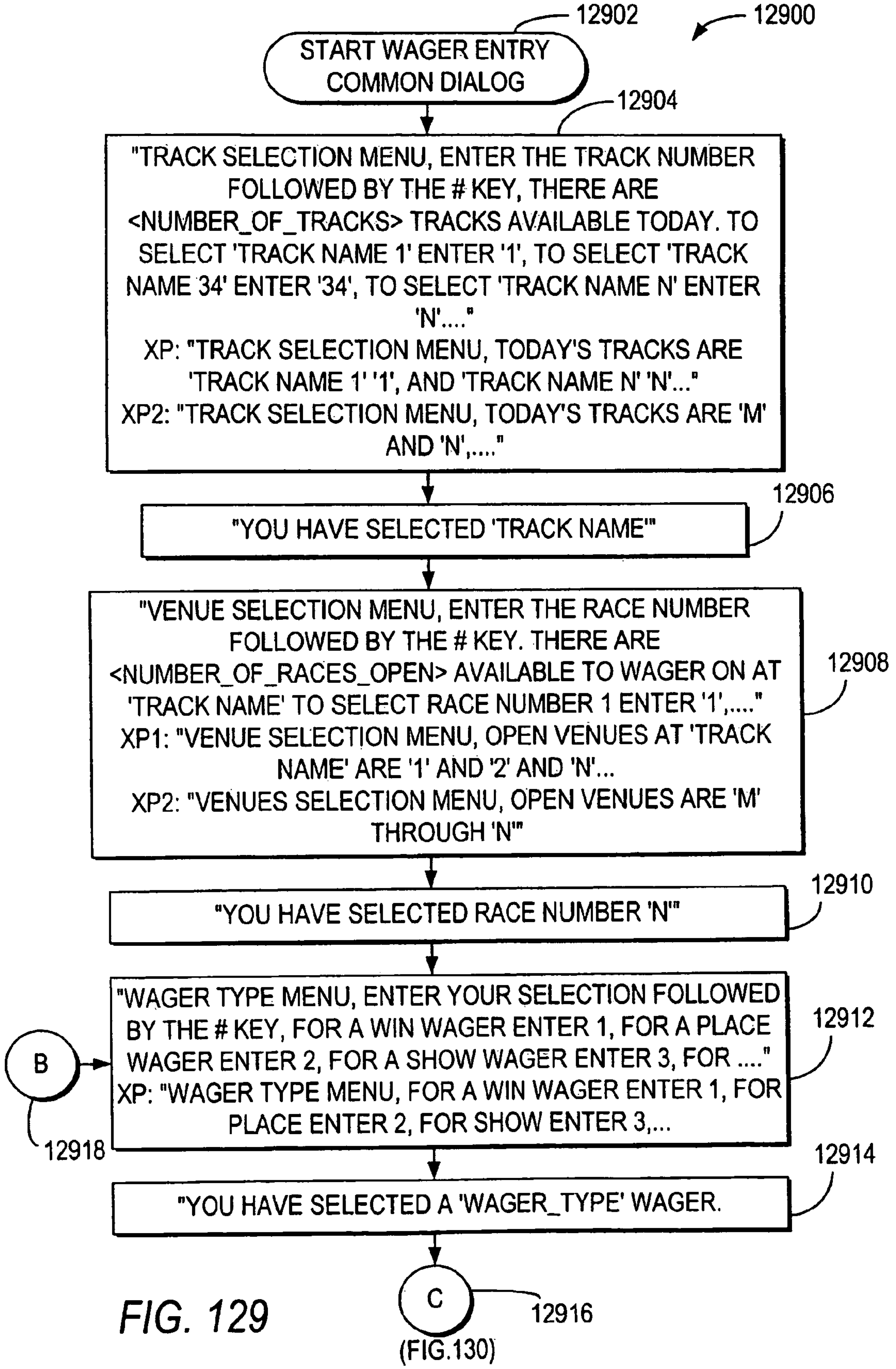
Figure 130:
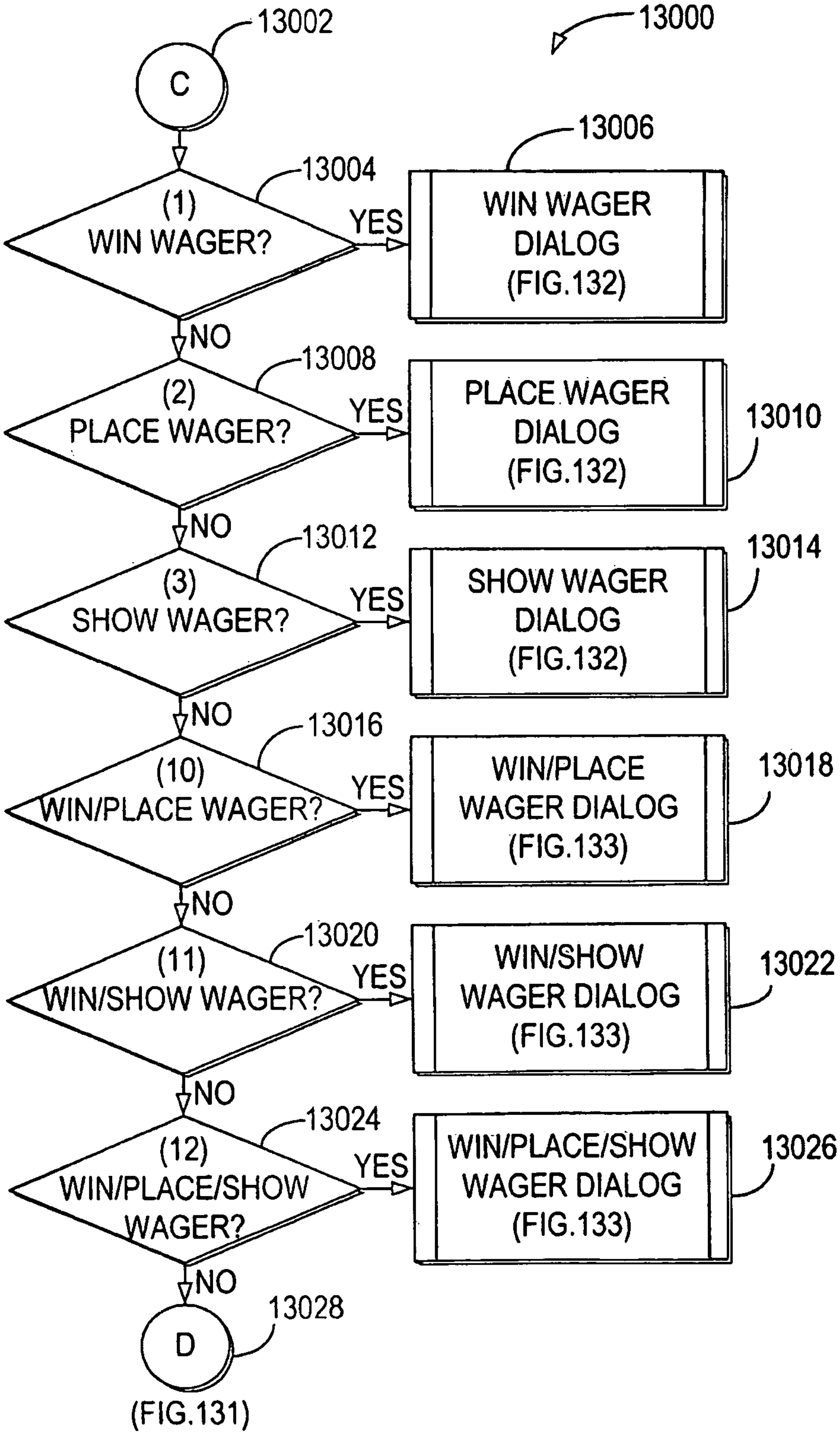
Figure 131:
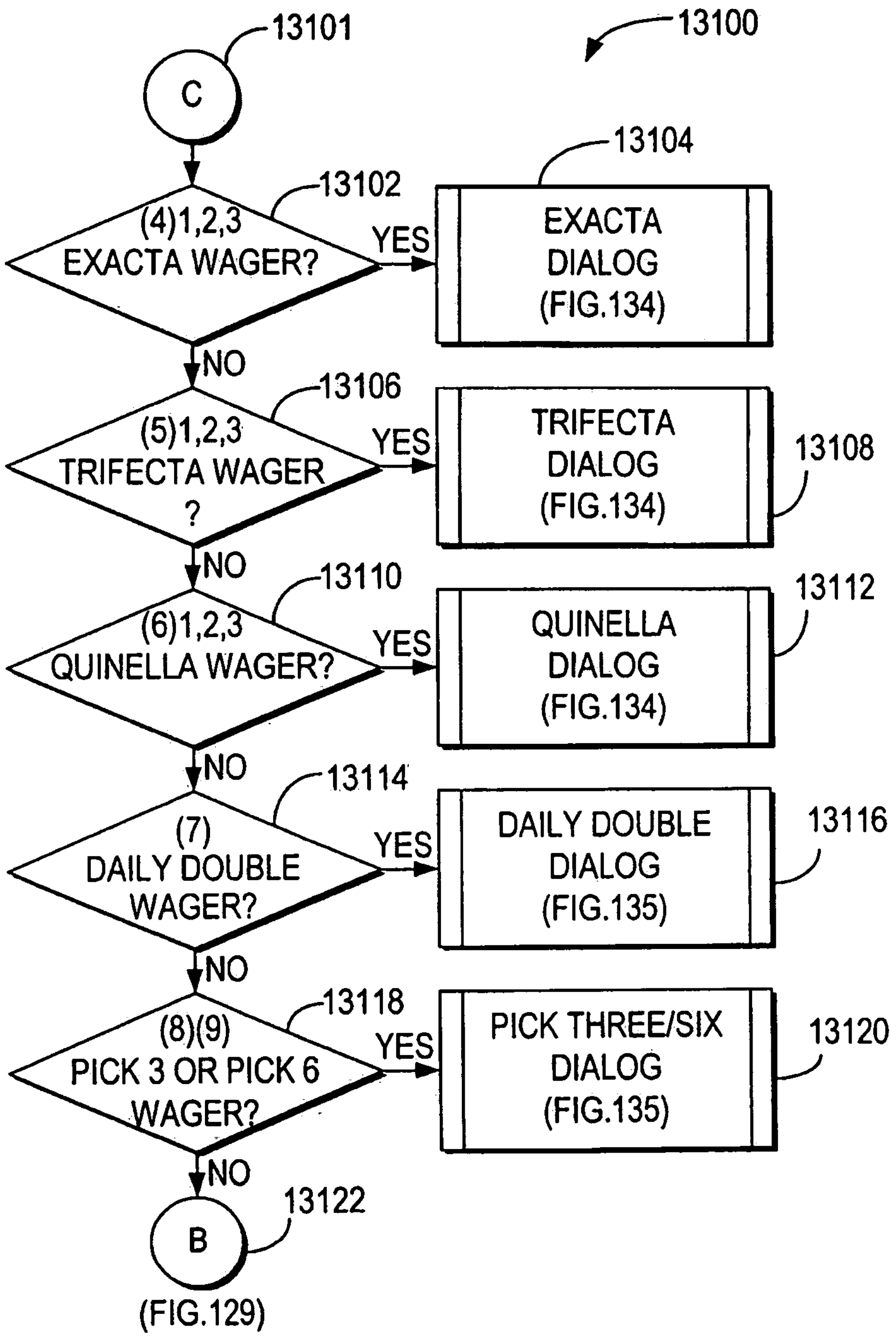

Otherwise process 13000 transfers control to process 13100 (FIG. 131) by implementing steps 13028 and 131101. If the user has selected an exacta wager, a trifecta wager, or a quinella wager, the process transfers control to exacta, trifecta, quinella wager process 13400 by implementing steps 13102 and 13104, steps 13106 and 13108, or steps 13110 and 13112, respectively. If the user has selected a daily double, or a pick three or pick six wager, the process transfers control to daily double, pick three/six process 13500 by implementing steps 13114 and 13116, or steps 13118 and 13120, respectively. Otherwise, process 13100 transfers control back to process 12900 at step 12912 by implementing steps 13122 and 12918 (FIG. 129).

Figure 132:
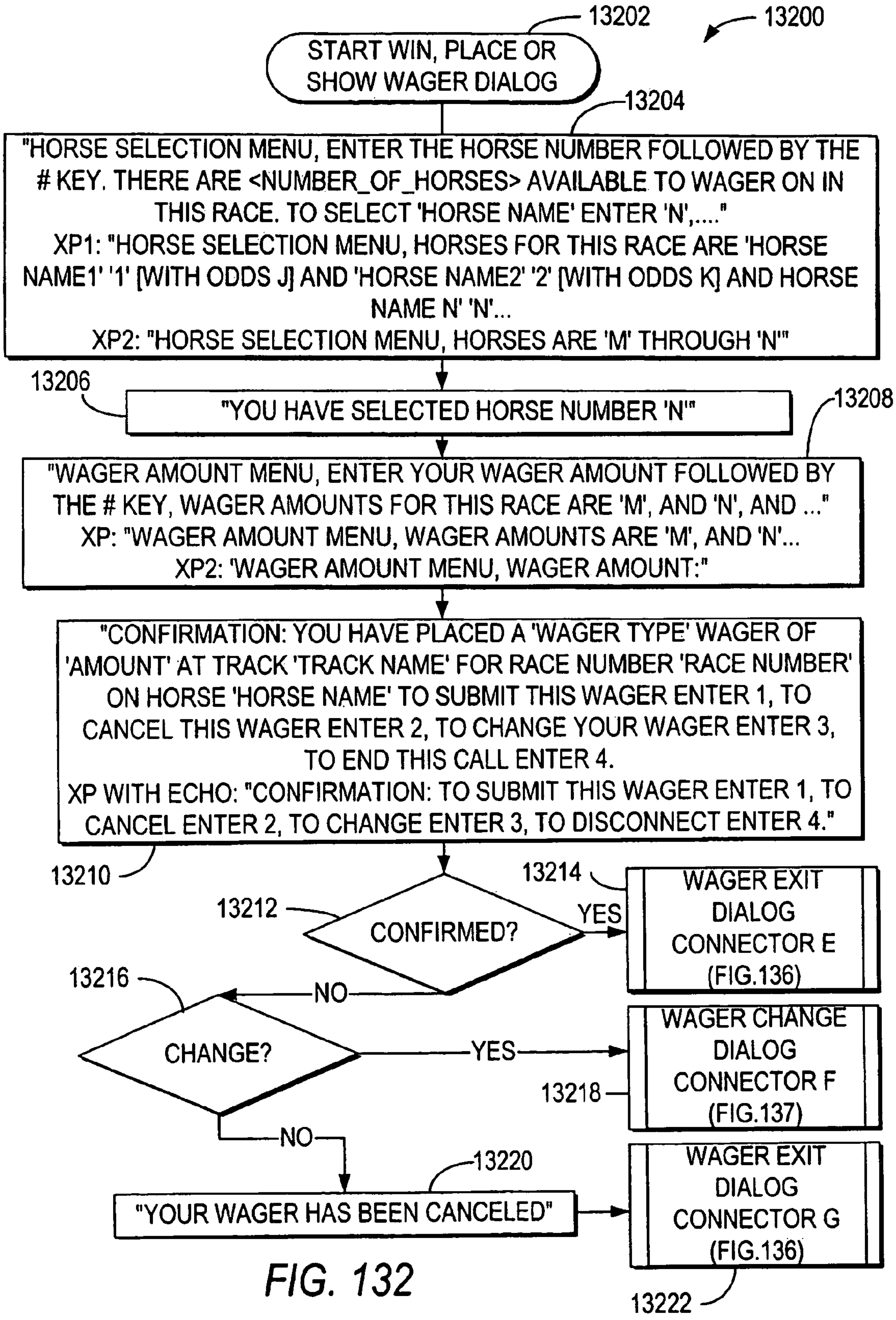

Win, place, show process 13200 is illustrated in FIG. 132. As shown, after process 13200 has begun at step 13202, the process prompts the user for a horse selection at step 13204 and then verifies the user selection at step 13206. Next at step 13208, process 13200 prompts the user for a wager amount at step 13208 and then prompts the user to confirm, change, or cancel the wager at step 13210. If the user confirms the wager, then process 13200 branches at step 13212 to step 13214 to initiate wager exit process 13600 of FIG. 136. If the user selects to change the wager, then process 13200 branches at step 13216 to step 13218 to initiate wager change process 13700 of FIG. 137. Finally, if the user elects to cancel the wager, process 13200 cancels the wager at step 13220 and then initiates wager exit process 13600 of FIG. 136 at step 13222.

Figure 133:
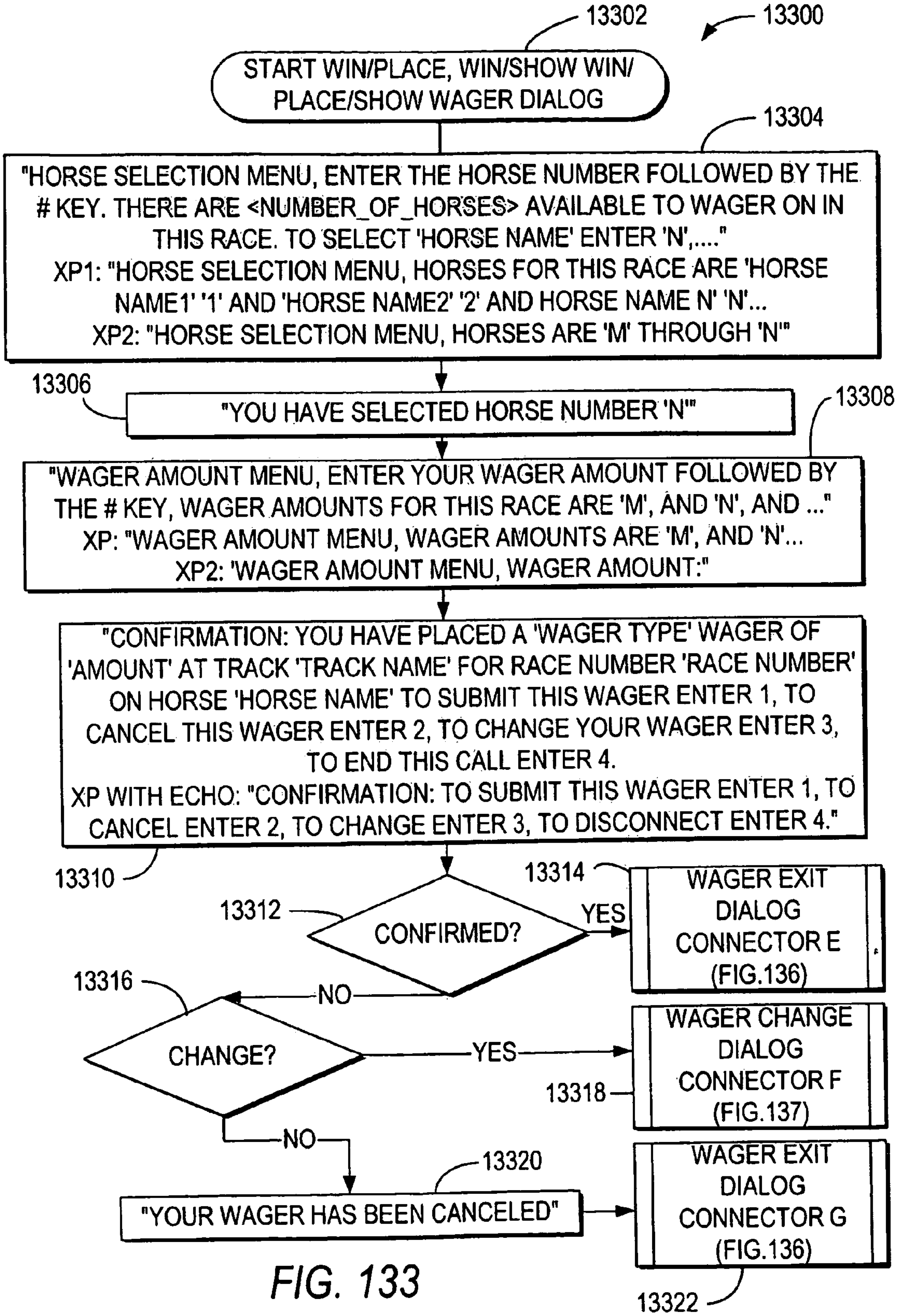

Win/place, win/show, win/place/show process 13300 is illustrated in FIG. 133. As shown, after process 13300 has begun at step 13302, the process prompts the user for a horse selection at step 13304 and then verifies the user selection at step 13306. Next at step 13308, process 13300 prompts the user for a wager amount at step 13308 and then prompts the user to confirm, change, or cancel the wager at step 13310. If the user confirms the wager, then process 13300 branches at step 13312 to step 13314 to initiate wager exit process 13600 of FIG. 136. If the user selects to change the wager, then process 13300 branches at step 13316 to step 13318 to initiate wager change process 13700 of FIG. 137. Finally, if the user elects to cancel the wager, process 13300 cancels the wager at step 13320 and then initiates wager exit process 13600 of FIG. 136 at step 13322.

Figure 134:
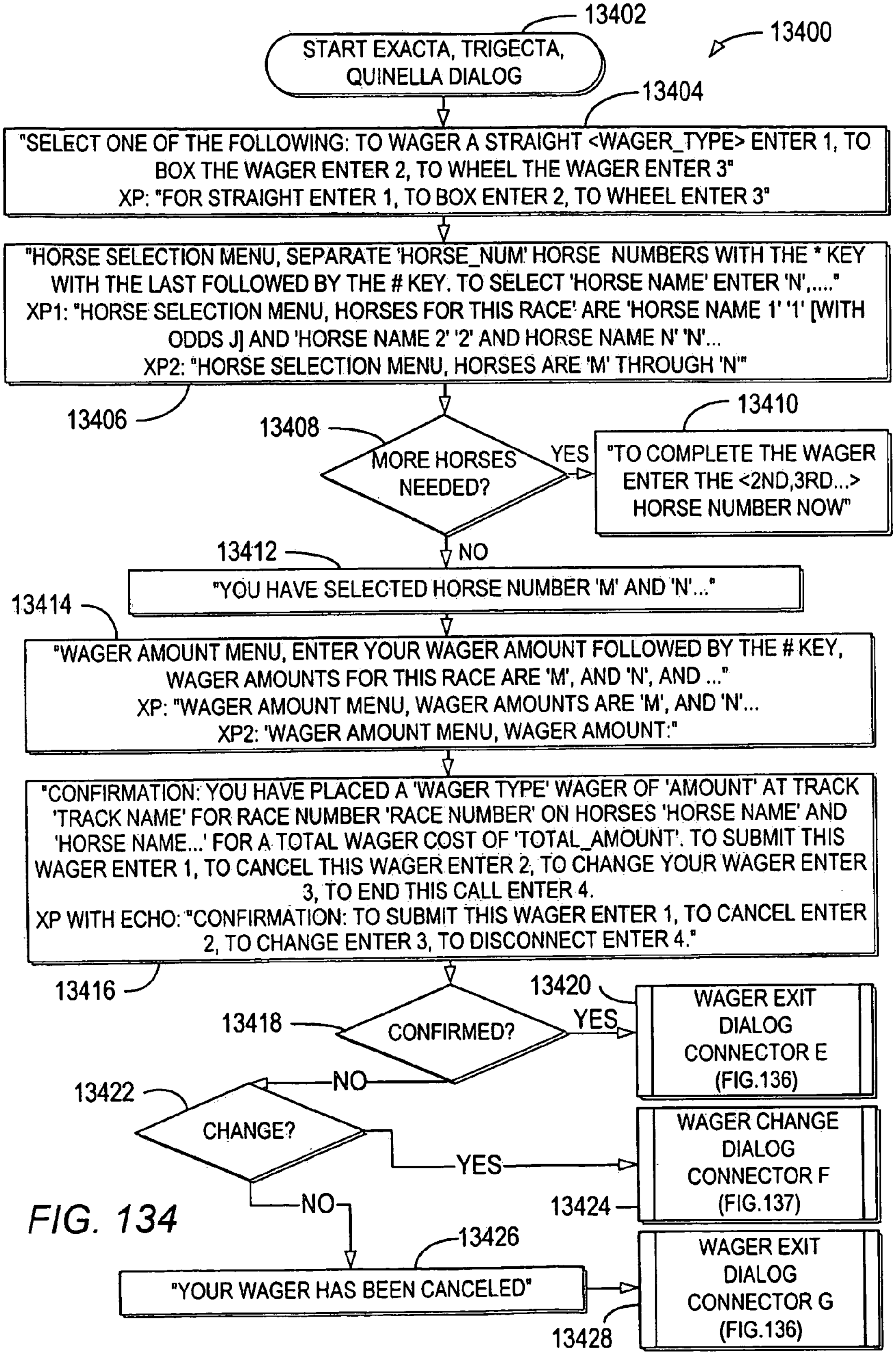

Exacta, trifecta, quinella wager process 13400 is shown in FIG. 134. As can be seen, once process 13400 is initiated at step 13402, the process prompts the user to indicate whether the wager is to be a straight, box, or wheel wager at step 13404. Next process 13400 prompts the user to select horses at step 13406. If more horses are needed to complete the wager, then process 13400 branches at step 13408 to step 13410 to prompt the user to select the next horse. Once all of the horses have been selected, process 13400 verifies the horse selections at step 13412. Process 13400 then prompts the user to select a wager amount at step 13414. After the wager amount has been selected, process 13400 prompts the user to confirm, change, or cancel the wager at step 13416. If the user confirms the wager, then process 13400 branches at step 13418 to step 13420 to initiate wager exit process 13600 of FIG. 136. If the user selects to change the wager, then process 13400 branches at step 13422 to step 13424 to initiate wager change process 13700 of FIG. 137. Finally, if the user elects to cancel the wager, process 13400 cancels the wager at step 13426 and then initiates wager exit process 13600 of FIG. 136 at step 13428.

Figure 135:
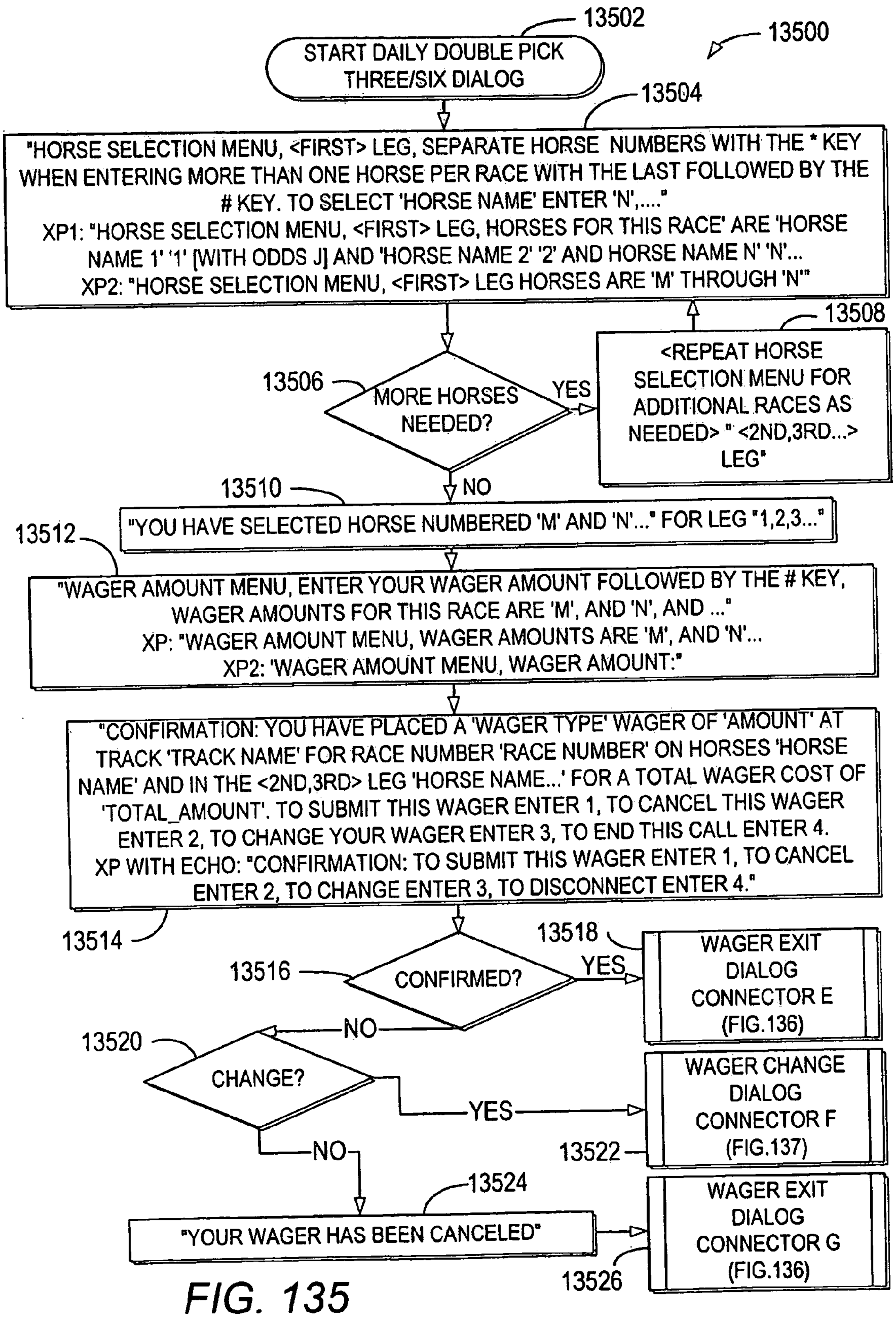

Daily double, pick three/six wager process 13500 is shown in FIG. 135. As can be seen, once process 13500 is initiated at step 13502, the process prompts the user to select horses at step 13504. If more horses are needed to complete the wager, then process 13500 branches at step 13506 to step 13508 to prompt the user to select the next horse. Once all of the horses have been selected, process 13500 verifies the horse selections at step 13510. Process 13500 then prompts the user to select a wager amount at step 13512. After the wager amount has been selected, process 13500 prompts the user to confirm, change, or cancel the wager at step 13514. If the user confirms the wager, then process 13500 branches at step 13516 to step 13518 to initiate wager exit process 13600 of FIG. 136. If the user selects to change the wager, then process 13500 branches at step 13520 to step 13522 to initiate wager change process 13700 of FIG. 137. Finally, if the user elects to cancel the wager, process 13500 cancels the wager at step 13524 and then initiates wager exit process 13600 of FIG. 136 at step 13526.

Figure 136:
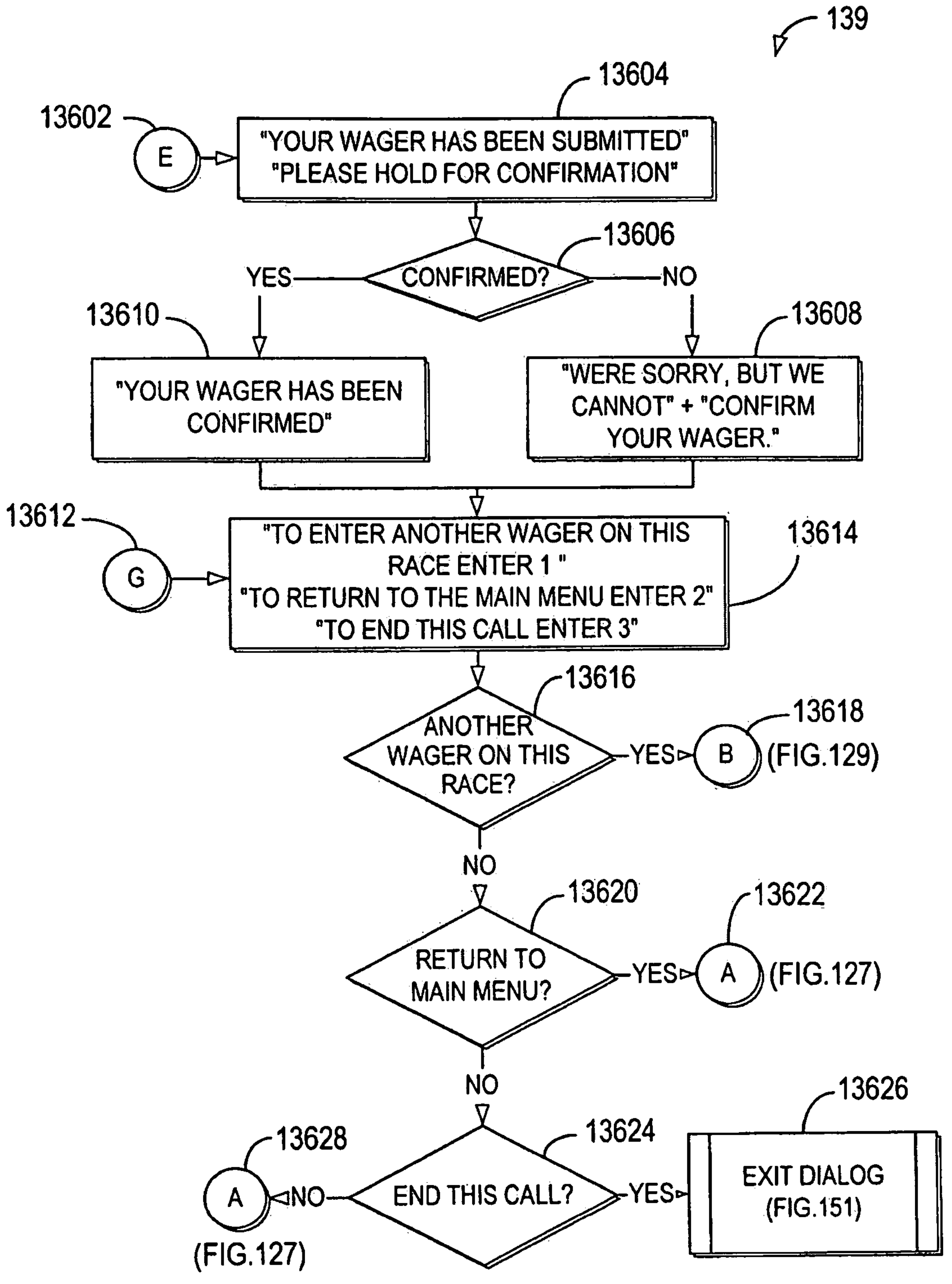

Wager exit process 13600 is illustrated in FIG. 136. As shown, once process 13600 is initiated at step 13602, the process notifies the user that the wager has been submitted at step 13604. Next, process 13600 determines whether the wager has been placed at step 13606. If the wager is confirmed as being placed, process 13600 then notifies the user that the wager has been placed at step 13610. Otherwise, process 13600 notifies the user that it cannot confirm the wager at step 13608. Process 13614 then asks the user whether he or she wants to enter another wager, return to the main menu, or end the call at step 13614. If the user chooses to enter another wager, process 13600 then transfers control back to step 12912 of FIG. 129 by implementing 13618 and 12918. If the user chooses to return to the main menu, process 13600 then transfers control back to step 12712 of FIG. 127 by implementing 13622 and 12724. If the user chooses to end the call, process 13600 then initiates exit process 15100 of FIG. 151 at step 13626. Otherwise, process 13600 transfers control back to step 12712 of FIG. 127 by implementing 13628 and 12724.

Figure 137:
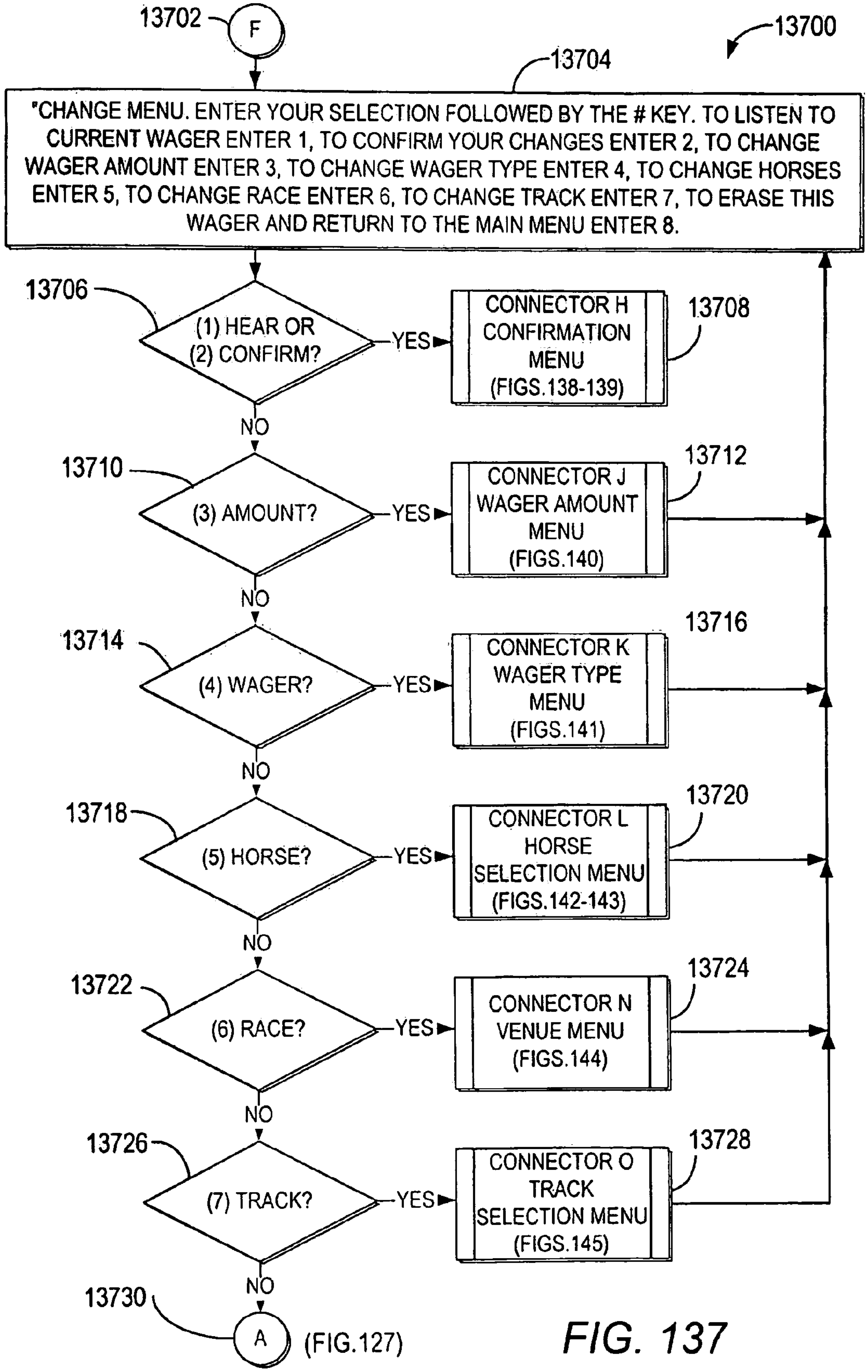

Wager-change process 13700 is shown in FIG. 137. Once process 13700 has been initiated at step 13702, the process prompts the user at step 13704 to select whether the user wants to hear the current wager, confirm changes to the wager, change the wager amount, change the wager type, change the horse selections, change the race selection, change the track selection, or erase the wager and return to the main menu. If the user selects to hear or confirm the wager, process 13700 then branches at step 13706 to initiate confirmation menu process 13800 of FIG. 138 at step 13708. If the user selects to change the wager amount, process 13700 then branches at step 13710 to initiate wager amount menu process 14000 of FIG. 140 at step 13712. If the user selects to change the wager type, process 13700 then branches at step 13714 to initiate wager type menu process 14100 of FIG. 141 at step 13716. If the user selects to change the horse selection, process 13700 then branches at step 13718 to initiate horse selection menu process 14200 of FIG. 142 at step 13720. If the user selects to change the race selection, process 13700 then branches at step 13722 to initiate venue selection menu process 14400 of FIG. 144 at step 13724. Finally, if the user selects to change the track selection, process 13700 then branches at step 13726 to initiate track selection menu process 14500 of FIG. 145 at step 13728. Otherwise, process 13700 transfers control to step 12712 of FIG. 127 by implementing steps 13730 and 12724.

Figure 138:
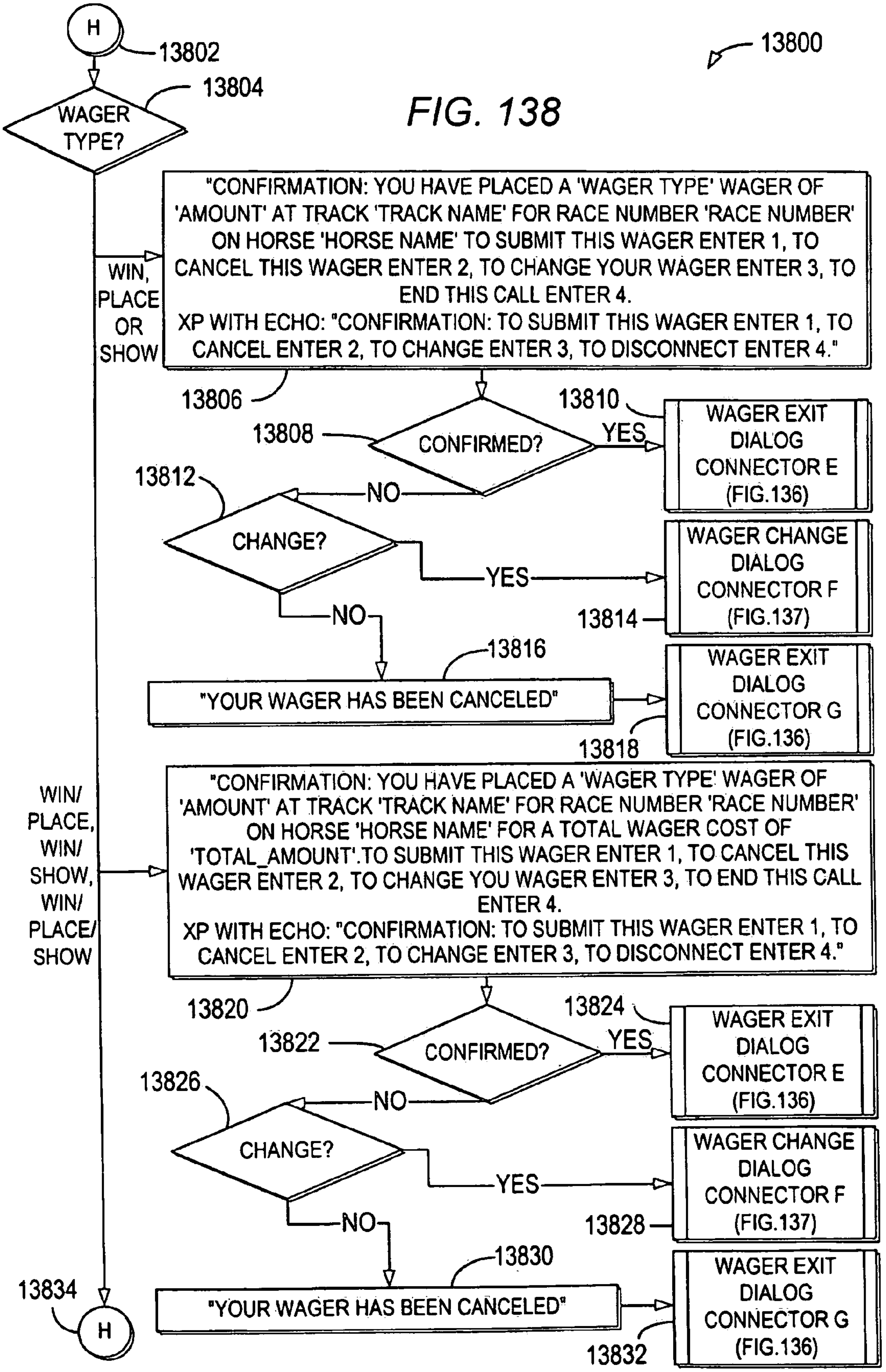

Confirmation menu process 13800 is illustrated in FIG. 138. As shown, once process 13800 has begun at step 13802, the process determines the wager type at step 13804. If the wager type is a win, place, or show, then process 13800 prompts the user to confirm, change, or cancel the wager at step 13806. If the user confirms the wager, then process 13800 branches at step 13808 to step 13810 to initiate wager exit process 13600 of FIG. 136. If the user selects to change the wager, then process 13800 branches at step 13812 to step 13814 to initiate wager change process 13700 of FIG. 137. Finally, if the user elects to cancel the wager, process 13800 cancels the wager at step 13816 and then initiates wager exit process 13600 of FIG. 136 at step 13818. If the wager type is a win/place, win/show, win/place/show, then process 13800 prompts the user to confirm, change, or cancel the wager at step 13820. If the user confirms the wager, then process 13800 branches at step 13822 to step 13824 to initiate wager exit process 13600 of FIG. 136. If the user selects to change the wager, then process 13800 branches at step 13826 to step 13828 to initiate wager change process 13700 of FIG. 137. Finally, if the user elects to cancel the wager, process 13800 cancels the wager at step 13830 and then initiates wager exit process 13600 of FIG. 136 at step 13832.

Figure 139:
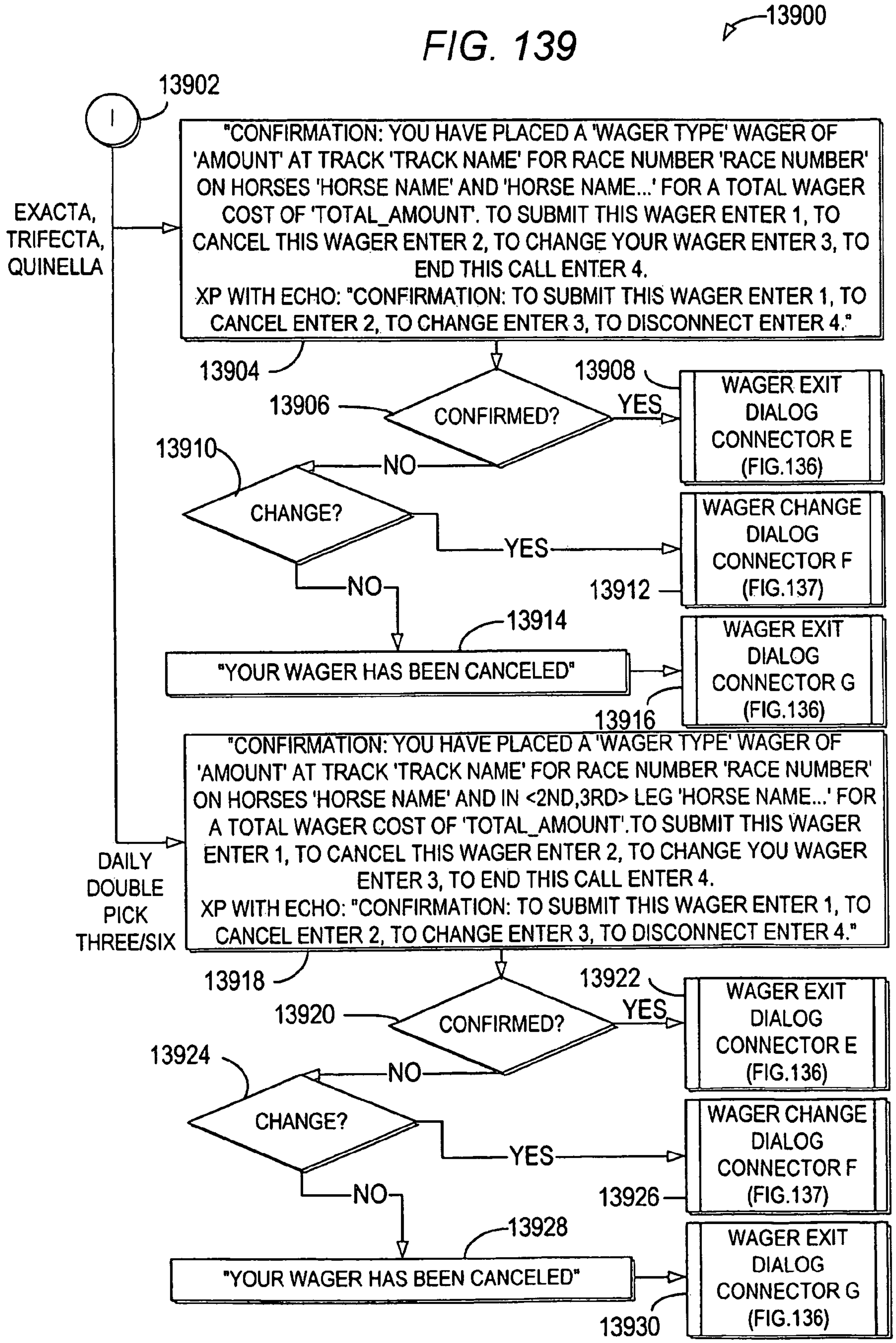

If the user has not selected a win, place, show, win/place, win/show, or win/place/show wager type, process 13800 then transfers control to process 13900 of FIG. 139 at steps 13834 and 13902. Next, if the wager type is an exacta, trifecta, or quinella, then process 13900 prompts the user to confirm, change, or cancel the wager at step 13904. If the user confirms the wager, then process 13900 branches at step 13906 to step 13908 to initiate wager exit process 13600 of FIG. 136. If the user selects to change the wager, then process 13900 branches at step 13910 to step 13912 to initiate wager change process 13700 of FIG. 137. Finally, if the user elects to cancel the wager, process 13900 cancels the wager at step 13914 and then initiates wager exit process 13600 of FIG. 136 at step 13916. Otherwise, if the wager type is a daily double, or pick three or pick six, then process 13900 prompts the user to confirm, change, or cancel the wager at step 13918. If the user confirms the wager, then process 13900 branches at step 13920 to step 13922 to initiate wager exit process 13600 of FIG. 136. If the user selects to change the wager, then process 13900 branches at step 13924 to step 13926 to initiate wager change process 13700 of FIG. 137. Finally, if the user elects to cancel the wager, process 13900 cancels the wager at step 13928 and then initiates wager exit process 13600 of FIG. 136 at step 13930.

Figure 140:
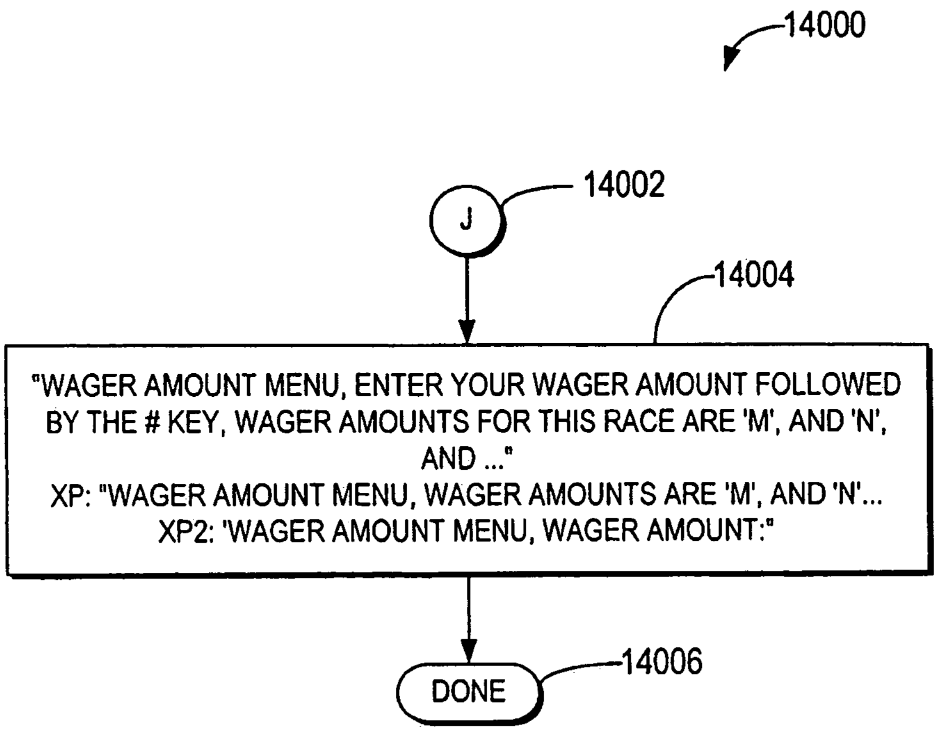

Wager amount menu process 14000 is illustrated in FIG. 140. As shown, after process 14000 begins at step 14002, prompts the user for a wager amount at step 14004. Once the user has entered a wager amount, process 14000 completes at step 14006.

Figure 141:
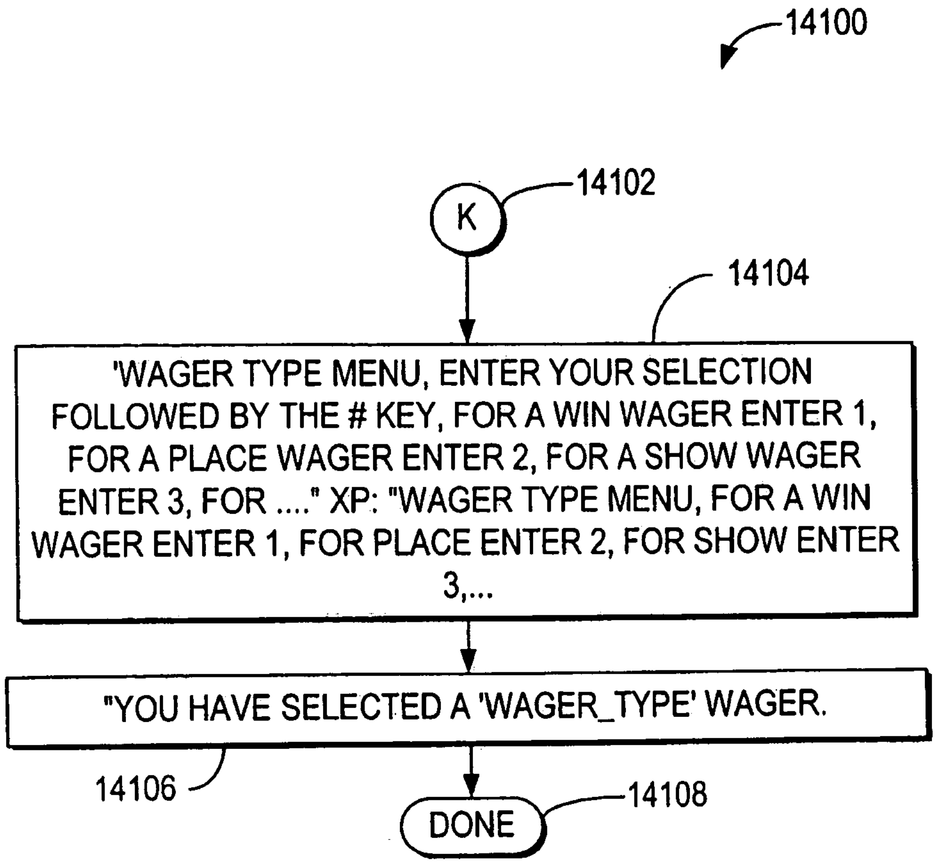

Wager type menu process 14100 is illustrated in FIG. 141. As shown, after process 14100 has begun at step 14102, the process prompts the user for a wager type at step 14104 and then verifies the user selection at step 14106. Once the wager type selection has been verified at step 14106, process 14100 then completes at step 14108.

Figure 142:
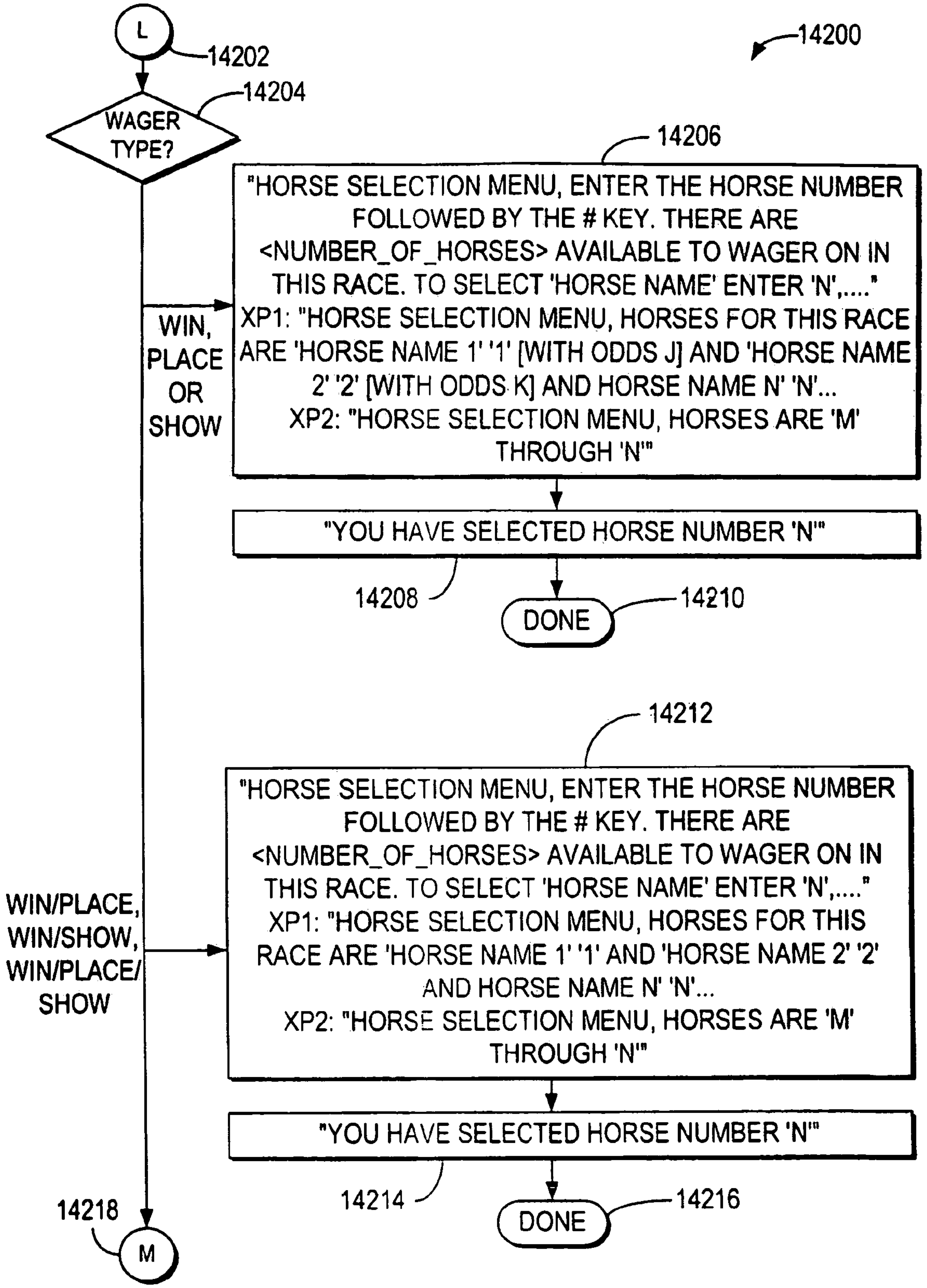
Figure 143:
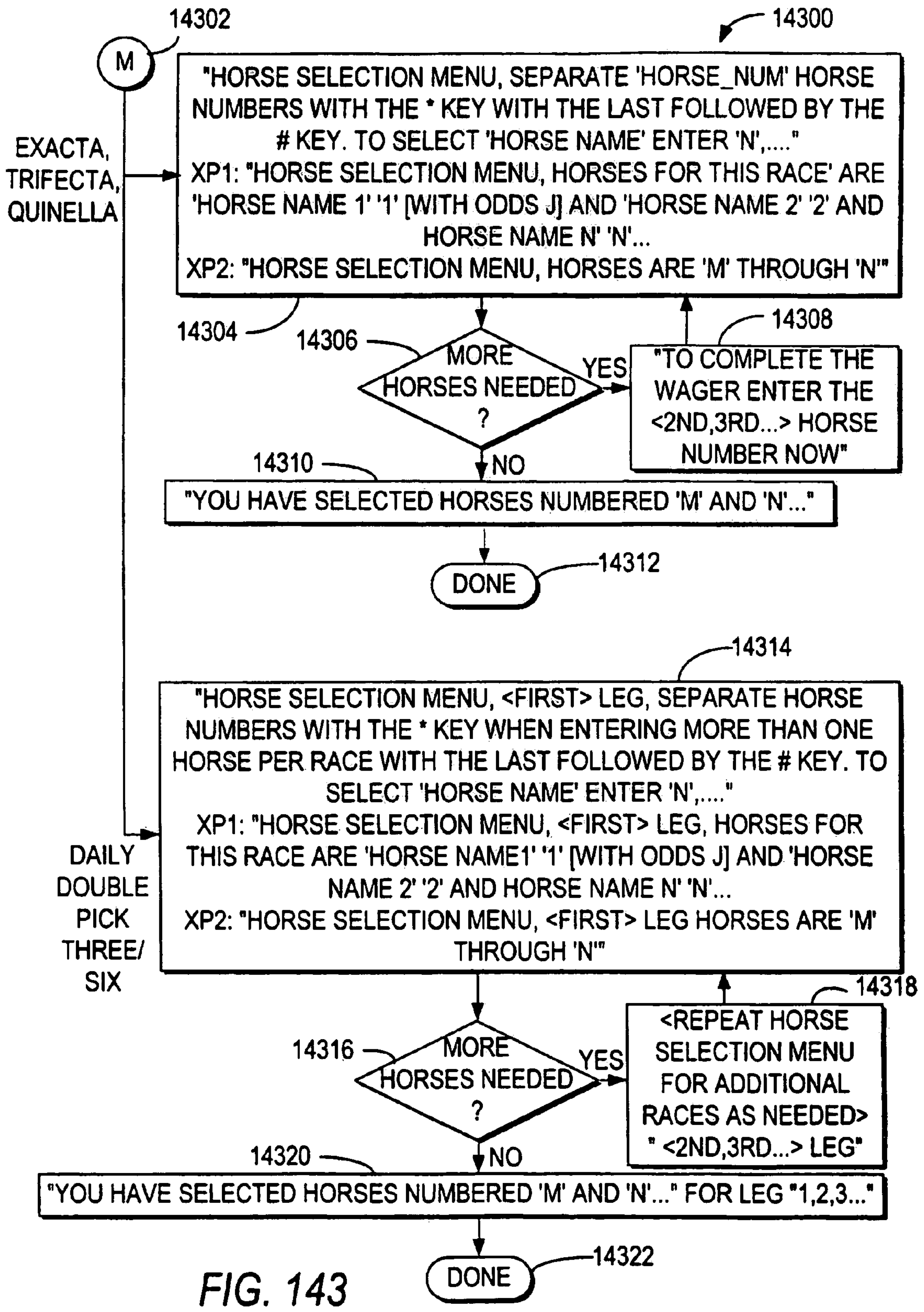

Horse selection menu process 14200 is shown in FIG. 142. As illustrated, process 14200 determines the wager type at step 14204 after process 14200 has initiated at step 14202. If the wager type is a win, place, or show, then process 14200 prompts the user for a horse selection at step 14206, verifies the selection at step 14208, and then terminates at step 14210. If the wager type is a win/place, win/show, or win/place/show, then process 14200 prompts the user for a horse selection at step 14212, verifies the selection at step 14214, and then terminates at step 14216. If the wager type is not a win, place, show, win/place, win/show, or win/place/show, then process 14200 transfers control to process 14300 (FIG. 143) through steps 14218 and 14302. Then, if the wager type is an exacta, trifecta, or quinella, process 14300 prompts the user to select horses at step 14304. If more horses are needed to complete the wager, then process 14300 branches at step 14306 to step 14308 to prompt the user to select the next horse. Once all of the horses have been selected, process 14300 verifies the horse selections at step 14310 and completes at step 14312. Otherwise, if the wager type is a daily double, or a pick three or pick six, then process 13900 prompts the user to select horses at step 14314. If more horses are needed to complete the wager, then process 14300 branches at step 14316 to step 14318 to prompt the user to select the next horse. Once all of the horses have been selected, process 14300 verifies the horse selections at step 14320 and completes at step 14322.

Figure 144:
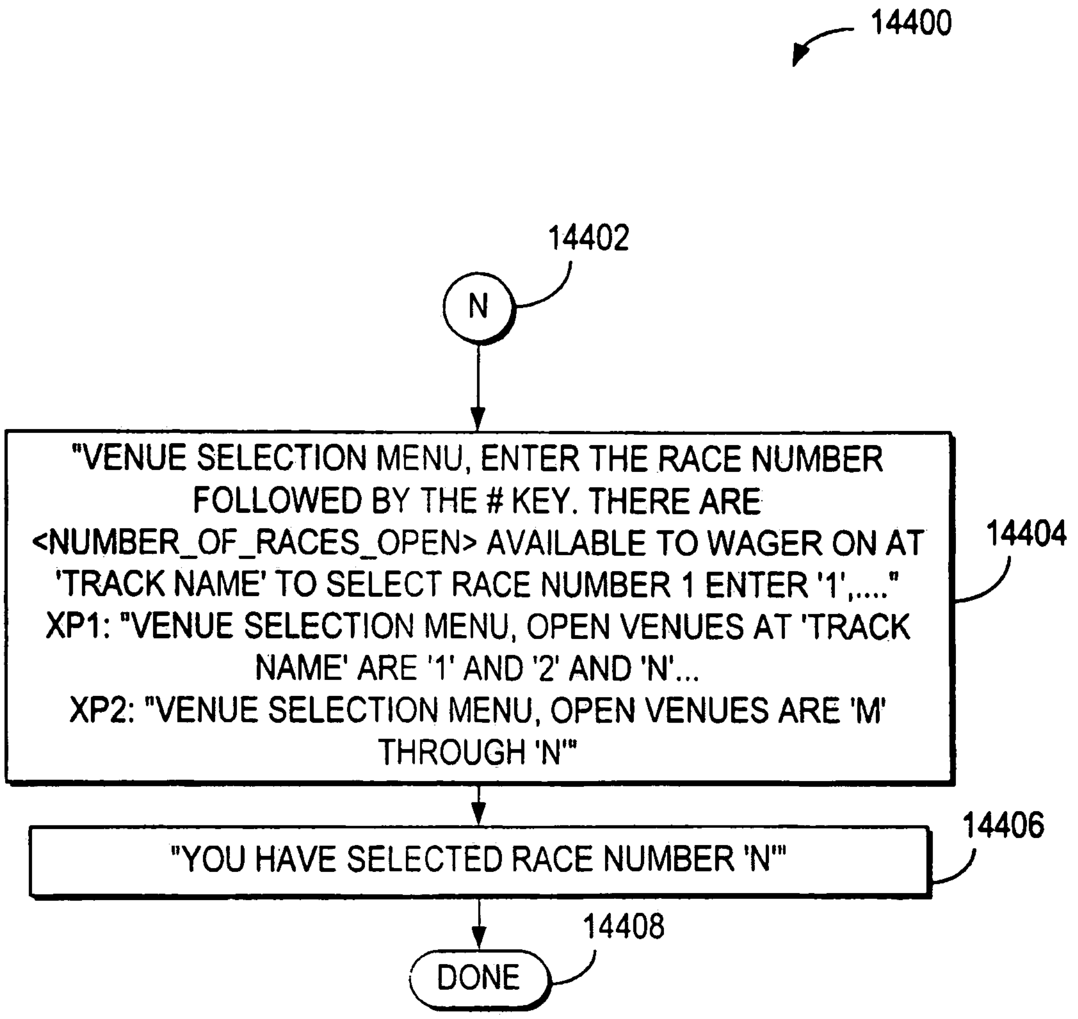

Venue selection menu process 14400 is illustrated in FIG. 144. Once process 14400 has begun at step 14402, the process then prompts the user for a race number selection at step 14404. Next, process 14400 verifies the race number selection at step 14406 and then terminates at step 14408.

Figure 145:
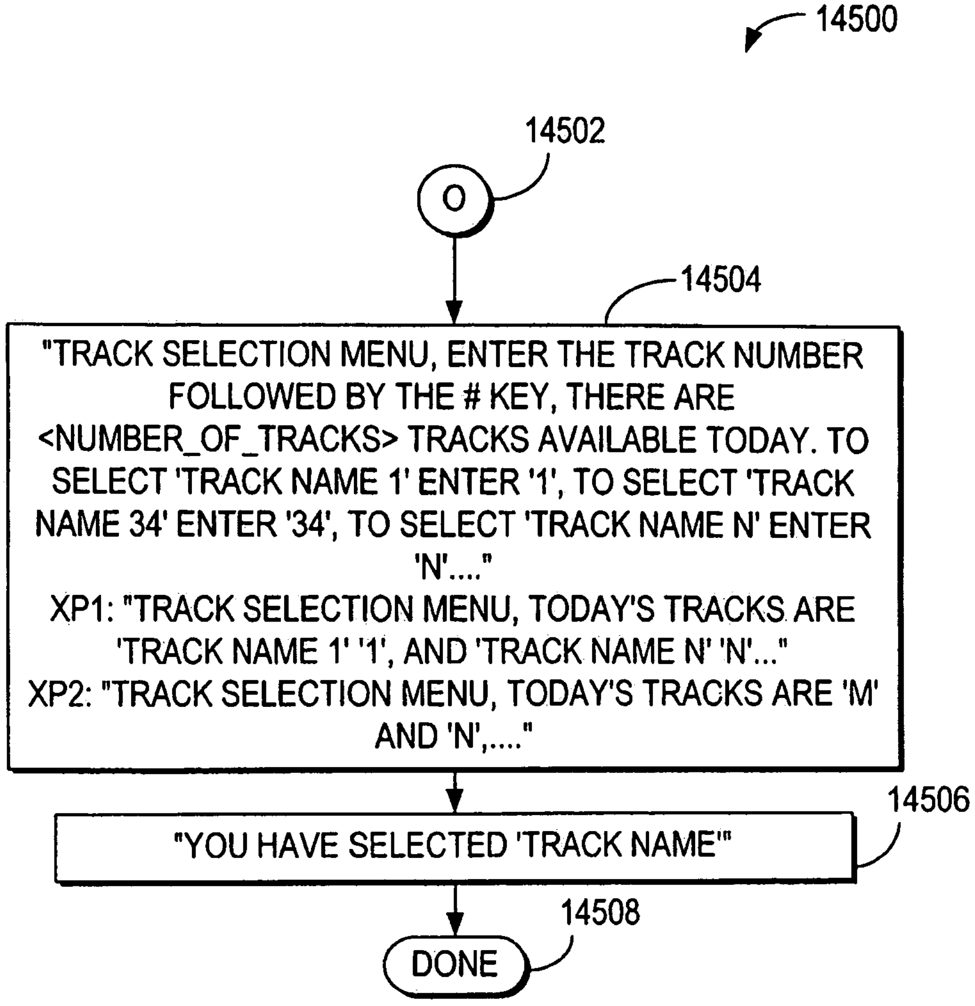

Track selection menu process 14500 is shown in FIG. 145. After process 14500 has begun at step 14502, the process prompts the user for a track selection at step 14504. Process 14500 then verifies the track selection at step 14506 and terminates at step 14508.

Figure 146:
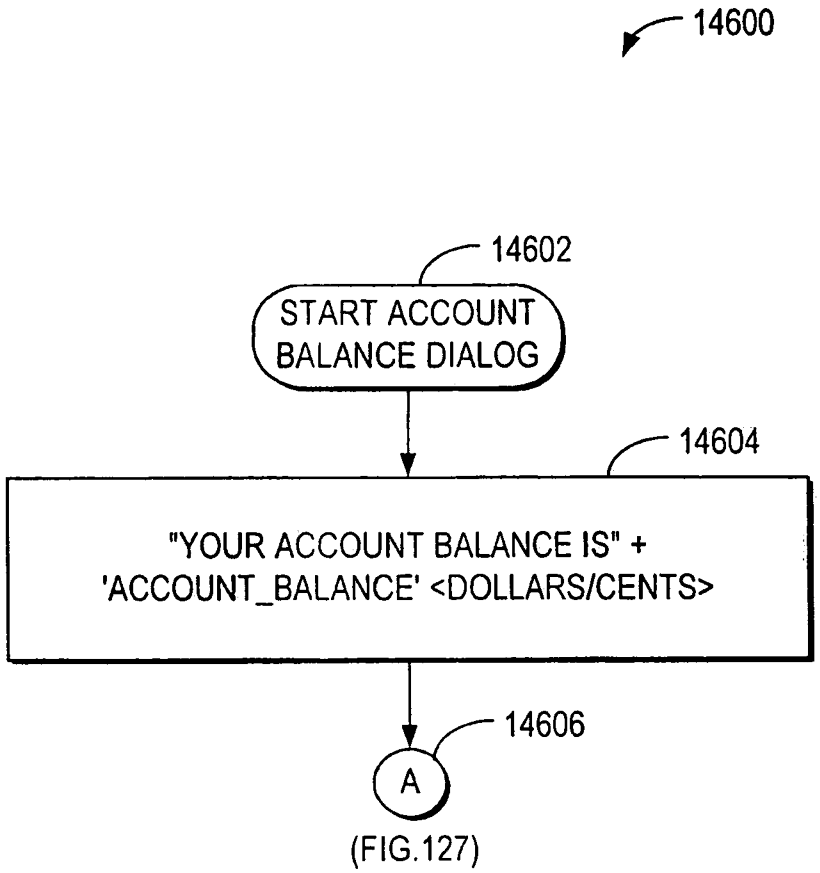

As stated above, if in response to the IVR interface main menu presented in step 12712 of FIG. 127, the user selects to hear his or her account balance, account balance process 14600 is initiated as illustrated in FIG. 146. As shown, once process 14600 begins at step 14602, the process then presents the user's account balance to the user at step 14604. The account balance presented may reflect wagers placed through any of the user interfaces available from set-top box 104, telephone 106, and computer 108 (FIG. 1). Process 14600 then transfers control back to step 12712 of process 12700 (FIG. 127) through steps 14606 and 12724.

Figure 147:
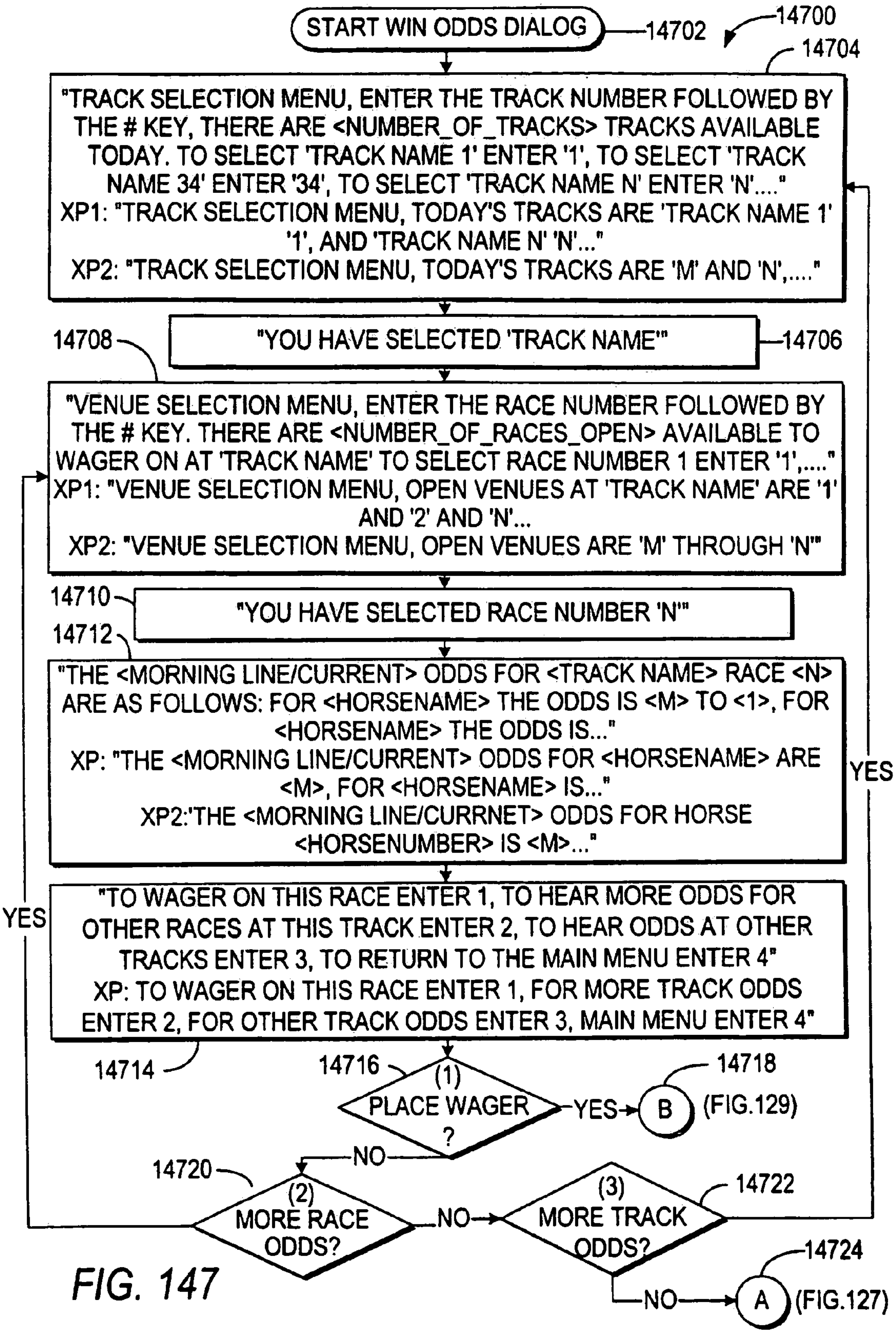

If the user selects to listen to win odds from the main menu presented in step 12712 of FIG. 127, process 14700 of FIG. 147 is executed. As shown, after process 14700 begins at step 14702, the process prompts the user for a track selection at step 14704 and verifies the track selection at step 14706. Next, process 14700 prompts the user for a race selection at step 14708 and then verifies the race selection at step 14710. The win odds for each horse are then presented to the user at step 14712. Once the interface has presented the win odds, process 14700 asks the user whether he or she wants to wager on the selected race, hear more odds for other races at the selected track, hear odds at other tracks, or return to the main menu. If the user selects to place a wager, process 14700 branches at step 14716 to step 12912 of FIG. 129 through steps 14718 and 12918. If the user selects to hear more odds at the same track, process 14700 branches at step 14720 back to step 14708. If the user selects to hear odds at other tracks, process 14700 branches at step 14722 to step 14704. Otherwise, process 14700 transfers control to step 12712 of process 12700 of FIG. 127 through steps 14722 and 12724.

Figure 148:
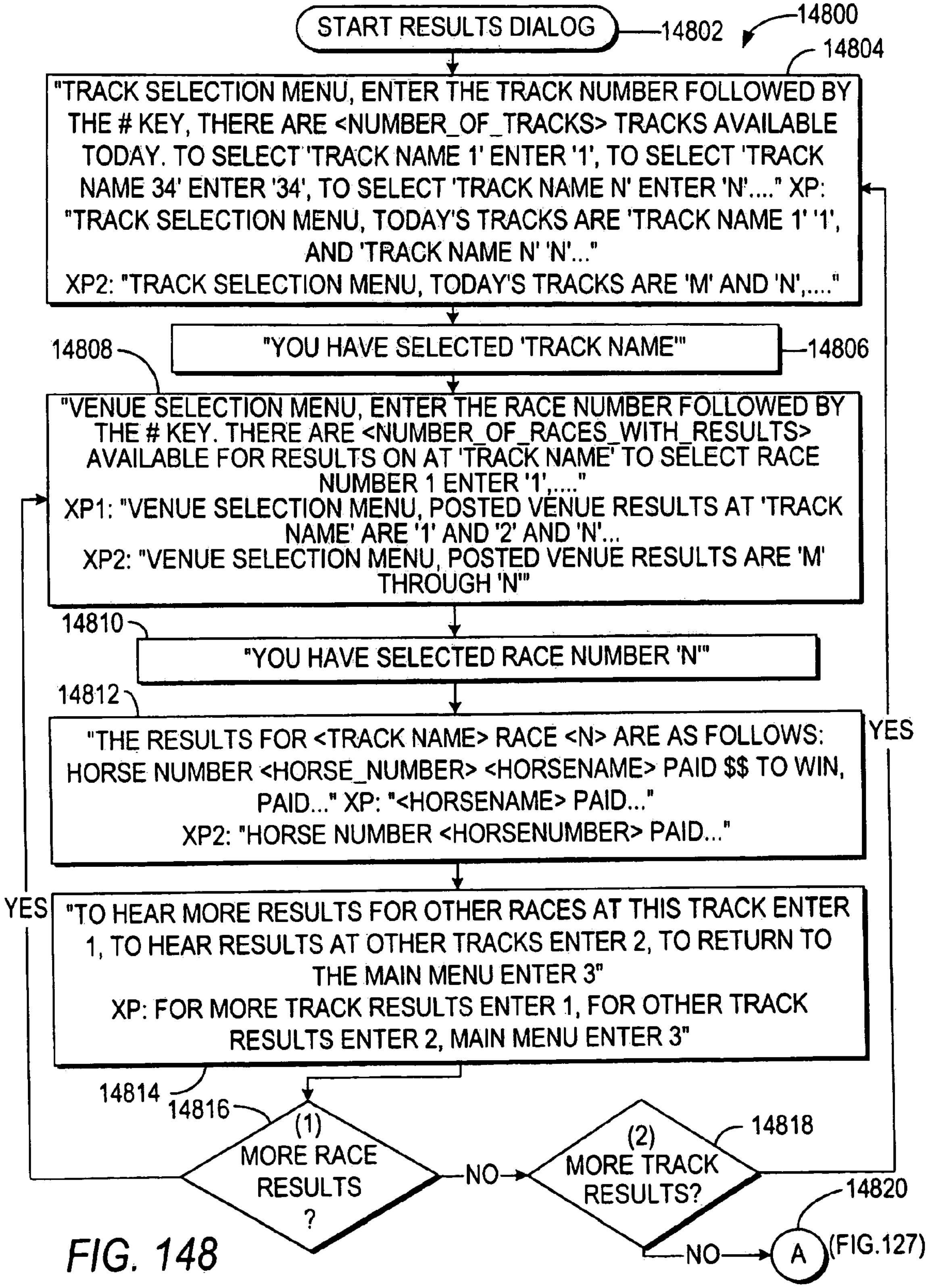

If the user selects to listen to results from the main menu presented in step 12712 of FIG. 127, process 14800 of FIG. 148 is executed. As shown, after process 14800 begins at step 14802, the process prompts the user for a track selection at step 14804 and verifies the track selection at step 14806. Next, process 14800 prompts the user for a race selection at step 14808 and then verifies the race selection at step 14810. The results for the selected race are then presented to the user at step 14812. Once the interface has presented the results, process 14800 asks the user whether he or she wants to hear more results for other races at the selected track, hear results at other tracks, or return to the main menu. If the user selects to hear more results at the same track, process 14800 branches at step 14816 back to step 14808. If the user selects to hear results at other tracks, process 14800 branches at step 14818 to step 14804. Otherwise, process 14800 transfers control to step 12712 of process 12700 of FIG. 127 through steps 14820 and 12724.

Figure 149:
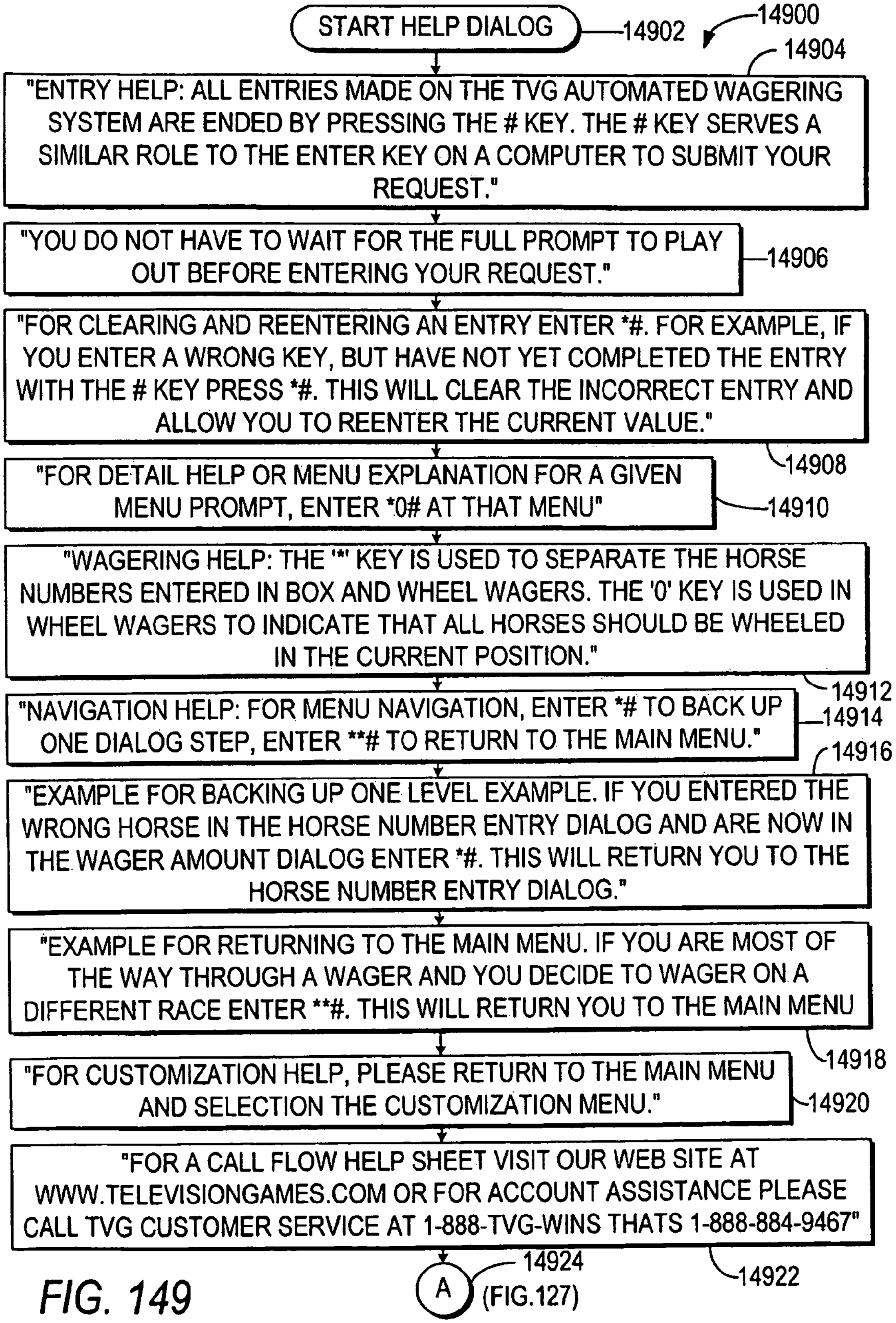

Help process 14900 is illustrated in FIG. 149. As shown, once process 14900 has begun at step 14902, the process presents a series of pieces of help information to the user at steps 14904-14922. Once the pieces of help information have been presented, process 14900 transfers control to step 12712 of process 12700 of FIG. 127 through steps 14924 and 12724.

Figure 150:
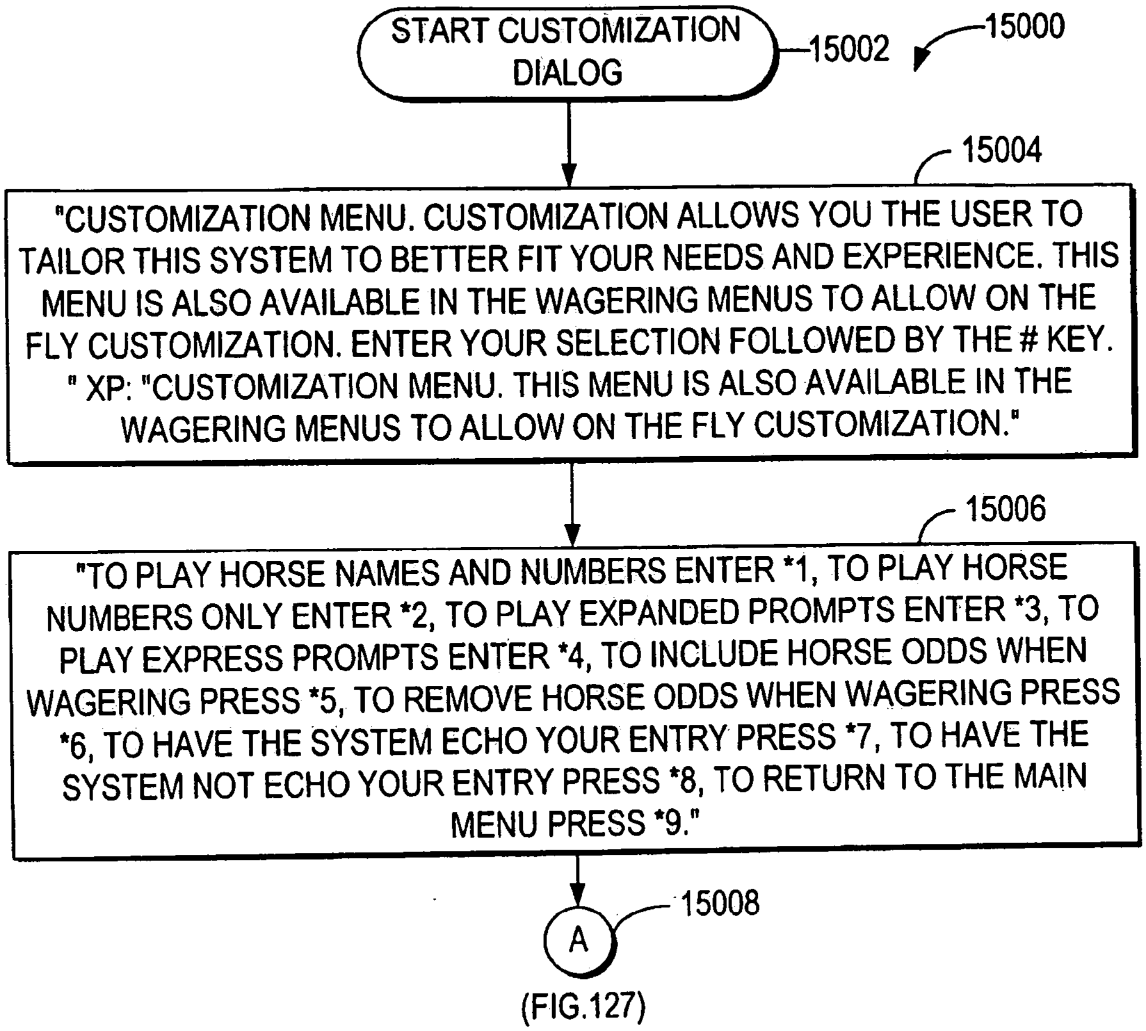

Customization process 15000 is shown in FIG. 150. As illustrated, once process 15000 has begun at step 15002, the process presents initial information regarding the customization feature to the user at step 15004. Then at step 15006, process 15000 prompts the user to select whether the user wants select to hear both horse names and numbers, horse names only, expanded prompts, express prompts, horse odds when wagering, no horse odds when wagering, entry verifications, or no entry verifications, or whether the user wants to return to the main menu. The user selection is then stored and used by the IVR interface to control the corresponding features of other processes disclosed above. Finally, through steps 15008 and 12724 (FIG. 127), process 15000 returns control to step 12712 of process 12700 of FIG. 127.

Figure 151:
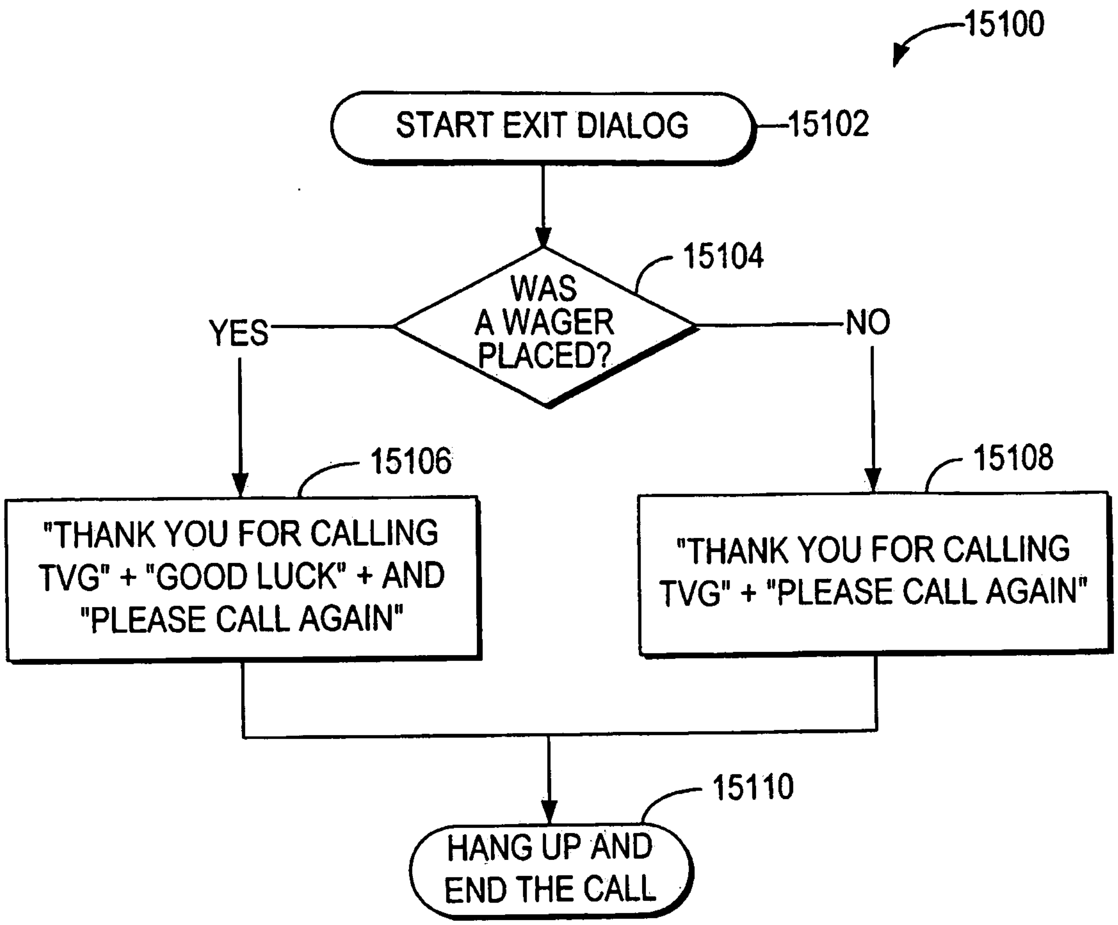

Finally, exit process 15100 is shown in FIG. 151. As can be seen, after process 15100 has begun at step 15102, process 15100 determines at step 15104 if a wager has been placed. If a wager has been placed, process 15100 presents a first "thank you" message at step 15106 and then ends the call at step 15110. Otherwise, if a wager has not been placed, process 15100 presents a second "thank you" message at step 15108 and then ends the call at step 15110.

Thus systems and methods for interactive wagering using multiple types of user interfaces are described. One skilled in the art will appreciate that the present invention may be practiced by other than the described embodiments, which are presented for purposes of illustration and not of limitation, and the present invention is limited only by the claims that follow.

What is claimed is:

1. A system for interactive wagering, comprising:
- a centralized wagering data hub in communication with a plurality of types of user devices, the centralized data hub comprising:
  - a centralized wagering events database that stores:
    - wagering data associated with a plurality of wagering events; and
    - handicapping data associated with the plurality of wagering events;
  - a subscriber management system that stores data relating to a plurality of wagering accounts, wherein said wagering accounts data is received from one or more wagering data sources; and
  - a first and second wagering user interface servers associated with a respective first and second user interface types, the first and second wagering user interface servers located in the centralized wagering data hub and the first user interface type being different from the second user interface type, wherein the first wagering user interface server is configured to:
    - receive a wagering user request associated with placing a wager for one of the plurality of wagering events from a user associated with a first one of the plurality of wagering accounts via a first user device, the first user device having the first user interface type;
    - authorize the wagering user request; and
    - provide an outcome of the wagering user request received at the first user device to a second user device having the second user interface type and being accessed from the first wagering account, wherein the first and second wagering user interface servers are in communication in the centralized wagering data hub, the first wagering user interface server provides a user interface of the first type to the first device and the second wagering user interface server provides a user interface of the second type to the second device, and wherein the user interface of the first type provided by the first wagering user interface server is automatically customized to be one of a first kind or a second kind depending on an attribute of the first wagering account.

2. The system of claim 1, wherein one of the first and second wagering user interface servers is a television wagering control system that provides at least one of the data relating to the first wagering account, the wagering data, and the handicapping data to a television distribution system and that receives information for the wager from a television wagering terminal.

3. The system of claim 2, wherein the television wagering control system receives the wager information from the television wagering terminal via one of a telephone system connection, a cable system connection, and a computer network connection.

4. The system of claim 2, wherein at least another one of the first and second wagering user interface servers is an interactive voice response control system that:
- receives a telephone call from an external source,
- provides, to the external source through the telephone call, voice prompts that correspond to at least one of the data relating to the first wagering account, the wagering data, and the handicapping data; and
- receives the wager information from the external source through the telephone call.

5. The system of claim 4, wherein the interactive voice response control system receives the wager information as one of the group consisting of signals generated in response to one or more telephone key depressions and verbal commands that are spoken by a caller.

6. The system of claim 2, wherein at least another one of the first and second wagering user interface servers is a computer wagering control system that provides at least one of the data relating to the first wagering account, the wagering data, and the handicapping data to an external computer and that receives the wager information from the external computer.

7. The system of claim 6, wherein the computer wagering control system provides the at least one of the data relating to the first wagering account, the wagering data, and the handicapping data to the external computer and receives the wager information from the external computer, through one of an Internet connection to the external computer, a telephone connection to the external computer, and a wireless connection to the external computer.

8. The system of claim 1, wherein:
- the first device is a portable wireless device; and
- the second device is one of a television wagering terminal and a computer wagering system configured to provide the wager outcome corresponding to the wager information received at the portable wireless device.

9. The system of claim 1, wherein the first wagering user interface server is further configured to:
- send a wagering authorization request to the subscriber management system to place the wager by the user;
- receive a wagering authorization response from the subscriber management system to place the wager;
- determine a target wagering data source from the one or more wagering data sources; and
- send the authorized wager to the target wagering data source.

10. The system of claim 1, wherein the first wagering user interface server is further configured to:
- determine a target wagering data source from the one or more wagering data sources;
- send a wagering authorization request to the target wagering data source to place the wager by the user;
- receive a wagering authorization response from the target wagering data source; and
- send the authorized wager to the target wagering data source.

11. The system of claim 1, wherein the wagering user interface servers provide a customizable user interface on each of the first and second user devices depending on an attribute of the wagering account.

12. The system of claim 1, wherein the plurality of wagering data sources comprises at least one of one or more tote companies, one or more racing data providers, and one or more handicapping data providers.

13. The system of claim 1, wherein the first wagering user interface server provides first access capabilities to the centralized wagering data hub from the first user device and wherein the second wagering user interface server provides second access capabilities to the second user device, wherein the second access capabilities are a subset of the first access capabilities.

14. A method for interactive wagering using a centralized wagering data hub in communication with a plurality of types of user devices, the method comprising:

storing, in a centralized wagering events database in the centralized wagering data hub:

wagering data associated with a plurality of wagering events; and handicapping data associated with the plurality of wagering events;

storing, in a subscriber management system in the centralized wagering data hub, data relating to a plurality of wagering accounts, wherein said wagering accounts data is received from one or more wagering data sources;

receiving, using a centralized wagering control system in the centralized wagering data hub a wagering user request associated with placing a wager for one of the plurality of wagering events from a user associated with a first one of the plurality of wagering accounts via a first user device, wherein the centralized wagering control system comprises a first and second wagering user interface servers associated with a respective first and second user interface types, the first and second wagering user interface servers located in the centralized wagering data hub and the first user interface type being different from the second user interface type, the first user device having the first user interface type;

authorizing the wagering user request using the first wagering user interface server; and providing an outcome of the wagering user request received at the first user device to a second user device having the second user interface type, wherein the first and second wagering user interface servers are in communication in the centralized wagering data hub, the first wagering user interface server provides a user interface of the first type to the first device and the second wagering user interface server provides a user interface of the second type to the second device, and wherein the user interface of the first type provided by the first wagering user interface server is automatically customized to be one of a first kind or a second kind depending on an attribute of the first wagering account.

15. The method of claim 14, wherein the providing comprises providing at least one of the data relating to the first wagering account, the wagering data, and the handicapping data to a television distribution system, and the receiving comprises receiving information for the wager from a television wagering terminal.

16. The method of claim 15, wherein the television wagering terminal is one of a cable television set-top box and a satellite television receiver.

17. The method of claim 15, wherein the receiving comprises receiving the wager information from the television wagering terminal via one of a telephone system connection, a cable system connection, and a computer network connection.

18. The method of claim 15, further comprising:

receiving a telephone call from an external source;

providing, to the external source through the telephone call, voice prompts that correspond to at least one of the data relating to the first wagering account, the wagering data, and the handicapping data; and receiving the wager information from the external source through the telephone call.

19. The method of claim 18, wherein the receiving comprises receiving the wager information as one of the group consisting of signals generated in response to one or more telephone key depressions and verbal commands that are spoken by a caller.

20. The method of claim 15, wherein the providing comprises providing the at least one of the data relating to the first wagering account, the wagering data, and the handicapping data to an external computer and the receiving comprises receiving the wager information from the external computer.

21. The method of claim 20, wherein the providing comprises providing at least one of the data relating to the first wagering account, the wagering data, and the handicapping data to an external computer and the receiving comprises receiving the wager information from the external computer, through one of an Internet connection to the external computer, a telephone connection to the external computer, and a wireless connection to the external computer.

* * * * *

UNITED STATES PATENT AND TRADEMARK OFFICE

CERTIFICATE OF CORRECTION

PATENT NO. : 8,419,544 B2
APPLICATION NO. : 12/077305
DATED : April 16, 2013
INVENTOR(S) : McNutt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 595 days.

Signed and Sealed this
Thirtieth Day of December, 2014

Michelle K. Lee
*Deputy Director of the United States Patent and Trademark Office*